US010693556B2

(12) United States Patent
Heath et al.

(10) Patent No.: US 10,693,556 B2
(45) Date of Patent: Jun. 23, 2020

(54) METHOD AND APPARATUS FOR THE DETECTION OF DISTORTION OR CORRUPTION OF CELLULAR COMMUNICATION SIGNALS

(71) Applicant: Viavi Solutions, Inc., San Jose, CA (US)

(72) Inventors: Jeffrey Abramson Heath, Jericho, NY (US); Eric Walter Hakanson, Gilroy, CA (US); Dmitriy Yavid, Stony Brook, NY (US); Christopher Silvio Cosentino, Union City, NJ (US); Stuart William Card, Newport, NY (US)

(73) Assignee: Viavi Solutions Inc., San Jose, CA (US)

( * ) Notice: Subject to any disclaimer, the term of this patent is extended or adjusted under 35 U.S.C. 154(b) by 0 days.

(21) Appl. No.: 16/460,844

(22) Filed: Jul. 2, 2019

(65) Prior Publication Data
US 2019/0326986 A1    Oct. 24, 2019

Related U.S. Application Data

(63) Continuation of application No. 16/258,350, filed on Jan. 25, 2019, now Pat. No. 10,476,589, which is a (Continued)

(51) Int. Cl.
*H04B 10/00* (2013.01)
*H04B 10/079* (2013.01)
(Continued)

(52) U.S. Cl.
CPC ......... *H04B 10/07953* (2013.01); *H04B 1/10* (2013.01); *H04B 1/1027* (2013.01);
(Continued)

(58) Field of Classification Search
USPC .................................................. 398/115–117
See application file for complete search history.

(56) References Cited

U.S. PATENT DOCUMENTS 8,903,324 B1    12/2014 Bradley
9,306,618 B2 *  4/2016 Charlon ................. H04B 1/525
(Continued)

FOREIGN PATENT DOCUMENTS

WO    WO 2015/172798    11/2015

*Primary Examiner* — Agustin Bello
(74) *Attorney, Agent, or Firm* — Farjami & Farjami LLP

(57) ABSTRACT

A system for troubleshooting signals in a cellular communications network, and in particular, for determining the cause of distortion or corruption of such signals, includes a robotic or other type of switch. The robotic switch can tap into selected uplink fiber-optic lines and selected downlink fiber-optic lines between radio equipment and radio equipment controllers in a wireless (e.g., cellular) network to extract therefrom the I and Q data. The selected I and Q data, in an optical form, is provided to an optical-to-electrical converter forming part of the system. The system includes an FPGA (Field Programmable Gate Array) or the like, and an analytic computer unit, or web server, and SSD (Solid State Drive) and magnetic disk storage, among other components of the system. The system analyzes the I and Q data provided to it, and determines the cause, or at least narrows the field of possible causes, of impairment to transmitted signals. The system includes a display which provides the troubleshooting information thereon for a user of the system to review, or other form of a report, and may communicate the analytical findings to a remote location over a public or private internet protocol network.

38 Claims, 40 Drawing Sheets

Related U.S. Application Data continuation of application No. 15/913,120, filed on Mar. 6, 2018, now Pat. No. 10,243,652, which is a continuation of application No. 15/408,913, filed on Jan. 18, 2017, now Pat. No. 9,941,959.

(60) Provisional application No. 62/279,958, filed on Jan. 18, 2016.

(51) Int. Cl.

| | | |
|---|---|---|
| *H04B 1/10* | (2006.01) | |
| *H04B 1/525* | (2015.01) | |
| *H04L 12/24* | (2006.01) | |
| *H04L 12/26* | (2006.01) | |
| *H04Q 11/00* | (2006.01) | |
| *H04W 24/08* | (2009.01) | |
| *H04B 17/00* | (2015.01) | |
| *H04B 17/336* | (2015.01) | |

(52) U.S. Cl.
CPC ........... *H04B 1/525* (2013.01); *H04L 41/069* (2013.01); *H04L 41/0645* (2013.01); *H04L 43/045* (2013.01); *H04Q 11/0066* (2013.01); *H04W 24/08* (2013.01); *H04B 17/0085* (2013.01); *H04B 17/336* (2015.01); *H04Q 2011/0083* (2013.01)

(56) References Cited

U.S. PATENT DOCUMENTS

| | | | | |
|---|---|---|---|---|
| 9,413,417 B2* | 8/2016 | Fleischer | ............... | H04B 1/525 |
| 9,479,380 B2* | 10/2016 | Alles | .................... | H04B 1/1027 |
| 9,802,701 B1* | 10/2017 | Hawes | .................. | B64C 39/024 |
| 9,826,263 B2* | 11/2017 | Zinevich | ............. | H04N 21/2385 |
| 9,941,959 B2* | 4/2018 | Heath | ................. | H04L 41/0645 |
| 10,027,368 B2* | 7/2018 | Gravely | ................. | H04B 1/525 |
| 10,263,721 B2* | 4/2019 | Phillips | ................ | H04J 11/0036 |
| 2006/0248564 A1* | 11/2006 | Zinevitch | .............. | H04N 17/00 725/121 |
| 2010/0085061 A1 | 4/2010 | Bradley | | |
| 2014/0253361 A1* | 9/2014 | Rezk | ....................... | G01S 7/021 342/16 |
| 2015/0078226 A1* | 3/2015 | Charlon | ................. | H04B 1/525 370/290 |
| 2015/0171902 A1* | 6/2015 | Fleischer | ............... | H04B 1/525 375/285 |
| 2015/0326334 A1* | 11/2015 | Alles | .................... | H04B 1/1027 375/343 |
| 2015/0341062 A1* | 11/2015 | Alles | .................... | H04B 1/1027 375/296 |
| 2016/0266184 A2* | 9/2016 | Detert | ....................... | H04L 1/00 |
| 2017/0033822 A1* | 2/2017 | Le Meur | ................ | G01S 7/021 |
| 2017/0126337 A1* | 5/2017 | Schwab | ................. | H04B 3/46 |
| 2017/0222858 A1* | 8/2017 | Wilson | ................... | H04B 1/123 |
| 2017/0237484 A1* | 8/2017 | Heath | .................. | H04L 41/069 398/26 |
| 2017/0359839 A1* | 12/2017 | Wang | ............... | H04W 74/0833 |
| 2018/0198520 A1* | 7/2018 | Heath | .................. | H04L 41/069 |
| 2018/0210774 A1* | 7/2018 | Young | ....................... | G06F 3/14 |
| 2018/0262370 A1* | 9/2018 | Al-Mufti | ................. | H04L 25/02 |
| 2018/0295617 A1* | 10/2018 | Abdelmonem | ......... | H04L 43/50 |
| 2018/0332487 A1* | 11/2018 | Beck | ..................... | H04B 17/27 |
| 2019/0058534 A1* | 2/2019 | Anderson | ............ | H04W 24/08 |
| 2019/0140690 A1* | 5/2019 | Hwang | .................. | H04W 28/04 |
| 2019/0349776 A1* | 11/2019 | Yankevich | ............... | H04B 1/00 |

\* cited by examiner

| Events | Controls | Markers | Traces | Limits |

Trace ⎯494    Limit ⎯496

☐ Max Hold  
☐ N Sec Max Window  
☐ Nth Percentile  
☐ Real-time Average  
☐ Real-time

[Add Point] [Delete Point]  ⇐ [Select Point] [Select Point] ⇒

[All Limits Off]   [Save Limits]

⎯498

| Point # | | |
|---|---|---|
| 1 | Frequency: 1980.000 001 MHz | Amplitude: -90.1 dBm |
| 2 | Frequency: 1980.000 001 MHz | Amplitude: -90.1 dBm |
| 3 | Frequency: 1980.000 001 MHz | Amplitude: -90.1 dBm |
| 4 | Frequency: 1980.000 001 MHz | Amplitude: -90.1 dBm |

FIG. 8F

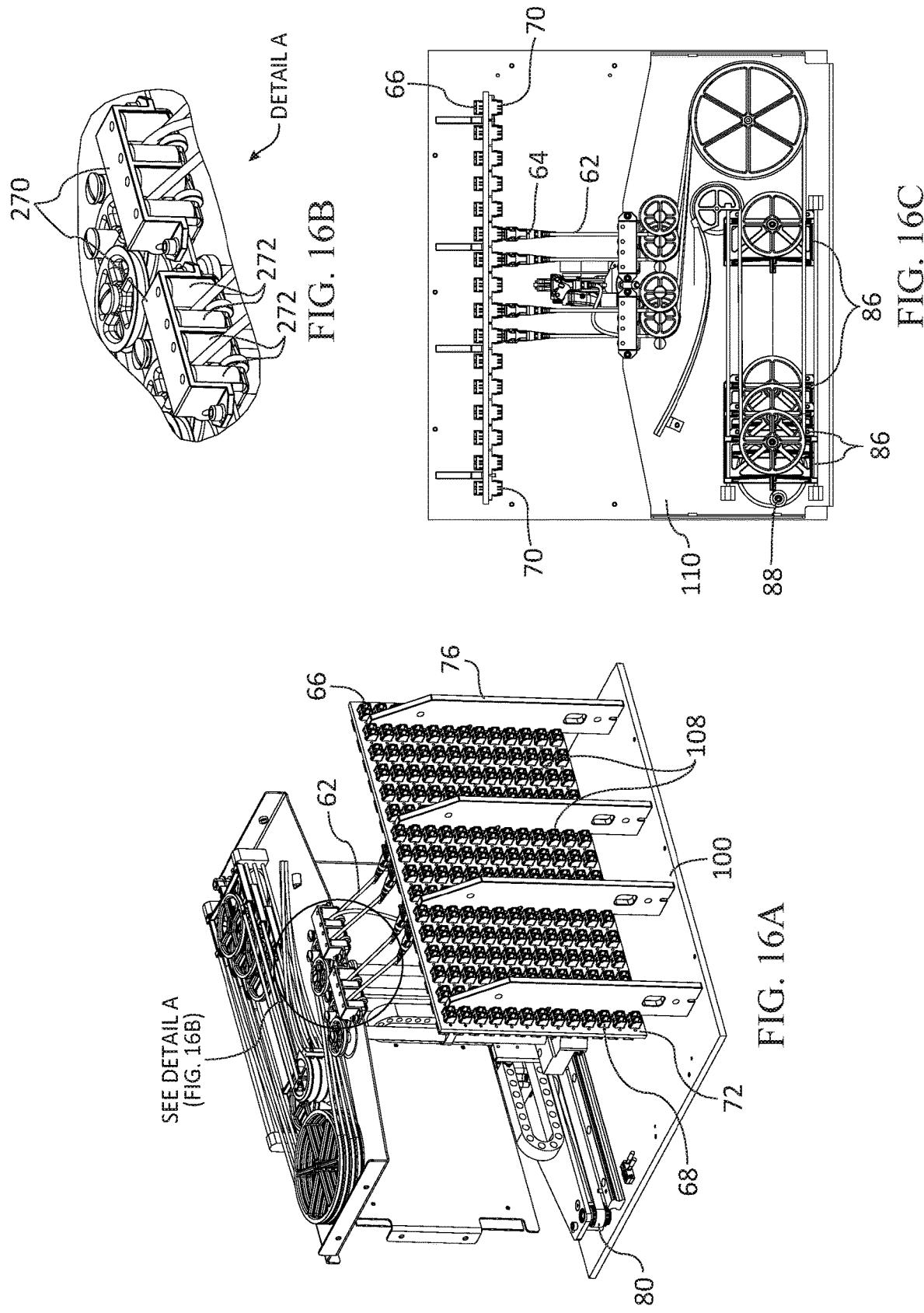

METHOD AND APPARATUS FOR THE DETECTION OF DISTORTION OR CORRUPTION OF CELLULAR COMMUNICATION SIGNALS

CROSS REFERENCE TO RELATED APPLICATION

This application is a continuation of U.S. patent application Ser. No. 16/258,350, filed on Jan. 25, 2019, entitled "Method and Apparatus for the Detection of Distortion or Corruption of Cellular Communication Signals," which is a continuation of U.S. patent application Ser. No. 15/913,120, filed on Mar. 6, 2018, entitled "Method and Apparatus for the Detection of Distortion or Corruption of Cellular Communication Signals," now U.S. Pat. No. 10,243,652, which is a continuation of U.S. patent application Ser. No. 15/408,913, filed on Jan. 18, 2017, entitled "Method and Apparatus for the Detection of Distortion or Corruption of Cellular Communication Signals," now U.S. Pat. No. 9,941,959, which claims the benefit of priority under 35 U.S.C. 119 and/or 35 U.S.C. 120 to U.S. Provisional Application Ser. No. 62/279,958, filed on Jan. 18, 2016, entitled "Method and Apparatus for the Detection of Distortion or Corruption of Communication Signals based on I/Q Signals", the disclosure of each of which is incorporated herein by reference and on which priority is hereby claimed.

BACKGROUND OF THE INVENTION

Field of the Invention

The present invention relates to wireless telecommunications networks, and more specifically relates to systems, equipment, components, software and methods for troubleshooting signals in cellular communications networks.

Description of the Prior Art

A) Overview of Wireless Telecommunications Networks

FIG. 1 shows an overview of a typical wireless telecommunications network 2. To facilitate an understanding of the invention, the steps in carrying on a conversation between New York and California on a wireless cellular network 2 will now be explained. When the person in New York inputs on his cellular phone 4 the number of the person in California and presses "call" or "send", a process is started to find the person in California and send a message to them to make his phone ring. When the person in California answers the call, a transmission path is set up to send and receive their conversation across the country.

For the purposes of this invention, the details of how the phone conversation is set up need not be described. This present invention is concerned with enabling the accurate recovery of a transmitted message in the section 6 of the network 2 which is linked by a radio transmitter and radio receiver. This section 6 of the network 2 is called the "Radio Access Network" which is commonly abbreviated as "RAN". For purposes of illustration, we will describe a voice conversation. However, the same concepts apply to any other radio transmission (data, video, etc.)

B) The Radio Access Network (RAN) is the Weakest Link in a Wireless Telecommunications Network Telecommunications is a chain of transmit and receive processes. In the case of voice conversations, human speech is received by a microphone and converted to analog signals (modulation of electromagnetic force (changes in voltage with respect to time)). The analog signals are converted to a digital representation in an analog-to-digital converter and then the digits (1s and 0s) are transported over a distance to a receiver where the 1s and 0s are converted from digital back to analog and presented to a person via a speaker. If the digital signal (1s and 0s) is not received exactly as it was transmitted, then there is distortion in the audio signal, and the person at the receiving end may not understand the conversation.

Referring again to FIG. 1, each connection between a transmitter and a receiver is commonly referred to as a "hop". An end-to-end connection consists of several hops, each of which must correctly transmit and receive the data, through multiple Mobile Switching Centers (MSC) 7. The limiting factor in the network equipment's ability to accurately recover the signal is the signal to interference plus noise ratio ("SINR") at the receiver. Every receiving device has an SINR at which it can no longer correctly recover the signal that was sent by the transmitter. Mathematically, the signal to interference and noise ratio is expressed as:

$$SINR = \frac{\text{Signal level}}{\text{Interference} + \text{Noise level}}$$

where the level (amount) of the signal and the level of the noise are measured in the same units (usually power, expressed in Watts).

For each hop in the telecommunications network 2, the path between the transmitter and the receiver is called the "transmission medium" 8. In the mobile phone network 2, the transmission mediums are:

1. Transmission of pressure waves from the lips of a human talker to the microphone of a mobile phone 4 a short distance through earth's atmosphere.
2. Transmission of radio waves over-the-air from the mobile phone 4 to the radio receiver in the network 2 over distances up to approximately 10 kilometers.
3. Transmission of pulses of light through strands of glass (fiber-optic cables) 8 over distances up to approximately 100 kilometers.
4. Transmission of electrical force over electrical conductors over short distances (meters).
5. Transmission of pressure waves from the speaker of a mobile phone to the eardrums of a human listener a short distance through earth's atmosphere.

The environment in which pressure waves are transmitted by a talker to a microphone (item 1) and from a speaker to a listener (item 5) can be a significant source of distortion in the quality of the end-to-end conversation (example: talking or listening in a crowded, noisy room). However, this SINR environment is outside the control of the Wireless Service Provider (WSP), so it is not a process the WSP tries to quantify, measure, and manage.

The transmission of electrical signals in the network (item 4) occurs over short distances (usually along a circuit path inside a piece of equipment or short distances between pieces of equipment) and are generally near 100% reliable (literally greater than 99.999% reliability).

Transmission of light pulses through fiber-optic cables occurs over long distances, but the transmission medium 8 is very good. The characteristics of the fiber-optic cables are very well known and are very stable (i.e. the characteristics have very low variability). Therefore, even though transmission of light pulses over fiber-optic cable 8 covers long distances, it can be engineered to consistently provide greater than 99.999% reliability.

The transmission medium 8 in which almost all the problems occur is the over-the-air radio wave environment.

While the characteristics of radio wave transmission in free space (e.g., between the earth and the moon) are very well understood, the transmission of radio waves in the mobile phone network 2 can only be predicted statistically. There are several reasons for this:
1. The radio waves transmitted by the mobile phone 4 to the network receiver are relatively low power.
2. Radio wave transmission in the mobile phone environment does not occur in free space—it occurs in space that is filled with reflectors and absorbers (buildings, cars, people, etc. . . . ). This causes high variability in the signal level part of the SINR equation.
3. Radio waves must be transmitted on specific frequencies. If a device outside the control of the wireless service provider is broken and transmitting radio energy on the same frequency as the wireless service provider's network receiver, then this causes high variability in the interference part of the SINR equation.
4. The equipment that is used to transmit and receive radio waves over-the-air is exposed to harsh weather conditions while the equipment used for fiber-optic transmission is housed in environmentally-controlled offices. Therefore, the radio transmission and reception equipment is more prone to degradation and failure.

The net result is that the over-the-air radio transmission environment has high variability in the signal part (numerator) of the SINR equation and sometimes also has high variability in the interference and noise part (denominator) of the SINR equation.

Signal-to-Interference+Noise Ratio (SINR) for transmission of digital signals over fiber-optic lines:

$$SINR(\text{fiber}) = \frac{\text{predictable Signal}}{\text{predictable Noise (and no interference)}}$$

Signal-to-Interference+

Noise Ratio (SINR) for transmission of radio signals over-the-air:

$$SINR(RAN) = \frac{\text{unpredictable Signal}}{\text{unpredictable Interferene + Noise (sometimes)}}$$

The signal to noise ratio of the fiber-optic (and electrical) part of the network 2 is highly predictable, and the signal-to-noise ratio of the Radio Access Network 6 is highly unpredictable. If the variability is low, then telecommunications engineers can accurately design the system for high reliability. If there is high variability in the system, it is much more difficult to achieve high reliability. This is why the RAN environment is always the limiting factor in the reliability of mobile telecommunications networks.

C) Frequency Spectrum is a Scarce and Valuable Resource

In addition to the reliability problems, there are also capacity constraints in the RAN environment. The capacity for data transfer (measured in bits per second) over a fiber-optic line is vastly greater than the data transmission capacity of the RAN environment.

Frequency spectrum is a shared public resource that is regulated and controlled by governmental agencies (the Federal Communications Commission in the United States). The FCC auctions licenses to operate in defined frequency ranges to the wireless service providers. The frequency spectrum of the RAN environment is a precious resource because there is a finite supply. Because there is a limited supply of frequency spectrum, and because of the growth in demand for wireless services by consumers, the cost for these licenses has risen dramatically. The most recent frequency auction in the United States garnered $45 billion dollars for the right to use 50 MHz (megahertz) of frequency.

D) Summary of Key Points about the RAN:
1. The signal-to-noise ratio (SINR) at the most disadvantaged receiver is the limiting factor in any telecommunications system.

$$SINR = \frac{\text{signal power level}}{\text{interference + noise power level}}$$

When SINR goes down, reliability, capacity, and data throughput all go down.
When signal power goes down, SINR goes down.
When noise or interference goes up, SINR goes down.

2. The most disadvantaged receiver in all wireless telecom networks 2 is the receiver in the network 2 that must recover the radio signal transmitted by the mobile phone 4.
The transmit power of the mobile phone 4 cannot be increased because of safety concerns and because of practical limitations on size and battery power. Mobile phones 4 are limited by regulation to a maximum transmit power of less than ½ of a Watt (by contrast, microwave ovens operate at about 500 Watts).

3. The variability of the signal power level that is received by the wireless telecommunications network 2 is very high and cannot be controlled by engineers.
The signal that is transmitted by the mobile phone 4 is subject to conditions (reflection, absorption, and scattering) in the RAN environment that are well understood, but can only be predicted using statistical models.
The interaction of these effects is called "fading" and can result in temporary reductions of the signal level by factors of 10 to 100 (i.e. over a short period of time the signal level can be as little as ¹/₁₀₀th of the normal signal level).
The technique used to reduce the variability of received signal level is the use of multiple receive antennas 10 (called "diversity antennas"). This technique works because the probability is very low that both antennas 10 will experience fading by the changing RAN environment at the same time.

4. Under normal operating conditions, the noise power level (in the denominator of the SINR equation) is predictable and the interference is non-existent; however, there are often problems in the RAN environment that cause the interference and noise power level to be unpredictable. The main source of these problems is equipment degradation due to exposure to weather conditions and interference from other transmitters.

5. Engineers can design a system that accounts for the variability of the received signal power level and provides reasonably good reliability. However, because of zoning restrictions and practical economic and construction limitations, wireless service providers cannot put receivers everywhere they want. Therefore, wireless telecommunications networks 2 often operate near the reliable limits of transmission based on the SINR. If a connection between a mobile phone transmitter and the network receiver is operating near that limit and the interference or noise level rises, the radio link can become unusable; then speech becomes garbled or in the worst case the call drops.

E) Problem Conditions in the Radio Access Network (RAN)

Two problems which reduce the reliability and capacity of the wireless telecommunications network 2 are breakdowns in the balance of the diversity antennas 10, and increases in the noise level at the radio receiver. The equipment in the network 2 monitors for these conditions and sends notifications when problems are detected. The generic terms for these notifications are:

Diversity antenna imbalance alarm, when the signal strength from the multiple receive antennas 10 is significantly different for a sustained amount of time. While fading can cause short term differences, if the difference is large and stays for a while, something else is causing the problem. The most common causes are a failed antenna or connecting cable in one branch. These can be outright failures, such as a broken cable, but are more commonly a subtler problem such as Passive Intermodulation Distortion.

High RSSI (Received Signal Strength Indicator). High RSSI is misleading because it seems like high signal strength would be good, not bad. The reason that high RSSI is detected as a possible problem condition is:

The mobile network 2 sends power control commands to the mobile phone 4 to power down the mobile phone's transmitter to a level that is strong enough to maintain a SINR that enables good quality reception but not stronger than necessary. Keeping the transmit power level of the phone 4 as low as possible while still maintaining a good SINR has two advantages:

It preserves the battery life in the mobile phone 4.

Often, especially in dense urban environments, there is more than one network receiver that detects the RF energy that is transmitted by the mobile phone 4. In those circumstances, the RF energy from the mobile phone 4 is considered noise by the other receivers.

In most cases, the reason that RSSI is too high is because there is unwanted noise or interference coming into the receiver. This causes the network 2 to command the mobile phone 4 to transmit at a higher than normal level in order to maintain a good SINR.

F) Root Causes of the Problems

There are many potential causes of problems in the RAN 6, but the common of them are:

Interference from an external transmitter (one that is not under the control of the wireless service provider) that is broken and creating noise in the wireless service provider's frequency spectrum. This is commonly called "interference".

Interference from Passive Intermodulation Distortion ("PIM") that is produced by a bad connector or loose connection in an antenna. This is called "internal PIM" if the source of the PIM is in the network equipment up to and including the antenna 10.

Interference from Passive Intermodulation Distortion ("PIM") that is produced by a semi-conductor that is external to the network equipment. This is called "external PIM". The source of external PIM is usually a rusty surface that mixes the RF energy transmitted by the radiating elements in the antenna 10 and reflects it back to the receiving elements in the antenna 10.

An unmanaged repeater, also known as a bi-directional amplifier or BDA that has gain that is too high, causing signals from a cell phone 4 to appear too high at the base station 12.

The root causes, physical manifestations, and alarms and indications of the physical manifestations are summarized in Table 2. The key point of the table is that the alarms and notifications are generally insufficient by themselves to diagnose and repair the root causes of the problems.

G) Diagnosing the Root Causes

A typical procedure for diagnosing the root causes requires:

A spectrum analyzer hooked up to RF monitor port at the base station.

A knowledgeable technician or RF engineer on site while the problem is occurring. However, problems are often intermittent (i.e. PIM only when it is windy or intermittent interference). It is like the gremlin in your car that does not show itself when you take it to the repair shop—you know something is wrong but you cannot diagnose it, so you just start changing parts and hope the problem goes away.

There is a high cost of mis-diagnosis:

Direct cost: wireless service providers spend thousands (sometimes 10s of thousands) of dollars changing antennas and/or transmission lines only to find that the repair did not fix the problem. (Evidence=no fault found in the replaced components, or no improvement in RAN performance.)

Indirect cost: money and man-hours that could have been spent building out the new network.

H) Change in Radio Access Network Architecture in Wireless Telecommunications Networks The Wireless Telecom Network 2 is currently undergoing a transition in the architecture of the radio access network (aka RAN 6). The traditional RAN architecture (which has been used since the 1980s) employed equipment in which the electronics were housed in a controlled environment and the radio signal was sent and received over a coaxial transmission line 14 to an antenna 10 which transmitted and received the radio signal over the air to mobile phones 4. A typical embodiment of this architecture is shown in FIG. 2. Throughout the rest of this disclosure, the inventors will refer to the traditional RAN or T-RAN for short.

The modern approach splits the function of the base station 12 into two pieces of equipment, called the Radio Equipment ("RE") 16 and the Radio Equipment Controller ("REC") 18 as shown in FIG. 3. The RE 16 and the REC 18 can be separated by an arbitrary distance. For example, with this technology is used at an independent tower location, the RE 16 is usually mounted near the top of the tower and the REC 18 is at the bottom of the tower. There is also a new architecture called C-RAN (Cloud or Centralized RAN), in which several RECs 18 are housed in a central location and the REs 16 are connected to them over distances up to 15 kilometers.

The Radio Equipment 16 transmits the radio signal to the mobile phones 4 and receives signals from those mobile phones 4. The Radio Equipment 16 may have multiple transmitters and receivers at the same frequency, for diversity or so-called MIMO (Multiple Input Multiple Output) functions. The Radio Equipment Controller 18 processes the baseband modulation data (in the mathematical format of "I/Q vectors", where "I" represents the in-phase signal component and "Q" represents the quadrature phase signal component).

In the C-RAN architecture shown in FIG. 3 and FIG. 4, the REC 18 and the RE 16 have a digital data connection that can be extended up to 15 kilometers (about 10 miles) over a highly reliable fiber-optic connection 20, often using an interface called the Common Public Radio Interface ("CPRI"). Hundreds of REs 16 can be connected to the REC equipment 18 that is housed in one location. This is why the C-RAN architecture is sometimes also referred to as "Base Station Hoteling".

There are three primary reasons that the Wireless Service Providers are investing in the C-RAN architecture:

1. Improvements in spectral efficiency.
2. Reductions in real estate and utility costs.
3. Improvements in quality of service to their customers.

I) The RE/REC Technology Enables Automated, Remotely-Controlled Diagnosis of the Root Causes of Problems in the RAN Environment The CPRI connection between RE 16 and REC 18 employs fiber-optic transmission lines 20 to transport I/Q data. I/Q data is to radio frequency modulation what an MP3 is to music—it is the digital representation of the analog modulation (change in voltage with respect to time).

In the downlink communication channel (from the network 2 to the mobile telephone 4), the I/Q data has no distortion, because at the point that it is observed, it has not yet been subjected to the effects of the RAN environment or any other sources of distortion.

In the uplink communication channel, the I/Q data contains the signal created by the phone 4 plus the effects of the RAN environment (path loss and fading effects) and distortion from noise sources (the problems the RANALYZER™ system of the present invention is designed to diagnose). In the uplink direction, the REC 18 processes the I/Q data and attempts to recover the original signal (in the presence of noise) as transmitted by the phone 4.

The RANALYZER™ system of the present invention processes the IQ data and attempts to separate out the noise component (in the presence of signal) to determine the root cause (source) of the noise. The methods for separating out the noise from the signal and analyzing the noise to discover its source, in accordance with the present invention, and the RANALYZER™ system 22 of the present invention, will now be disclosed.

OBJECTS AND SUMMARY OF THE INVENTION

It is an object of the present invention to provide a system and method for detecting and determining the cause of impairments to signals in a wireless communications network.

In accordance with one form of the present invention, a system (hereinafter, often referred to by the trademark RANALYZER) for troubleshooting signals in a cellular communications network, and in particular, for determining the cause of distortion or corruption of such signals, can include a robotic or other type of switch. The robotic switch can tap into selected uplink fiber-optic lines and selected downlink fiber-optic lines between radio equipment and radio equipment controllers in a wireless (e.g., cellular) network to extract therefrom the I and Q data. The selected I and Q data, in an optical form, is provided to an optical-to-electrical converter forming part of the system. The system includes an FPGA (Field Programmable Gate Array) or the like, and a Computer (often a Web Server) with SSD (Solid State Drive) and magnetic disk storage, among other components of the system. The system analyzes the I and Q data provided to it, and determines the cause, or at least narrows the field of possible causes, of impairment to transmitted signals. The system includes a display which provides the troubleshooting information thereon for a user of the system to review, or other form of a report, and may communicate the analytical findings to a remote location over a public or private internet protocol network, for example.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 5I shows detail of block 17 in FIG. 5C for baseband coupling to microwave fronthaul.

FIGS. 8A-8F are examples of screen displays of the system of the present invention.

FIG. 9A is an XZ planar view of the robotic switch without the housing, showing motion axes.

FIG. 9B is an isometric view of the robotic switch without the housing, showing motion axes.

FIG. 9C is an XY planar view of the robotic switch without the housing, showing motion axes.

FIG. 9D is a ZY planar view of the robotic switch without the housing, showing motion axes.

FIGS. 16A-C are isometric (FIGS. 16A and 16B) and top plan (FIG. 16C) views of the 4-fiber slack management system in the robotic switch of the present invention, including the sliding member, constant force springs and output roller guides, with the housing of the robotic switch removed for clarity.

DETAILED DESCRIPTION OF THE PREFERRED EMBODIMENTS

A) System Overview

Figure 1:
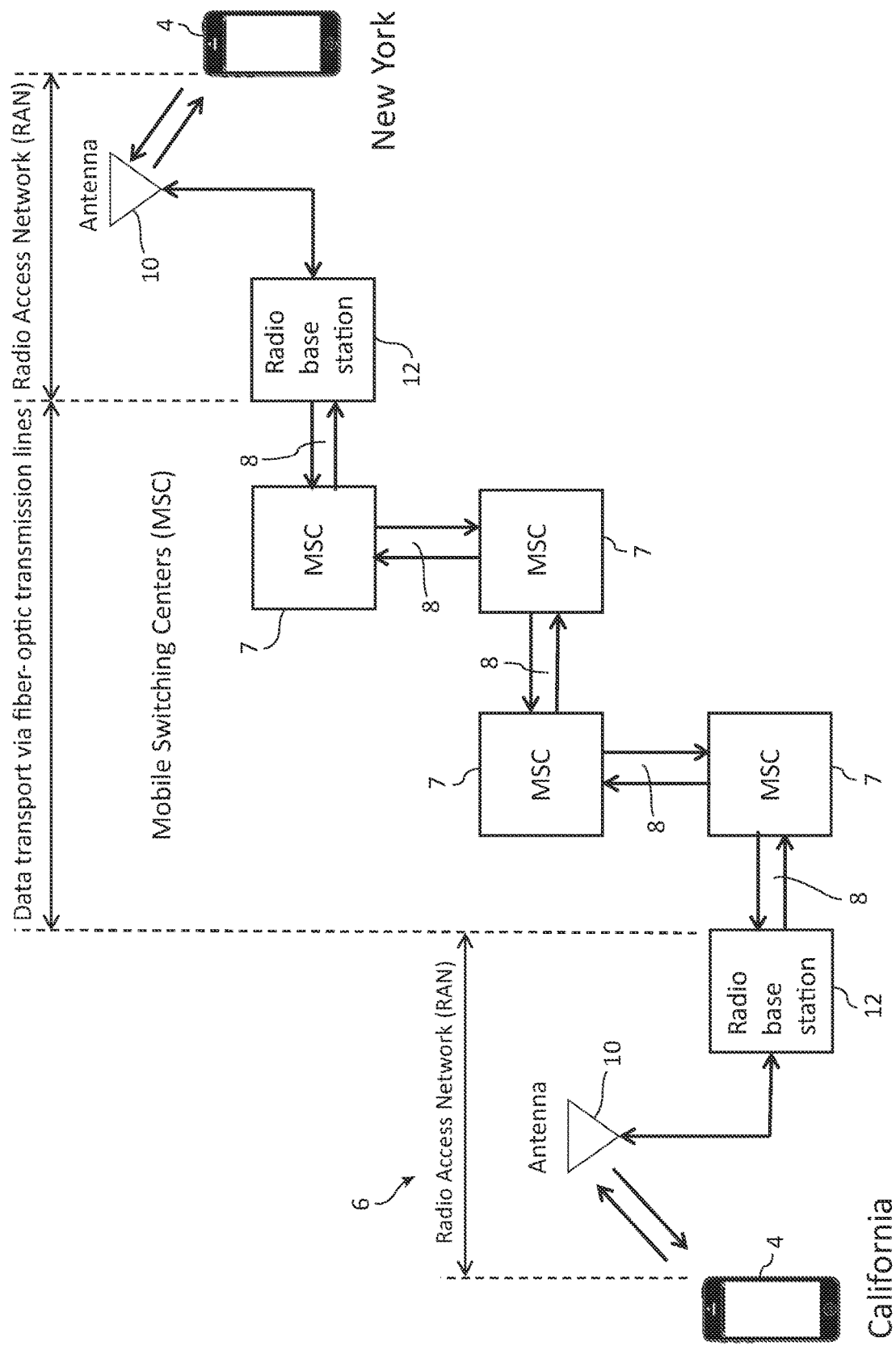
FIG. 1 is a block diagram illustrating an overview of a telecommunications data transport network.
Figure 2:
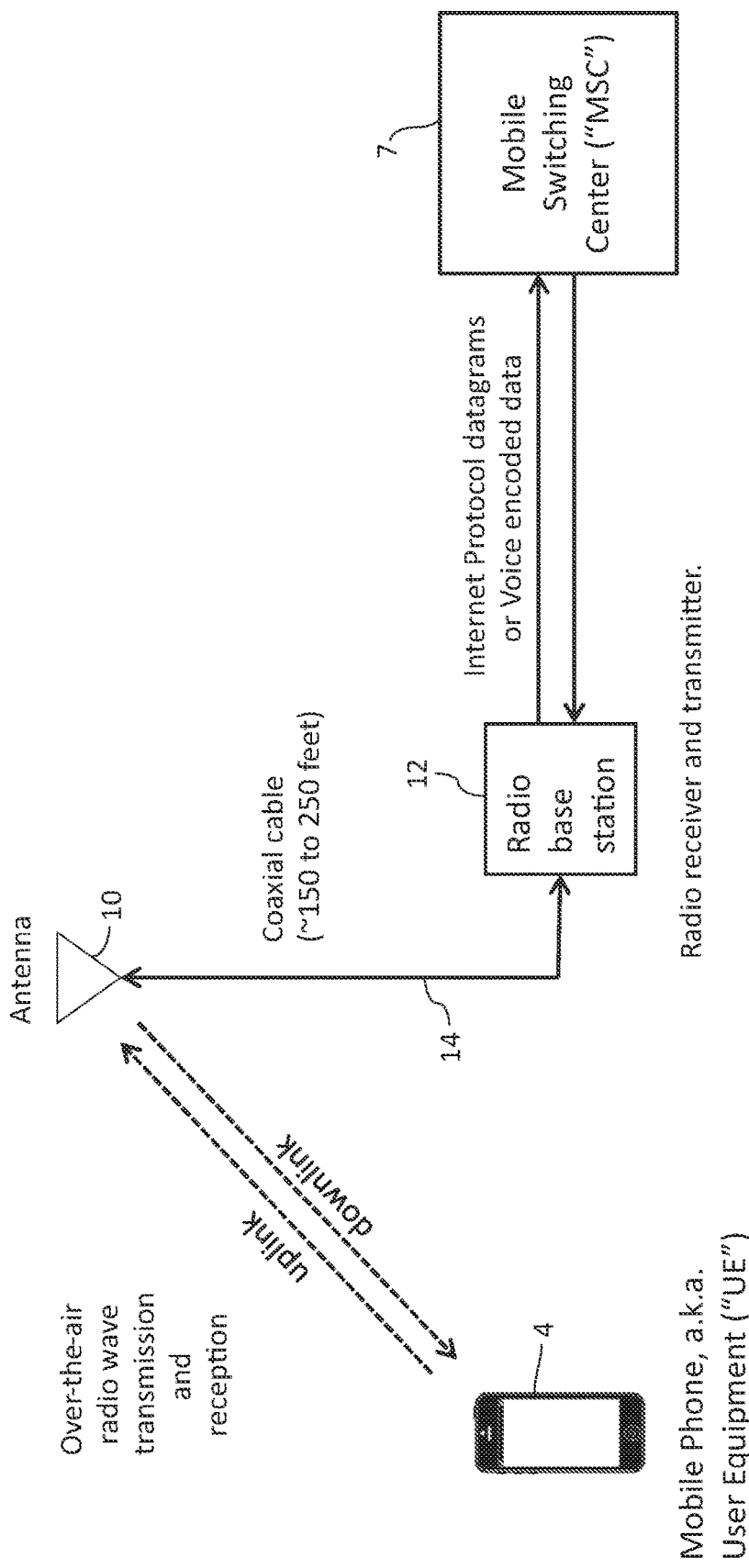
FIG. 2 is a block diagram illustrating a traditional radio access network ("T-RAN") equipment.

FIG. 5, consisting of FIGS. 5A-5D shows a block diagram of the RANALYZER™ system 22 of the present invention in a generic form. The system observes the communication between the Radio Equipment 16 and Radio Equipment Controllers 18 by obtaining a portion of the signal used for this communication. This signal is most commonly over a fiber-optic connection, but other connections are possible such as a wireless connection (see FIG. 5C). The observed signals are feed into a high-speed logic device, such as a Field Programmable Gate Array (FPGA), which acts as a digital signal processor 24 which performs various operations to extract knowledge about impairments in the Radio Access Network (RAN) 6. These observations may be triggered by alarms from the network 2, made manually by an operator, or by automatically scanning among the various available connections between RECs 18 and REs 16 by using an electrical or mechanical (preferably, robotic) switch assembly 26.

Communications between REC 18 and RE 16 are observed in each direction—from the Radio Equipment Controller 18 to the Radio Equipment 16 (also known as the "Downlink"), and from the Radio Equipment 16 to the Radio Equipment Controller 18 (also known as the "Uplink").

These four pairs of signals are converted from optical format to electrical format preferably using an optical-to-electrical converter 28 situated before or after the electrical or mechanical switch assembly 26, and then fed into a high-speed digital device known as a Field Programmable Gate Array, or FPGA, acting as a digital signal processor 24, as mentioned above. FPGAs are in many ways similar to microprocessors, but can be much faster at performing certain operations, although they are much more difficult to program and tend to be somewhat less flexible. The FPGA (digital signal processor) 24 performs a number of signal processing functions, to obtain I/Q data, spectrum traces, and various other pieces of information about the observed signals that are detailed later. An Application-Specific Integrated Circuit (ASIC), may also be used as the digital signal processor 24 to provide similar functionality. In the future, specially programmed general purpose processors may even be able to keep up with the needed data rate. Each of these methods do not affect the fundamental functionality of the system 22 of the present invention.

This information is passed to an analytic computer unit 30, such as a microprocessor, which may include a server 32, for some additional processing, mostly involving the Automatic Analysis and Identification of Interference and Noise Sources (q.v.), as well as storage of I/Q data and traces for later additional analysis.

The server 32 then makes these data available to a client via a network connection, that is, through a private or public internet protocol network 34. More specifically, a display 36 may be located locally to the RANALYZER™ system 22 and connected to the analytic computer unit 30, or may be remotely located and provided analytical data through the private or public internet protocol network 34. In this way, the client may observe the analytical results at a convenient (local or remote) location.

Figure 6:
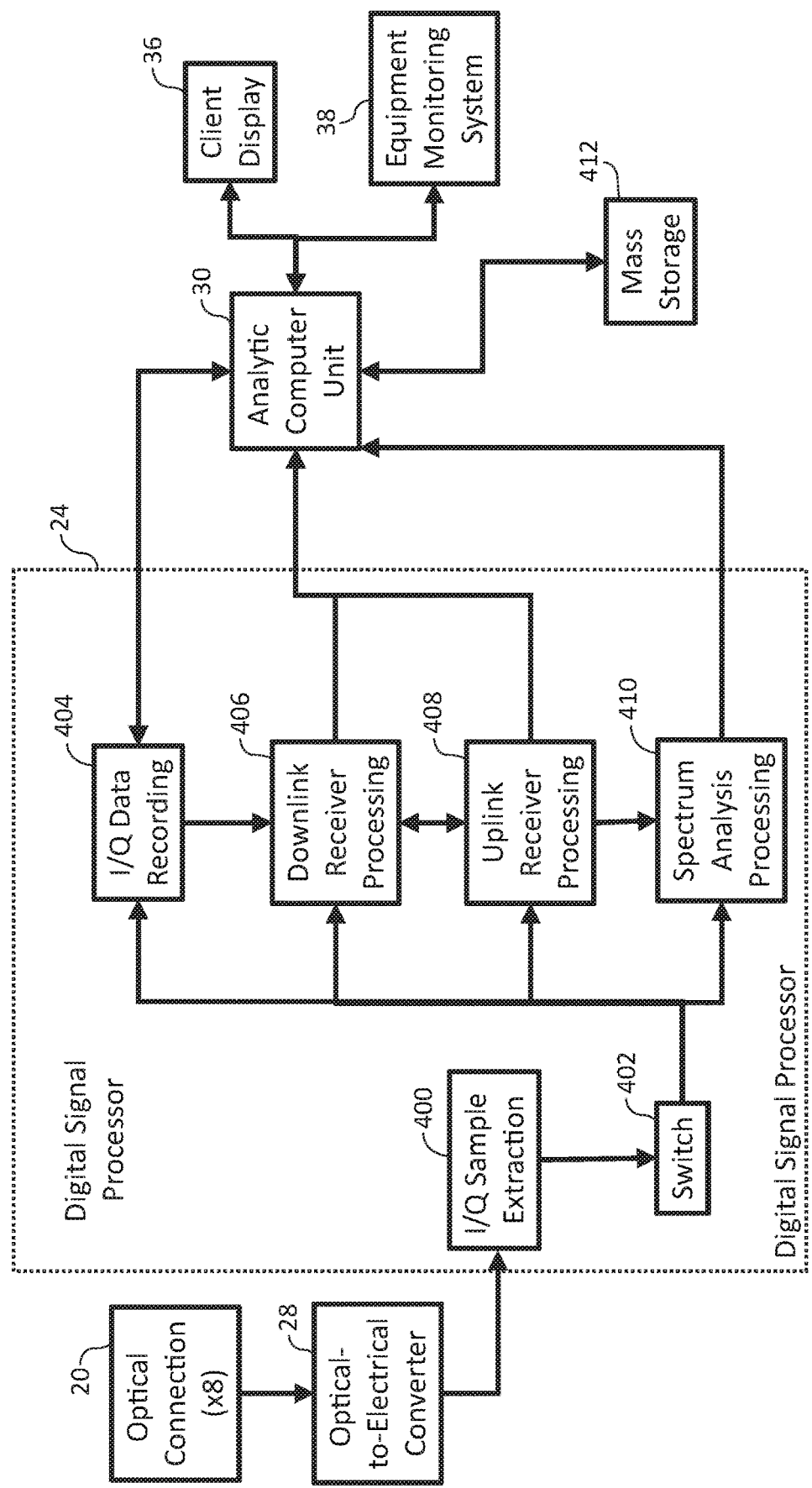
FIG. 6 is a block diagram of the data flow in the system of the present invention.
Figure 7:
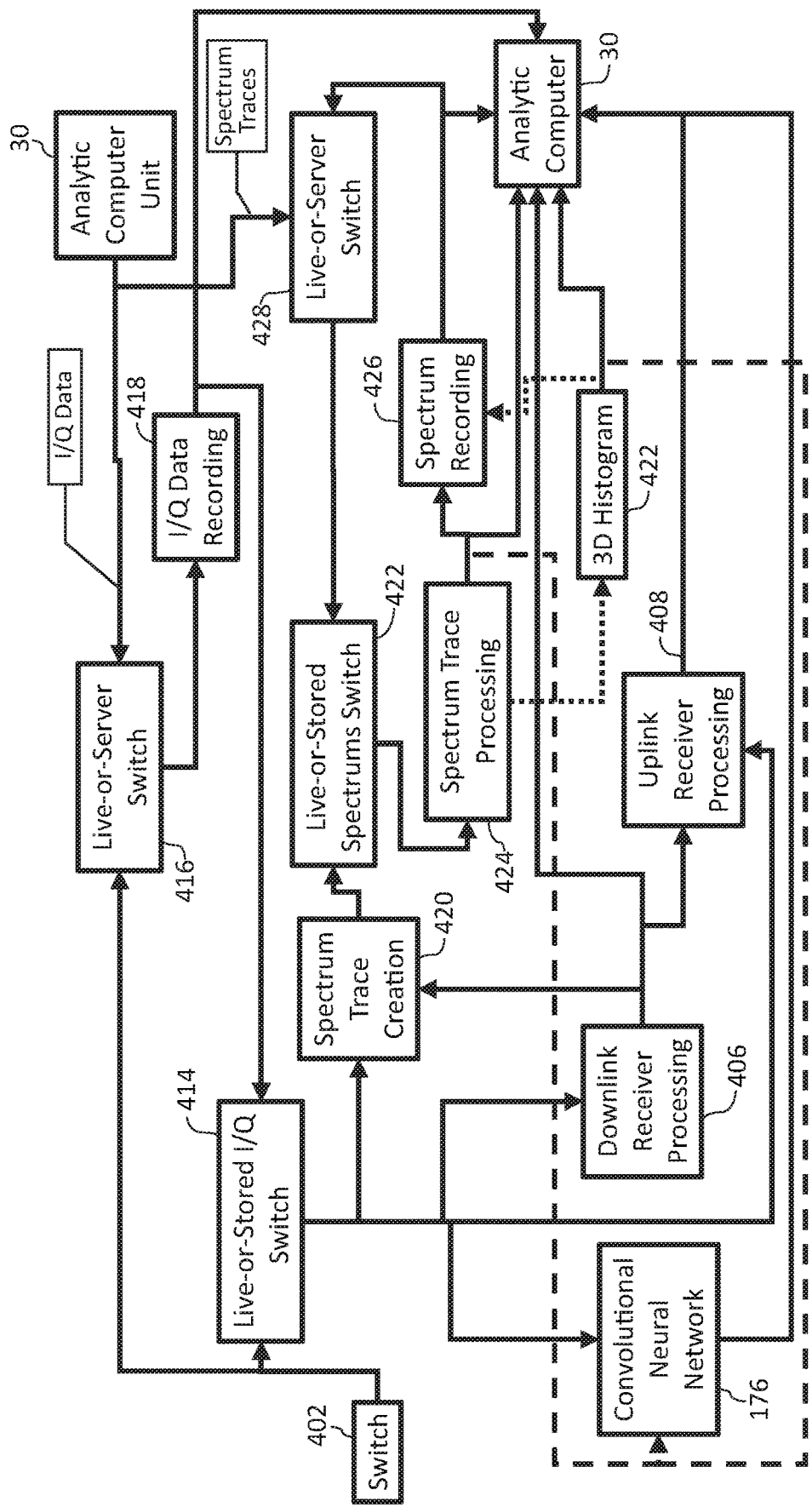
FIG. 7 is a block diagram illustrating data flow in the inner block details of the system of the present invention.

The server 32 also receives control and setup information from the client, as well as alarms and indicator signals from a High-Level Network Equipment Monitoring System 38 that is closely linked to the Radio Equipment Controllers 18. This monitoring system 38 provides Diversity Imbalance alarms, high RSSI alarms, as well as several other alarms and indications that are useful to help find the real problem in the RAN 6, as detailed below. The I and Q digital data, spectrum traces and other analytical data may be stored in memories within the digital signal processor 24 or the analytic computer unit 30, or remotely in a post-processing and mass storage memory 40 coupled to the analytic computer unit 30 and server 32 through the internet protocol network 34. The dataflow through the system 22 is shown in FIGS. 6 and 7. The control information that is passed from the client is exemplified by the screens in FIG. 8, as described below. It should be noted that that the RANALYZER™ system 22 has many more displays than this, as explained in the section Signal Displays herein; these are merely examples of different types of displays in the RANALYZER™ system 22.

Figure 3:
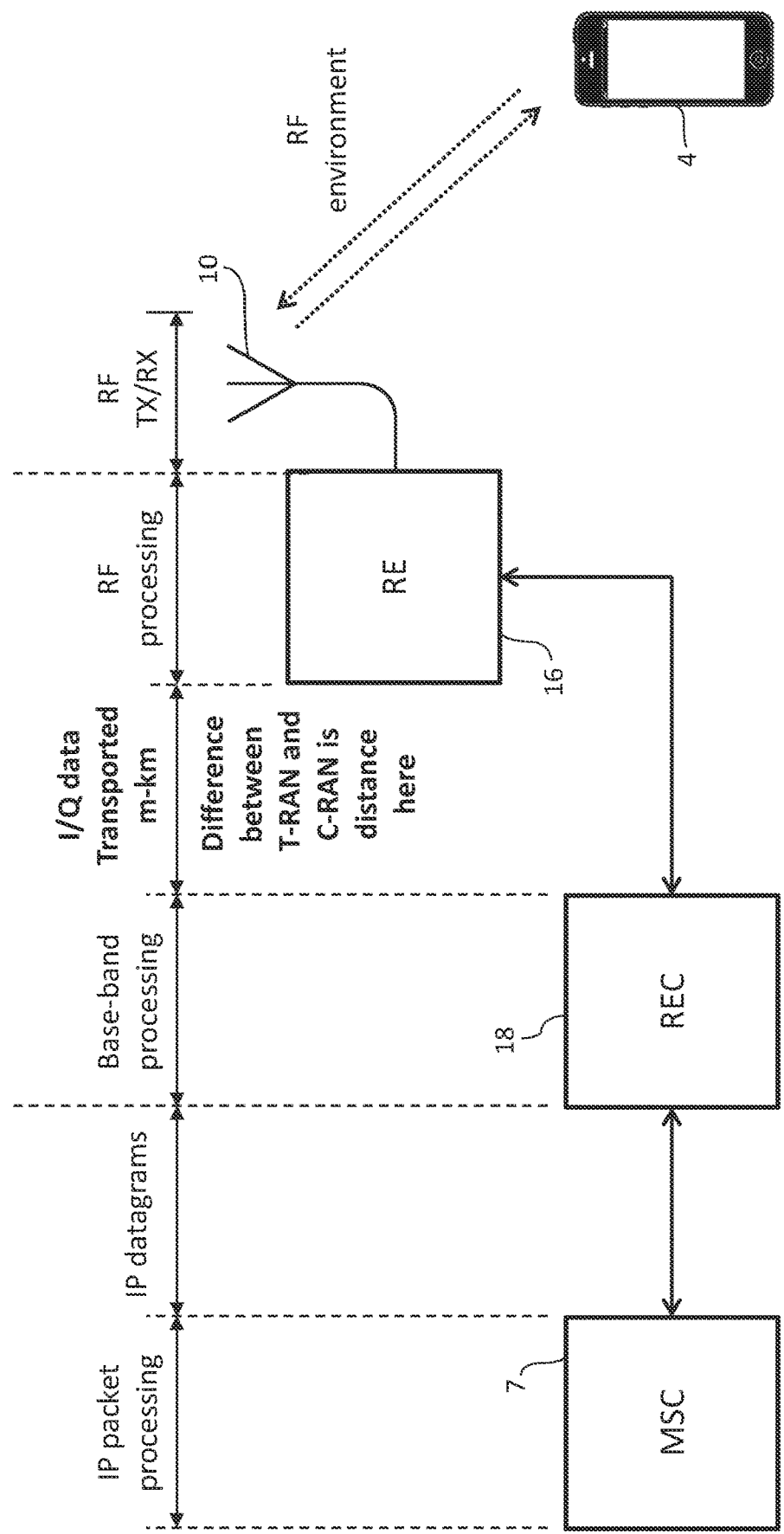
FIG. 3 is a block diagram illustrating RE/REC technology.
Figure 4:
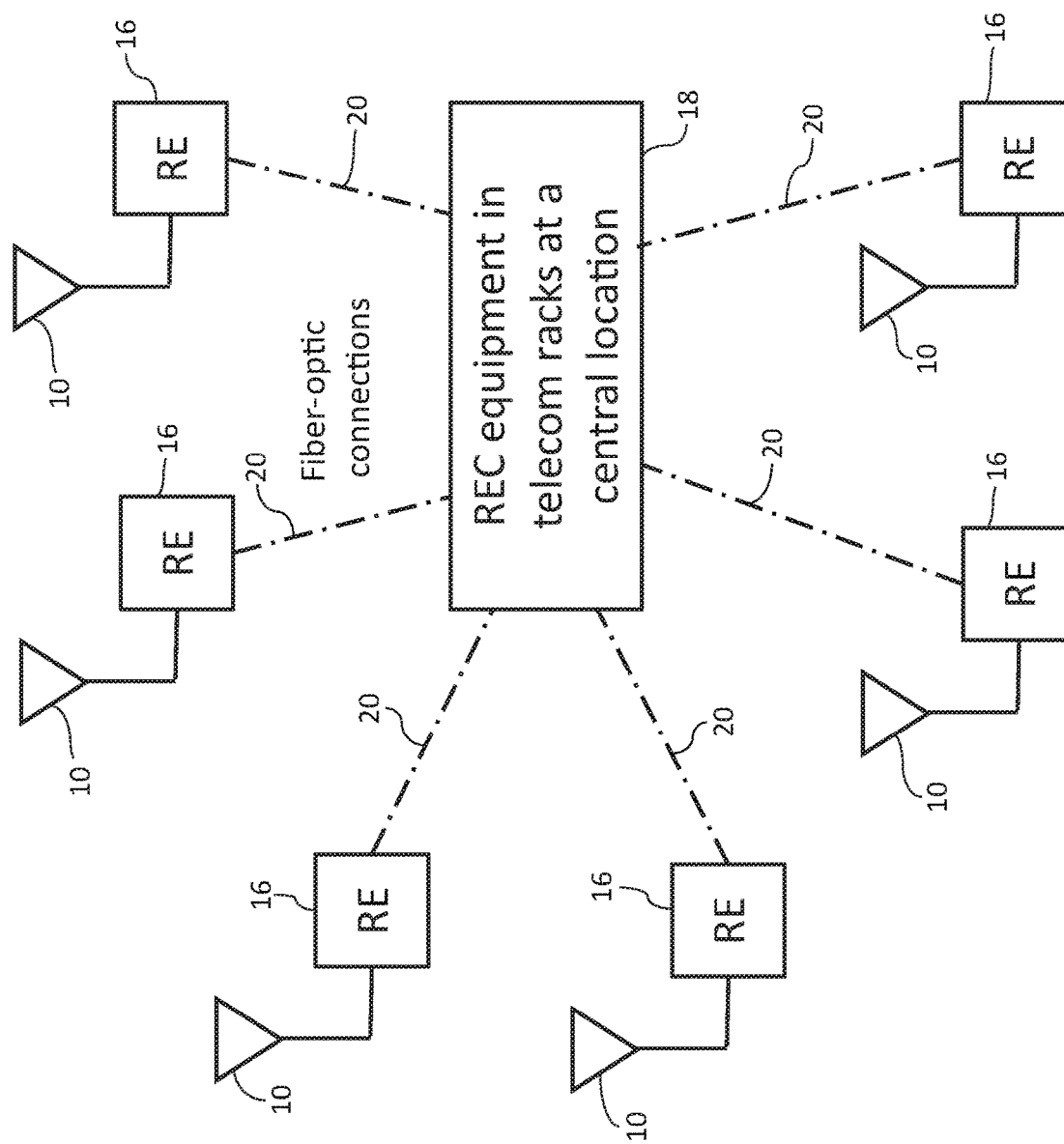
FIG. 4 is a block diagram of the architecture of a C-RAN communications system.
Figure 8A:
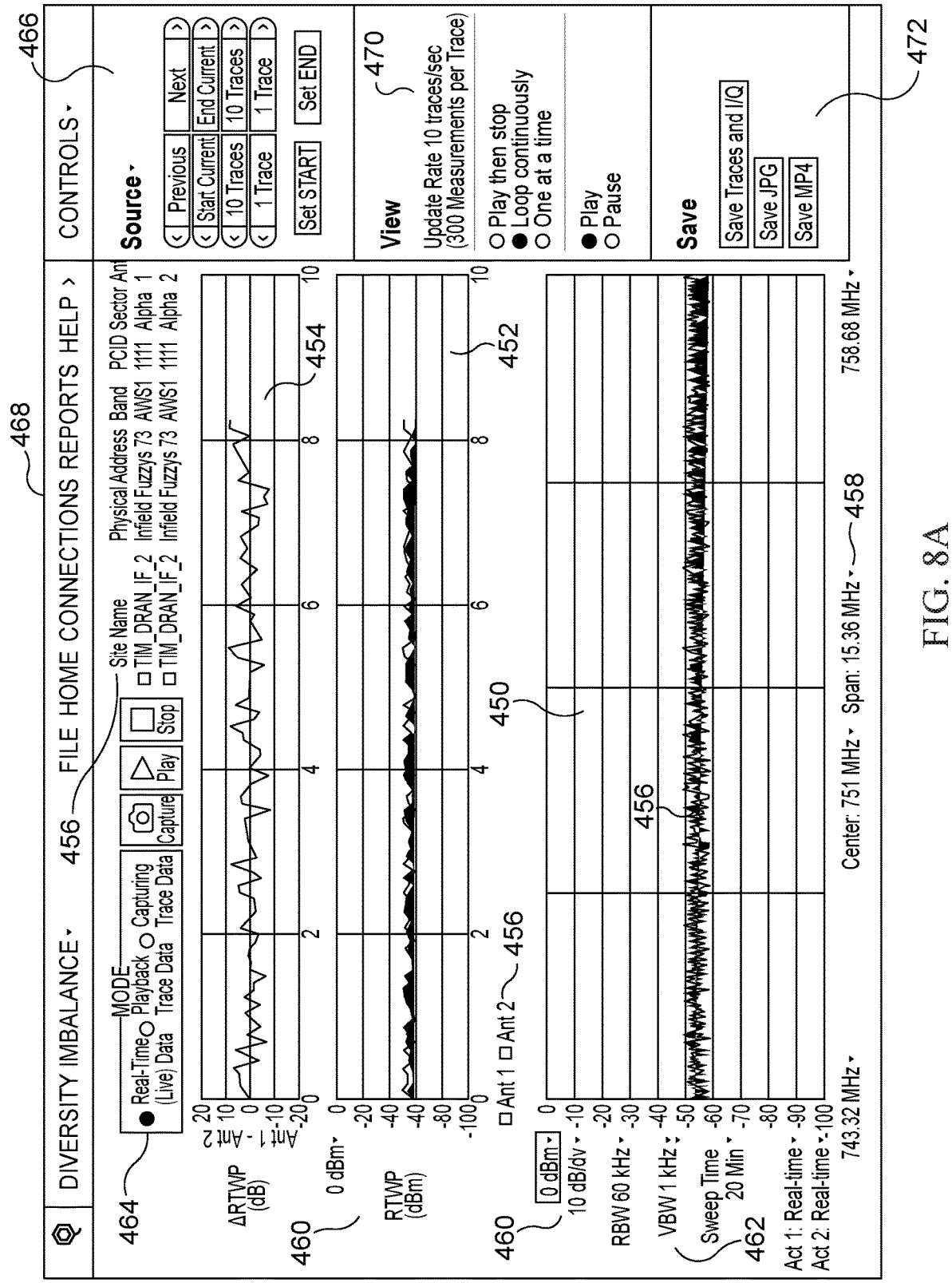
Figures 8B, 8C:
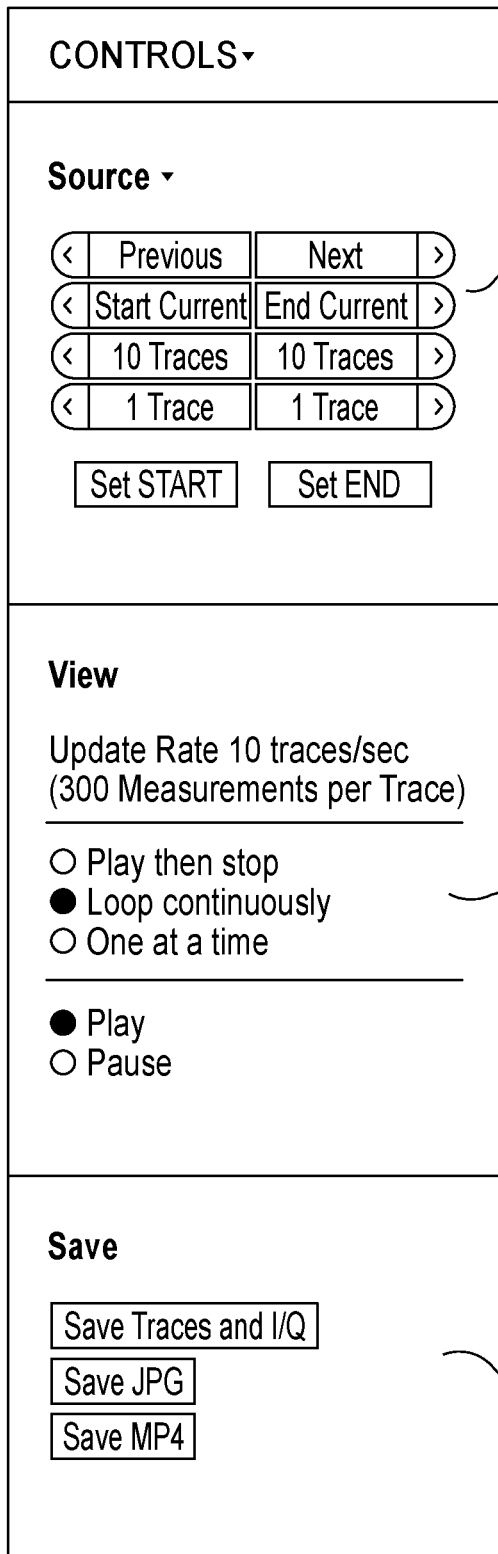
Figure 8D:
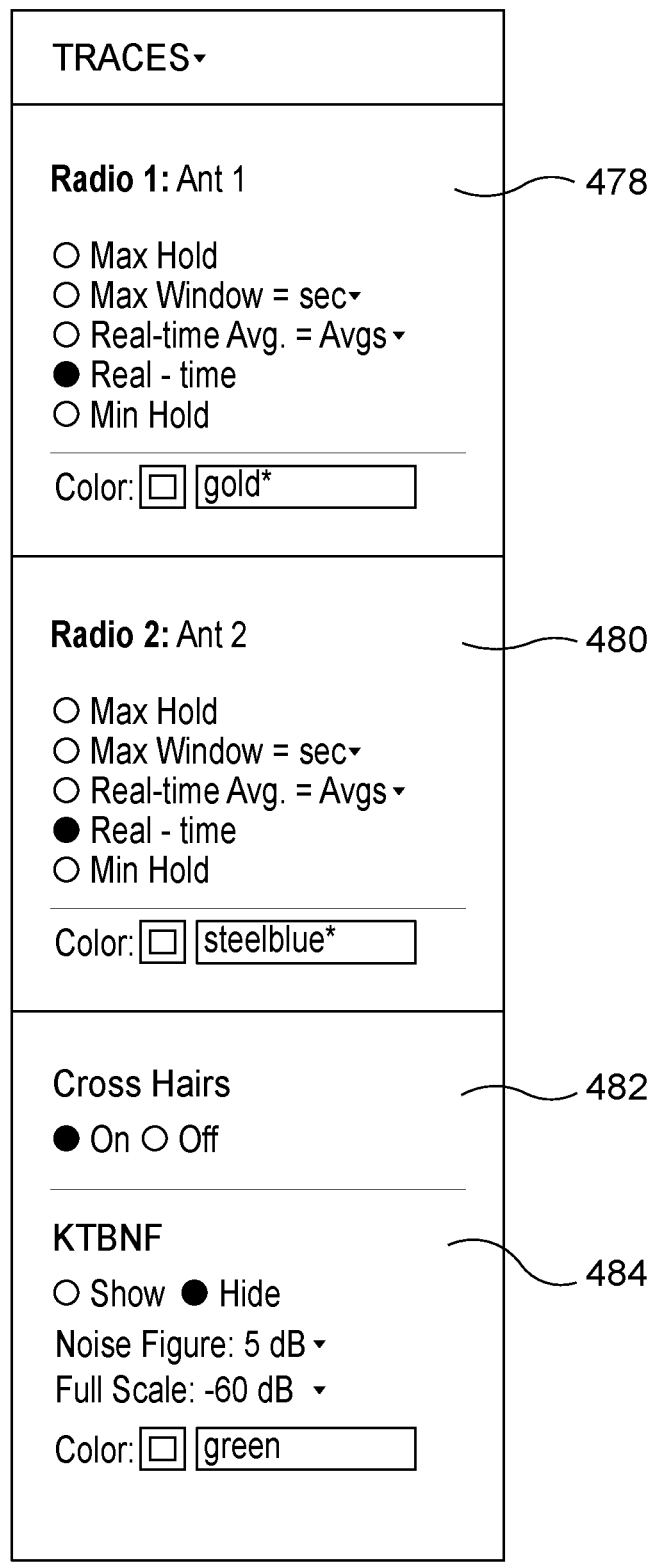
Figure 8E:
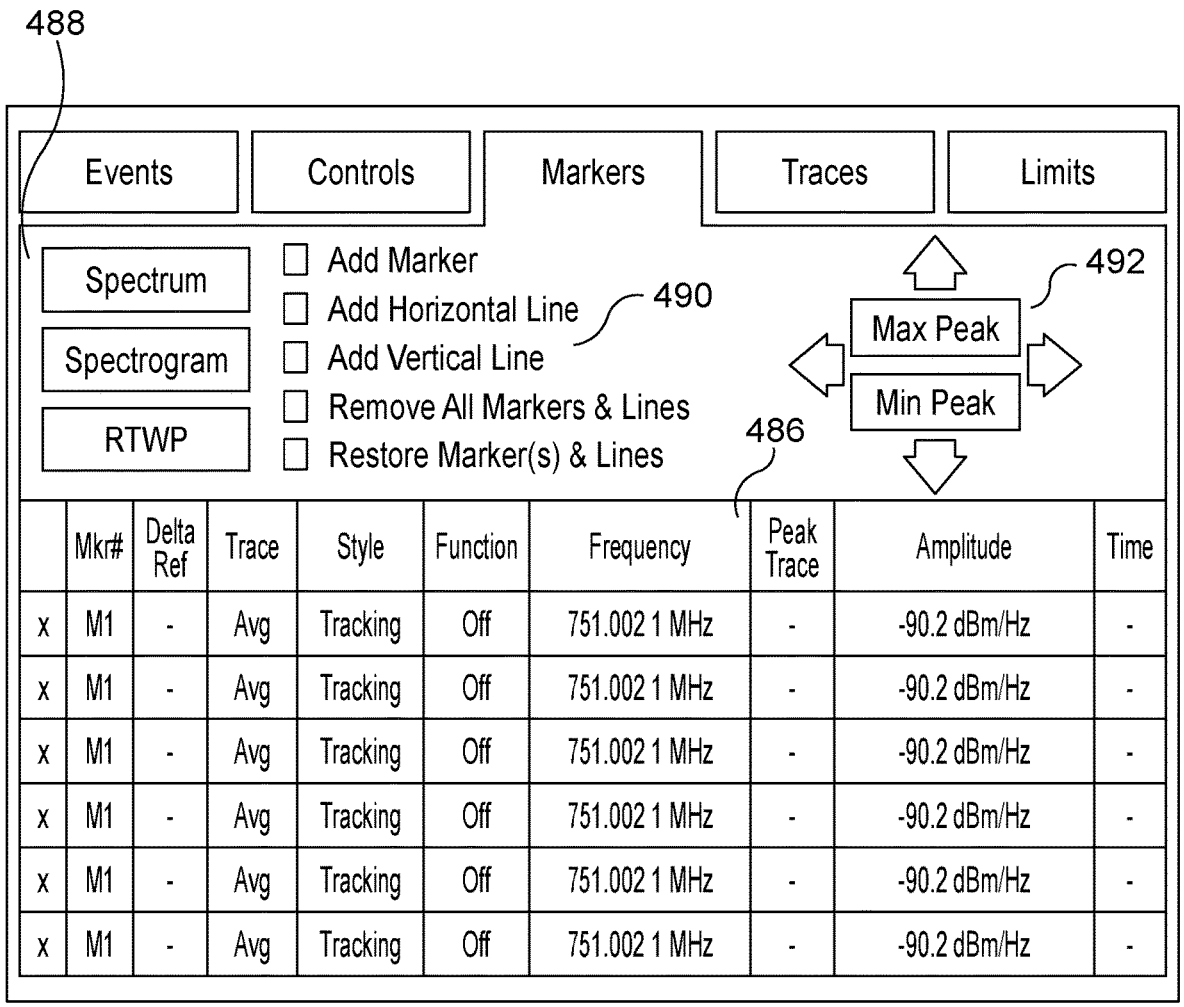
Figure 9B:
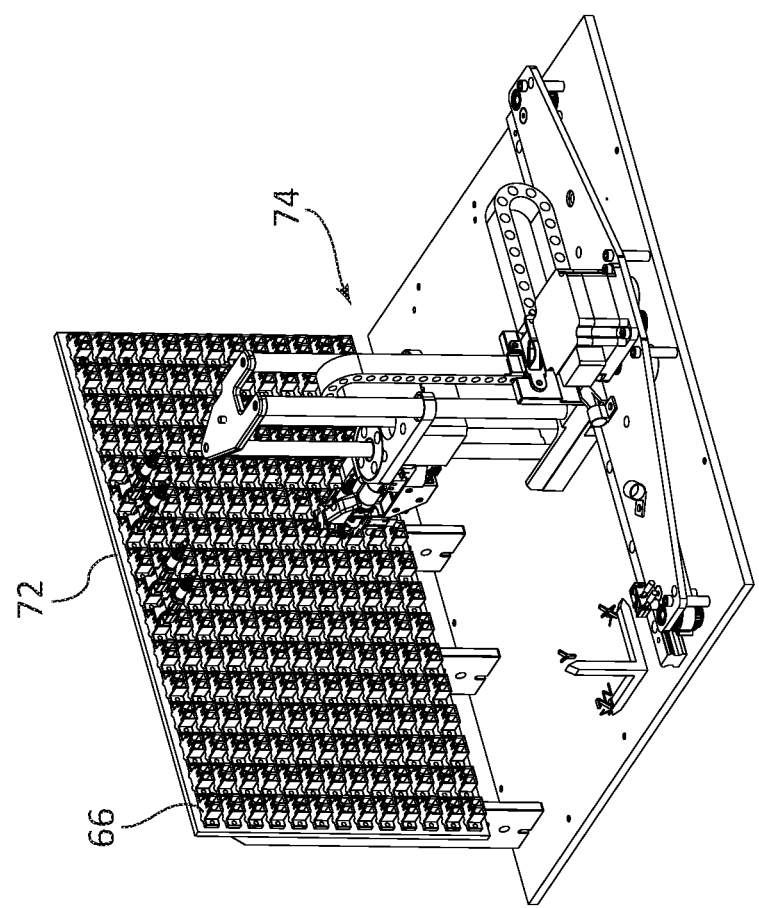
FIGS. 9A-9D are various views of the robotic switch structure, axes and backplane forming part of the system of the present invention. These include.
Figure 9A:
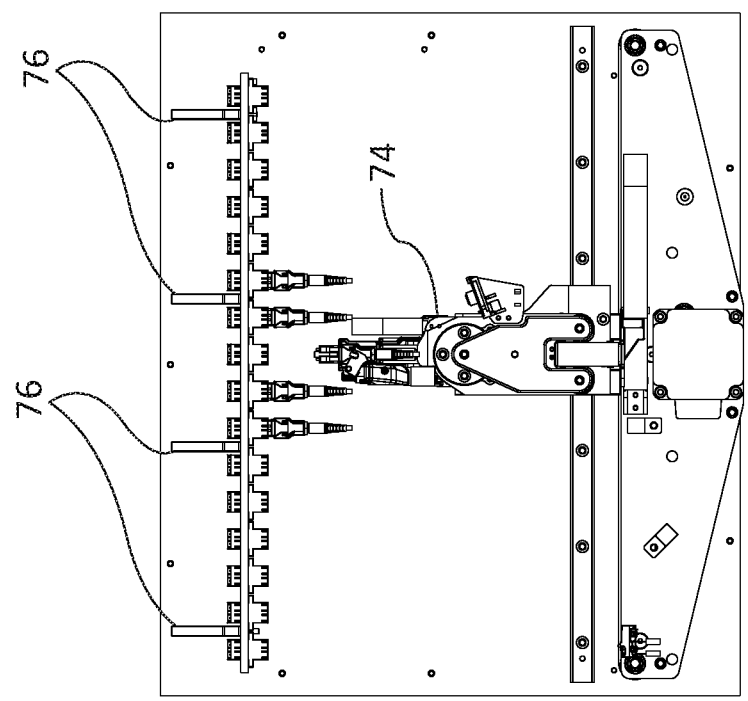
Figure 9D:
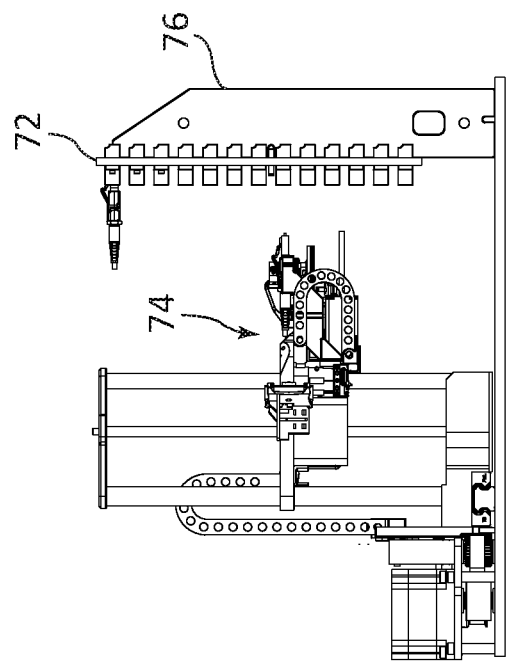
Figure 9C:
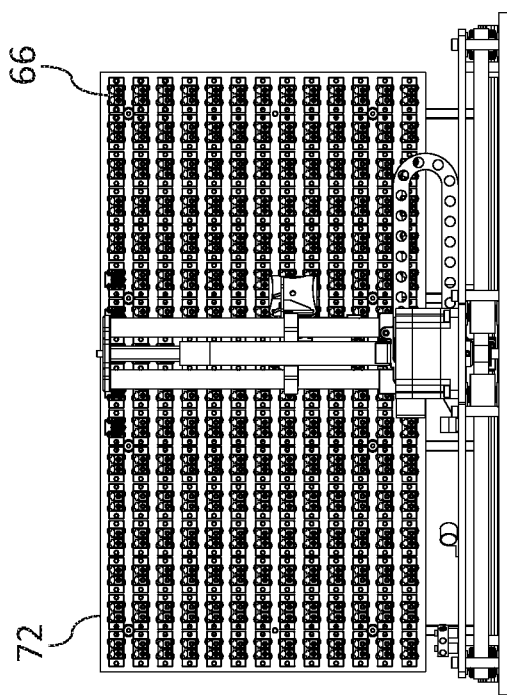
Figure 10B:
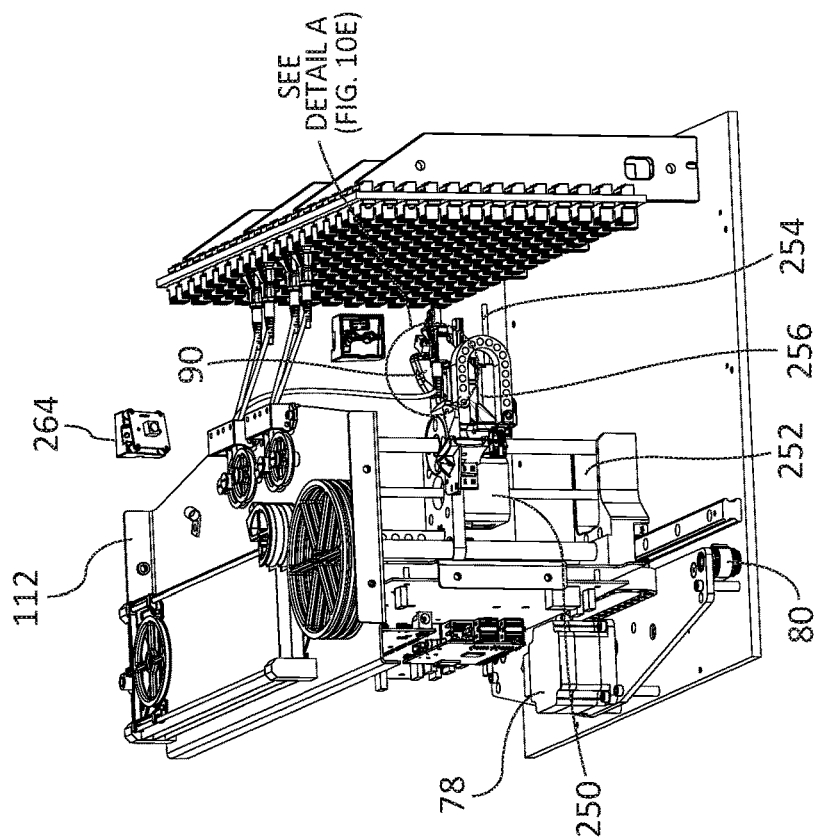
FIGS. 10A-10E are various orthographic views of the robotic switch structure forming part of the present invention, showing the driver motors and mechanisms and the gripper components, without the housing.
Figure 10A:
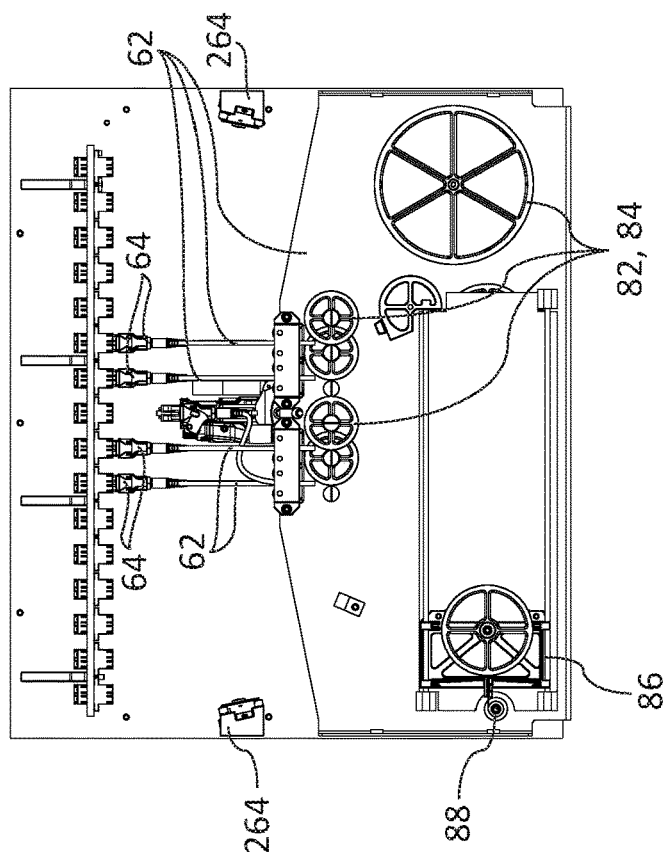
Figure 10D:
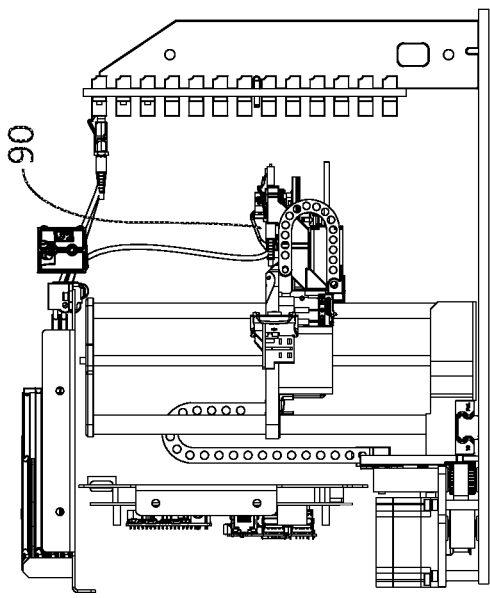
Figure 10C:
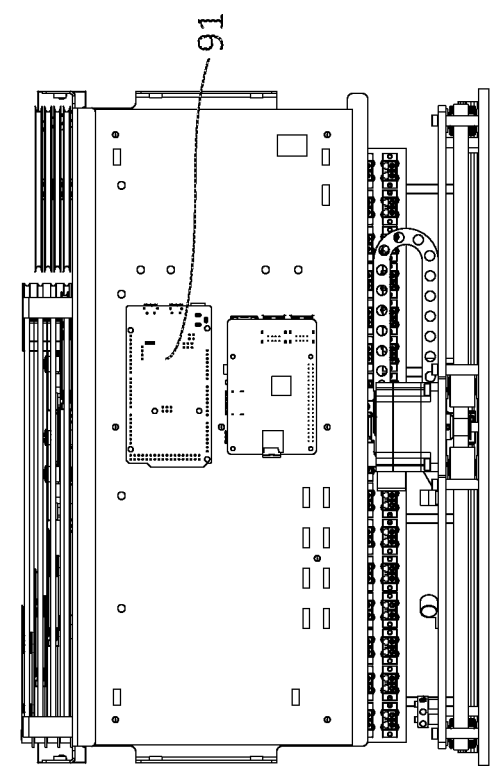
Figure 10E:
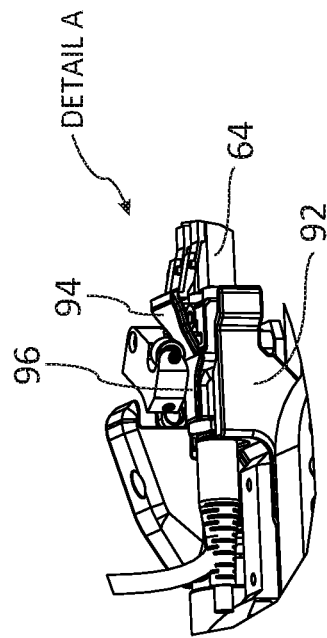
Figure 11B:
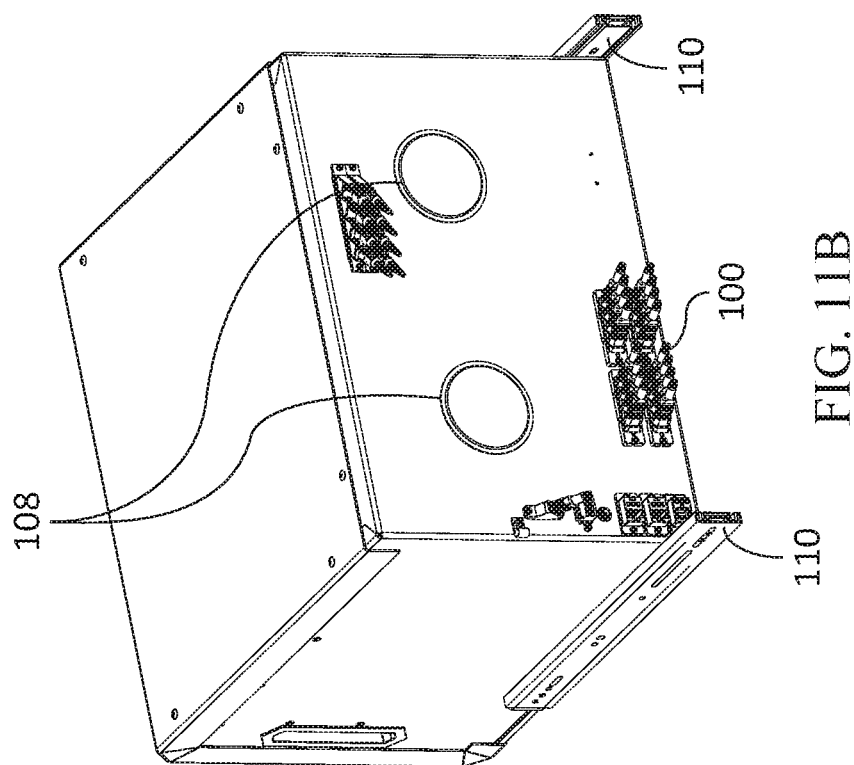
FIGS. 11A-11D are various isometric views of the robotic switch with the housing, and with and without the top cover showing slides for service accessibility and the fan and filtration system, forming part of the system of the present invention.
Figure 11A:
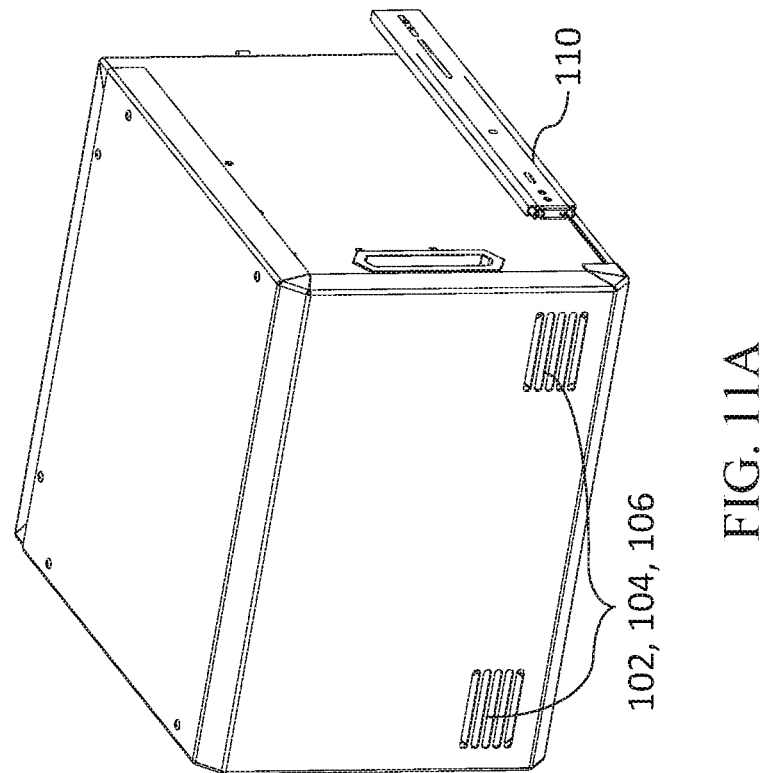
Figure 11D:
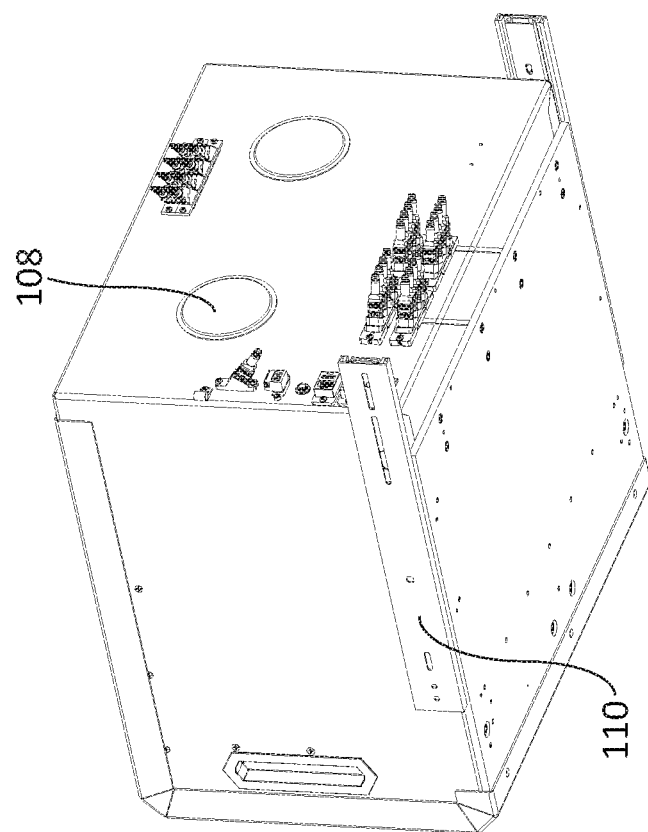
Figure 11C:
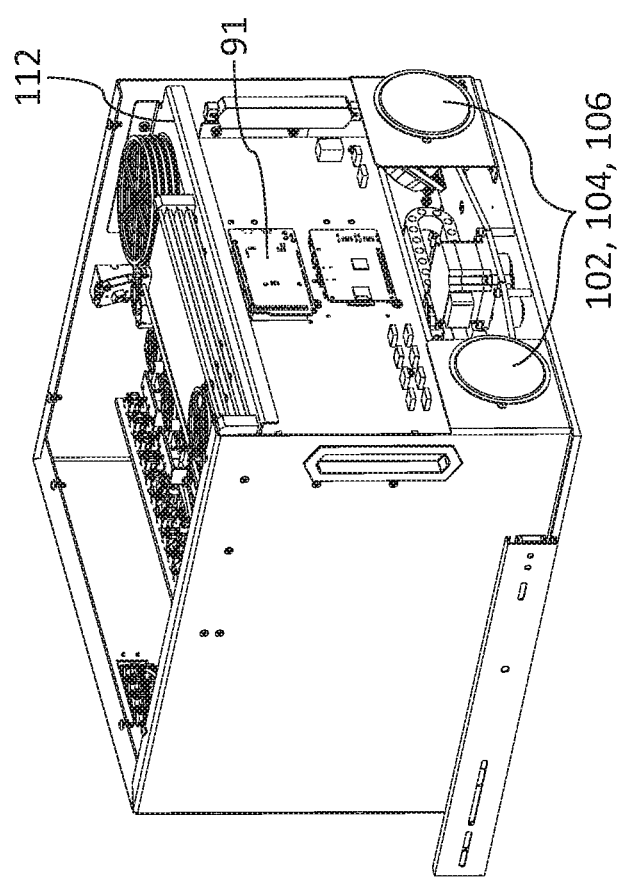
Figure 12B:
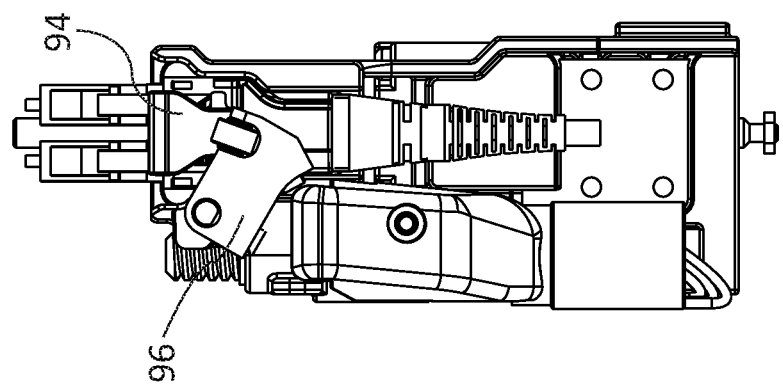
FIGS. 12A-12F are various orthographic and isometric views of the robotic switch Z Carriage assembly with LC duplex connector in the gripper showing the rotating cam, gearmotor, worm gear, and two-position sensor, forming part of the system of the present invention.
Figure 12A:
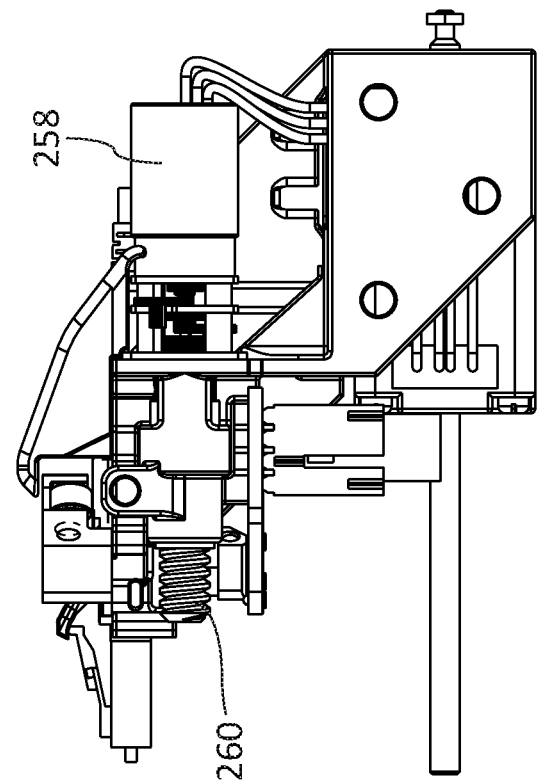
Figure 12D:
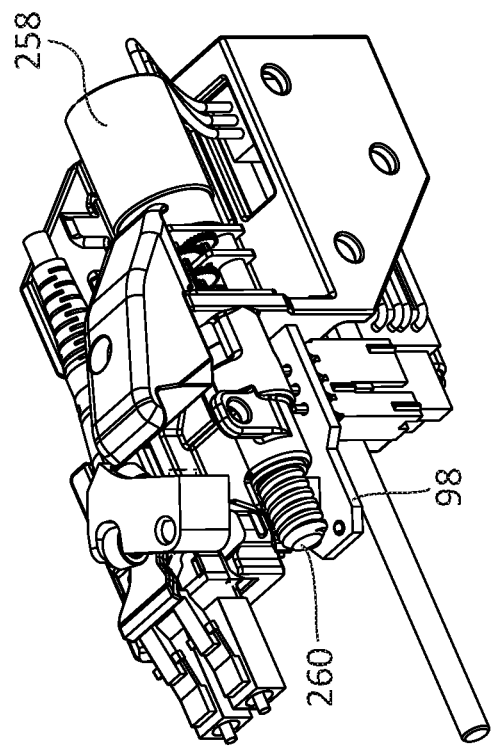
Figure 12C:
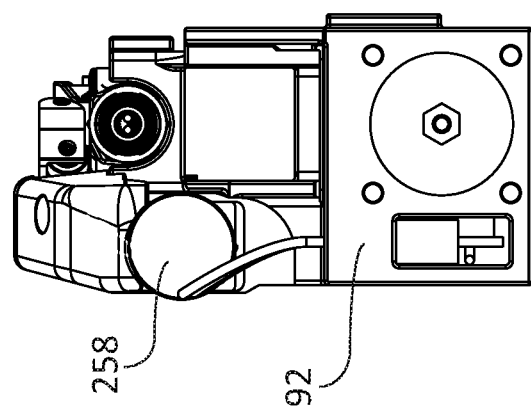
Figure 12F:
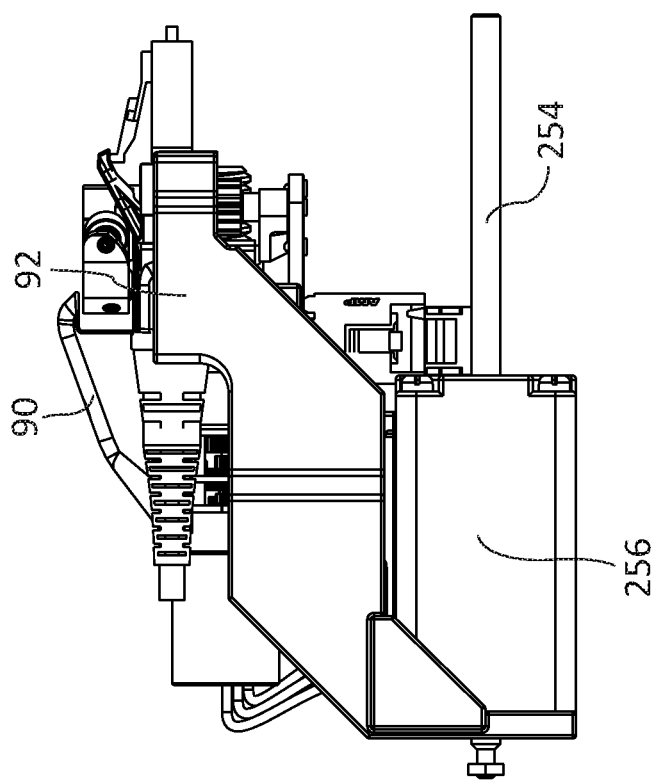
Figure 12E:
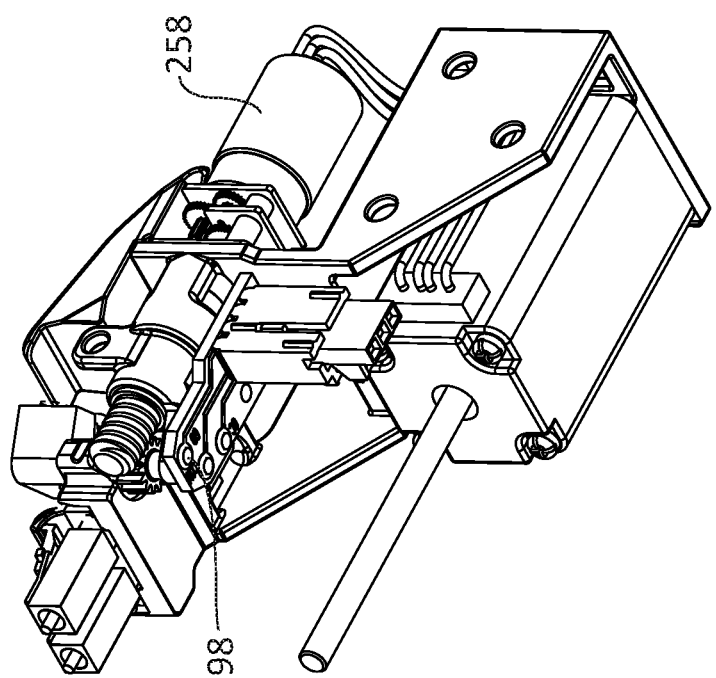

1. FIG. 8A shows a Diversity Imbalance screen to a user.
   a. A traditional spectrum display 450 is shown, near the bottom, of two radios, for example the two MIMO branches from one RE. Additional spectrums could be shown here as well, for example in the case where an RE has four MIMO branches.
   b. Above the spectrum display is a graph of Received Total Wideband Power (RTWP 452), with multiple traces—one per spectrum trace shown below. Each point on a trace in the RTWP graph has one point created at the same time as each displayed spectrum trace, showing the total power over the entire received bandwidth of each output from the RE. It should be noted that the displayed spectrum trace may have a narrower bandwidth than the I/Q samples from the RE, but the RTWP graph shows the power in the entire bandwidth—not just what's shown in the spectrum graph.
   c. Above the RTWP graph is another graph showing the maximum difference among the different RTWP traces (ΔRTWP 454). This trace has one point created each time points are added to the RTWP trace, showing the maximum difference (maximum minus minimum) among the related trace points on the RTWP graph.
d. These two graphs (RTWP 452 and ΔRTWP 454) help a user see what the difference is among various MIMO receivers. In general, these should be be very similar, unless there is something wrong with one of the MIMO branches, such as a bad cable or antenna, or internal Passive Intermodulation Distortion (PIM) in one of the branches.
e. Spectrum and RTWP traces are color-coded 456 to show which receiver (most commonly MIMO branches from one RE) is providing I/Q samples to create which trace.
f. Various controls are presented to the user, allowing changes in the display in various ways, including:
i. The frequency range 458 displayed on the spectrum graph, including Start, Center, Span, and Stop frequencies. These can be selected from the drop-down Home menu, or directly on the graph.
ii. The amplitude range on the spectrum graph, including the top level and the amplitude range per division. The top of the spectrum graph is also used for the top of the RTWP graph.
These amplitude parameters can also be selected from the drop-down Home menu, or directly on the graph.
iii. The Resolution Bandwidth, Video Bandwidth, and Sweep Time 462 used for creating the spectrum trace, as in a traditional spectrum analyzer.
iv. Controls for viewing live of captured spectrum data, as well as controlling the capture and playback 464.
v. Since a large number of spectrum traces, or related I/Q samples can be captured into memories 116, 118, 120, 122, 124, 126, and 130, a set of controls 466 is provided to help choose which spectrums are being shown at a given time.
vi. A large number of parameters can be adjusted, files saved, and reports generated via the pull-down menus 468.
vii. The display update rate can be adjusted with the View controls 470, as well as if playback stops after a set of recalled spectrums (or I/Q samples displayed as spectrums) is shown, if that set of spectrum continuously loops, or one spectrum is shown at a time, (advancing when the user clicks on the Play button), and either pausing or playing that set of spectrums on the graphs.
viii. The displayed graphs and the underlying traces and I/Q samples can be saved with Save controls 472
2. FIG. 8B is a duplicate of the Controls menu from FIG. 8A
3. FIG. 8C shows a set of controls for picking which sets of stored spectrum traces, or I/Q samples made into spectrum traces, from the Events System (q.v.) database. From this menu, the user can:
a. Use Filters 474 to select, in various ways, the items in the Events System database to display, including what type of Event, and the impact on the service provided by an RE.
b. Use the Sort By control 476 to change the arrangement of the displayed events.
c. View key aspects of the events in area 478, including:
i. When they happened (column labelled "Time").
ii. The service impact (column labelled "!").
iii. The count of how many times similar types of event have happened (column labelled Ct.).
iv. A description of what the event is (column labelled "Desc.)
4. FIG. 8D is of the Traces Menu and allows
a. Adjusting the Spectrum Trace Processing 424 mode in the digital signal processor 24 for each radio displayed, including Radio 1 478 and Radio 2 480 in this case. More than two radios can have the trace mode controlled with this menu, if more than two radios are configured for display.
b. Enabling or disabling cross-hair markers 482 shown on the spectrum graph 450, RTWP graph 452 and ΔRTWP graph 454.
c. Showing or hiding a KTBNF line 484 on the spectrum graph at the noise level of the receiver for the current RBW setting for the spectrum graph. "KTBNF" refers to how this line is calculated, from a factor K called Boltzman's constant, the temperature T (usually assumed to be 290 Kelvin, as even fairly large changes in temperature have minimal effect on this line), the Bandwidth B (similar to the Resolution Bandwidth, but slightly different for this purpose), and the Noise Figure of the receiver NF. The user can also adjust the NF value, if this is not pre-configured as part of the RE data received from the Equipment Monitoring System 38.
5. FIG. 8E shows a Marker Menu and related table 486 of Marker values. Controls include:
a. Where the Marker is placed in area 488.
b. What type of Marker will be used, in area 490.
c. Positioning of the current active marker to the Maximum Peak, Minimum Peak, Next Peak to the Right Next Peak to the Left, Next Higher Peak or Next Lower peak with control 492.
6. FIG. 8F shows a Limits menu, where the user can define a reference spectrum trace that if the measured spectrum trace exceeds, will cause the Events System (q.v.) to record the displayed spectrum into the Events System database. In this menu, the user may:
a. Define which trace processing is to be used to on the measured spectrum for the comparison. This trace processing may be the same as used to display the spectrum, or it may be different.
b. Add, Delete, or select points, as well as turn the limit processing off and save the defined limits to memories 120, 122, 124, 126 or 130, by using control 496.

B) RANALYZER™ System in a C-RAN Context

Figure 5A:
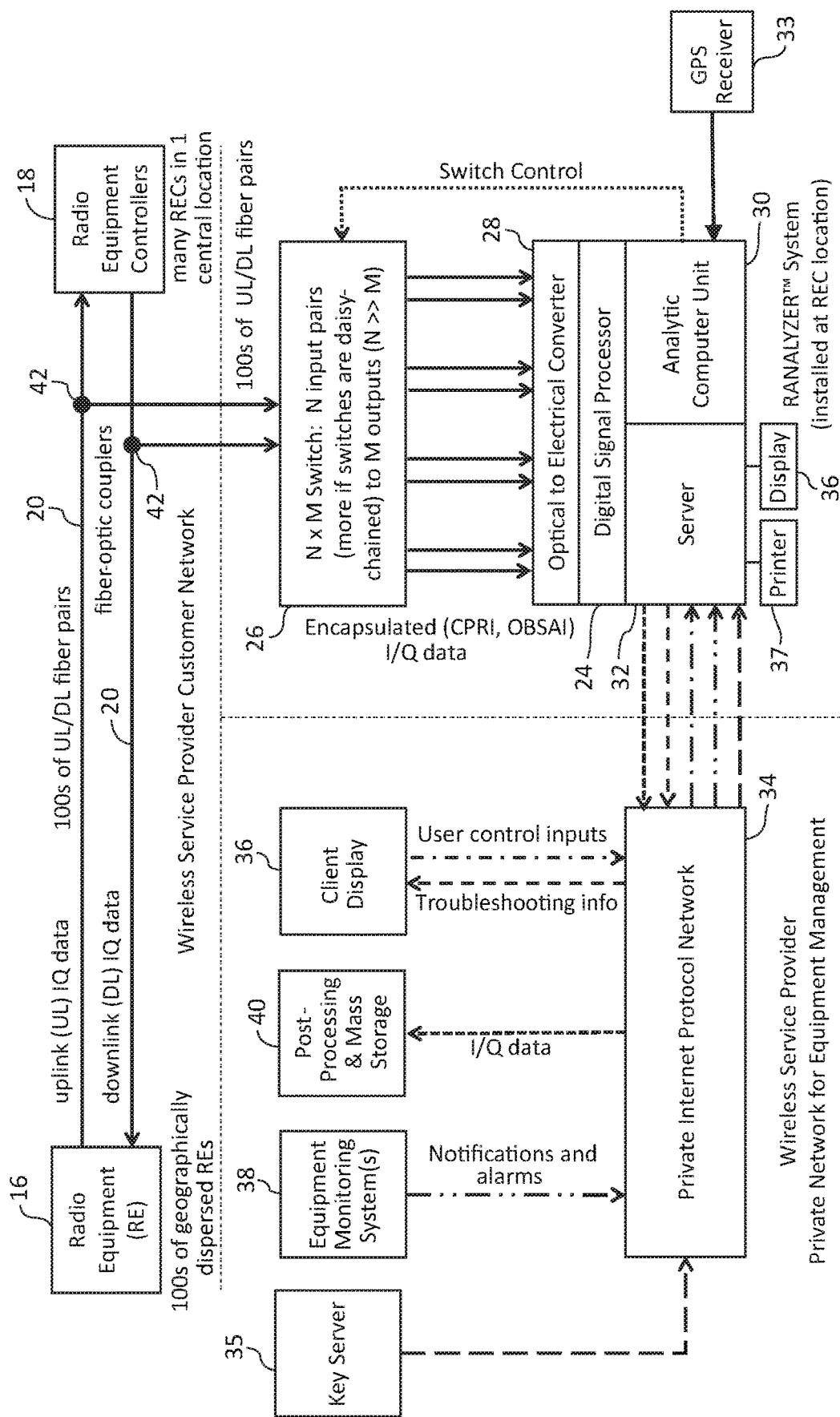
FIG. 5A is a block diagram illustrating an overview of the system of the present invention for troubleshooting signals in a cellular communications network in a C-RAN context.

FIG. 5A shows a block diagram overview of the RANALYZER™ system 22 as used in a C-RAN. The system 22 observes the communication between the Radio Equipment Controllers 18 in the C-RAN hub and the various geographically-dispersed Radio Equipment 16 by means of fiber optic couplers (aka "taps") 42. The observed signals are sent via links 19 to a fiber-optic switch 26 which selects certain (preferably up to four (4)) pairs of signals from many fibers. One such switch 26 is a robotic "patch panel", with preferably up to 192 input pairs. More than 192 pairs can be switched if the robotic switches 26 are daisy-chained. A GPS receiver 33 is also provided in the system 22, in order to coordinate measurements among multiple systems, by capturing complex I and Q samples at the same time in each unit, both by knowing the time of day to make the capture, and capturing at a precise time, triggered by a one pulse-per-second output from the receiver, which is closely tied to UTC time. This is especially important in the case of the Macro Site Context below.

C) RANALYZER™ System with RF or microwave fronthaul for C-RAN.

Figure 5B:
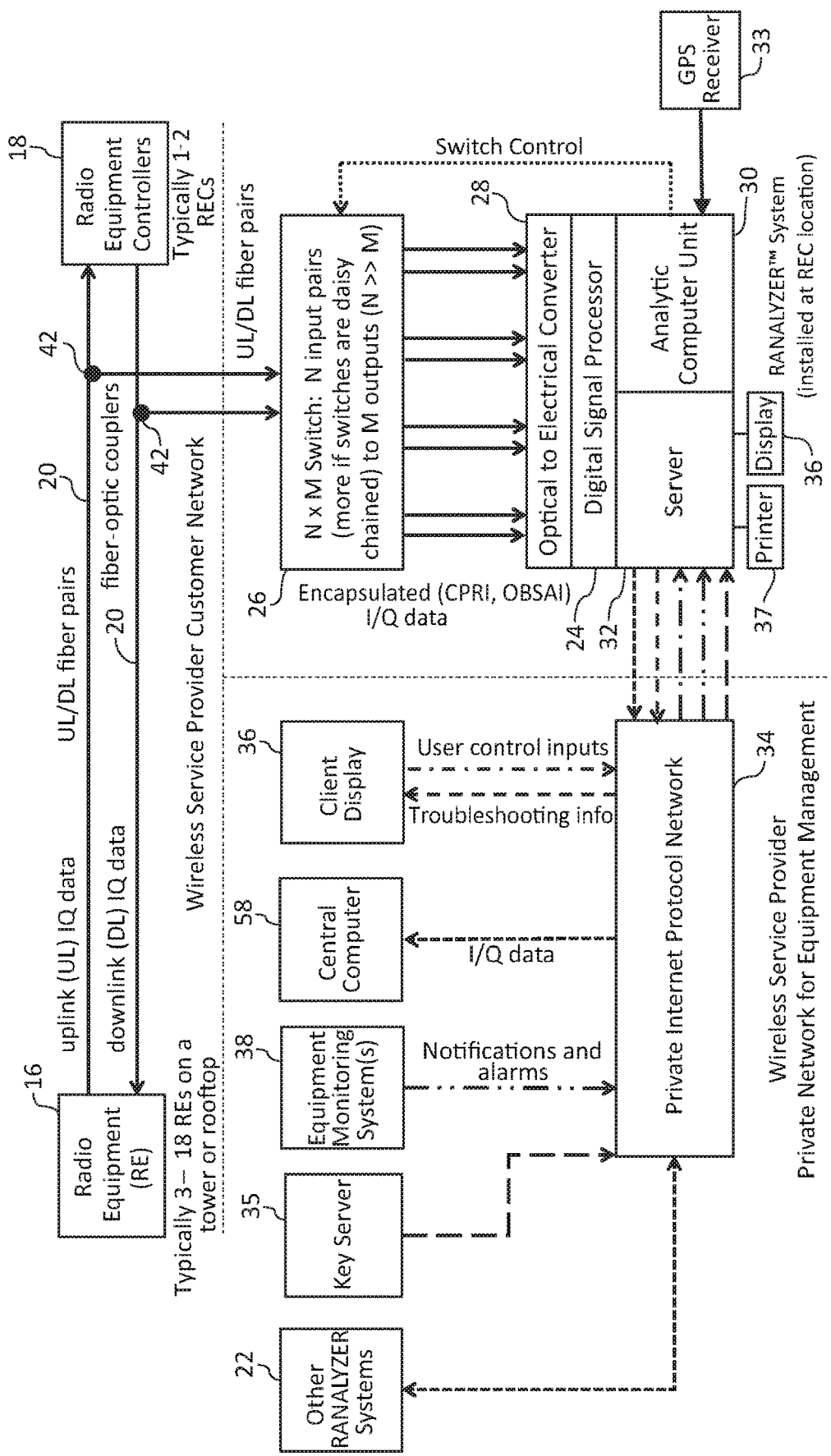
FIG. 5B is a block diagram illustrating an overview of the system of the present invention in a Macro Site context.
Figure 5C:
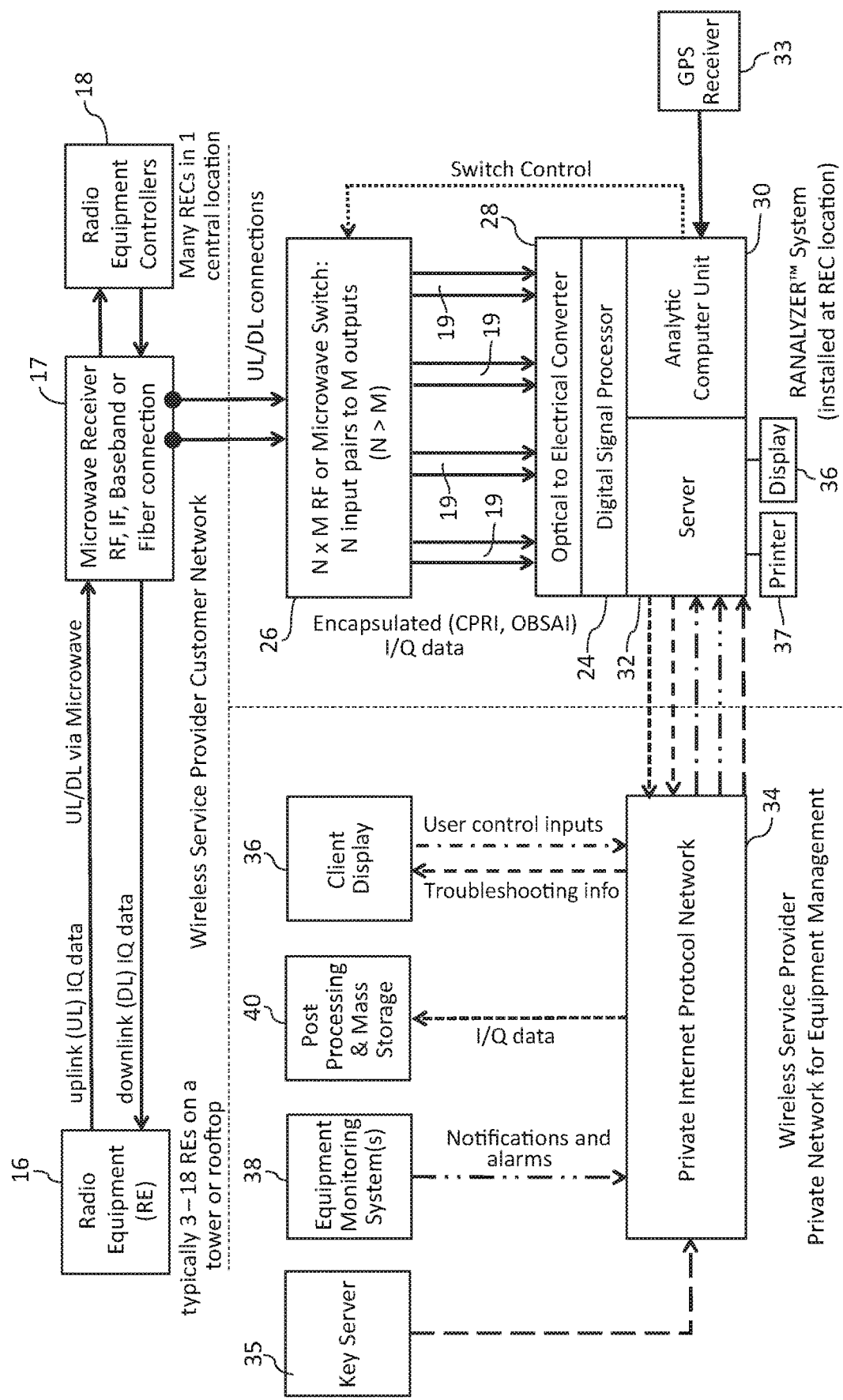
FIG. 5C is a block diagram illustrating an overview of the system of the present invention in a RF or microwave Front-Haul context.

While the most common connection between the REC 18 and RE 16 ("fronthaul") is via fiber optics, sometimes an RF or microwave connection is used, such as illustrated in FIG. 5C, with detailed connections shown in FIGS. 5E-I. The form of this interconnection does not affect the functionality of the RANALYZER™ system 22; merely a different connection to obtain the I/Q data carried on the REC-to-RE connection is used. This connection may take one or several of a number of different forms, depending on the implementation of the C-RAN:

1. Fiber from radio receiver to REC 18. In this case, the RF or microwave radio receiver is separate from the REC 18, and a fiber-optic connection is used between them. Since a fiber connection is available, the connection to the RANALYZER™ system 22 is identical to that of case B described above.

2. RF sniffer port. As shown in FIG. 5E, the signals between the RE and REC are transmitted through the air by means of antennas 52. The uplink and downlink RF signals are available in a coaxial or waveguide lines 44, and directional couplers or splitters 46 are used to gain a sample of the RF signal. This signal is distributed to eight parallel RF switches 48, which choose which fronthaul link signal is to be measured, four each in both uplink & downlink directions. A radio receiver 50 is then used to convert this signal to digitized baseband I and Q samples for use in the RANALYZER™ system 22 via links 19. If the receiver 50 is sufficiently low cost, the selection of fronthaul link signal can be done on the baseband I/Q signal, as shown in FIG. 5F.

Block 58 and 60 are not germane to this method of attachment, and will be discussed below.

Figure 5D:
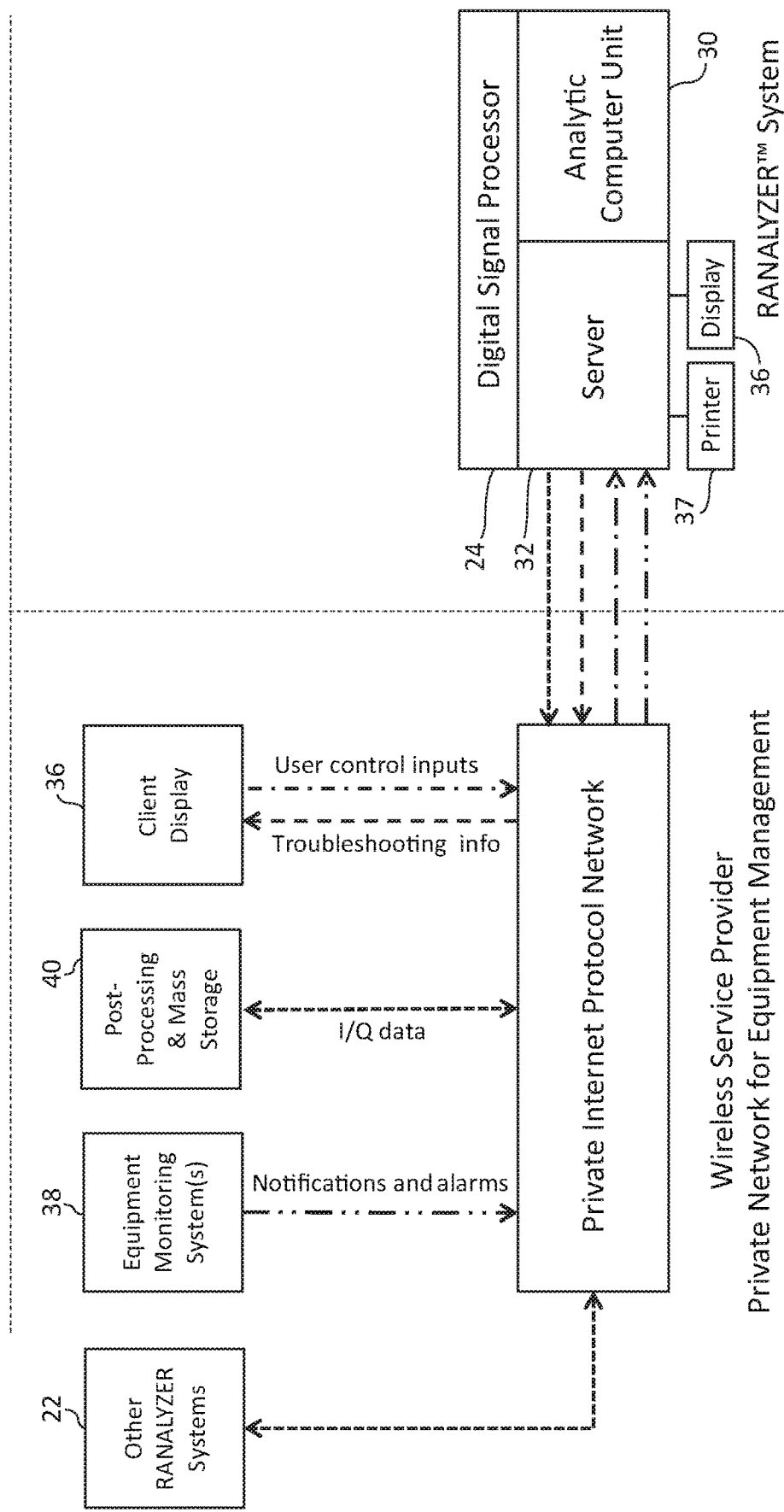
FIG. 5D is a block diagram illustrating an overview of the system of the present invention in a non-real-time (or offline) context.
Figure 5E:
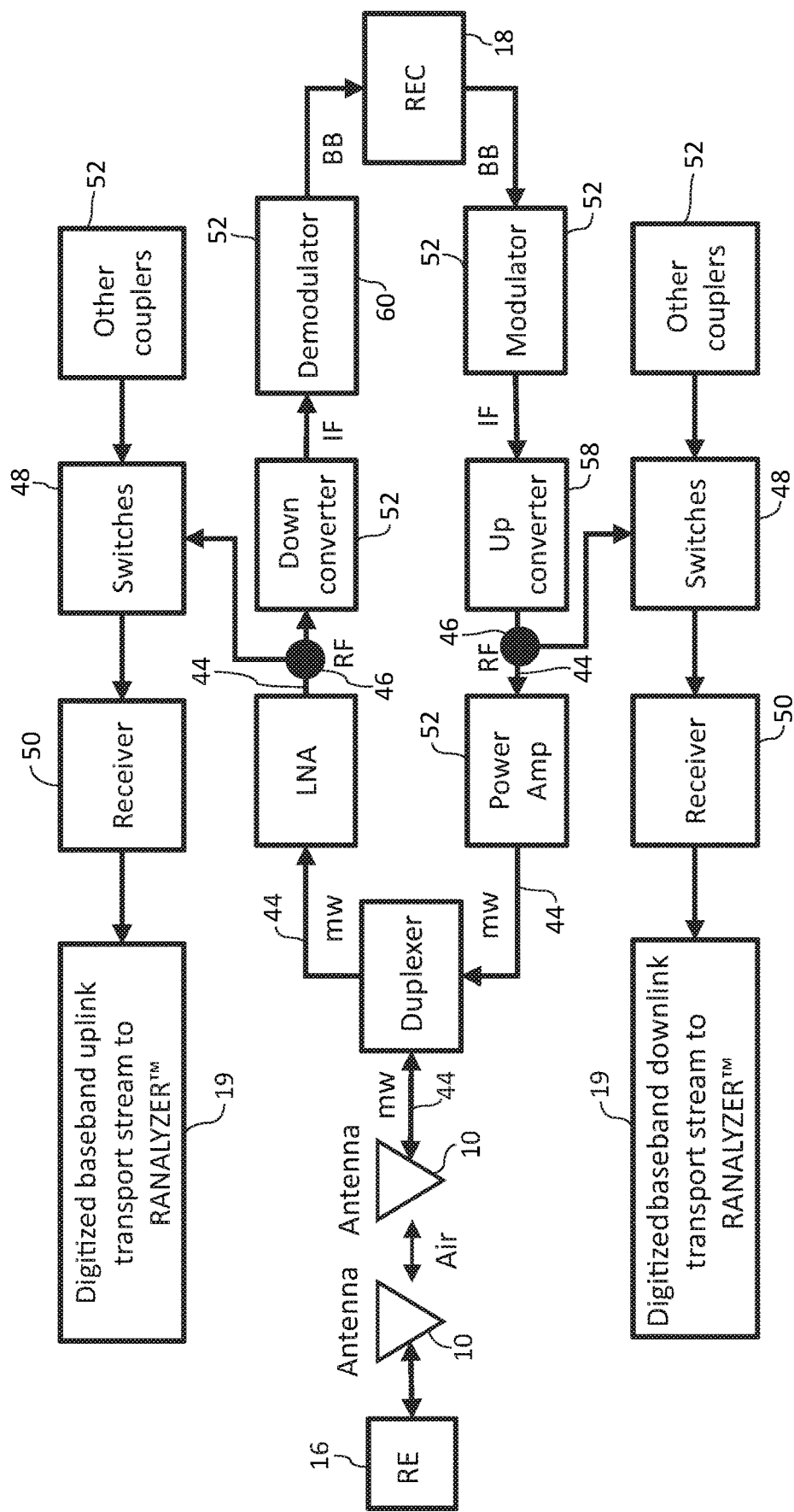
FIG. 5E shows detail of block 17 in FIG. 5C for RF coupling to microwave fronthaul, with RF switching.
Figure 5F:
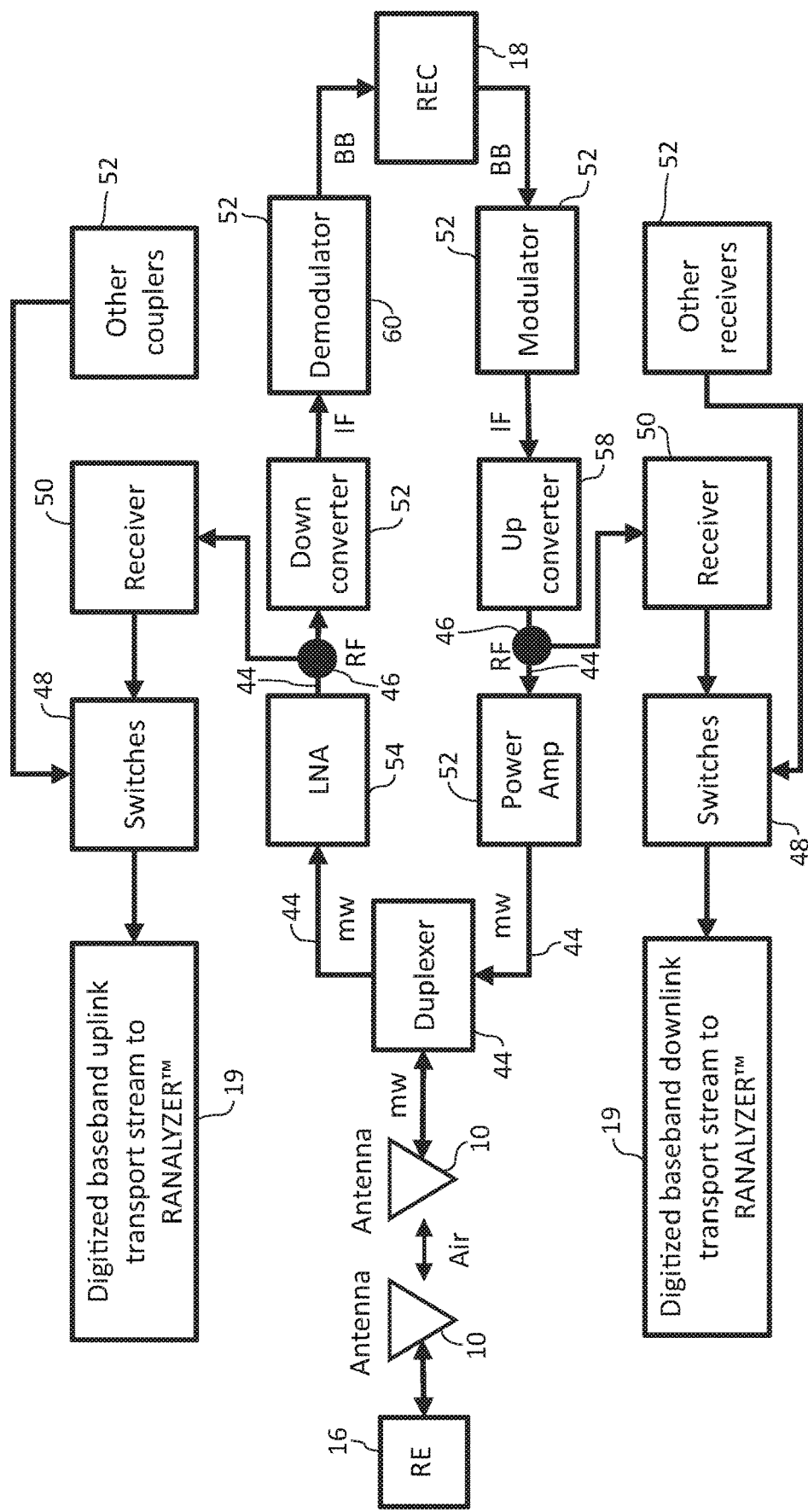
FIG. 5F shows detail of block 17 in FIG. 5C for RF coupling to microwave fronthaul, with baseband switching.

Other blocks 52 shown in FIGS. 5E and 5F are part of the backhaul system which the RANALYZER™ system 22 is connected to, and are obvious to those skilled in the art of microwave links, and will not be further described here.

Figure 5G:
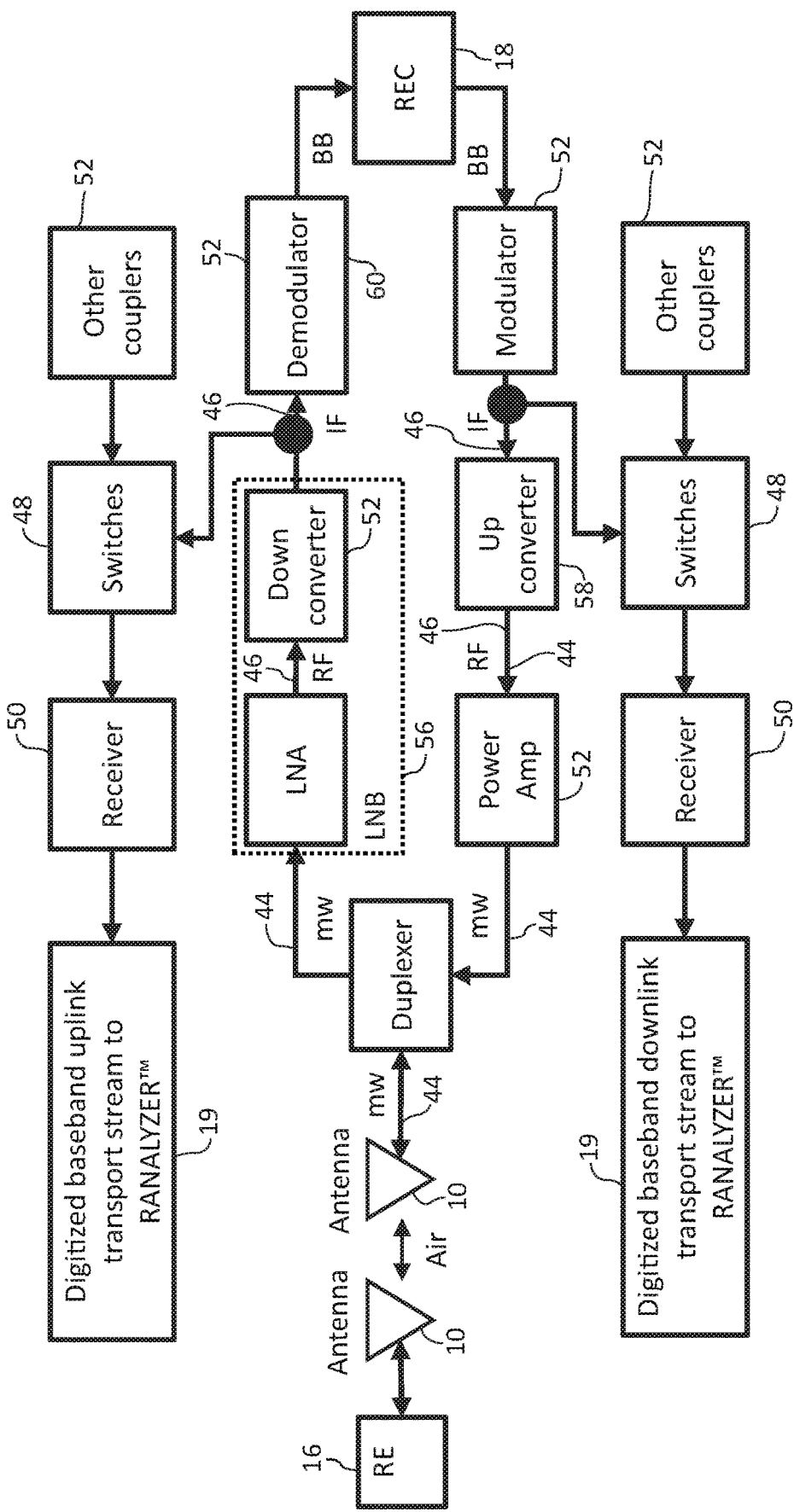
FIG. 5G shows detail of block 17 in FIG. 5C for IF coupling to microwave fronthaul, with IF switching.
Figure 5H:
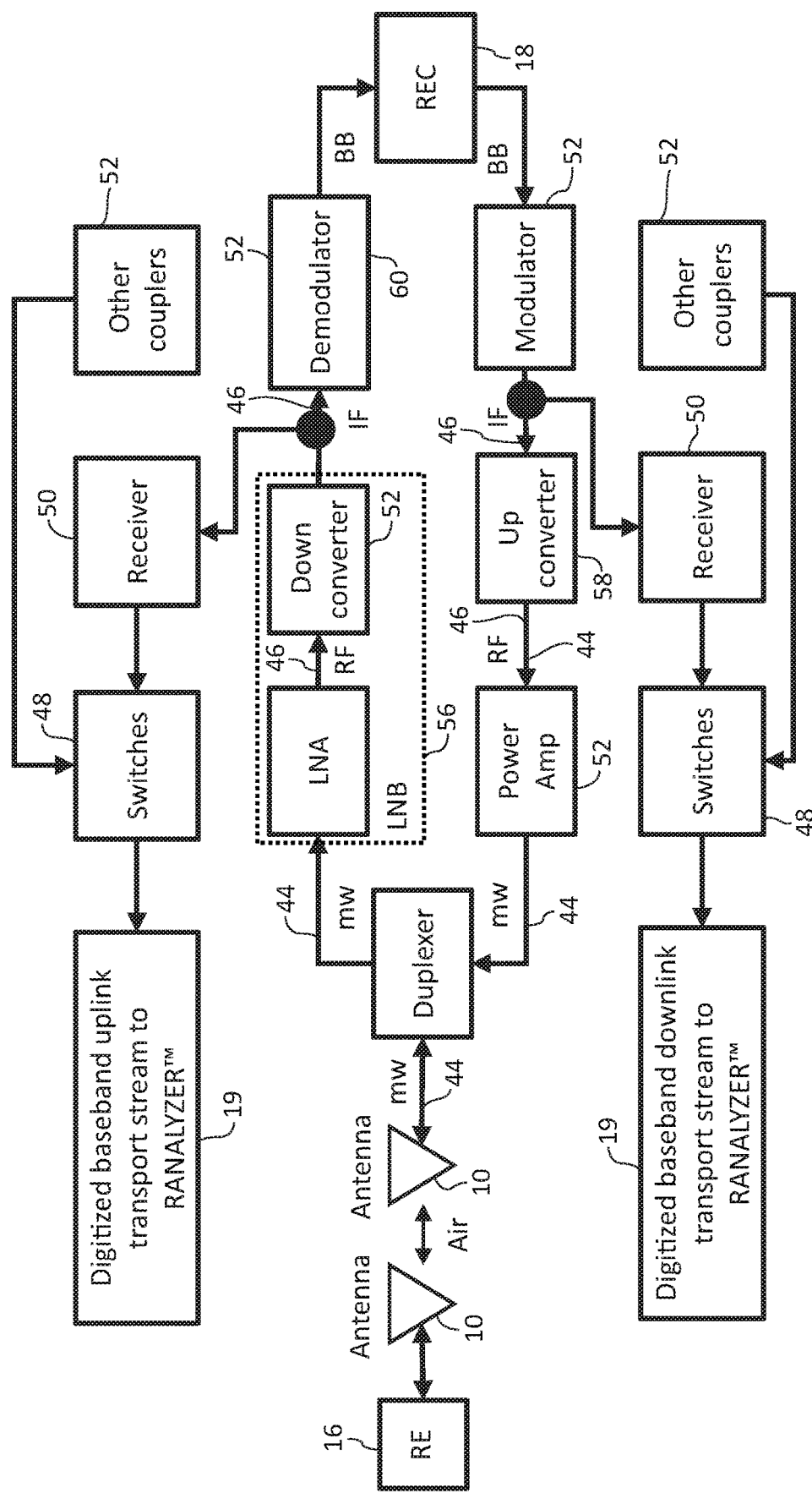
FIG. 5H shows detail of block 17 in FIG. 5C for IF coupling to microwave fronthaul, with baseband switching.
Figure 51:
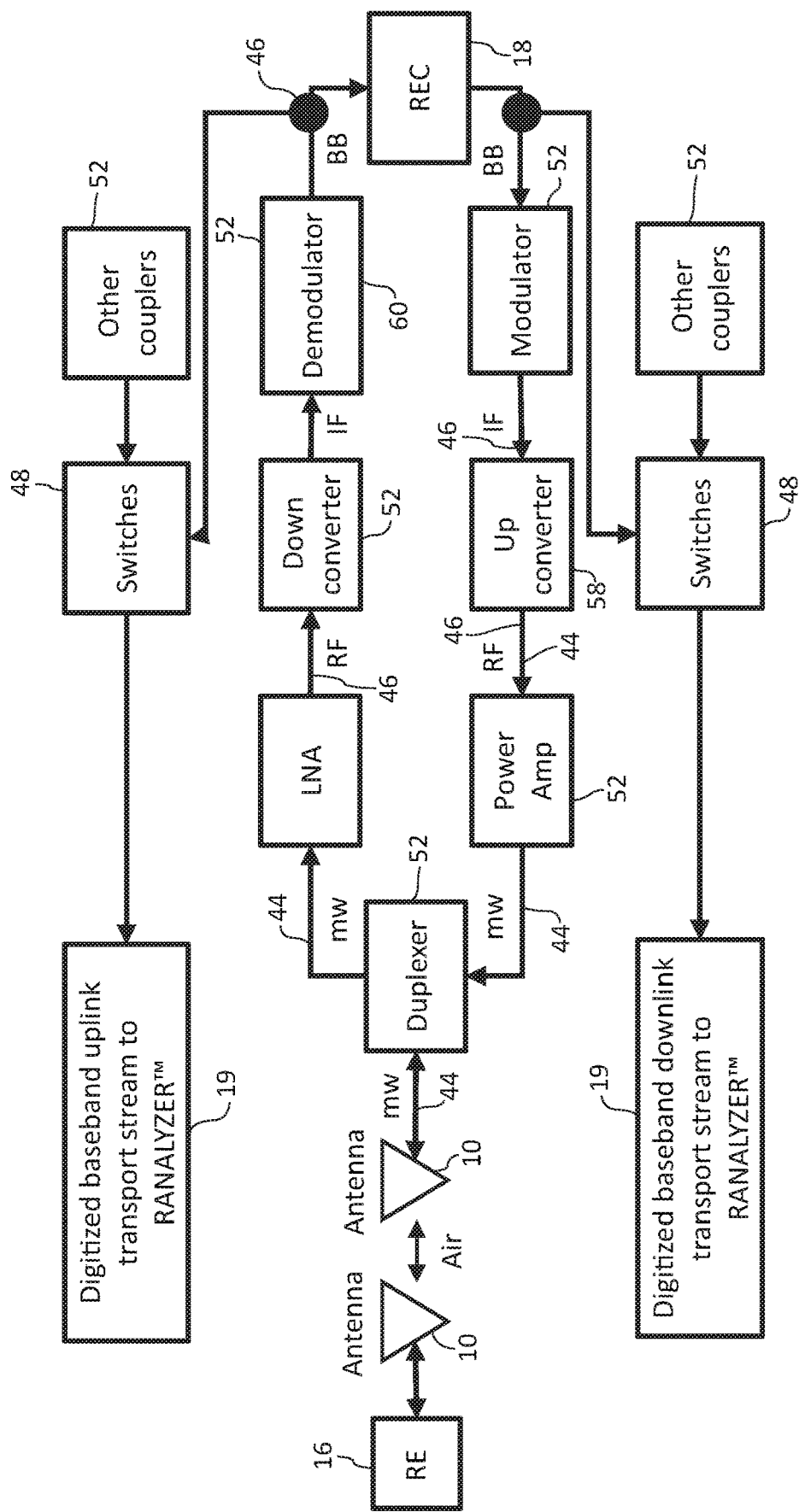

3. IF sniffer port. FIGS. 5G and 5H show this case, where the signal received from the RE is immediately downconverted to a lower frequency at the receive antenna, by a so-called "low-noise block converter" or LNB 56. This is done to reduce the losses between the antenna and radio receiver, as loss in cable is higher at microwave frequencies. As for FIGS. 5E and 5F, the difference between FIGS. 5G and 5H is how the switching is accomplished—either of the IF signal (before the Receiver 50), or of the baseband (I and Q) signal after the Receiver 50.

The downlink signal transmitted by the REC is also coupled at IF, before the upconverter 58. The rest of the connections are identical to the RF sniffer port cases, except that the input frequency of the radio receiver 50 used to convert to baseband is lower.

As for the RF sniffer port, there are four switches used for each link direction, in order to provide the four downlink/uplink pairs to the RANALYZER™ system 22.

Other blocks 52 shown in FIGS. 5F and 5G are part of the backhaul system which the RANALYZER™ system 22 is connected to, and are obvious to those skilled in the art of microwave links, and will not be further described here.

4. Baseband sniffer port. FIG. 5I shows the RANALYZER™ system 22 connected to an electrical or optical baseband signal. This is for cases where the RF or microwave receiver, which might be located inside the REC 18 or separate from it, has an output of analog or digital baseband I and Q signals. After digitization of analog signals, these can be feed to the RANALYZER™ system 22 for extraction of the I and Q vectors for further use, in a similar manner as for the RF and IF sniffer port cases above. Note that a digital baseband I or Q signal is very similar to the I and Q samples used in the RANALYZER™ system 22, but the sample rate or other digital parameters may be somewhat different. The Digital Signal Processor 24 is reconfigured to adapt to these minor changes as necessary.

Figure 5J:
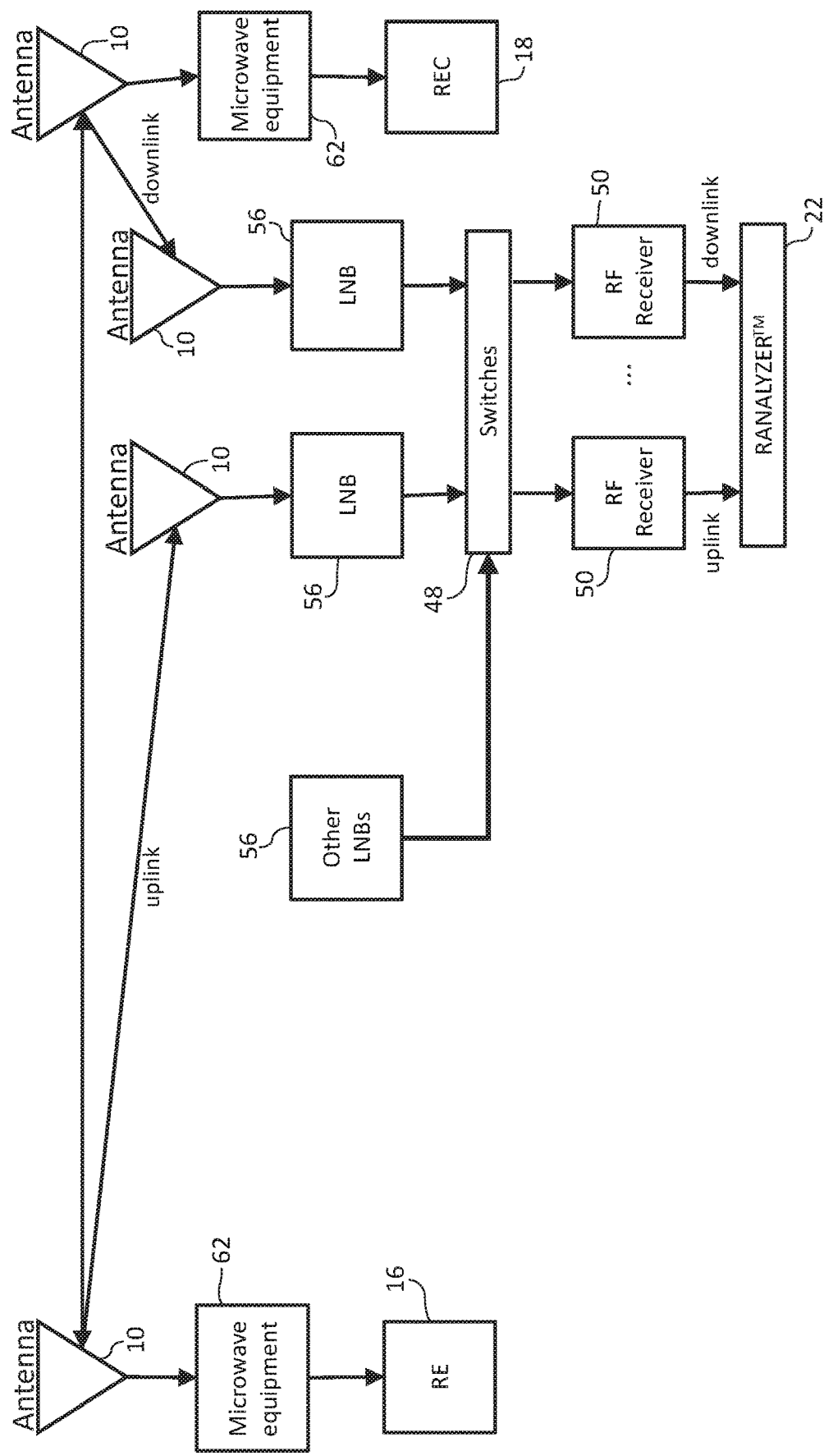
FIG. 5J is a block diagram of the system of the present invention employing microwave equipment.

5. Sniffer antenna. If no sniffer ports are available (or can be made available), another alternative is possible-using a separate receive antenna 52 just for connection to the RANALYZER™ system 32. This is shown in FIG. 5J. The normal RE to REC connection is comprised of RE 16, microwave equipment 62, microwave antennas 10, and REC 18.

To capture the transmission data, additional antennas 10 are placed near the antenna 10 directly connected to the REC. These antennas are pointed in the proper directions to gain a sample of the signal from the RE to REC, and REC to RE. It should be noted that at a site using microwave fronthaul, the REs may be in many different directions, requiring many different antennas. Depending on the particular situation, it may be possible to share one sniffer antenna among multiple REs at different frequencies; this just means that the Receiver 50 has to be tunable by the system 22 to those different frequencies.

The signals from these additional antennas is amplified and downconverted to an Intermediate Frequency (IF) signal by LNBs 56. The output from the LNBs 56, including from other sniffer antennas 10, are then distributed to 8 different switches, four for the uplink direction, and four for the downlink direction. The output of the switches go to 8 different RF receivers 50.

This sniffer antennas 10 could take several forms, such as a steerable antenna or an array of antennas; each form of antenna is equivalent in operation here. It should be noted that this technique is not constrained to when sniffer ports are unavailable, but since sniffer ports are less expensive than antennas, this would be the most likely case for using a separate receive antenna.

At the output of the sniffer antenna is an RF signal, and processing of this signal then proceeds as in the case of the RF sniffer port case above (or IF sniffer port case, if the antenna incorporates an LNB).

D) RANALYZER™ System in a Macro Site Context

FIG. 5B shows the RANALYZER™ system 22 in the context of a traditional base station, often called a Macro cell or Macro site. In this case, there are a much smaller number of fibers to observe, so a smaller number of input switch ports on the switch assembly 26 are needed. Additionally, some of the data used for diagnoses may come from other cell sites, rather than other REs connected to RECs in a C-RAN. Because of this, it's especially important for macro site systems to communicate with other RANALYZER systems 22 via the Private Internet Protocol Network 34, so that this data can be used for diagnoses, as well as coordinating the capture of complex I and Q sample data at the same time.

A key aspect of macro site systems is that since there are fewer radio heads to observe, the system cost must be much lower, to maintain a reasonable cost per observed radio. Therefore, many cost optimizations are needed, including:
1. Using a System-on-Chip (SOC) that combines computer and FPGA functionality.
2. Using an electrical switch 26 and a bank of optical-to-electrical converters 28. System 22 preferably has 24 fiber inputs (preferably 12 pairs of downlink and uplink connections, but could be used in other ways).
3. Using direct fiber inputs, instead of SFP connectors. Also, using a single multi-fiber connector.
4. Provision is also made to send IQ vectors to a central computer 58 for further processing, if the local CPU 30 is insufficient for some types of analysis. A moderate amount of local storage is provided, in order to be able to wait for times that connection bandwidth is available for this, since this bandwidth is usually shared with network functions (connecting cell phone calls, video, and data transfers), which take higher priority.
5. Since fibers from multiple sites may not be available, provision for a GPS receiver 33, or other time reference, is made so that multiple units may make simultaneous measurements—similar to having multiple fibers from different sites in the C-RAN system.

E) RANALYZER™ System in an Offline Context

FIG. 5D shows the RANALYZER™ system 22 in the context of offline analysis. In this case, I/Q samples or spectrum traces recorded by a RANALYZER™ system 22 are recorded into memories either locally (memories 118, 120, 122 or 124) or via a network connection (memories 126 or 130). These data can then be analyzed in more detail by a subject matter expert (SME) on a RANALYZER™ system 22 that need not be directly connected to any REs or RECs. The construction of FIG. 5D can be seen to be identical to FIGS. 5A, 5B, and 5C, with these physical connections removed. Since captured I/Q samples (along with metadata such as when the samples were captured, the link direction—uplink or downlink—and the REs or RECs it was gathered from, as well as other information stored in the Event System (q.v.) database) contain all the information that the RANALYZER™ needs for diagnosing RAN problems, these data can be moved via a network connection, or even physical transport of storage media, to any other RANALYZER™ system for detailed analysis.

F) Using a Switch to Solve the Connectivity Problem

Since the cost of hardware to observe the RAN 6 is significant, it is optimal to have fewer measurement points than there are points to observe. A switch 26 of some kind, listed below, can be used to connect the RANALYZER™ observation hardware to many different RAN branches.

a. Using an Optical Switch to Solve Connectivity Problem

One method of switching observed RAN branches into the RANALYZER™ system 22 is to use an optical switch 26. Optical switches 26 to date are optimized for network, rather than measurement, use, and are too costly to be practical. However, a lower-cost optical switch 26 would also be possible for use in observing the RAN 6, such as described herein.

b. Using an Electronic Switch to Solve the Connectivity Problem

Since the C-RAN can have hundreds, if not thousands, of fiber or RF connections, there is a problem selecting the correct connection to monitor, especially from a remote location, and at low cost. While the RF connection solutions are listed above, one solution for the fiber case is to convert the fiber-optic signal to electrical signals using an optical-to-electrical converter 28, then use an electronic switch 26 to select which signal(s) to present to the RANALYZER™ system 22. Unlike typical "crossbar" switches, however, there is no need to have many outputs. Only a few outputs are necessary to drive the RANALYZER™ system 22, allowing the switch 26 to be lower in cost than would otherwise be the case. See the section on M×N switching for more details about this.

c. Using a Robotic Switch to Solve the C-RAN Connectivity Problem

The connectivity problem has been solved for decades in a local environment by the use of a "patch panel", where a person plugs a cable into a socket, similar to the old plug boards used by telephone operators. However, the large number of connections (which make it easy for a person to select the wrong connection) and the desire to control this remotely cause problems for traditional patch panels. Another alternative is to use mirror-based optical switches, but these quickly become cost-prohibitive for a large number of connections.

A solution to this problem is to use a mechanical robot in conjunction with the traditional patch panel. The robot can be remotely instructed to move a cable connected to the monitoring system to attach to the desired test point.

i. Overview of the Robotic Optical Switch Assembly

Drawings of the robotic optical switch assembly 26 can be found in FIGS. 9-12 and 16. The robotic optical switch assembly 26 has four test output cables 62 which are connected to the input of the digital signal processor 24 or the optical-to-electrical converter 28 (if such is required) of the RANALYZER™ system 22. On the inside of the robotic switch assembly 26, the output test cables 62 are called "test connection cables" and the fiber optic connector 64 at the end of the connection cable 62 is called a "test connection plug". Multiple robotic switch assemblies 26 can be daisy-chained together by connecting the test output cables 62 of one system 22 to four of the external monitor ports (inputs) 66 on another system.

The monitor port inputs 66 to the robotic switch assembly 26 is an array of modified LC-type bulkhead connectors 68. The connectors 68 on the outside of the system are called "exterior monitorjacks". The mated connectors 70 on the inside of the system are called "interior monitor jacks". A backplane structure 72 in the form of a panel supports an array of connectors 68, 70 which preferably consists of 16 columns×13 rows of connector pairs in a rectangular grid. Preferably, there are a total of 208 locations (16×13). These 208 ports are allocated as follows: 192 input ports are for uplink/downlink monitor pairs, four ports are for parking the test cables 62 when not in use, four ports are used for daisy-chaining multiple robotic switch assemblies 26 when required to have greater than 4×192 connections and the remaining 8 ports are used for internal cleaning and diagnostic functions. These diagnostic functions can include a test signal generated in the RANALYZER™ system 22 (used for bit-error-ratio testing of the test connection fiber cables 62), a fiber inspection scope (used for verifying the cleanliness of the fiber connection in the test connection plug 64) and a cleaning station (for removing dirt and other contaminants of the fiber connection on the test connection plug 64). Note that having 192 pairs is an optimal number due to one implementation of C-RAN, where an interface to provide Coordinated Multipoint operation (CoMP) is limited preferably to 192 connections.

The test connection plugs 64 are moved by a single arm and gripper mechanism 74 which disconnects the test connection plug 64 from its protected parking spot in the array of connector jacks 70 and moves it to any of the interior monitor jacks 70.

ii. Improving Robot Alignment Accuracy Tolerance Requirements, and Improving Alignment Accuracy in the Robotic Switch Assembly The connectors 68, 70 are mounted in an array to a rigid back panel 72 with structural supports 76 to increase the stiffness of the panel 72 of connectors 68, 70 and prevent movement while inserting and retracting the fiber-optic plugs 64. The interior monitor jacks 70 have chamfered lead-in areas to increase the acceptable tolerances for insertion of the test connection plugs 64 into the interior monitor jacks 70 by the gripping mechanism 74. The combination of the structure members 76 to improve the stiffness of the array of monitor jacks 70, along with the chamfering of the monitor jacks 70, increases the required alignment tolerance of the insertion of the plug 64 such that it can be accomplished by the system using a stepper motor 78 and belt drive system 80 in the X axis, a stepper 250 with leadscrew 252 drive in the Y axis, and stepper 254 with leadscrew 256 drive in the Z axis, all without employing alignment feedback systems.

iii. Avoiding Robot Tangling of the Cables and Complying with Minimum Bend Radius Requirements The test connection cable 62 is routed around several pulleys 82, 84 with one on a sliding member 86 to allow for slack take-up as the plug 64 is inserted into various ports 70 that have a different physical distance from the cable outlet. The sliding member 86 is preloaded with a constant force spring 88 to keep a known and constant level of tension on the test connection cable 62 regardless of its position in the panel 72. The connection cable 62 has a highly flexible outer jacket and construction to allow for high durability and flexibility while being routed around the pulleys 82, 84. The combination of the flexible cable 62 plus the constant force from the pulley 82, 84 enables the system to predict the location of the fibers 62 with sufficient accuracy to avoid collisions and tangles.

The arm and gripper mechanism 74 that moves the connectors 64 is located (in its home position) at the bottom of the backplane panel 72 array of connectors 68, 70, and the pulleys 82, 84 from which the test connection cables 62 are tensioned are located above the top row of the backplane panel 72 supporting the array of connectors 68, 70. If more than one plug 64 needs to be inserted into the same column of jacks 70, then the plugs 64 and connection cables 62 are inserted into the jacks 70 in the order of top to bottom.

To access a given test connection plug 64, the gripper arm 74 positions itself directly in front of the plug 64 to be moved (in-line in the Z axis). When the gripper arm 74 moves in the Z direction to grab the plug 64, it makes several vertical steps (upward deflections in the Y direction) to avoid collisions with the connector housings and test connection cable 62 of adjacent plugs 64. A cable guide 90 in the shape of a rounded wedge also aids in the vertical motion to prevent tangled cables 62 (see FIGS. 12*d* and 12*f*).

The robotic switch assembly and system 26 keeps track of the current locations of the test cables 62 and plugs 64. When the system 26 receives a request from the analytic computer unit 30 of the RANALYZER™ system 22 by way of a control signal to make a fiber connection to one of the monitor jacks 70, it sends a reply signal to the analytic computer unit 30 acknowledging the request, but the robotic switch assembly 26 decides how to connect the plugs 64 so as not to tangle the cables 62.

Parking positions for the test plugs 64 are used for tangle avoidance. If a request for connection is made by a control signal sent by the analytic computer unit 30 to the robotic switch assembly 26 that would cause a tangle to occur, then the robotic switch assembly and system 26 temporarily parks the test plugs 64 which are in the way of the other plugs 64 until all requested connections to the test jacks 70 can be made without tangling the test connection cables 62.

After the connections have been made, the electronic circuitry 91 of the robotic switch assembly 26 sends a signal back to the analytic computer unit 30 of the RANALYZER™ system 22 which output cable 62 is connected to which monitor jack 70. The analytic computer unit 30 of the RANALYZER™ system 22 works in conjunction with the robotic switch assembly and system 26 to allow for interrupts in data collection but maintain logical consistency of the data analysis and data collection.

iv. Design of the Robot Gripper to Work with Standard LC Type Connectors.

The gripper mechanism 74 that connects and disconnects the plugs 64 from the jacks 70 has a cradle 92 that fits the bottom of plugs 64 and prevents movement in the X and Z directions. Pressure to depress a clip 94 that holds the plug 64 in the jack 70 is provided by a cam 96 that rotates in the X-Z plane by gearmotor 258 and worm drive 260. As the cam 96 rotates, it depresses the clip 94 to release the plug 64 from the jack 70. After the cam 96 has rotated, it also creates the grip pressure on the plug 64 to hold it in the cradle 92. A two-position sensor 98 confirms clip release and cam retraction.

v. Maintaining a Clean Fiber-Optic Environment in the Robotic Switch Assembly

The exterior monitor jacks 68 on the reverse side of the panel 72 that supports the array of connectors 68, 70 are routed to a series of preferably four (4) port MTP bulkhead connectors 100 that allow a sealed connection to the outside of the robotic switch assembly 26.

A dual fan and filter system 102 is used to create a higher pressure inside the robotic switch assembly 26 than in the room in which it is located. This helps keep dust particles out of the assembly 26. The slight positive pressure is achieved by having an input fan 104 and filters 106 combined with exhaust filters 108 only.

vi. Methods and Apparatus for Serviceability of the Robotic Switch Assembly

The robotic switch assembly 26 is designed to be rack mounted in a telecommunications rack. As shown in FIGS. 11A-11D of the drawings, the exterior housing 108 of the robotic switch assembly 26 includes slides 110 mounted on opposite lateral sides thereof, which mate with slides incorporated into the rack mount system (not shown). Also, a method of attaching a service-loop of fiber to the back of the housing (where the monitor fibers connect to the backplane of exterior monitor jacks) is provided. The combination of the slides 110 and the service loop enables the assembly 26 to be serviced without disconnecting the monitor fibers.

For machine service, which is expected to be every 1000 relocations, there is a procedure to replace the probe fiber cartridge 112 and fan filters 106, 108. First, the robotic switch assembly 26 receives a control signal from the analytic computer unit 30 and is commanded to replace all test connection cables 62 to their home positions and the arm and gripper mechanism 74 to return to its home position. Then, the power to the assembly 26 is removed and the robotic switch assembly 26 is slid into its forward slide position. The top cover of the housing 108 is removed by removal of the mounting screws. The filters 106, 108 on the front and rear sides of the assembly housing 108 can now be replaced. After replacement of the filters 106, 108, both ends of the probe fibers 62 are removed from their respective plugs 64, carefully letting the fibers 62 fully retract, and then each port 70 is covered with a dust cap (not shown). Then the two screws on each side of the probe fiber slack panel 112 are removed and the panel 112 may be slid out of the housing 108 out of the robot. Replace with new panel and reverse the procedure, cleaning the ports and fibers before insertions. The service technician should then use a small vacuum to clean the corners of the robotic switch assembly 26 within the housing 108, give a visual check for cleanliness and then reattach the top cover to the rest of the housing 108. The robotic switch assembly 26 can then be returned to the rearward slide position in the rack (not shown) on which it is mounted and power may be reapplied to the assembly 26. The arm and gripper mechanism 74 and test connection cables 62 may then be rehomed, if necessary, by control signals provided by the analytic computer unit 30 and received by the electronic circuitry 91 of the assembly 26, and the robotic switch assembly is now ready for use.

Cameras 264 may be located on the inside of the housing 108 of the robotic switch assembly 26 to provide an inspection capability. Additionally, fiber inspection probes (not shown) and fiber cleaning mechanisms (not shown) may be included in the assembly 26.

vii. Miscellaneous Features of the Robotic Switch Assembly

Backup power by way of a capacitor array (not shown) within the housing 108 is provided to complete a move and then position the gripper arm 74 to a safe position (preferably, its home position) if external power is lost.

Seismic sensors (not shown) may be included within the housing 108 and electrically connected to the electronic circuitry 91 so that the robotic switch assembly 26 does not attempt to make a connection between a test probe 64 and test jack 70 if the assembly 26 is shaking too much. The gripper arm 74 moves to a safe location (preferably, its home position) if vibration thresholds programmed into the electronic circuitry 91 are exceeded.

One or more temperature sensors (not shown) may be included within the housing 108 of the robotic switch assembly 26 and electrically connected to the electronic circuitry 91 to sense temperature extremes when the robotic switch assembly 26 is located in certain installations and possibly activate an internal heater (not shown) situated within the housing 108.

Since the distance from where the four test connections cables 62 exit the probe fiber cartridge 110 to various ports in the panel 72 varies significantly the slack in each of the test connection cables needs to be independently controlled to prevent tangling with each other. This is accomplished through a system of fixed pulleys 82, 84 and sliding pulleys 86 loaded by a constant force spring 88. The pulley system for each test connection cable 62 are stacked on top of each other at the top of the unit as shown in FIGS. 16A-C. Each pair of test connection cables 62 exits the probe fiber cartridge 110 through a multi-roller output assembly, 270. For each test connection cable 62 there is a series of four rollers 272 that both guide the test connection cable 62 in the proper direction and reduces the amount of internal friction in the probe fiber cartridge 110. It is important to minimize the internal cartridge friction to allow the use of the minimum strength constant force spring 88 which minimizes the tension in the test connection cable. This minimizes signal loss and cable jacket fatigue. The rollers 82, 84, 86 and other slack system geometry are designed to prevent the test connection cables 62 from being subject to a bend radius smaller than the minimum allowable radius to prevent signal attenuation and cable jacket fatigue.

viii. Operation of Robotic Switch

Power on/Homing

Upon application of power, a homing command needs to be issued to the robotic switch to zero all of the motion axes and initialize the rotating cam.

Gripper
    The two position (open/closed) rotating cam sensor is looked at.
    If it is not in the open position the gearmotor/worm reduction is operated CCW until the sensor open position is triggered.
    If the sensor is initially in the open position the system moves to the next step.
    There is a 5 second timeout where if the switch open is not seen then an error is thrown and the homing process stopped.

Z axis
    If the Z1 switch is closed the Z motor moves in a +Z direction for 2000 steps, stops, then moves in the −Z direction until the switch is actuated to get an accurate location of the home/trip point.
    If the Z1 switch is open the Z motor moves in the −Z direction until the switch is actuated to get an accurate location of the home/trip point.
    If the Z1 switch is not found after 20000 steps, then the Z motor is operated in the +Z direction for 25000 steps and the 1.b.ii procedure is repeated.
    If the Z1 switch is not found a second time, then an error is thrown and the homing process stopped.

Y Axis
    If the Y0 switch is closed the Y motor moves in a +Y direction for 2000 steps, stops, then moves in the −Y direction until the switch is actuated to get an accurate location of the home/trip point.
    If the Y0 switch is open the Y motor moves in the −Y direction until the switch is actuated to get an accurate location of the home/trip point.
    If the −Y motion is greater than 55000 steps, then an error is thrown and the homing process stopped.

X Axis
    If the X0 switch is closed the X motor moves in a +X direction for 500 steps, stops, then moves in the −X direction until the switch is actuated to get an accurate location of the home/trip point.
    If the X0 switch is open the X motor moves in the −X direction until the switch is actuated to get an accurate location of the home/trip point.
    If the −X motion is greater than 45000 steps, then an error is thrown and the homing process stopped.

The robot now moves to X,Y position of port 1 leaving Z in the home position and is now ready for operation.

The robot operates by removing any/all of 4 specialized LC Duplex fiber optic connectors from home 'parking spaces' in the top center top of the panel array to any of 192 locations commanded by the RANALYZER server. There are 12 additional ports that can be used for diagnostic or advanced functionality. The process has four distinct steps:
    Removing a LC duplex connector from the panel
    Inserting a LC duplex connector into the panel
    Moving to a new port X,Y location for insertion of a LC duplex connector
    Moving to a new port X,Y location for removal of a LC duplex connector These four steps can be repeated and ordered utilizing a mapping algorithm to avoid cable tangling in order achieve any desired 4×192 port configuration. We will look them in reverse order.

Moving to a new port X,Y location for removal of a LC duplex connector. This maneuver assumes the idle configuration of the robot: any X,Y position, Z1 switch triggered, no connector currently in the gripper and that the gripper sensor is in the open position. The procedure is as follows:

Move the Z motor in the −Z direction for 20000 steps.

Move the Y motor in the −Y direction until the Y0 switch is triggered then stop and move the Y motor in the +Y direction for 1000 steps.

Move the X motor in the appropriate direction to the X coordinate of the desired panel port Move the Y motor in the +Y direction to the Y coordinate minus two adjustment factors, Y_DN_OFF and Y_STRAIN_OFF, of the desired panel port Moving to a new port X,Y location for insertion of a LC duplex connector.

This maneuver assumes the following robot configuration: any X,Y position, Z1 switch is triggered, a LC Duplex connector in the carriage pocket and the gripper sensor is in the closed position. The procedure is as follows:

Move the Z motor in the −Z direction for 20000 steps.

Move the Y motor in the −Y direction until the Y0 switch is triggered then stop and move the Y motor in the +Y direction for 1000 steps.

Move the X motor in the appropriate direction to the X coordinate of the desired panel port Move the Y motor in the +Y direction to the Y coordinate minus one adjustment factor, Y_STRAIN_OFF, of the desired panel port Removing a LC duplex connector from the panel.

This maneuver assumes the following robot configuration: the robot has just completed 'Moving to a new port X,Y location for removal of a LC duplex connector'. The procedure is as follows:

Move the Z motor in the +Z direction until the Z_1_5 position.

Move the Y motor in the +Y direction by Y_STRAIN_OFF

Move the Z motor in the +Z direction until the Z_1_75 position

Move the Y motor in the +Y direction by Y_DN_OFF to end in the Y nominal position of desired port Move the Z motor in the +Z direction until the Z_2 position The gearmotor/worm reduction is operated CW until the sensor closed position is triggered.

Move the Y motor in the −Y direction by Y_DN_RLS

Move the Z motor in the −Z direction until the Z_1_5 position

Move the Y motor in the −Y direction by Y_STRAIN_OFF

Move the Z motor in the −Z direction until the Z1 switch is closed

Inserting a LC duplex connector into the panel.

This maneuver assumes the following robot configuration: the robot has just completed 'Moving to a new port X,Y location for insertion of a LC duplex connector'. The procedure is as follows:

Move the Z motor in the +Z direction until the Z_1_5 position.

Move the Y motor in the +Y direction by Y_STRAIN_OFF

Move the Z motor in the +Z direction until the Z_4+Z_4 FUDGE position

The gearmotor/worm reduction is operated CCW until the sensor open position is triggered.

Move the Z motor in the −Z direction until the Z_1_75 position

Move the Y motor in the −Y direction by Y_DN_OFF

Move the Z motor in the −Z direction until the Z_1_5 position

Move the Y motor in the −Y direction by Y_STRAIN_OFF

Move the Z motor in the −Z direction until the Z1 switch is closed

Terms used for describing robot operation:

X0=position of X home switch

Y0=position of Y home switch

Z1=position of Z home switch

Y_DN_OFF, Y_STRAIN_OFF, Y_DN_RLS=variables in the Y motion locations in order to assist in avoidance of cable tangles Z_1_5, Z_1_75, Z_2, Z_4=variables in the Z motion locations in order to assist in avoidance of cable tangles Z_4_FUDGE=variable of Z insertion depth to compensate for flexure in support structures d. N×M Switching Capability In a preferred form of the robotic switch assembly 26, the output test cables 62 can be connected to any of the interior monitor jacks 70. This provides N×M (input x output) switching (where N and M are integers): the I and Q signals of any M of the N single or dual (uplink and downlink) monitor jacks 70 can be routed to the digital signal processor 24 or the optical-to-electrical converter 28, if such converter 28 is used, of the RANALYZER™ system 22 for simultaneous analysis.

For the electronic version of the switch, mentioned in subsection b of this section above, configuring it for N×M operation also allows monitoring the needed RAN signals.

Depending on the number of test outputs and the configuration of REC-to-RE connections made by the robotic switch assembly 26, as shown in FIGS. 9A-9D, it is possible to conduct various tests and diagnoses with the RANALYZER™ system 22 of the present invention.

It should be realized that, although an optical-mechanical robotic switch assembly 26 is described herein, an electronic switch assembly may be used in its place. This is especially realizable when the optical-to-electrical converter 28 is placed upstream (signal-wise) before the switch assembly 26, or where the I and Q data is provided by the network 2 already in an electrical format and, thus, no optical-to-electrical converter 28 is required and an electronic switch device or circuit may be used to select the electrical I and Q data and provide this data to the digital signal processor.

G) Choosing which Ports to Measure

Given that it is preferred that only M test ports 70 are measured at any one time (out of the larger number N), some method must be used to choose which ports 70 to measure. There are several methods used by the RANALYZER™ system of the present invention to do this, based on different circumstances and needed capabilities. Table 1 lists the diagnostic capabilities based on the number of connections to REs and RECs, which shows why the RANALYZER™ system 22 is designed to connect to 4 pairs of uplink & downlink connections between REs and RECs. Details about choosing ports to measure for different scenarios are explained below.

1. On receipt of an alarm from the network equipment monitoring system 38

The port 70 related to the radio equipment 16 having a problem is the one to be measured. Additional ports 70 can be added to supplement this, as listed below.

2. Downlink and Uplink

RAN problems are much more of an issue in the uplink, as a problem here can take out an entire sector (or perhaps even more), while downlink problems tend to be only for specific areas. The RANALYZER™ system cannot observe the RF environment for downlink signals, so why measure the downlink at all? This is because the downlink has useful information for measuring the uplink. This information includes:

a. Control signals for allocating uplink transmissions. This also says when at what frequencies uplink transmissions are not allocated, which provides a convenient window for observing external interference as well as PIM products without the effect of uplink transmissions. By observing over a small window of time (e.g. several LTE frames), a spectrum almost clear of uplink transmissions can be assembled. This provides a much clearer picture of what is happening in the uplink spectrum that should not be there.

b. NACK/ACK ratio

NACK is short for "Not Acknowledged", i.e., a transmission that was not received properly, so it is Not ACKnowledged", while ACK is that the transmission is OK, and is therefore ACKnowledged. The "User Equipment" ("UE", which is a mobile telephone 4 or other device, rather than the base station 12) transmits error correction and detection information along with the user data. Sometimes the error correction information is sufficient to correct the received information, but sometimes it is insufficient. When the user data is uncorrectable (as determined by the error detection information), the base station 12 transmits a NACK digital signal back to the mobile device 4 to tell the mobile device 4 to re-transmit the data. This happens commonly in mobile networks, as the UE moves and the power level received at the base station 12 changes. However, if the received power level is high, but the NACK/ACK ratio is higher than usual, this can be an indication that some kind of interference is happening.

c. Timing reference

UEs use the base station signal as a timing reference, along with a "timing advance" command signal from the base station 12 to adjust the time that signals are transmitted. This allows the signals from different UEs, at different distances from the base station 12, to arrive at the same time (or very closely in time). If a receive signal is observed to be at the wrong time, this may indicate a mis-configuration of a base station 12 or group of base stations 12, or a UE that is transmitting at the wrong time.

3. For PIM Determination

Having knowledge of the downlink signal(s) allows for characterization of PIM in the uplink, and how it would change over time. This can take several forms:

a. If this behavior is observed in the uplink, this is a very strong indicator that PIM is present, and allows calculation of how bad the PIM could be under different traffic conditions (i.e., how much power the base station 12 is transmitting).

b. Since PIM may be generated by a single transmitted frequency (with modulation), or combinations of transmitted frequencies (with or without modulation), different downlink signals need to be accessed in different cases.

c. PIM may be internal to the cables 14 and antennas 10 of the base station 12, or from an external object. Access to the base station signals from multiple MIMO ("Multiple Input Multiple Output") transmitters at the same frequency allows observing if the PIM signal is only from one MIMO transmitter, or from several. If from one transmitter, the PIM is almost certainly internal; if it is from multiple transmitters, it is almost certainly external. It should be noted that similar information can be obtained just by looking at the received signals on each MIMO branch of the receive antenna 10 of the radio equipment 16, but having access to the transmitted signals again provides higher confidence in the diagnosis of the source of the PIM.

4. For external interference localization

Having access to uplink received signals at multiple locations allows a position estimate of that signal using several techniques, or a combination of them:

a. Multi-lateration (how GPS works). At least three (3) receive locations are preferred for multi-lateration; additional receive locations can reduce the uncertainty of the location estimate.

TABLE 1

Diagnostic Capabilities versus number of available connections.

| Number of Connections | Impairment to be Diagnosed | | | |
| --- | --- | --- | --- | --- |
| | Internal PIM | External PIM | External Interference | False Alarm |
| 1 (Uplink Only) | RF only, single frequency, moderate confidence | | Limited, no location | Yes |
| 1 Pair (Uplink and Downlink) | RF only, single frequency, high confidence | | No location, faster and easier to see than above | Yes |
| 2 Pair | Yes (most cases) | | Usually, reasonable location estimate | Yes |
| 3 Pair | Yes (almost all cases) | | Yes, good location estimate | Yes |
| 4 Pair | Yes (adds unusual cases) | | Yes, better location estimate | Yes | b. Relative power levels between base station 12. Again, at least three (3) receive locations are preferred for measuring power levels to ascertain the possible location of an external source of an interfering signal, and adding additional receive locations can reduce location estimate uncertainty.

c. Relative power levels between adjacent sectors pointing in different directions, to get a bearing estimate from that base station location. Relative phase could also be useful, but only if any frequency conversions use a common local oscillator, so there is no ambiguity in phase from that source. Alternatively, it may be possible to measure the local oscillator phase by measuring a known signal through the RE 16 receiver for each sector, such as the reference signal transmitted by a UE—if the location of that UE (and, therefore, the bearing to the UE) can be determined by other means, such as a GPS position report from the UE. Bearing estimates from multiple base station locations can help determine a position estimate, by using the concept of triangulation.

d. Since these signals exist in a complex environment, especially due to multipath, a combination of techniques will generally provide a better estimate than any of them by itself. The ability of the RANALYZER™ system 22 to connect to different REs, at various locations, is essential for extracting the different data to allow this analysis.

e. Tracking moving interferers is a more complex case of localizing a fixed interferer. In this case, the observed uplink signals likely to be from different REs 16 over time. Having connections to multiple select REs 16 through the switch assembly 26 simplifies this process, and simplifies the process for estimating which RE 16 to observe next as the interferer moves.

5. Determining which Base Stations 12 are Connected to Which Fiber

When connecting the RANALYZER™ system to a communications network 2, determining which radio equipment 16 and antenna 10 each fiber is connected to is a challenge. By decoding base station identification information (such as for LTE, the cellIdentity carried in System Information Block #1 (SIB1), or the Physical Cell Identity (PCI) carried in the synchronization signals), a unique or near-unique identity can be associated with each RE. In many Equipment Monitoring Systems 38, a report may be requested with detailed RE information, including accurate location information, the LTE cellIdentity, PCI, and other useful data such as the allocated frequencies and bandwidths used by the RE. In this case, matching this configuration information to the observed cellIdentities and PCIs, this configuration can be done automatically, or near-automatically.

6. Verification of base station configuration

Base stations 12 have many configuration parameters that can be adjusted. Many of these can be observed in the transmitted information from the base station 12, and can then be verified against expected values, either manually or automatically.

7. Scanning

By scanning through all (or a subset) of uplink signals, RAN problems may be identified sooner than an alarm happens. This allows scheduling maintenance in a proactive fashion, improving RAN network quality and maintenance efficiency.

8. Automatic Configuration of Switch Ports

There can be many different REC-to-RE connections available to the RANALYZER™ system. Manually configuring the system to know which port 68, 70 is connected to which REC 18 and RE 16 would be a time-consuming and error-prone process. Because of this, the RANALYZER™ system automatically determines which port 68, 70 is which, based on the following steps:

a. During the setup phase, the robotic switch assembly 26 is commanded by a control signal from the analytic computer unit 30 to connect a test probe 64 sequentially to each test port 70.

b. I/Q vectors are captured from the downlink direction, and stored in a memory of the digital signal processor 24 or the analytic computer unit 30 (see FIG. 13).

c. The RANALYZER™ system 22 synchronizes to the embedded LTE clock signal in the I/Q vectors, and extracts two (2) messages—the Physical Cell ID (contained in the synchronizing signals) and the cellIdentity (contained in System Information Block #1). These values are stored in memory, along with the port 70 which was connected at the time.

d. The Equipment Monitoring System 38 is queried for details about the cellIdentity that was received. This Physical Cell ID is checked against the stored value to make sure they match; if not an error report is sent to the manager (i.e., the person responsible for the operation of that particular RANALYZER™ system 22) of that RANALYZER™ system 22. If there is a match, the details about that cell site are stored in a memory of the RANALYZER™ system 22. These details include information including the location (street address and GPS coordinates) of the antennas 10, how many sectors are present at that site and what directions they are pointing, and how high the antennas 10 are above the ground.

e. The RANALYZER™ system manager (the person responsible for the operation of that particular RANALYZER™ system 22) may manually adjust these settings, if necessary.

f. When the RANALYZER™ system 22 connects to a port 70, it may verify if the Physical Cell ID and the cellIdentity signals are as expected. If not, a report is printed on a printer (not shown) or displayed on the display 36 of the RANALYZER™ system 22 and sent to the responsible technician and the RANALYZER™ system manager. The RANALYZER™ system manager may then manually change configuration settings, or initiate another automatic configuration.

H) System Data Flow Overview

Referring to FIG. 6, using the example of the RANALYZER in a C-RAN context, the flow of data through the system, and the transformation of this data into information is as follows:

1. As shown in the previous sections and in Block 20, the system is connected to up to 8 REC-to-RE connections by means of fiber taps. In this version of the system, this is configured as 4 pairs of connections, with each including both the uplink and the matching downlink connections for the same RE.

Figure 13:
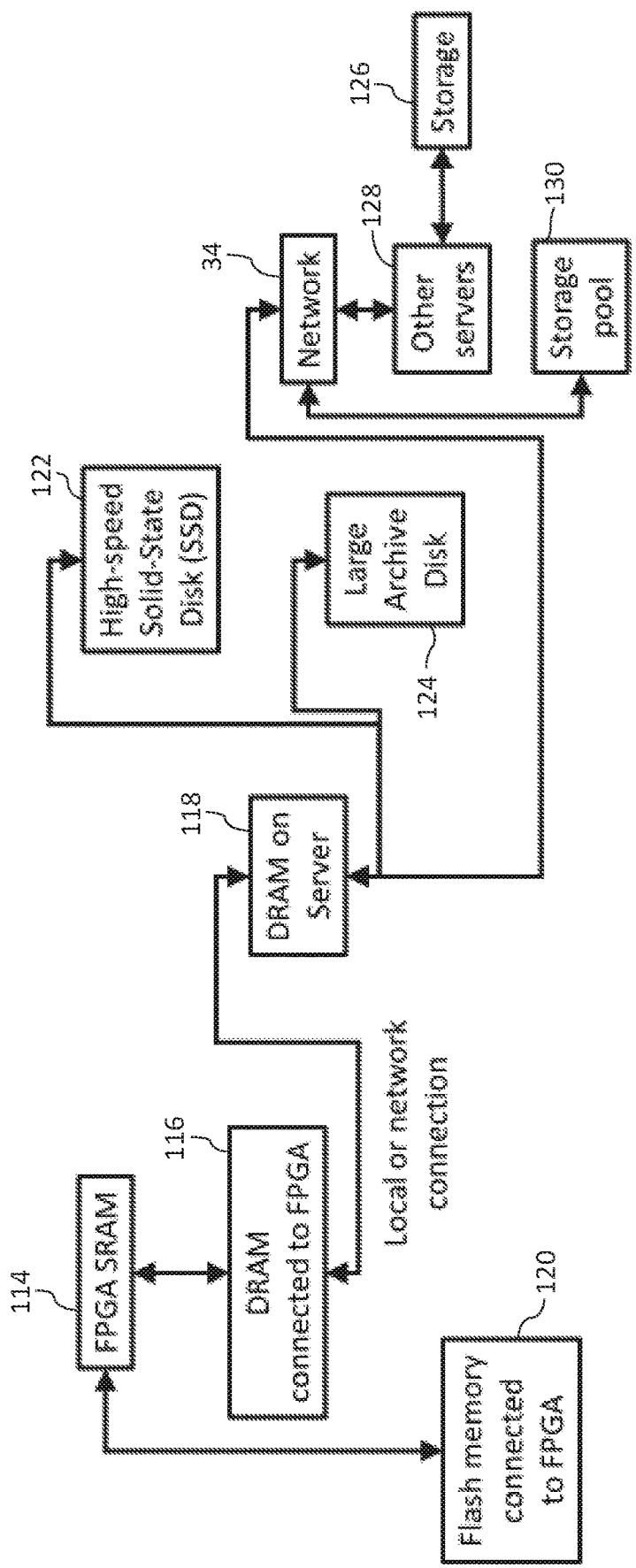
FIG. 13 is a block diagram of the data buffering and storage hierarchy of the system of the present invention.

2. Optical-to-Electrical Converter 28 converts these optical signals to electrical signa This allows easier processing by means of electrical, rather than optical, circuits.
3. The I/Q Sample Extraction 400 is the circuit for conversion from a transport stream into I/Q data for different REs 16 and antennas carried by that transport stream. This conversion can be from various transports streams, including CPRI (Common Public Radio Interface), OBSAI (Open Base Station Architecture Initiative) and Ethernet. Each of these are possible by means of a reconfiguration of this part of the circuit. This box incorporates several steps, including:
   a. Synchronization to the transport stream.
   b. Removal of synchronizing patterns, such as 8B/10B and 64/66B.
   c. Serial to Parallel conversion.
   d. Demultiplexing the desired Antenna Container(s) (A×C in the CPRI standard) to obtain the I/Q samples for (a) particular antenna(s). This may be for the uplink direction, the downlink direction, or both at the same time, as necessary for the processing steps needed.
4. The DSP circuitry incorporates several of the following processing circuits, generally more than the 4 pairs of physical connections available. Also, each transport stream may contain more than one A×C. Different processing circuits may have somewhat different capabilities, due to resource limitations in the DSP. Because of these things, the switch 402 routes desired A×Cs to the correct processing engines in the DSP. Outputs from the switch 402 go to 1 or more of 4 different types of processing circuits, as explained below.
5. Downlink I/Q samples go to I/Q Data Recording Block 404, as well as Downlink Receiver Processing Block 406.
6. Uplink I/Q samples also go to I/Q Data Recording Block 404, the Uplink Receiver Processing Block 408, as well as the Spectrum Analysis Processing Block 410.
7. These 4 circuits are interconnected to provide information based on the combination of downlink and uplink I/Q samples. This will be further explained in the description of FIG. 7 below.
8. The outputs of these circuits are provided to the Analytic Computer Unit 30 for:
   a. Archival of I/Q samples, spectrum data, and other measurement data in Mass storage 412. This is various physical devices 120, 122, 124, 126 and 130 as shown in FIG. 13.
   b. Further analysis, as detailed extensively herein.
   c. Display 36 to users, and reporting to the Mobile Network Operator's Equipment Monitoring System 38.
   d. Return of archived spectrum data to the Spectrum Analysis Processing Block 410, for further processing.
   e. Return of I/Q samples to the IQ Data Recoding Block 404, for further processing.

I) System Data Flow-Inner Block Details

FIG. 7 is explained here, with further details about each block elsewhere herein.
   1. Uplink & Downlink I/Q samples from the Switch 402 are routed to two switches, 414 and 416. These switches configure the digital signal processor 24 to either use live I/Q data from switch 402, IQ Data Recording Block 418 stored locally in the DSP, or I/Q data stored in the analytic computer 30 and the storage hierarchy attached thereto in memories 118, 122, 124, 126, and 130. Either set of I/Q samples if forwarded to other blocks as detailed below.
   2. Downlink I/Q samples are routed to the Downlink Receiver Processing Block 406, which extracts several pieces of data, including the LTE physical cell identity (PCI), the LTE cellIdentity, ACKs & NACKs, frame and symbol timing, uplink allocations including assigned RBs and MCS, and frame timing.
      a. The symbol timing data is routed to the Spectrum Trace Creation block 420, to allow removal of the LTE Cyclic Prefix (CP) and time-alignment with LTE symbols before the spectrum is created, allowing observation of the spectrum that the REC will see as the received signal.
      b. The assigned LTE Resource Block data per UE are also routed to Spectrum Trace Creation block 420 for creating an uplink spectrum without UE traffic.
      c. The PCI, cellIdentity, ACK and NACK counts, and uplink MCS allocations are forwarded to the Analytic Computer 30 for further processing, as detailed elsewhere herein.
      d. The frame timing and uplink RB allocations are forwarded to the Uplink Receiver Processing Block 408 for received power-level estimation.
      e. The section on Digital Signal Processing herein explains these steps process and the connections in more detail.
   3. Uplink I/Q samples from Switch 402, I/Q Data Recording Block 418, or from memories 118, 122, 124, 126 or 130 via the Analytic Computer Unit 30 are routed to the Spectrum Trace Creation Block 420 for creating a spectrum trace, as detailed in the section on Digital Signal Processing herein.
      a. The Spectrum Trace Processing Block 414, which can combine multiple spectrum traces together in various ways, takes as input either the live spectrum created by the Spectrum Trace Creation block 420, or previously stored spectrums by means of switches 422 and 428. These previously stored spectrums can come from the either the Spectrum Recording Block 426, or from the Analytic Computer Unit 30. The Analytic Computer Unit 30 stores spectrum traces in memories 118, 122, 124, 126 or 130, as shown in FIG. 13. The Spectrum Recording Block 420 stores spectrum traces in memories 120 and 116 in the Digital Signal Processor 24.
      The operation of the Spectrum Trace Processing Block 414 is explained in detail in the sub-section on Circuitry to Process the Outputs of the FFT, in the Digital Signal Processing section herein.
      b. This spectrum trace may be just of the uplink I/Q samples in the normal way, or it may have the uplink UE traffic removed based on the information from the Downlink Receiver Processing Block 406. Details about how the uplink traffic is removed are explained in the section Getting Uplink Spectrum without UE Traffic herein.
   4. After spectrum trace processing, the subsequent spectrum traces are recorded locally in the Spectrum Recording Block 426, and are forwarded to the Analytic Computer for storage and forwarding to clients as explained for FIG. 6.
   5. Uplink complex I and Q samples are also forwarded from the Switch 402 to the Uplink Receiver Processing Block 408, along with the UE scheduling information extracted from the Downlink I/Q samples by the Downlink Receiver Processing Block 406, for received power level estimation per LTE UE. These data are forwarded to the Analytic Computer for further analysis, as detailed in the section on Receiver Functions herein.

6. The Convolutional Neural Network block 176 has several inputs, including:
   a. Complex I and Q samples from the Live or Stored I/Q Switch 414.
   b. Processed Spectrum Traces from block 424, which can be either time-aligned to the LTE resource grid, or traditional spectrum traces.
   c. Histogram data from the 3D Histogram block 422.
   d. Each of these can be based on live complex I and Q samples from switch 402, or can be stored either internally in the I/Q Data block 418, the Spectrum Recording block 426, or stored in the Analytic Computer Unit 30.
   e. For further details about the Convolutional Neural Network block 176, refer to the section Convolution Neural Network Pattern Recognition herein.

J) Digital Signal Processing

The Digital Signal Processor (DSP) 24 performs a variety of functions on the transport data received from a selected RE or REC, including:
   a. Extraction of I/Q samples from the transport data. Circuitry in the DSP synchronizes to the transport stream, and extracts I/Q samples for selected REs, in either the uplink or downlink direction.
   b. Circuitry in the DSP performs a Fourier Transform (usually a Fast Fourier Transform or FFT) to create spectrum data.
   c. When needed, a DSP circuit is also used to shift the center frequency of the I/Q samples by mixing with a Numerically-Controlled Oscillator (NCO), filter the I/Q samples to a narrower bandwidth, reduce the sample rate accordingly. An FFT can then be performed on the resulting I/Q samples. This allows seeing the spectrum with a narrower bandwidth, just like a larger FFT size would, but with less circuitry needed.
   One of the benefits of using the NCO instead of an L.O., is that I/Q samples can be stored while previously-stored I/Q samples are being processed as above. If the above process is sufficiently fast, it can be performed multiple times on the stored I/Q samples. This allows this process to be real-time, similar to a Real-Time Spectrum Analyzer (RTSA), with a larger ratio of Span-to-Resolution-Bandwidth (Span/RBW) than previously available. The Span/RBW in RTSAs is limited by the size of the FFT available, and large FFTs take a tremendous amount of circuitry in digital signal processors. This technique allows trading off the speed of the Digital Signal Processor 24 for circuit complexity.
   d. Circuitry to count the occurrence of each level for each frequency from the output of the FFT for a programmed time, to create a 3D histogram of occurrence versus level and frequency. This histogram provides the capability for the color-graded spectrum display in a Real-Time Spectrum Analyzer (RTSA), as well as the percentile traces mentioned next.
   e. Circuitry to create percentile traces (q.v.) from the above-mentioned 3D histogram.
   f. Circuitry to process the outputs of the FFT
   This encompasses several functions, including Spectrum Trace Creation 420 and Trace Processing 424, as well as associated Recording Block 426. This circuitry performs the following functions:
      i. Averaging the same frequency points of multiple spectrum traces together.
      ii. Picking the maximum of each frequency point of a set of multiple spectrum traces.
      iii. Picking the maximum of each frequency point of a set of multiple spectrum traces over a period of time, then having the retained maximum decrease in amplitude until another higher point at that frequency is output from the FFT.
      iv. Picking the minimum of each frequency point of a set of multiple spectrum traces.
      v. Picking the minimum of each frequency point of a set of multiple spectrum traces over a period of time, then having the retained maximum decrease in amplitude until another higher point at that frequency is output from the FFT.
      vi. Picking just one spectrum trace at a time, to provide a lower output rate than the FPGA rate, for easier display especially on a remote computer.
      vii. Detection—creation of a spectrum trace with fewer points, based on combining trace points in various ways, including taking the maximum point, the minimum point, a selected point, or averaging the points together.
      viii. Reprocessing of stored spectrum traces to change the number of spectrums per second. Having this capability in the Digital Signal Processor 24 allows zooming a spectrogram out (larger amount of time across the Display 36) quickly. Zooming in quickly is done by reusing spectrums stored in the Spectrum Recording Block 426, or in memories 118, 122, 124, 126, and 130, which are in or attached to the Analytic Computer Unit 30.
      ix. Selection of a subset of frequency points for display.
   g. Circuitry in the DSP provides a variety of receiver functions on the I/Q samples, including:
      i. For the Downlink:
         1. Synchronization to the LTE frame, sub-frame, and symbols
         2. Extraction of the Physical Cell Identity (PCI) and cellIdentity
         3. Decryption of the Physical Downlink Control Channel
         4. Extraction of the programmed modulation & coding scheme (MCS) for each UE being commanded
         5. Extraction of the ACK and NACK counts for each received UE being commanded
         6. Optional removal of the LTE Cyclic Prefix before creating a spectrum
      ii. For the Uplink:
         1. Optional removal of the LTE Cyclic Prefix before creating a spectrum
         2. Relative or absolute power level estimation. This determines the power level in dB relative to full scale by squaring the I & Q components of a sample and adding them together and dividing by the system impedance of 50 ohms. This is then converted to absolute power by means of a calibration factor for a particular model of RE, determined separately from the system and stored in a lookup table. Alternatively, a user may enter a calibration factor for this step.

3. Create a non-traffic spectrum, by only keeping Resource Blocks (ranges of frequency and time) where no UE was commanded to transmit, as detailed in this section above.
4. Creates a time-domain equalizer from the LTE spectrum, for use in estimating the position of a problem UE, in combination with the commanded timing advance. See the section on Extended Analysis of External Interference from Rogue Transmitters for more details about how this is used.

The equalizer is formed by examining the Demodulation Reference Signal transmitted by the UE. This signal is extracted from the uplink transmissions, modulation on the signal is removed, and an inverse Fourier transform is performed by the Digital Signal Processor 24. These transformations change the frequency-domain output of the FFT into a time-domain signal that gives the impulse response of the transmission channel, which is just what's needed for finding the cases where the strongest transmission channel isn't the shortest.

K) Cross-system Measurements

In a single C-RAN, measurements can easily be made on multiple REs 16 simultaneously, giving rise to the benefits listed herein. However, in many situations simultaneous (or near-simultaneous) measurements need to be made between different systems. This can be because of a variety of reasons, including:

a. Interference located between two C-RAN areas
b. Measurement units located at Macro sites
c. PIM caused by intermodulation of the signals between different co-located mobile network operators. If the antennas for different operators are close enough, and they are operating at frequencies where PIM products can land at difficult frequencies (i.e., where there are uplink receivers), PIM can be created in a way that does not come from transmitters that are measured from one C-RAN or Macro-site. In this case, being able to measure the signals coming from each operator's transmitter provides a high-confidence way to measure PIM levels, as well as predict when the PIM level gets bad enough to cause a failure—again allowing preventative maintenance. The system of the present invention will make measurements between operators, if they both approve of this use.

L) Simultaneous Measurements

In these (and possibly other similar cases), some way of making simultaneous or near-simultaneous measurements is important. The near-simultaneous case can be fairly simple, depending on the timing requirements. A network message might be sufficient for this. However, for relative timing measurements between received signals, precise timing is essential, so a method of precise synchronization is needed. Two ways of doing this are:

a. A one (1) Pulse-per-second from a GPS or similar receiver. These signals can provide excellent absolute timing references worldwide, and can be used along with time-of-day information and network messages to make measurements simultaneously at different locations.
b. Standard IEEE-1588 precision time protocol can also be used as a time reference, if it is available via a network connection.

M) Spectrum Analysis functions

In a traditional RAN, a separate monitoring receiver or spectrum analyzer is sometimes incorporated to allow observation of the RF spectrum in the vicinity of the antenna 10. Spectrum analyzers have been available for decades, and exist in a wide variety of form factors, generally with an electrical input, often connected to an antenna. The RANALYZER™ system 22 essentially incorporates the functionality of a spectrum analyzer, and extracts the spectrum information by examining the "I/Q vectors" that the Radio Equipment 16 and the Radio Equipment Controller 18 use to communicate with each other over the CPRI link. These I/Q vectors describe the analog signal as a function of time, and are well known to electrical and radio engineers, as well as mathematicians. In addition, multiple channels of spectrum analysis are preferably used simultaneously for analysis, for several purposes. These include:

1. Supporting multiple simultaneous users (looking at different radios).
2. A single user comparing the signal from multiple radios and locations to get clues about the source of unwanted noise and interference.
3. Comparison of multiple signals to automatically diagnose the root cause of RAN problems.

In a traditional spectrum analyzer, there is the concept of a "local oscillator", or L.O., that can be used for examining different parts of the spectrum. In the Radio Equipment 16, the frequency of that L.O. is fixed, which thus cannot be used for this function. Instead, RANALYZER™ system 22 uses Numerically Control Oscillator, or NCO, in the digital signal processor to provide this function digitally. In addition, this technique allows examining the spectrum in fine frequency detail, in an efficient way. See the section on Digital Signal Processing herein for more details on this subject.

N) Receiver Functions

In addition to directly examining the spectrum of the signal received by the Radio Equipment 16, there are a number of benefits to examining the signal transmitted from the Radio Equipment Controller 18, as well, which is performed by the RANALYZER™ system 22. These include:

1. Extracting the "Physical Cell Identity" or PCI code, to help verify that the RANALYZER™ system 22 of the present invention is connected to the correct Radio Equipment 16.
2. Extracting and decrypting the commands from in the downlink direction to the mobile phone 4 that either acknowledges ("ACK") or not-acknowledges ("NACK") that the signal was received and decoded properly. If there are more NACKs than usual, this can indicate the presence of bursty (non-continuous) noise or interference.
3. Extracting and decrypting the signals from the Radio Equipment 16 to the mobile phone 4 that tell the mobile phone 4 when and where (at what frequency) to transmit signals. This is helpful to know when signals are not transmitted, which means that the system 22 of the present invention can examine the spectrum of just the noise—by looking at times and frequencies where mobile phones 4 are not transmitting.
4. Extracting the signals from the Physical Downlink Control Channel (PDCCH) that command the UE to use a particular Modulation and Coding Scheme (MCS). The system compares this to the received power level per RB to determine if the MCS is too low given the power level received.

5. Comparing the power transmitted from the Base Station 12 to the unwanted power received by the Base Station 12. If these are highly correlated, it is a clear indication of PIM distortion.
6. Creating a high-confidence metric for the presence of PIM distortion by digitally mixing the base station transmit signals that may cause PIM, and comparing this to the signals received in the uplink.
7. Determining if PIM is internal or external via a comparison of the received signal in each MIMO branch of the antenna 10, versus what has been transmitted in each branch. If the PIM signal appears in more than one receive branch, and is related to the signal transmitted in more than one MIMO branch, there is a high confidence that the PIM is produced by an object external to the cable and antenna system. Otherwise, the PIM is produced internal to the cable and antenna system.

O) Signal Displays

There are a variety of displays shown on the display 36 that are useful for the engineer or technician using the RANALYZER™ system 22 of the present invention, including:

1. The spectrum of what the RRH (Remote Radio Head) or RE 16 sees. This is like using a portable spectrum analyzer connected to a test port from a T-RAN (a common test), but much faster and more convenient, since the user does not have to travel to the physical location of the T-RAN.
2. Percentile traces. These are similar in concept to a Real-Time Spectrum Analyzer (RTSA), but instead of showing all the probability for all different amplitudes in the form of a colored display, the system 22 preferably shows only the signal level for one or a few percentile values—just some of the points from the RTSA screen. This reduces the network bandwidth of the internet protocol network 34 required between the client and server 32 in the RANALYZER™ system block diagram (see FIG. 5), which is often necessary for remote access and remote display. However, the ability for an RTSA to show the presence of multiple signals at the same frequency is retained.

The percentile values mentioned here are extracted from a three-dimensional histogram generated by the RANALYZER™ system. This is a grid of power vs. frequency, with a count of how often each power/frequency combination has occurred over a user-selectable period of time. As each new spectrum is computed by the system 22, the count of each power/frequency combination in the histogram is incremented, based on the values of that spectrum. The highest amplitude encountered over that time for each frequency would be the 100-percentile point; the lowest amplitude would be the 0-percentile point. Amplitude points in between these two values (at each frequency) would then have percentile values between 0 and 100.

The number of probability levels shown on the display 36 can adapt to the available network bandwidth. If enough network bandwidth is available, all probability levels can be shown on the display 36, and this becomes the traditional color-graded spectrum display of an RTSA.

The rate of client screen updates on the display 36 also affects how many probability levels can be shown, along with the network bandwidth. With a sufficiently slow update rate for the available network bandwidth, an entire color-graded RTSA display can be shown on the display 36, even with little network data throughput. However, this can be too slow to be useful. Allowing the user to adjust the update rate allows the system 22 to adapt the number of displayed probability levels to the network bandwidth, thus providing an optimal tradeoff to a user of the system 22.

For some types of spectrum, network bandwidth can also be reduced by using differential encoding—only sending changes between displays, rather than the entire display. One way to help this is to only display levels above the noise level, as random noise does not compress with differential encoding.

3. Received Total Wideband Power (RTWP) and ΔRTWP traces. These show the power received by each radio on the Radio Equipment 16 as a function of time, or the difference in power received among different antennas 10 connected to the RE 16. These graphically depict how a diversity alarm is happening—which radio/antenna it is coming from, and how long the problem lasts.
4. It is well known that using a spectrogram can be useful for seeing the spectrum over time, and that selecting a line in the spectrogram can show the spectrum graph at that time. Similar to this, the RTWP graphs displayed by the system 22 on the display 36 show power versus time, and can also be used as a selection method to see spectrum history.
5. An Event list which is displayed on the display 36 shows a summary of the problems that the RANALYZER™ system 22 has detected over time. This can show what problems have been happening in the RAN environment in a highly-compressed form, making it easy to see at a glance the kinds of problems that are happening and how often they happen.
6. Similar to using the RTWP graphs to select a spectrum to show, an adjacent displayed graph displayed on the display 36 can show when Events happen versus time, and can be used to show the spectrum during that Event, as well as what Event was detected.
7. Since Events may happen over a very long time (hours or even days), selecting by the system 22 of the present invention an Event from the Event List displays the Spectrum and RTWP at the time the event was detected, and can show these at somewhat earlier or later times.
8. Map displays provided on the display 36 showing location information for external interference (including PIM) can be helpful for showing movement or the uncertainty of the position estimate.
9. Three-Dimensional Spectrograms of the LTE Resource Grid displayed on the display 36 show the spectrum versus time in the same format as interpreted by the LTE receiver (i.e. presented in the same format as the LTE time and frequency resource grid). Proper LTE signals (as identified by methods discussed elsewhere herein) are grayed out on the display 36 at the user's choice, so that improper RF energy easily stands out in the display. This enables a human to more easily identify the problem.

Figure 14:
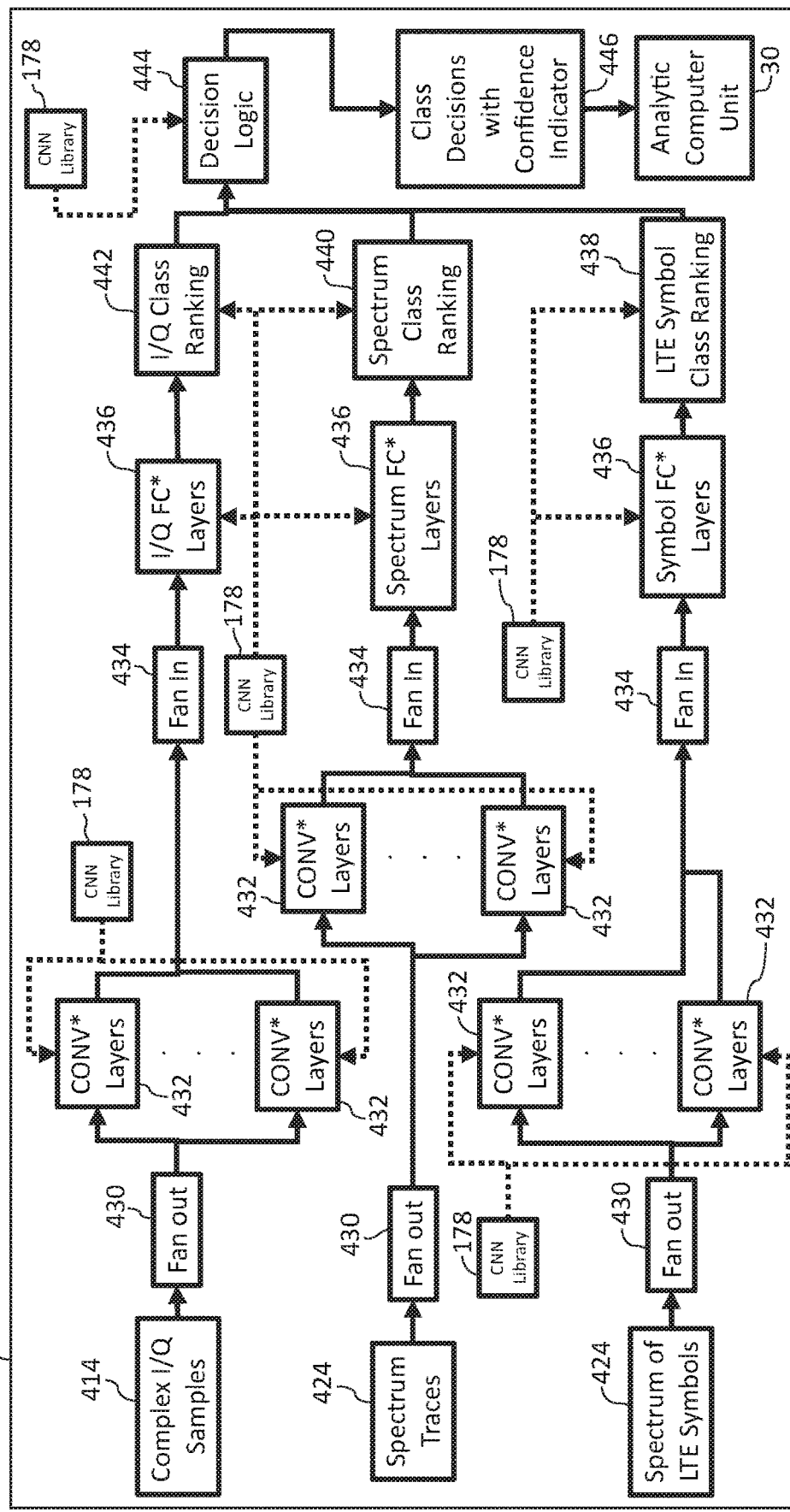
FIG. 14 shows the Convolutional Neural Network used for signal classification in the RANALYZER™ system.

Once the problem is identified by a human, and if the problem can be characterized, then the RANALYZER™ system 22 can be configured to look for those characteristics, using a Convolutional Neural Network Pattern Recognition system, as shown in FIG. 14.

10. Displays on the display 36 of the event list itself can also be useful, including:

a. A simple list of events, with details about each. These events can include:
   i. Alarms and indicators that are received from the Equipment Monitoring System 38.
   ii. Locations of captured spectrum and related data, as well as I/Q data for both uplink and downlink.
   iii. Tests and diagnoses made by the system 22.
b. A filtered list of events, such as by location, time of day, direction or customer impact. This filtering, performed by the analytic computer unit 30 or the digital signal processor 24, can apply to any of the below displays, as well.
c. Events versus time, either as a simple graph, or a 2D (two dimensional) chart—which can show a much longer time period.
d. Sorted histograms of event types, similar to a Pareto chart used for failure analysis.
e. 2D chart showing time-of-day versus duration.
f. Histogram of duration.
g. 3D (three dimensional) chart showing histogram of duration versus time-of-day
h. Geographic map of events.
   i. Coded by impact using color, or height for example.
   ii. Video showing when and where events happen. This can be either faster or slower than real time.
i. Service impact (e.g. number of customer affected) versus duration, or versus time of day.
j. 3D chart showing service impact versus duration and time of day.

P) Further Analysis of Events

In addition to saving spectrum traces and RTWP values in a memory 118, the RANALYZER™ system 22 can also record the complex I and Q sample data from the Radio Equipment 16 into memories 118 and 122, which data are used to create those traces and RTWP values. This allows the user to more closely examine what happened during the event, at a later time. This includes adjusting parameters such as Span and Resolution Bandwidth. Traditional spectrum analyzers may be able to save the traces, but do not allow adjusting these parameters after displaying the traces. Saving the I/Q data enables the user to play back the displays shown on the display 36 in slow-motion and, therefore, to be able to analyze bursty noise phenomena that are not perceptible by humans when played at real-time speed.

Q) Getting Uplink Spectrum without UE Traffic

One of the difficulties of finding noise or interference is that the signal trying to be found (that noise or interference) is obscured by the traffic signals from the mobile phones 4. If the SINR is very low or if there is very little traffic, this is not much of a problem, as the noise and interference will dominate the observed spectrum. However, in a significant number of cases, the (intermittent) problems manifest only when the system 22 is highly utilized. In those cases, it is important to be able to detect and analyze noise in the presence of signal. There are a number of possible ways to address this problem, including:

1. Using a real-time spectrum analyzer (RTSA), or as stated elsewhere herein, percentile traces, to get much of the functionality of the RTSA through a low-bandwidth connection to the client display 36. The advantage of these techniques is that signals that are on at different times both show up in the display 36. Since the mobile phone traffic is inherently bursty (on sometimes and off others), there are usually times when there are no mobile phone transmissions, at least for part of the spectrum being examined; however, the off times of the UE transmissions are too short for human perception; therefore, a machine-based expert analysis performed by the system 22 is preferred to catch the fault conditions, record the I/Q data associated with those conditions into memories 118 and 122, and then playback in slow-motion on the display 36 to a human for confirmation of the analysis. Once sufficient confidence has been established in the expert analysis performed by the system 22, the need for slow-motion playback on the display 36 to a human might be eliminated in favor of having the system 22 automatically initiate a request for corrective action based on its diagnosis of the root cause of the problem.

2. A more direct way of finding the times and portions of spectrum that are unused is to extract and examine the control signals from the base station 12 to various mobile phones 4. For the LTE system, a signal called "PDCCH" (Physical Downlink Control CHannel) contains the information of when and on what frequencies mobile phones 4 or other UEs are directed to transmit. By examining this signal, the system 22 of the present invention can find times and frequencies where no mobile phone 4 is supposed to transmit, and look at just those times and frequencies. Over time, a large part of the spectrum of interest can be accumulated by the system 22 and stored in memory in this way. One difficulty with this technique is that the PDCCH signal is encrypted. Fortunately, the encryption key is short (only 16 bits, plus the known Physical Cell ID (PCI) for that base station 12), and the transmission includes error correction information that can be used to validate that the correct encryption key is used. Thus, the encryption can be readily overcome with a brute-force method—simply try every possible key. With modern technology, it may or may not be possible to do this in a real-time fashion (i.e., trying every key for each part of the PDCCH before the next PDCCH transmission), but this is easily overcome by recording the I/Q vectors for the time period that the specific part of the PDCCH controls—something that is well known from the specification of the LTE standard. Again, the RANALYZER™ system 22 can build up and store in memory a spectrum of interest (that is used for transmission of the mobile phone signal) over time, by finding frequencies and times that have not been scheduled for transmission by mobile phones 4. To speed up this process, several refinements are possible:
   a. Since it is likely that a UE transmission may last for more than one LTE sub-frame, as well as sending multiple bursts of data, the system 22 may try the most recently used encryption keys first. The probability of successfully finding a key this way is much higher than from all possible keys, thus speeding up the decryption process.
   b. Have a Key Server 35 embedded in the Mobile Network Operator's network. This would interact with the Mobile Switching Centers 7, or other parts of the mobile network 2 that aren't explicitly shown in FIG. 1 to gain access to a list of keys currently in use for UEs attached to each base station 12. This will also reduce the number of keys that must be tried. Again, this can substantially speed up the search for keys by the system 22 in use for a particular LTE sub-frame.

3. Another use of the data in the PDCCH is the Modulation & Coding Scheme (MCS) that the REC commands UEs to use. MCS values are highly variable, as the radio network constantly adapts to changing signal conditions, especially path loss and multipath. However, by examining many MCS commands for each RE, average and peak values can be determined, which indicates the general quality of the signal environment around that RE. By comparing these average and peak values of MCS for several REs that are nearby each other, the system can highlight problematic area. This is most effective when the environment for each RE is similar, such as a number of small areas inside a stadium, or in dense urban environment with many small cells, such is common for a C-RAN.

4. Characterization of UE transmissions by examining alignment to the LTE time/frequency resource grid and examining other known characteristics of the UE transmission. Identification of proper LTE UE signals can be accomplished by the system 22 by first looking for RF energy that aligns (or nearly aligns) to the LTE resource grid. Proper LTE UE signals can be confirmed by the system 22 by examining known characteristics of UE transmissions. It is very difficult to determine the DeModulation Reference Signal (DMRS) Zadoff-Chu coding sequence without knowledge of the input parameters; however, it is known that Zadoff-Chu sequences are constant amplitude and, therefore, the system 22 can use this knowledge to identify that certain Resource Elements in the LTE Resource grid are in fact DMRS transmissions, even though the exact sequence in use may not be able to be determined. If the observed RF energy aligns to the LTE grid and has DMRS signals in the proper location in the LTE resource grid, then the system 22 can determine with high confidence that the RF energy in question is a UE transmission.

5. To make it easier to find times where there is little or no traffic, recording by the system 22 could be scheduled to happen at specific times of the day or week. From years of experience with mobile phone systems, engineers have developed the concept of a "maintenance window"—a time when there is so little mobile phone traffic that a base station 12 can be taken out of service for maintenance. This would be one of the best times for the system 22 to schedule a measurement of the spectrum to see external interference that is continually present. PIM, however, might be very low at this time, since the base station transmitter that causes the PIM would not be doing very much either. Other times of day might provide optimum conditions for seeing PIM—light enough uplink traffic to be able to extract the times the non-traffic spectrum, but heavy enough downlink (from base station 12 to mobile phone 4) traffic that the PIM will be easily seen. Or an out-of-service test can be scheduled to make a definitive determination—see the section on Automatic Tests during the Maintenance Window for more details about this.

6. Other implementations to achieve the effect of a percentile trace include doing a minimum hold function with a threshold above the theoretical noise floor on a small number of traces, and then averaging the result over a time period that is consistent with the dynamics of the UE traffic. Such steps may be performed by the RANALYZER™ system of the present invention.

7. The spectrum of LTE signals is tightly controlled, but due to limitations in the implementation of filters, the base station receiver will see slightly more than this. In some cases, these extra bits of spectrum can give clues to the causes of noise and interference. Perhaps the best example is a stadium, where most of the time there is little or no traffic. However, when tens of thousands of people arrive, there may be almost no time when the uplink spectrum is not completely used. In these cases, looking just at these small bits of "extra" spectrum by the system 22 of the present invention can be helpful.

8. A well-known way of seeing signals in the presence of digitally-modulated signals is called "EVM Spectrum", as well as other names; "EVM" stands for "Error Vector Magnitude", and is a common way to measure the quality of digitally-modulated signals. This uses the well-known characteristics of the digitally-modulated signal to receive it, decode the bits being used, recreate the originally-transmitted signal, and then subtract that from what was received. This leaves just the unwanted signal, plus some artifacts due to imperfect reconstruction of the original signal. The spectrum of the unwanted signal can then be created and displayed by the system 22 using well known mathematical techniques. While a very powerful technique, EVM spectrum has a major problem when used for the LTE uplink spectrum—it is very difficult to demodulate the uplink signal without knowing the parameters of a special part of the signal called the DMRS (or DeModulation Reference Signal). This can be addressed partly by the RANALYZER™ system 22 using some information from the PDCCH mentioned above, but other DMRS parameters may be more difficult to extract. A way around this is to request those DMRS parameters for a particular UE from the Equipment Monitoring System 38, or directly from the RECs 18 parts of the network 2, similar to having a key server as mentioned previously herein.

R) Smart Collection of Spectrum

Since noise and interference may vary with time, it can be useful for the system 22 to record in memory a number of spectrums. A good example of this is a stadium that has a base station with a PIM problem. Well before a game, there is essentially no downlink traffic, so there is essentially no PIM signal. As people arrive at the stadium, the traffic increases, and so does the PIM level.

However, there is a potential problem with this. Since we are building up the spectrum from looking at times and frequencies that the base station 12 has not told the mobile phones 4 to use, there can be a bit of a conflict. One would want to wait as long as possible to see the entire spectrum, but one also would like to see the changes in spectrum with time. By setting a threshold for how much of the spectrum the system 22 should accumulate before displaying on the display 36 (and possibly recording in memory) it, the user of the RANALYZER™ system can make a tradeoff between how much of the spectrum is shown on the display 36 versus how often it is shown. Alternatively, the user could specify how often to update the display 36, regardless of how much of the spectrum has been accumulated at that time.

Also, since some of the noise can come from PIM, and since the PIM level varies with the power level transmitted by the base station 12, it can be helpful to accumulate parts of the spectrum by the system 22 based on the transmitted power from that base station 12. If the system 22 simultaneously records the power levels from the base station 12 while the system 22 is examining the "uplink" spectrum (from the mobile phone 4 to the base station 12), the system 22 can sort those pieces of uplink spectrum into groups based on those power levels. The RANALYZER™ system 22 can then display on the display 36 the different spectrums as a function of power transmitted from the base station 12. If the level of the unused uplink spectrum increases with the transmitted power from the base station 12, this is a clear indication that PIM is present. If the relationship between these levels is the same as is expected from PIM (which is known from long experience by the mobile phone industry), this is an even stronger indication that PIM is present.

S) Storage Hierarchy

The RANALYZER™ system 22 of the present invention deals with potentially massive amounts of data. In the present state of the art for the CPRI standard, each of the optical connections 68, 70 can carry 24 billion bits per second. The RANALYZER™ system 22 preferably has eight (8) optical inputs (i.e., the test connection plugs 64 of the robotic switch assembly 26) (although the system 22 may be formed with more or fewer inputs), so there is the potential for 24 GB (Gigabytes) of data each second. If all of this was recorded, a one TB (Terabyte) drive would be filled in under one minute. Clearly, it is impractical to store and intelligently retrieve all this data. To deal with all this data, the RANALYZER™ system 22 uses the concept of a storage hierarchy with expert analysis and event-driven indexing, as illustrated in FIG. 13.

The digital signal processor 24 (preferably, an FPGA) in the RANALYZER™ system 22 has several megabytes of high-speed static random access memory (SRAM 114). The available storage capacity of the SRAM 114 is small compared to the overall storage needs of the system 22, but is useful for buffering small amounts of I/Q data and a number of traces for storage in a local dynamic random access memory (DRAM) 116 coupled to the SRAM 114, which can be several gigabytes. The DRAM 116 allows sufficient storage of I/Q data (several seconds) so that the spectrum can be examined by the system 22 in different ways, e.g. using different resolution bandwidths, on the same captured data. The DRAM 116 also allows storing high-speed spectrum traces, i.e. faster than the human eye can discern. This again allows more detailed inspection of the spectrum by the system 22 and a technician after-the-fact.

There is also a DRAM 118 in the analytic computer unit 30 or server 32 of the system 22, which can also store high-speed I/Q data and spectrum traces, and can be somewhat larger in storage capacity than that of the DRAM 116 or SRAM 114. This DRAM 118 allows storing of additional data while the Expert Analysis (see FIG. 13) is being performed by the analytic computer unit 30 or server 32 of the system 22. For a system 22 that is used at a macro-site, the DRAM 118 used for emulating a disk drive can provide more storage than is conveniently available with low-cost (e.g. 32 bit) CPUs. Local mass storage, such as from a flash memory device 120, can also be used for buffering data for further processing.

More specifically, the system 22 of the present invention preferably includes the SRAM 114 in the digital signal processor 24, the DRAM 116, capable of more storage, connected to the digital signal processor 24, the flash memory 120 connected to the digital signal processor 24, and the DRAM 118 situated on the analytic computer unit 30 or server 32 and coupled to the DRAM 116 by way of a local or network connection. Furthermore, the system 22 preferably includes a high-speed solid state disc drive memory 122 and a large archive disc drive memory 124, each of which is coupled to the DRAM 118 on the analytic computer unit 30 or server 32.

Additional remotely located storage memory is also preferably provided by the system 22. More specifically, off-site storage 126 of I/Q data, spectrum data, and other data (e.g. NACK/ACK ratio, what LTE cellIdentity applies to the I/Q and spectrum data) is provided through the private (or public) internet protocol network 34 and through outside servers 128 operatively coupled to the server 32, as well as, optionally, a pool of storage devices or memories 130 connected to the system 22 through the network 34.

Once the system 22 has identified an interfering signal or excessive noise, this is recorded in the Events System database (q.v.) in the RANALYZER™ system 22. To allow an operator of the system 22 to observe what caused the event in more detail or for automated post-processing, the captured I/Q data and/or spectrum traces (that were buffered in the RAM 114 or other media) are stored to the high-speed solid-state drive 122 forming part of the system 22 of the present invention.

While the speed of the SSD 122 is most useful, it is somewhat limited in storage capacity. When the data stored to the SSD 122 reaches some portion of the SSD storage capacity, then the data is off-loaded to a local hard drive 124 with higher storage capacity. In addition, the RANALYZER™ system 22 keeps track of the count of the number of occurrences of similar type events and preferably only records a (user-configurable) number of the same type of event. This reduces the storage requirements of the system 22 and also aids the user in filtering through large volumes of data to obtain actionable information with which to make a decision regarding how to resolve the service-impacting problem.

Additional storage can also be made available via the network connection 34. This can be useful in a variety of ways, including:

1. Very large storage in central locations. Due to space limitations, truly massive storage is inconvenient at the measurement points. However greater storage 126, 130 than is available locally can be desirable, especially for the system 22 used at a macro-site. Since a network connection 34 is available, this can be used to transport spectrums or I/Q data to one or several central locations for further storage and analysis.
2. The system 22 used at a macro-site has both limited memory, storage and processing power. These can be supplemented by a central server 128 with large amounts of each of these. Sufficient local storage for gathering useful data at the macro-site is essential, and this can be shipped at a convenient time to one or several central servers 128.
3. Aggregation of data for further analysis. Once problems are found, a good practice is to examine what problems happen often, and then fix the root cause of those problems. Aggregating failure data from multiple sites can lend a great deal of insight for this process. Such is performed by the system 22 of the present invention.
4. One use of the measurement data processed by the system 22 is to make a case that someone or something is consistently causing interference. Having the measurement data stored in a distributed fashion by the system 22 makes sure that it is available when needed.

The system user can also manually archive events of interest, and reports created from those events, to a large local hard drive 124, or other storage media, either local or connected via network 34.

T) Combining Spectrum Analysis and Receiver Functions

While the system 22 of the present invention is particularly interested in seeing the uplink spectrum, monitoring the downlink signal at the same time by the system 22 can also be helpful in a variety of ways, including:

1. As mentioned above, extracting the LTE PDCCH signal from the downlink signal can help find parts of the uplink spectrum that are not scheduled for use (in both frequency and time).
2. Another part of the LTE downlink signal is called PHICH, for Physical Hybrid Automatic repeat request Indicator CHannel. The base station 12 uses this signal to tell the mobile phone 4 that it did not hear its last transmission correctly. Most of the time, the base station 12 sends an acknowledgement (or "ACK") that the signal was okay, but sometimes the base station 12 sends a "not-acknowledgement" (or "NACK") that it could not hear the signal (or more precisely that the error correction information that is also transmitted showed that there is an uncorrectable error). The ratio between how often these signals happen varies somewhat, but is generally fairly constant. If the ratio of NACK/ACK is larger than usual, this can indicate that a brief noise signal was present. The system 22 of the present invention may look to see the spectrum just during these times, compared to the spectrum when the NACK/ACK ratio is low.
3. Similar to the above, recording the I/Q data by the system 22 into memories 118 and 122 when NACK/ACK is high gives the capability for further analysis of the signals (both uplink & downlink) that happen during these times.

U) Automatic Analysis and Identification of Interference and Noise Sources

As can be seen in Table 2: Most Common RAN Environment Problems and Related Network Notifications, there is a relationship between problems in the RAN 6 (Root Causes) and various indicators and alarms. An examination reveals that one can get similar indicators and alarms for different root causes. For example, External PIM and External Interference can give the exact same alarms. Thus, the maintenance engineer or technician knows there probably is some problem in the RAN 6, but not what to fix.

It should be noted that Table 2 refers to antenna 1 and antenna 2, which is common for LTE deployments. However, more than two (2) antennas for an RE 16 is also common, and a similar set of conditions happens in this case.

To address this, the RANALYZER™ system 22 analyzes the uplink signal received by the Radio Equipment 16 to give a much higher confidence of what is causing the problem, and therefore what needs to be fixed. The system 22 does this with a multi-step testing approach listed below and shown in FIGS. 15A-F. While any one of these tiers is useful for determining the cause of RAN problems, the combination of them is even more powerful, as it allows the system 22 to have high confidence quickly, as well as efficiently screen for intermittent problems.

1. Alarms and Indicators

The first test of the system 22 is just to analyze the alarms and indicators that are mentioned in Table 2, for the Radio Equipment 16 in question. While these are not definitive results, they do indicate that there likely is a problem, and give some hints about what the problem may be.

Figure 15A:
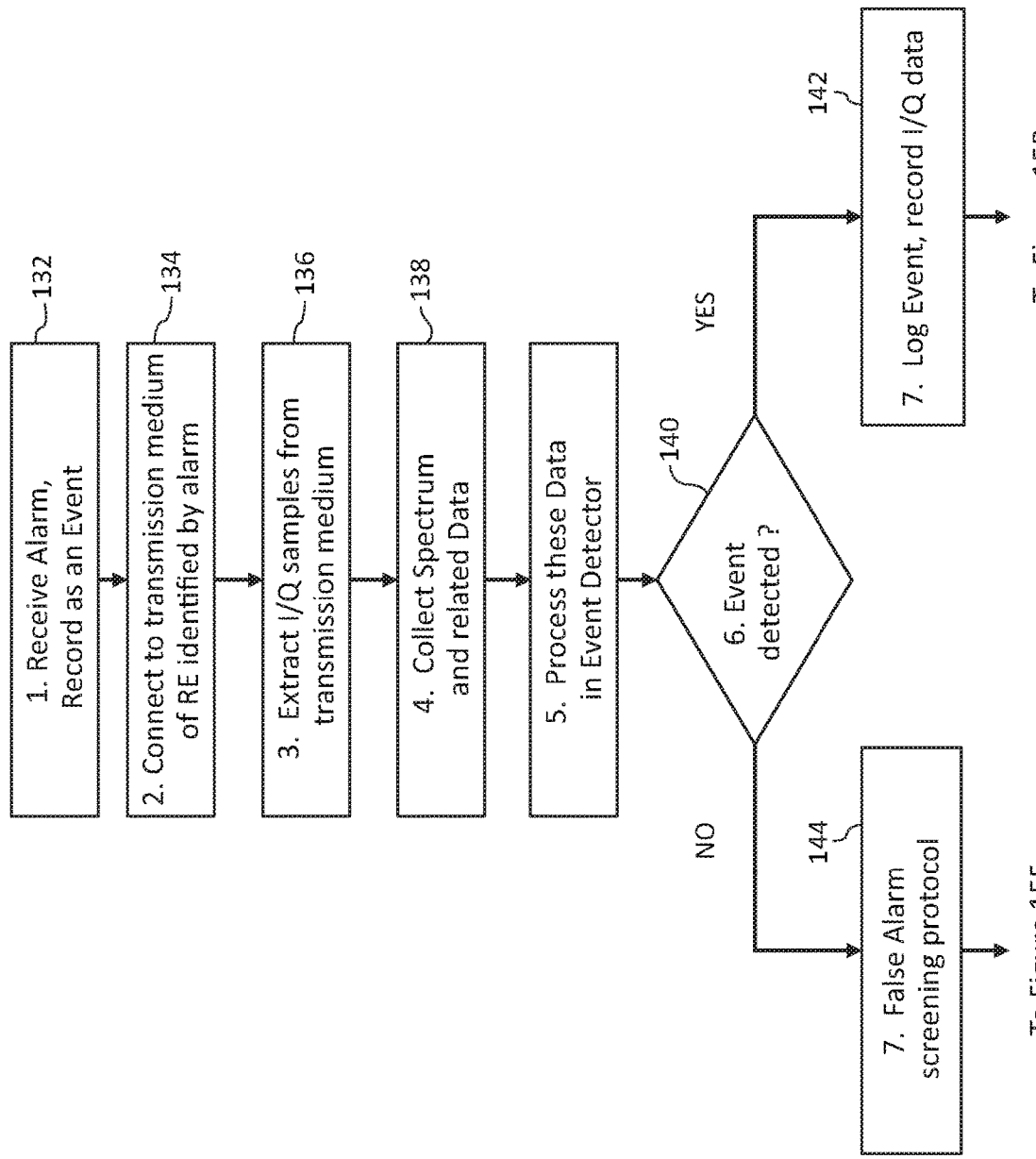
FIGS. 15A-15F are portions of a flow chart of the expert analysis used in the system of the present invention to determine the root cause of SINR problems.

Referring to Box 1 (Step 132) on FIG. 15A, the system 22 includes Table 3 as a lookup table stored in memories 118 and 124. This table lists the most likely problems given different combinations of alarms or indicators. The system 22 compares received alarms with this table in memory to determine the most likely and possible causes of the alarm. This information is then:

Displayed to a user on display 36.
Stored in memory 118 and in mass storage in the Storage Hierarchy 112, 124, 126 and 130, as an element of the Events System database (q.v.).
Sent to the Equipment Monitoring System 38.
Used to determine what RE 16 and REC 18 the system 22 will connect to using the switch assembly 26 for further tests.

Key to this capability is integration with the alarming system 38 in the network 2, for example, subscribing to the same messages that relevant technicians get when there is an alarm, then parsing the resulting messages for the useful alarm information.

To address this, the RANalyzer analyzes the signal received by the Radio Equipment to give a much higher confidence of what is causing the problem, and therefore what needs to be fixed. The system does this with a multi-tiered screening approach listed below and shown in FIGS. 15A-F. While any one of these tiers is useful for determining the cause of RAN problems, the combination of them is even more powerful.

TABLE 2

Most Common RAN Environment Problems and Related Network Equipment Notifications

| | Physical Manifestation (total power per antenna branch) | | Indicators and Alarms | | | |
|---|---|---|---|---|---|---|
| Root Cause | Antenna 1 | Antenna 2 | Alarm | Radio 1 | Radio 2 | Notes |
| External Interference | stronger | weaker | high RSSI diversity imbalance | yes (val1) yes, if \|val1 − val2\| > 5 dB | maybe (val2) | The indicators and alarms for external interference and external PIM are the same. |
| | affects both about equally | | high RSSI diversity imbalance | yes (val1) | yes (val2) probably not | The techniques to differentiate between them are part of the patent claims |
| External PIM | stronger | weaker | high RSSI diversity imbalance | yes (val1) yes, if \|val1 − val2\| > 5 dB | maybe (val2) | |
| | affects both about equally | | high RSSI diversity imbalance | yes (val1) | yes (val2) probably not | |
| Internal PIM | stronger | weaker | high RSSI diversity imbalance | yes (val1) | no yes | This problem can be determined by the alarm indicators unless it is an intermittent problem (and it often is intermittent) |
| Severely-degraded antenna connection | stronger | weaker | high RSSI diversity imbalance | no | no yes | This will also have a high VSWR alarm. this problem can be determined by the alarm indicators |
| False Alarm | stronger | weaker | high RSSI | maybe | maybe | False Alarms happen frequently, with no known cause other than random chance due to the high variability of random noise. |
| | affects both about equally | | diversity imbalance | maybe | maybe | |
| | stronger | weaker | maybe | maybe | maybe | |
| | affects both about equally | | diversity imbalance | maybe | maybe | |

TABLE 3

Likely Causes of Alarms

| Alarms | Most Likely Problems | Secondary Problems |
|---|---|---|
| High RSSI (only) | External PIM<br>External interference from malfunctioning transmitters | Internal PIM in a component that is common to both antenna branches<br>Un-managed BDA<br>False Alarm |
| Diversity Imbalance (only) | Internal PIM | Polarized external interference (low level that effects one branch but not the other)<br>Polarized external PIM (low level that effects one branch but not the other)<br>Malfunctioning pre-amplifier in the Radio Equipment (RE)<br>Un-managed BDA with polarized antenna<br>False Alarm |
| High RSSI & Diversity Imbalance | Internal PIM | Polarized external interference<br>Polarized external PIM<br>Un-managed BDA with polarized antenna |
| VSWR (only) | Somewhat degraded antenna connection | False Alarm |
| Diversity Imbalance & VSWR | Severely degraded antenna connection | False Alarm |

Referring to FIG. 15A, Box 2 (Step 134), the alarms and indicators from the network equipment monitoring system 38 are created for a specific LTE cellIdentity. The cellIdentity is used to tell the switch assembly 26 of the present invention which circuit to connect to (see also FIGS. 5A-C). These alarms are the triggering event that commands the switch 26 of the system 22 to automatically connect to a circuit, and for the RANALYZER™ system 22 to begin its analysis to either determine the root cause of the problem or determine that the alarm is a false alarm.

2. Collect "RFX" Data (see Box 3, Step 136, in FIG. 15A)

Once alarms have been received and REs 16 automatically selected by the switch assembly 26 for analysis, the system 22 captures (i.e., extracts) the uplink I/Q data from the RE 16. The system 22 then proceeds to FIG. 15A Box 4 (Step 138), and collects a variety of data, specifically it:

Converts the I/Q data to a set of spectrum traces by means of a Fast Fourier Transform, detection and trace processing (including user-selectable percentile traces) in the digital signal processor 24. These traces are compared to user-adjustable reference traces stored in the memories 118 and 124 in the system 22.

Creates a 3D histogram from those spectrums, over a user-selectable period. This will not be used in this step, but is captured to allow processing in a later step with the uplink signal acquired at the same time.

Measures the Received Total Wideband Power (RTWP) in each uplink signal for that sector, over a user-selectable period, and compares that to a user-defined threshold stored in the memories 118 and 124 in the system 22.

Measures the difference in RTWP between MIMO receive branches of the antenna 10 for that sector, over a user-selectable period, and compares that to another user-defined threshold stored in the memories 118 and 124 in the system 22.

Simultaneously, I/Q samples are captured from the matching downlink connection using the switch assembly 26. From these samples, the ACK and NACK messages are extracted and counted (see the section "Combining Spectrum Analysis and Receiver Functions" for more details about this). If the NACK/ACK ratio is too high, this is an indication of bursty noise or interference that is affecting that RE.

These data are referred to herein as RFX Data in Box 3 (Step 136) of FIG. 15A.

In FIG. 15A, Box 4 (Step 138), the system 22 then examines that RFX data, looking for evidence of any type of interference (PIM, rogue transmitters, or other), as listed above. Meanwhile the system 22 also stores the spectrum and related data, I/Q data (from both downlink and uplink) and NACK/ACK ratio in memories 118 and possibly 122 in case it is needed for further analysis and reporting in later steps of automatic analysis. The evidence being sought is spectrum or spectrogram data that does not fit the profile of normal UE transmissions (e.g., spectrum data that does not conform to the LTE uplink resource grid). If conditions result in a comparison that exceeds one of the thresholds or limits, the system records this as an Event.

If any one of the above conditions results in a comparison that exceeds one of the thresholds or limits as shown in Box 5 (Step 140), the system 22 stores this occurrence in the Events System database (q.v.) in the archive disk 124, along with the RFX data, the I/Q data, NACK/ACK ratio and the cellIdentity of the RE being measured. The system 22 then proceeds as shown in FIG. 15A, Box 6 (Step 142). These data are thusly available for analysis per the methods below (q.v.) for diagnosing the root cause of alarms with high confidence.

If there is no pattern match over a user-selectable time, the system proceeds as shown in FIG. 15A, Box 7 (Step 144).

This process performed by the system 22 of the present invention then can automatically repeat for different alarms for the same Radio Equipment 16 (perhaps for different sectors or bands, for example), or for other Radio Equipment 16.

Figure 15B:
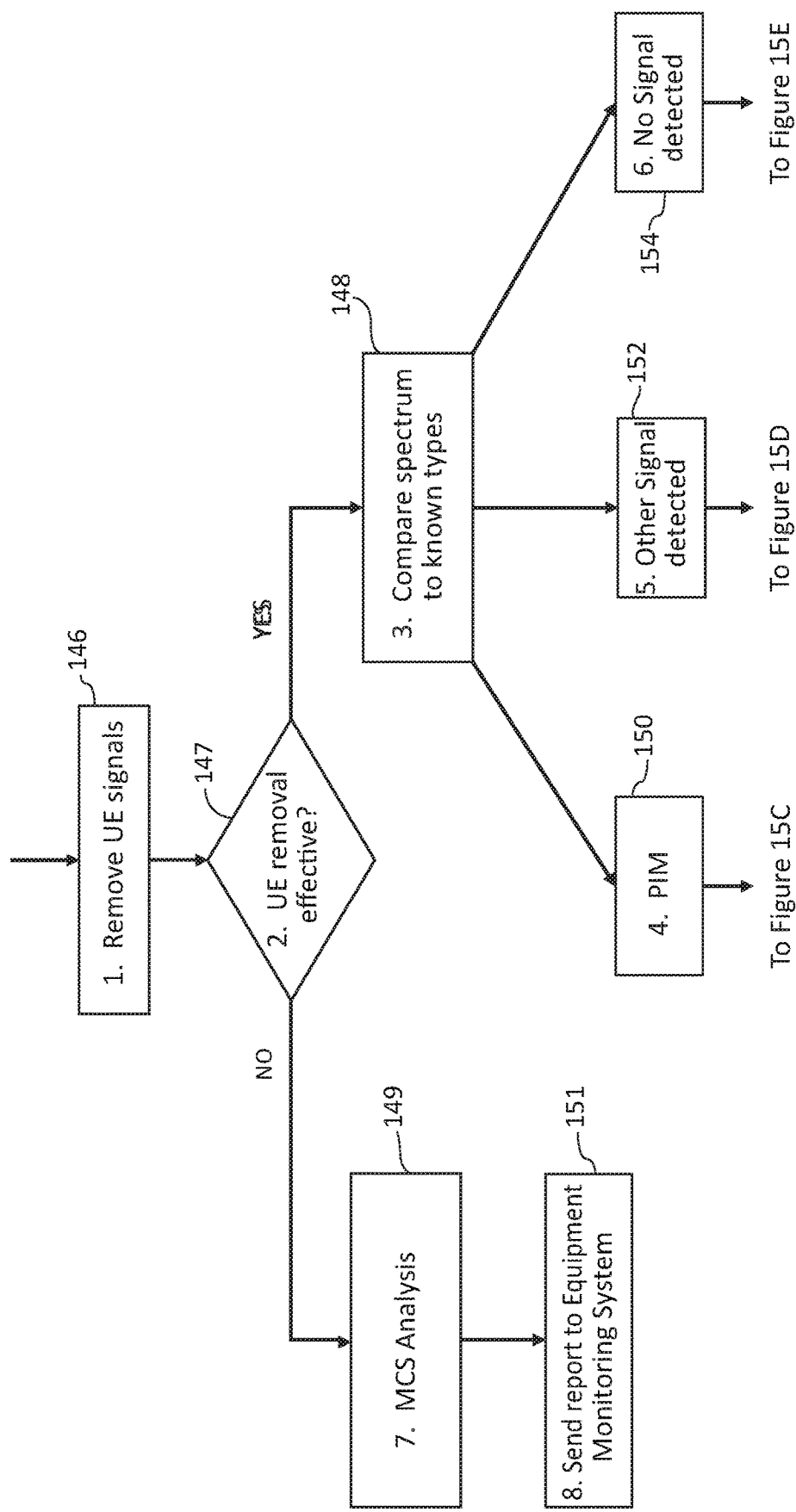

3. Removal of UE Traffic to Isolate Interference for Analysis a. Referring to FIG. 15B, Box 1 (Step 146), once some form of interference has been detected, the RANALYZER™ system 22 then does a further examination of the spectrum without uplink UE traffic. This is because the objective of the RANALYZER™ system 22 is to characterize interference in the presence of signals. The most effective method to achieve this goal is to create a spectrum of times & frequencies when UE signals are not present by:

i. Using the stored I/Q samples from the previous step
ii. Extracting and decrypting the signals from the Radio Equipment Controller (REC) 18 to the mobile phone 4 that tell the mobile phone 4 when and at what frequency to transmit signals iii. Using this information to determine when there are no scheduled transmissions at different times and frequencies (so-called "Resource Blocks" for LTE).
iv. Collecting and storing spectrum data during the UE silent times and frequencies.
v. Creating a spectrum during just the UE silent times and frequencies, thus showing the signal without the scheduled traffic.

For more details on this topic, refer to the section "Getting Uplink Spectrum without UE Traffic".

This could be performed in a real-time way by the system 22, and thus would be part of all spectrum screening. However, some versions of the RANALYZER™ system 22 may not be capable of performing the decryption necessary to determine silent periods in real-time. In this case, then I/Q data must be captured into memories 120, 118 or 122, and analyzed in post-processing mode, either locally or in a remote system connected via a network 34.

b. Removal of UE Traffic from Adjacent Cells

One limitation of removing UE traffic from a cell is that there are other nearby UEs that may also be transmitting to other REs 16. If these are close to that other cell, their received power at the cell of interest may be low enough that they can be ignored. However, if they are at the edge between cells, the received power levels may be high enough to seem like PIM or external interference. To alleviate this, since the RANALYZER™ system 22 can connect to multiple REC-to-RE connections, the system 22 may perform the same process using the observed scheduling information from adjacent cells as well, looking for times and frequencies where both the cell being tested and the adjacent cell have no scheduled uplink traffic.

In the case of the RANALYZER™ system 22 used in the Macrosite context (see FIG. 5B), this can be accomplished by scheduling those sites to capture and store I/Q samples in memory 118 at the same time, and then sending either the I/Q samples or preferably the extracted scheduling information to a system 22 at a central location (preferably the site for the sector being tested) via a network, such as network 34, for processing.

4. Checking if Traffic Removal has been Effective

However, there are a variety of reasons why this functionality may not be available, including very heavy traffic during all times when the interference is present, such as during major sports games, precluding any time/frequency pair (LTE Resource Block) when there is no traffic. The available hardware may also be insufficient for eliminating the UE traffic as well, for some versions of the system. In Box 2 (Step 147) this determination is made, by determining if a user-adjustable portion of the spectrum has been obtained without traffic in a user-set period of time. In these cases, the system uses alternative, somewhat less effective or efficient means to see the noise in the presence of signal, including RTSA functionality, percentile traces, and EVM spectrum.

Another alternative that the system has available for cases where it is difficult to eliminate the uplink traffic from the spectrum display is to analyze the modulation format and error correction scheme (so-called Modulation and Coding Scheme, or MCS, in LTE) that the base station tells the UE to use, and then compare this among multiple UEs for several REs. This is shown in FIG. 15B, Box 2 (Step 147) to determine if this step is necessary, Box 7 (Step 149) for the analysis process and Box 8 (Step 151) for the report sent to the Equipment Monitoring System 38.

The system determines the MCS by examining the Downlink I/Q samples that have been captured for the problem RE, decrypting the PDCCH commands (see the section on Receiver Processing herein for more details about this), and then decoding the MCS part of the PDCCH command that contains the commanded MCS value.

In LTE, the MCS can take on values from 0 to 15, where lower values indicate lower-order modulation and more error correction, and therefore lower throughput but more robustness to noise. In the case where many REs are relatively close to each other, such as may be the case in a stadium, the distribution of MCSs used should be similar among all REs, or at least all REs in a similar position (such as inside the stadium or in the parking lot). If some REs show a lower average peak MCS being used, this indicates that there is some reason that RE can't receive signals as well, such as external interference. There could be other reasons that a single RE has this problem, such as a bad antenna, but if multiple nearby REs have the same problem, this is more likely to be a case of external interference—for example a jammer that someone brings to the game. The system compares the average MCS among many REs around a stadium to create a "heat map" that gives a general indication of where the interference source is located.

5. Compare Spectrum to Known Types

Referring to FIG. 15B, Box 3 (Step 148), once the UE traffic has been removed, and a traffic-free spectrum obtained, the system 22 then compares the observed uplink spectrum to reference spectrums, or parametric descriptions of spectrums, from a lookup table stored in memories 118 and 124. These can include spectrums that both describe PIM, as well as rogue transmitters. The system 22 compares the calculated uplink spectrum received from the RE 16 and these stored reference spectrums to see if there is a match.

If a good match is found to PIM, the system 22 records and stores this as in the Event System database (q.v.), and then proceeds as shown in Box 4 (Step 150) in FIG. 15B. If not PIM, and if the spectrum matches one of the stored known rogue transmitter types listed below, the system 22 records and stores this in the Event System database (q.v, and proceeds as shown in Box 5 (Step 152) in FIG. 15B. However, if the traffic-free spectrum shows no signal above the stored user-set noise level, that is useful information as well. In this case, the system 22 creates and stores this information in the Events System database (q.v.), and also proceeds as shown in Box 6 (Step 154) of FIG. 15B.

The methods used by the system 22 to find the non-conforming data include:
  Comparing the calculated slope of the averaged traces to a reference slope, stored in memories 118 and 124, that describes PIM. If the slopes are sufficiently close, this is an indication that PIM is likely the problem.
  Comparing spectrum traces to a user-configurable reference spectrum (limit line) stored in memories 118 and 124.

Details of what the reference spectrums, or parametric descriptions of these spectrums, are listed in the relevant sections below.

a. Spectrum Characteristics of PIM

The spectrum of PIM has a characteristic shape, making it identifiable by a trained observer, at least after some averaging is applied by the system 22 to the spectrum to remove variations. The spectrum shape for PIM can take on several similar forms depending on the relative frequencies of the signals causing the PIM as well as the Radio Equipment receive frequency. These forms are generally the slope of the spectrum, which can be rising or falling, over a range of known frequencies. If the user has configured the RANALYZER™ system 22 with what frequencies and bandwidths of signals are present on each antenna 10, either by manual entry into a configuration database or via a report from the Equipment Monitoring System 38 (see the subsection Determining which Base Stations 12 are Connected to Which Fiber for details on this), as well as nearby antenna systems 10, the RANALYZER™ system 22 will calculate the PIM characteristics that those frequencies and bandwidths would cause, and compare the received spectrum to that calculation. If the RANALYZER™ system 22 is not so configured (i.e., with knowledge of the transmit frequencies of REs 16 that is connected to), the RANALYZER™ system 22 cannot compute a specific reference spectrum, since it does not know how to combine the different signals. However, all types of PIM have a similar characteristic, in that there is a significant slope to the spectrum after averaging the spectrum from the RE 16 over time (there may be a slope before averaging due to multipath, and thus the system 22 applies averaging for this test). The slope can vary with the relevant transmit frequencies, and can be positive or negative. So, in this case, the RANALYZER™ system 22 does not compare the spectrum to a stored reference spectrum, but rather just calculates the slope of that spectrum. If the slope is relatively large (positive or negative), this is an indication that PIM is present. This process is somewhat slower and less precise than comparing to a specific stored computed reference spectrum, but does not require configuration of the RANALYZER™ system 22 with specific radio frequency information about RF transmitters. Because of the imprecision of this technique, the system 22 would have to consider all possible sources of interference, slowing the diagnostic process, so the system 22 preferably uses the radio configuration information in the improved process mentioned above.

If PIM is detected on multiple antennas 10 for a specific Radio Equipment 16, at similar levels, it is very likely that the PIM is coming from an external source, such as a nearby metal junction that is rusty. Because of this, the system 22 records and stores the spectrum from all MIMO branches of the RE antenna 10, as well as the relative power levels among them. This is used for analyzing and reporting of internal or external PIM, along with the extended PIM analysis listed below.

b. Spectrum Characteristics of Rogue Transmitters

The most common types of rogue transmitters and their associated spectrum characteristics are listed in Table 4.

the rogue transmitter. This helps the technician by giving an indication of the specific type of device to be looking for.

The pattern matching is easily extended if the characteristics of other types of interference become known. While some signals are quite stable with time, such as the common case with cable TV leakage, others can come and go. The Events System database (q.v.) in the analytic computer unit 30 in the RANALYZER™ system 22 helps keep track of such events.

c. Spectrum Characteristics of Other Transmitters

When the system 22 detects that there is a received signal level above the stored, user-set threshold, but does not match one of the stored known patterns, this is most likely a type of rogue transmitter for which the system does not have a stored reference spectrum or parametric description. However, there are two other cases that need to checked by the system 22—a UE that is transmitting bad signals (distorted, wrong power level, or incorrect timing advance), and an unmanaged repeater (or bi-directional amplifier) that is causing receive signal levels to be too high at the RE 16. These will be covered in more detail in the below section on Extended Analysis of External Interference from Rogue Transmitters.

6. Extended PIM Analysis

Figure 15C:
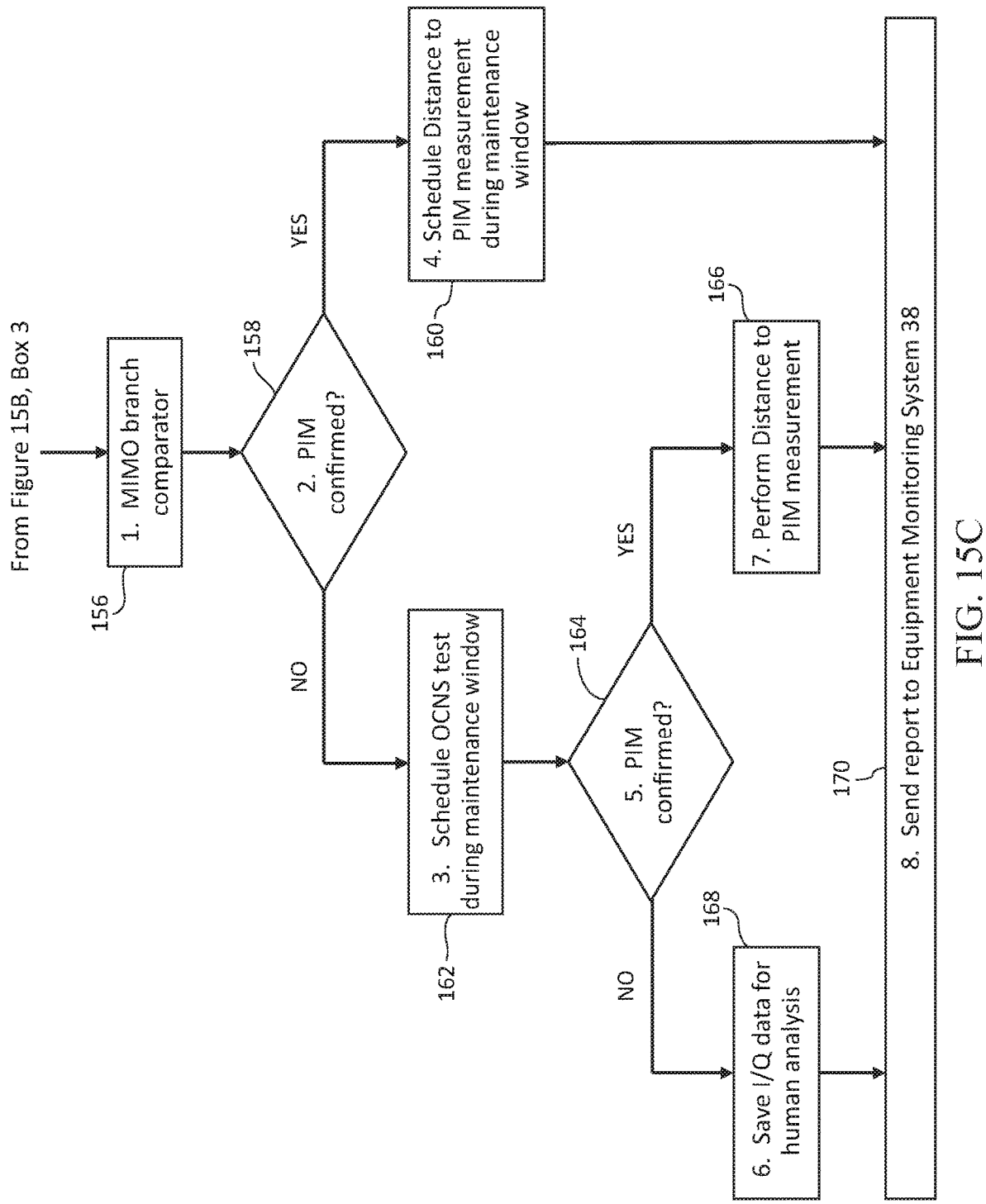

Referring to FIG. 15C, if the PIM is detected on just one of the receive antennas 10 for a particular sector and band, it is more likely that the PIM is coming from an internal problem, either in the cable from the Radio Equipment 16 to the antenna 10, or in the antenna 10 itself. However, there are situations where externally created PIM is polarized, and (since antennas 10 are often polarized orthogonally) it is possible that external PIM could be seen in one antenna 10 but not the other if it were at a low level (close to the noise floor of the RE 16) and of a similar polarization to just one antenna 10. Thus, while it is likely that the PIM is coming from an internal source in this case, additional testing is required to make this a definitive judgment.

Once the system 22 has identified PIM as the likely cause of the problem, further tests are performed by the system 22 to verify that PIM is actually present and locate the source of it.

TABLE 4

Common Spectrum Characteristics of different Interference Signals

| Interference Signal Type | Common Spectrum Characteristics |
| --- | --- |
| Cable TV leakage | Flat spectrum across channel width (typically 6, 7, or 8 MHz), with dips at known channel boundaries. |
| Leaking "clock" signal from most any digital electronics | Single spike at one frequency. Commonly called "CW" (for continuous wave) signal. |
| Oscillating repeater (sometimes called a "bi-directional amplifier" or BDA) | Distorted version of the input signal. Frequency may wander or scroll. |
| BDAs that are too strong | Create a normal (or nearly normal) looking signal, but it is too strong and cannot be power-controlled to a low enough level by network commands. This is a somewhat rare occurrence, but can happen when the BDA is close to the network antenna. |
| Wireless microphones at the wrong frequency | May be analog (usually FM) or digital. Only present sporadically, such as during sports games or other meetings. |
| Transmitter harmonics | Wider version of spectrum from transmitter, most commonly terrestrial TV. |
| Jammers | Broad noise rise on all antennas, flat in frequency, even beyond limits of LTE signals. |

These characteristics are stored in memories 118 and 124 in the system 22 as reference spectrums, and the received spectrum, with UE transmissions removed, is compared to these stored reference spectrums. If a match is found, this is displayed and reported to the technician who will be finding a. External or Internal PIM Determination-MIMO Branch Comparator The PIM level in the uplink varies as a strong function of the downlink transmitted signals, especially the power level. The system 22 uses this to determine if the source of the PIM is internal or external to the cable and antenna system connected to the RE 16. It is important to know if the PIM is internal or external, as the troubleshooting and repair process is very different for these two cases, and performing the wrong corrective action is very expensive.

Referring to FIG. 15C, Box 1 (Step 156), the system 22 determines if PIM is internal or external with high confidence by using the following steps:
  i. First, the unwanted signal is verified to be PIM:
    1. If the likely source of PIM is due to only the downlink signal previously captured (due to the frequency bands in use at that problem site), then the system 22 uses the captured I/Q downlink signals from the Radio Equipment Controller 18 (captured at the same time as spectrum traces were created for the Compare Spectrum to Known Types step, i.e., Step 148 in FIG. 15B).
    2. However, if the likely source of PIM is due to mixing of different frequencies bands (e.g. the downlink of the AWS and PCS bands creating PIM in the uplink of the AWS band), then the RANALYZER™ system 22 will command the test access switch assembly 26 to obtain access to the downlink I/Q data from the additional frequency bands.
    3. The system 22 then digitally mixes the likely transmitted signals causing the PIM in the digital signal processor 24 to create and store in memory 116 a reference signal waveform.
      It should be noted that "mixing" can be done by single or multiple multiplications in the time domain, applying a nonlinear transfer function in the amplitude domain, or by convolution in the frequency domain.
    4. This stored reference signal waveform is then compared to the observed uplink signal in the digital signal processor 24, after time alignment to adjust for differences in timing due to the round-trip delays incurred as a result of the measurement points being far from the PIM source, and level adjustment since the strength of the PIM source is unknown.
    5. If the comparison shows a good match, then there is very high confidence that the source of the problem is in fact PIM.
  ii. The system 22 then determines if the PIM source is either internal or external to the RF cable and antenna system connected to the RE 16. The system 22 determines this with the Digital Signal Processor 24 using the stored complex (I and Q) waveforms of each MIMO branch of the antenna 10—again both downlink and uplink for each branch, from either one or several transmitters. It should be noted that the transmitted downlink signals from each MIMO antenna branch will be similar, but are not identical. These signals are digitally mixed in the Digital Signal Processor 24 to simulate possible PIM sources, and these are then compared to the received signals. If the comparison is strong for one branch but not the other, the PIM is determined to be from an internal source. If the comparison is strong for both branches, as well as strong for mixing with a combination of the downlink signal from both branches, the PIM is determined to be from an external source.
    For details about this step, refer to the section Details about MIMO Branch Comparator herein,
  b. External PIM Polarization Angle
    There is also a somewhat unusual case where the pattern matching by the system 22 between MIMO antenna branches fails (i.e., there is no match). This is where there is an external PIM source that is polarized, and the polarization is spatially aligned with just one MIMO branch of the antenna 10. Fortunately, cases where this happens are rare. Somewhat less rare is the case where the external PIM is polarized, but not aligned with any particular MIMO antenna 10. Also, if there are more than two MIMO antenna branches for one RE 16, the antennas 10 obviously cannot all be orthogonal, since they are pointing in the same direction. These additional antennas 10, however, can give additional confidence in the PIM being internal or external, since a polarized external PIM source would show up in all antenna branches that have the same, or similar, polarization.

Because it can be difficult to find external PIM sources, knowing if there is any polarization to it can be helpful in knowing what to look for, as there will be a physical feature that is at that angle. For example, if the polarization is known to be vertical, it is unlikely that horizontal metal flashing could be the cause.

The system 22 determines the polarization angle for external PIM by:
      Creating the sum and difference signals in the digital signal processor 24 from the different polarizations of receive antennas.
      Applying these to the X and Y axes (or other orthogonal axes) of the display 36. Over time, the predominant angle displayed by these signals will be the angle of the polarization of the external PIM (if the axes of the display 36 correspond to the axes of the antennas 10).
      This angle may also be determined by the digital signal processor 24 by the processor 24 extracting the angle that would be displayed, and averaging this over time. The system 22 uses the information about the polarization angle as part of the report to the Equipment Monitoring System 38.
  c. Further Verification of PIM
    Sometimes I/Q analysis of PIM by the system 22 may not show the PIM problem, due to a variety of factors. These can be that the PIM is intermittent, or that it is hidden by other received signals. Because of this, if the result of the Internal or External PIM determination by the system 22 did not show PIM, the system 22 performs an additional test, shown in FIG. 15C, Box 3 (Step 162). See the section on Automatic Tests during the Maintenance Window for further details about how the system 22 performs this test.

If the RANALYZER™ system 22 does not find PIM during this additional test (see FIG. 15C, Box 5, Step 164), this information is stored in the Event System database (q.v.). The I/Q data that was stored in memories 118 and 122 during the initial screening for PIM is archived to memories 124, 126 and 130, and a report is sent to the Equipment Monitoring System 36. If the system 22 does find PIM during this test, the system 22 proceeds as shown in FIG. 15C, Box 7 (Step 166), to determine the location of the PIM source.

If no PIM is found from this test, the system proceeds as in FIG. 15C, Box 6 (Step 168), as this is so unusual that a human being needs to be involved with discovering the root cause. To aid this process, all of the captured I/Q data from the above tests is archived into memories 124, 126 and 130, and an electronic report is sent to the Equipment Monitoring System 38. This report describes the tests and the storage location of the I/Q data. By storing the RE that's been tested along with the spectrum and I/Q data, that person has a wealth of data to help with the troubleshooting process.

d. Location (Distance to PIM)

Referring to FIG. 15C, Box 4 (Step 160), the last step in diagnosing PIM is to determine its location. This is accomplished by scheduling an out-of-service test performed by the system 22 during a maintenance window. The method used by the system 22 by which distance to PIM is accurately determined is discussed below in the section on Distance to PIM. Results of this measurement are saved in the Events System database, in memories 124, 126, and 130. A report is then set to the Equipment Monitoring System 38, as explained below.

e. PIM Reporting

Referring to FIG. 15C, Box 8 (Step 170), based on the tests performed by the system 22 shown in FIG. 15C, in Boxes 1, 3, 4 and 7 (Steps 156, 162, 160 and 166, respectively), an electronic report is sent to the Equipment Monitoring System 38. This is commonly then forwarded to the responsible person for either corrective action or further analysis. Reporting when PIM has not been confirmed is explained above.

7. Extended Analysis of External Interference from Rogue Transmitters

Figure 15D:
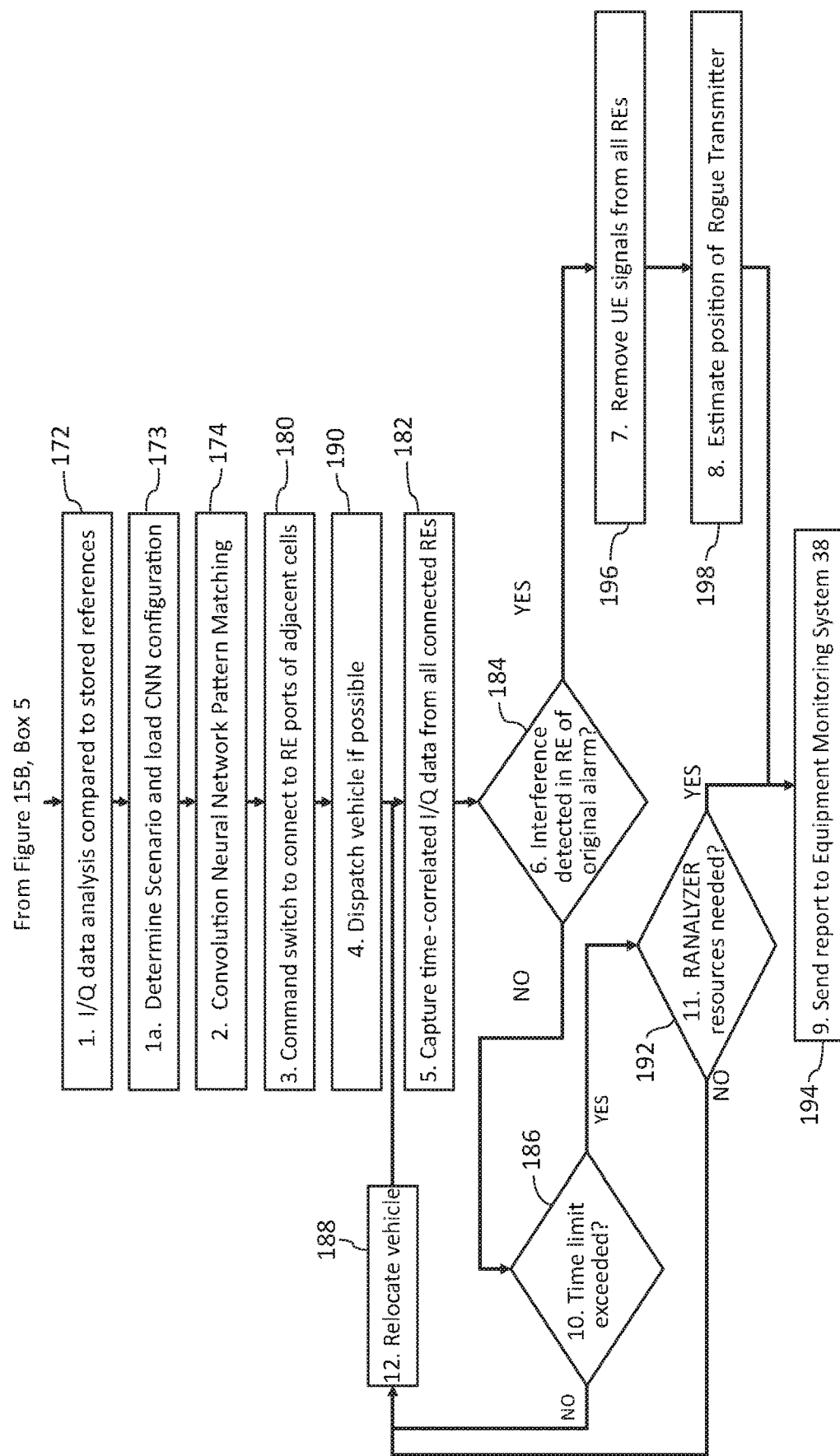

Referring to FIG. 15D, signals from rogue transmitters often have characteristics that can be determined in a variety of ways. These characteristics can create higher confidence in the determination of the type of signal causing the interference, and can be used to help build a library of unknown signals which is stored in memories 118 and 124 in the system 22. When corrective action is taken, the type of device causing the rogue transmission can then be manually entered by the technician discovering the rogue transmitter into the RANALYZER™ system 22. This is then stored with the captured I/Q data and signal characteristics in memory 124. This then expands the number of rogue transmitter types known, helping the technician correcting a problem by letting them know what to look for. In Boxes 1 (Step 172) and 2 (Step 174) in FIG. 15D the system 22 determines these characteristics.

a. Heuristically Determined Pattern Recognition

One way the system 22 accomplishes this is in Box 1 (Step 172), where the system 22 looks for known characteristics of signals types in a variety of ways, using the I/Q samples captured previously, or newly acquired I/Q samples, if necessary:

The system 22 creates_cyclostationarity metric indicating the repetitive nature of the received signal, and compares this to a list of cyclostationarity metrics of known interference types stored in memories 118 and 124. If a match is found, this is entered into the Event System database (q.v.) stored in memories 142, 126 and 130, and included in the electronic report generated by the system 22 and provided to the Equipment Monitoring System 38.

The observed interfering signal may be digitally modulated, in which case the symbol rate is another indicator of the type of device to find. The system 22 extracts the symbol rate from the I/Q data, and compares this to a list of known symbol rates for a variety of transmitters stored in the system memories 118 and 124. Any match is included in the report to the Equipment Monitoring System 38.

Digitally modulated signals can have a variety of modulation formats. The system 22 extracts modulation format information from the I/Q data, and compares this to a list of known modulation formats for a variety of transmitters stored in the system memories 118 and 124. Any match found by the system 22 is included in the report provided to the Equipment Monitoring System 38.

The observed interfering signal may also be analyzed by the system 22 by comparing the peak-to-average ratio or a Distribution Function (DF) of that signal to a list of peak-to-average ratios or Distribution Functions stored in memories 118 and 124. Any match is again reported by the system 22 to the Equipment Monitoring System 38.

It should be noted that "Distribution Function" used herein means the Probability Distribution Function, Cumulative Distribution Function, Complementary Cumulative Distribution Function, or any related function based on a histogram of amplitude values.

Ideally, each of these metrics is calculated by the system 22 from I/Q samples with uplink traffic removed. This is done in a similar way that the system 22 generates the spectrum with uplink traffic removed (q.v.), except that instead of creating a spectrum, the I/Q samples are filtered by the system 22 to remove remaining traffic, and then analyzed by the digital signal processor 24 or the analytic computer unit 30 of the system 22.

b. Non-Heuristic Pattern Recognition

In FIG. 15D, Box 1a (Step 173), Determine Scenario and load CNN configuration, the system 22 picks from library 178 of Convolutional Neural Network (CNN) configurations, based on the current scenario, which is defined by the frequencies in use local to the problem RE.

In FIG. 15D box 2 (Step 174) Convolutional Neural Network Pattern Matching, the system 22 attempts to identify known signals even when specific characteristics have not or cannot be identified. The system 22 does this by using a convolutional neural network (CNN) circuit 176 shown in FIG. 7 and FIG. 14 that has been created to recognize a variety of signal types. For more details on this topic, see the section on Convolutional Neural Network Pattern Recognition herein.

c. Location Estimate

More important than diagnosing the type of rogue transmitter is providing an estimate of its location so that a human being can precisely locate it and mitigate it. The detailed methods to locate the emitter are described in the section Interfering Emitter Location; below are described the steps the system uses to capture data for these methods.

Referring to FIG. 15D, Box 3 (Step 180), the system 22 identifies REs 16 that are physically nearby the problem RE 16. These can be adjacent sectors or nearby cells. The fundamental concept is to gain as much data about the location of the interference source as possible. Once the useful nearby REs 16 have been identified, the system 22 commands the switch 26 to connect to the RE-to-REC connection, and observe uplink and downlink I/Q samples.

In FIG. 15D, Box 4, if a vehicle, either autonomous (such as a drone) or manned, is available to be dispatched to the site, this is done.

In FIG. 15D, Box 5 (Step 182), the system 22 captures I/Q samples from all of the related REs 16 found in Box 3 (Step 180).

In FIG. 15D, Box 6 (Step 184), the system 22 verifies that interference is present in the problem RE 16 at the moment before trying to locate it. If the answer is no, the interference is probably intermittent, so the system 22 continues to look for the interference for a user-selectable period of time (FIG. 15D, Box 10, Step 186). If that period of time is not exceeded, the system proceeds to Box 12 (Step 188) to relocate any dispatched vehicle (see FIG. 15D, Box 4, Step 190). If the time has been exceeded, the system 22 proceeds to Box 11 (Step 192), where it then checks if there is any other process that needs system resources, such as connections to uplink or downlink fibers 20; this can happen if another alarm has been received or if more than one user is operating the system. See the section on Multi-user Capability for more details about this. If system resources are not needed for other processing, the system 22 again relocates any autonomous vehicle that has been dispatched from Step 190 (Box 12, Step 188) and continues looking for the interference, repeating until the user-selectable period of time passes. However, if the time limit has passed, and system hardware is needed for other tests, the system 22 stores this in the Event System database, adds this to a list of measurements to be made (also stored in the Events System database) when resources are available, and reports what measurements have been made, as well as the updated list of measurements to be made, to the Equipment Monitoring System 38 (Box 9, Step 194). In any case, when the interference is seen in the original RE 16, as well as when it is not seen, this information is stored in the Event System database of the system 22. This is because it is important to know when interference will be present when a person is hunting for the source of the undesired signal.

In FIG. 15D, Box 7 (Step 196), if the result of the decision in Box 6 (Step 184) is that interference is detected in the original RE 16, the system 22 then proceeds to Box 7 (Step 196), where UE traffic is removed from all observed uplink signals, pursuant to the process and circuitry in the section Getting Uplink Spectrum without UE traffic herein.

In FIG. 15D, Box 8 (Step 198), the location of the source of the undesired signal is estimated by the system 22. The details of this method are described in the section Interfering Emitter Location herein. As above, the system then proceeds to Box 9 (Step 194) and reports the results of the location estimate to the Equipment Monitoring System 38.

8. Extended Analysis of External Interference from Rogue Transmitters

Figure 15E:
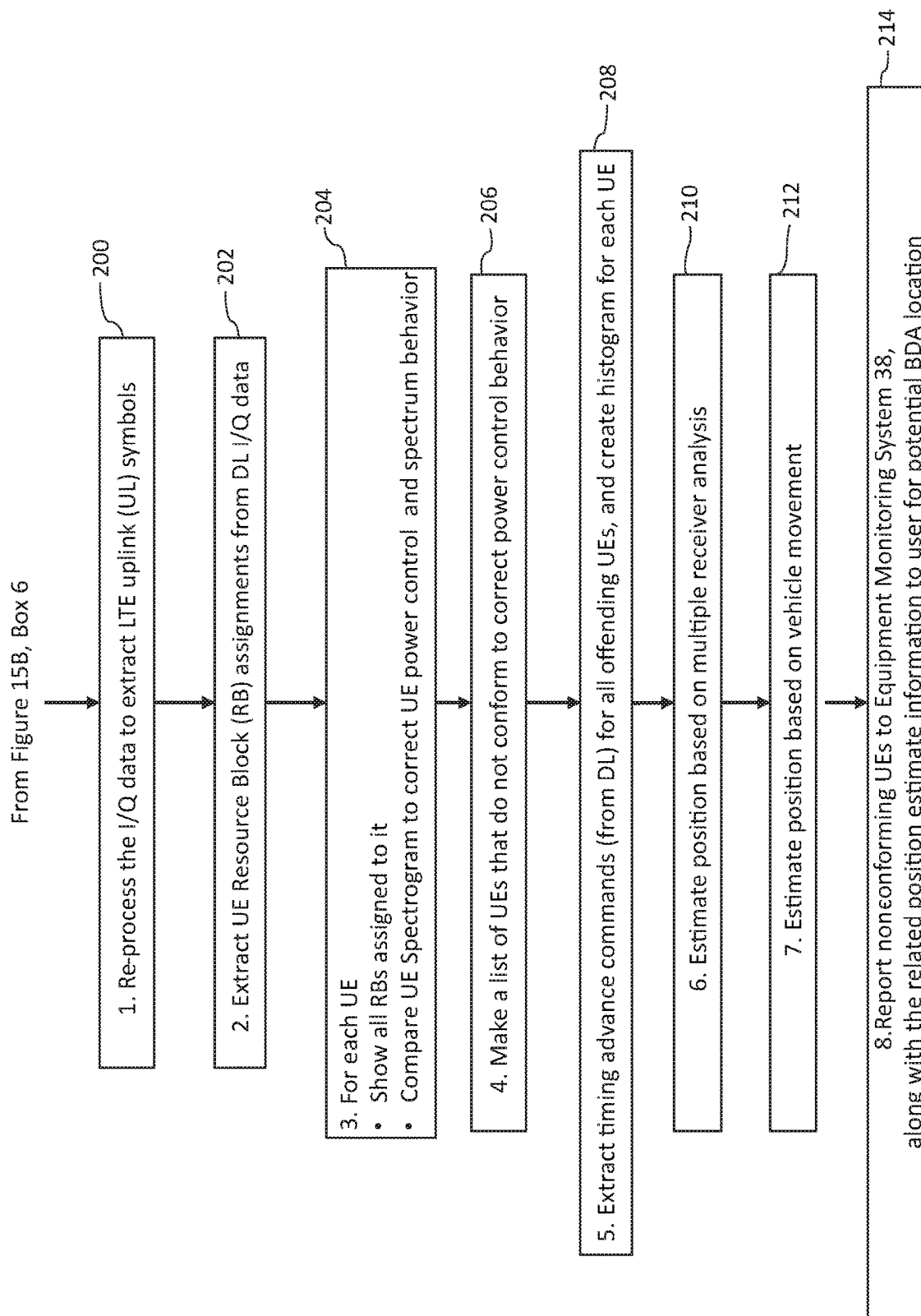

Referring to FIG. 15E, when the result of FIG. 15B, Box 2 (Step 148) is that no signal was detected, a probable reason is that there is a UE that is transmitting bad signals (distorted or wrong power level). This may be due to the UE itself, or due to an unmanaged repeater (also called a Bi-Directional Amplifier, or BDA). It should be noted that a BDA may oscillate and create its own signal, as shown in Table 4, or they may just make a normal (or nearly normal) looking signal, but the signal is too strong and cannot be power-controlled to a low enough level by network commands. This is a somewhat rare occurrence, but can happen when the BDA is close to the network antenna 10. This circumstance can create a high RSSI alarm and it will be detected by the RTWP screen of the False Alarm Screening protocol shown in FIG. 15F and described elsewhere herein.

When all the UE traffic is removed, then the bad signal may also be removed (or sufficiently removed) that there is nothing (or nothing sufficient) left to detect. The system 22 checks for this by examining the spectrum for each UE independently. The specific steps for this are:

Starting with the original captured I/Q samples, the system 22 first identifies Uplink symbols in time, using circuitry in the digital signal processor to synchronize to that signal, as shown in FIG. 15E, Box 1 (Step 200).

The UEs that are transmitting for each LTE subframe are separately identified, like the process used for FIG. 15B, Box 1 (Step 146), and described herein in the section labelled Removal of UE Traffic to Isolate Interference for Analysis. This is shown in FIG. 15E, Box 2 (Step 202).

In FIG. 15E, Box 3 (Step 204), a set of spectrums for each UE alone are stored in the Event System database, along with an identifier for that UE known as the Radio Network Temporary Identifier (RNTI) which is part of the key used to decrypt the PDCCH. See the section on Removal of UE Traffic to Isolate Interference for Analysis for more details about this.

The set of spectrums for individual UEs can be displayed on the display 36 as a spectrogram, and is compared to a stored profile for expected spectrum and power control behavior, stored in memories 118 and 124. The results of these comparisons are stored in the Event System database, associated with the above data, to allow a user to check on the comparisons that are made automatically.

Determining the expected power control behavior is complex, as the REC 18 controls both the UE output power to improve battery life, and the so-called MCS, which is both the modulation format and how much error-correction information is transmitted by the UE. Details of how the system 22 does that are listed below.

The system 22 extracts the modulation format (QPSK, 16 QAM, or 64 QAM) of the received signal for each identified UE, and compares this to the power level received from that UE. Since the Base Station 12 (REC 18 and RE 16) controls the mobile phone output power to improve battery life, if there is a mismatch between these, say QPSK transmission with a high received power level, it is very likely that the phone 4 is malfunctioning. A table of expected power levels versus modulation format is stored in the memories 118 and 124 of the system 22 for this comparison.

However, determining the modulation format for the received signal is somewhat problematic, as the signal that the mobile phone 4 transmits to help the Radio Equipment 16 demodulate the signal, the DMRS or Demodulation Reference Signal, is highly variable based on a number of parameters that the Base Station 12 transmits to the mobile phone 4 in an encrypted fashion. However, there are several things that can be done to aid the estimation of the modulation format.

First, the system 22 obtains significant knowledge of when the DMRS signal is supposed to be received by closely examining the downlink (RE 16 to mobile phone 4) signal. This also provides timing signals for reference, and these can be used to locate the DMRS signal in time. While it may not be possible to get the DMRS signal in phase, since the parameters used to create the DMRS are not known, a good estimate of the DMRS amplitude can be determined by the system 22. If the system 22 examines the received signal amplitude nearby the DMRS, an amplitude comparison can give the system 22 a good clue about the modulation format being used. A Costas loop used by the system 22 can also add in signal timing and phase recovery.

By the system 22 decrypting the PDCCH signal (see the section on Receiver Functions for more about this), it is also possible to find sets of adjacent frequencies that will use the same modulation format. This provides a larger set of data for estimation, which improves the quality of that estimation. Such steps may be performed by the system 22 of the present invention.

In FIG. 15E, Box 4 (Step 206), a summary list of all UEs that do not meet the defined criteria for UE transmissions is stored in the Event System database, with references to the set of spectrum data stored for each UE.

To estimate the position of the UE, several steps are taken by the system 22:

The so-called Timing Advance commands from the downlink to that UE is extracted by the digital signal processor 24 from downlink I/Q samples. This gives the system 22 a useful estimate of the position of the UE or BDA, at least in terms of approximate distance from the RE antenna 10. A histogram of these timing estimates over a short period of time (several seconds) is then created by the system 22 and stored in memory 118 as the timing may vary somewhat. This process performed by the system 22 is shown in FIG. 15E, Box 5 (Step 208).

Because of multipath, the path length from a UE to an RE 16 may appear to change over time, even if the UE does not move. What is most useful is the shortest path, which may not be the largest amplitude. An equalizer (not shown) may be used and form part of the RANALYZER™ system 22 of the present invention to find the shortest path length. A histogram of timing for the shortest versus the largest received signal may also be helpful for finding the impact of multipath on the path delay. If the largest response in the equalizer is not the same as the shortest path, this can for example be because the UE is shielded from the RE, such as by a building, but there is a large reflector that sends a large signal from the UE to the RE. By examining the equalizer response, and determining that there is a large component indicating a shorter path than the largest component, the distance to the UE may be shortened from the value obtained by the timing advance command.

It should be noted that uplink traffic for a UE may be over a much smaller bandwidth than the entire LTE channel bandwidth, which reduces the usefulness of this measurement, as narrower bandwidths create larger uncertainty in the timing measurements based on the equalizer. However, the RANALYZER™ system 22 can observe the timing advance and transmission bandwidth for a long time, and on occasion where the UE transmits over a large bandwidth, and is relatively fixed in location, sufficient timing information may be obtained.

More details about the equalizer that the RANALYZER™ system 22 uses for this function are found in the section about the Digital Signal Processor.

In FIG. 15E, Box 6 (Step 210), the UE position is estimated by the system 22 using the multiple receiver analysis like FIG. 15D, Boxes 3 through 8 (Steps 180, 190, 182, 184, 196, and 198 respectively), but focused on the received signal from the identified UE.

If available, the system 22 dispatches a vehicle, preferably in the general area determined by other location estimation methods listed herein to provide further position information, as shown in FIG. 15E, Box 7 (Step 212). See the section Using Vehicle-mounted Receivers to Enhance Position Estimation for further details on this.

The value for the timing advance command is recorded in the Event System database by the system 22, and added to the electronic report to the Equipment Monitoring System 38, as shown in FIG. 15E, Box 8 (Step 214).

9. False Alarm Screening

If the results of the test performed by the system 22 in FIG. 15A, Box 5 (Step 140) is that no RFX event has been detected, then it is likely that the problem signal is intermittent, or there is a false alarm.

Intermittent problems and false alarms are a significant problem in diagnosing problems in the RAN 6. PIM is often intermittent. In one case, the non-linear junction that is causing the PIM may be made to contact or separate, depending on the temperature or wind conditions. Monitoring the signal by the system 22 from the RE 16 over hours or days will make this obvious, especially using the information recorded in the Event System database of the RANALYZER™ system 22; see the section on Events System for more details about this. External interference may also be intermittent, or even mobile. Being able to monitor when the interference happens can give clues to its source, such as a wireless microphone used in church services. This can also give clues to finding a mobile interferer, by determining times and location when and where it is stationary. Such is performed by the system 22 of the present invention.

Figure 15F:
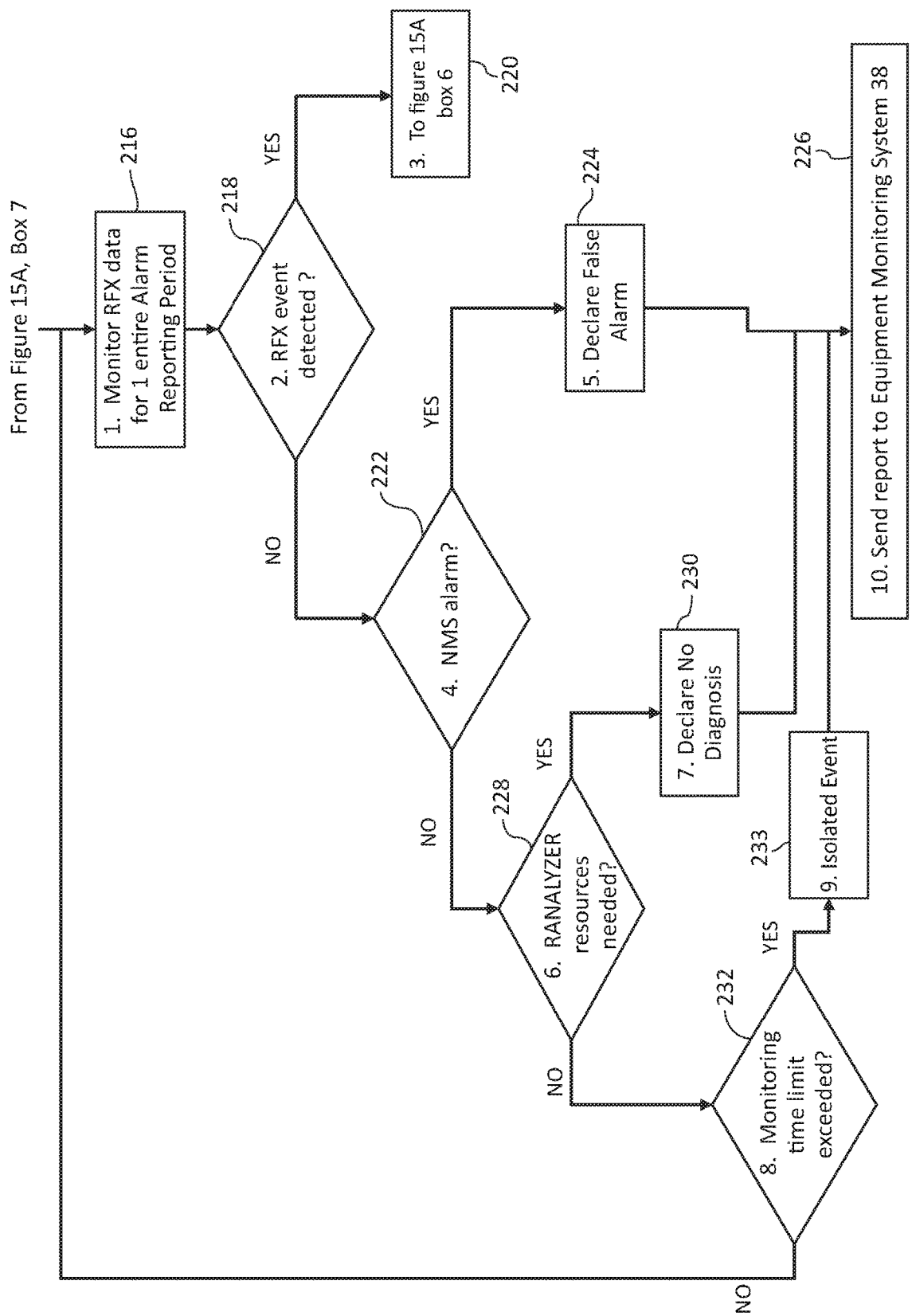
Figure 17:
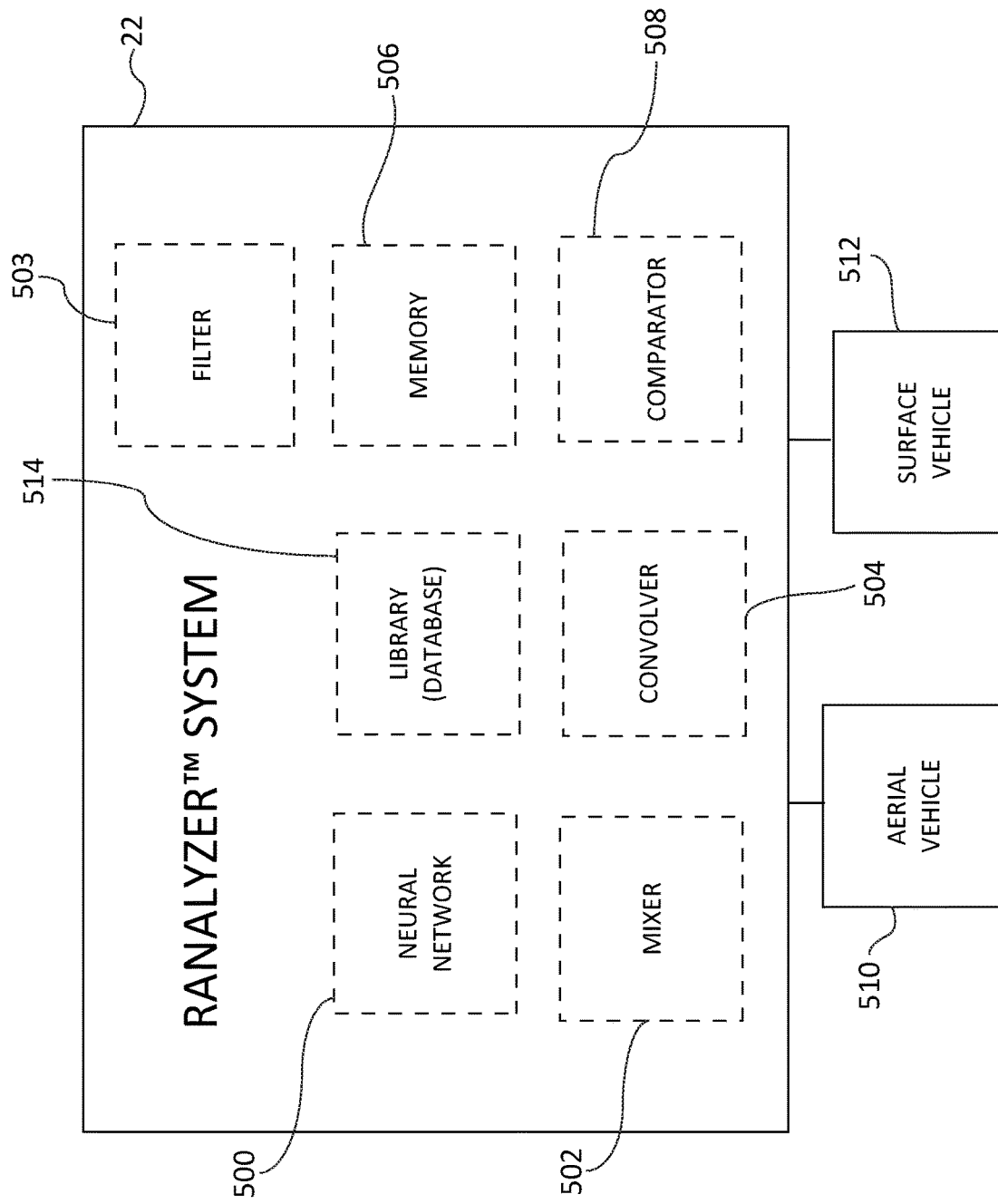
FIG. 17 is a block diagram of the system of the present invention, illustrating further components thereof.

In this circumstance, the RANALYZER™ system 22 continuously monitors the signal and performs the following actions, as shown in FIG. 15F:

a. In FIG. 15F, Box 1 (Step 216), the system 22 monitors all RFX data stored in memory 118, including spectrum and other data, at user configurable rates, for all needed MIMO antenna branches including:
  i. Uplink Spectrum traces, including maximum hold (for a configurable time), minimum hold, and plain traces.
  ii. User-configurable uplink spectrum percentile traces.
  iii. A 3D histogram of the uplink spectrum analyzer traces generated by the system 22. See the section on Signal Displays for more detail about three-dimensional histograms. This can be used for creating by the system 22 a color-graded spectrum display shown on display 36, the percentile traces mentioned elsewhere herein, or for other analysis.
  iv. The NACK/ACK ratio, extracted by the digital signal processor 24 from the downlink I/Q data. See the section on Combining Spectrum Analysis and Receiver Functions for more details about this.
  v. The Received Total Wideband Power (RTWP). See the section on Signal Displays for more information about this.

b. This process carried out by the system 22 continues until at least one entire alarm reporting period (such as 15 minutes) has been captured.

c. In FIG. 15F, Box 2 (Step 218), while monitoring this RFX data, the system 22 makes the following comparisons to references stored in memories 118 and 124
   i. If a (user-configurable) high amount of NACKs (compared to the number of ACKs in the same time window) occur, then an entry is made by the system 22 in the event log, and the I/Q data from in memories 114, 116 and 118 associated with the timeframe of the high NACK count is saved in memories 118 for further analysis.
   ii. If a (user-configurable) difference in RTWP is detected by the system 22 that lasts for a (user-configurable) amount of time, then:
      1. This is recorded by the system 22 in the Event System database.
      2. The uplink and downlink I/Q data from the memories 114, 116, and 118 associated with the timeframe of the RTWP delta is saved by the system 22 into the Event System database for further analysis.
      3. The latest (user-configurable) 3D histograms are saved by the system 22 into the Event System database for further analysis.
      4. The latest (user-configurable) spectrum traces are saved into the Event System database for further analysis.
   iii. If a (user-configurable) level of RTWP stored in memories 118 and 124 is exceeded for a (user-configurable) amount of time (also stored in memories 118 and 124), then similar data to the case for difference in RTWP is saved by the system 22 into the Event System database. The data save is that associated with the timeframe of the stored RTWP level threshold being exceeded. Once again, this storage allows further analysis.
   iv. The spectrum is compared by the system 22 to a stored profile of acceptable uplink spectrum, stored in memories 118 and 124. This stored profile has both a limit of amplitude versus frequency, and a duration that that limit must be exceeded. If the received spectrum exceeds this stored profile, then similar data to the case for difference in RTWP is saved by the system 22 into the Event System database. This time the spectrum data associated with the timeframe of the spectrum exceeding the amplitude versus frequency limit is what's saved for further analysis.
   v. If any one of these happens, the system 22 proceeds to Box 3 (Step 220), thence to FIG. 15A, Box 6 (Step 142), where the detected signal is then classified and located.
d. In FIG. 15F, Box 2 (Step 218), if none of the above RFX data exceeds the stored limits, the system 22 progresses to Box 4 (Step 222). If an additional alarm or indicators are received by the system 22, with none of the above indications of interference found, this is declared by the system 22 as a False Alarm in Box 5 (Step 224), and is reported to the Equipment Monitoring System 38 in Box 10 (Step 226). This condition means that it is highly likely that the Equipment Monitoring System 38 is sending false alarms. It is extremely important to identify false alarms because trying to fix a problem that does not exist is an expensive waste of time and money.
   If the RANALYZER™ system 22 resources are not required for other diagnosis activity, as shown in FIG. 15F, Box 6 (Step 228), then the system 22 may spend additional time monitoring the RFX data to more definitively determine if a false alarm was transmitted by the network equipment monitoring system 38. But, if the resources of the system 22 are needed for diagnosing other problems, then the system 22 sends a report or displays a message on the display 36 to the technician or operator of the system 22 that no "false alarm" or other diagnosis is made by the system, as shown in FIG. 15F, Box 7 (Step 230).
e. In FIG. 15F, Box 8 (Step 232), the system 22 decides if a user-configurable time limit memories 118 and 124 has been exceeded, with no additional alarms or matches to stored patterns. If so, the system 22 declares that the original alarm is an Isolated Event False Alarm in FIG. 15F, Box 9 (Step 233), and such is reported to the Equipment Monitoring System 38 in Box 10 (Step 226).

10. Automatic Tests During the Maintenance Window

If PIM is suspected, a definitive test performed by the system 22 can be scheduled during a maintenance window. By effectively disconnecting the base station 12 from the network 2 (after making sure no emergency calls (e.g. 911) are in progress), a test signal can be requested by the system 22 from the network 2. This signal is often called "OCNS", but is simply a high-power test signal that can be turned on and off. If there is no traffic, while the transmit power is low there should be no indication of PIM. If transmit power is high, which the OCNS signal will cause, the PIM level should be high. If these conditions are met, there is very high confidence that PIM is present. This procedure is undertaken by the system 22. Additional processing by the system 22 can help determine if the PIM is internal or external, as mentioned elsewhere herein.

In addition, these tests may be periodically scheduled by the system 22 even if PIM is not suspected at a site. This would allow tracking the levels of PIM, which in many cases degrades over time. This is especially true in locations near the ocean, where salt water spray can cause significant corrosion. As the PIM level degrades, maintenance of the antenna or cable system can be scheduled at a convenient time, before the PIM starts to affect the capability of the base station 12 to connect and maintain calls and transfer data at optimum rates.

V) Convolutional Neural Network Pattern Recognition

To classify interference sources not readily classifiable using conventional DSP algorithms, such as ones designed by humans based on heuristics provided by human experts in the problem domain, the RANALYZER™ system 22 uses machine learning techniques, including artificial neural networks.

The interference source classification problem is related to the modulation classification problem, to which neural nets have been applied by others, including:

Biologically Inspired Radio Signal Feature Extraction with Sparse Denoising Autoencoders, Benjamin Migliori, Riley Zeller-Townson, Daniel Grady, Daniel Gebhardt, arXiv:1605.05239v1 [stat.ML] 17 May 2016. This takes advantage of sparsity, as is done in "compressed sensing".

Convolutional Radio Modulation Recognition Networks, Timothy J. O'Shea, Johnathan Corgan, T. Charles Clancy, arXiv:1602.04105v3 [cs.LG] 10 Jun. 2016. This applies Convolutional Neural Networks (CNNs), a "deep learning" approach.

The RANALYZER™ system 22 utilizes these and exploits the LTE frame structure to enable real-time processing within economical resource limits, as shown in FIG. 14.

The RANALYZER™ system 22 applies Convolutional Neural Networks (CNNs) in various ways, including:

In the pure time domain (on windowed streams of I and Q samples), from block 400 in FIG. 14.

In the pure frequency domain (on FFT outputs, whether represented as complex spectrum samples, log magnitude or histograms thereof). These come from the Spectrum Trace Processing block 424 and the 3D histogram 422.

In the joint time-frequency domain (on the LTE resource grid), from the Spectrum Trace Processing block 424, when the Spectrums from the Spectrum Trace Creation Block 420 is set to use the data from the Downlink Receiver Processing block 406 to align the spectrums to the LTE resource grid.

All of these could be live data, or stored data either internally in the I/Q Data Recording block 418, the Spectrum Recording block 426, or from the Analytic Computer Unit 30.

These input data from blocks 400, 422 and 424, or alternatively from the Analytic Computer Unit 30 are each fanned out into multiple CONV* layers 432. Each CONV* layer 432 includes a number of sub-layers, of type convolution, nonlinear activation ("ReLU"), and down-sampling or pooling ("POOL"). The exact number of each of these sub-layers and their interconnection is stored in the CNN library 178, and loaded into the CNN 176 in the Digital Signal Processor 24 based on the current scenario (see block 1a, Step 173, and the text related thereto for more details about scenarios).

The outputs from each set of CONV* blocks 432 is then fanned in to respective FC* layers 436, one each for complex I/Q samples from block 414, Spectrum Traces or 3D histograms from block 424, or spectrums of LTE symbols from also block 424. Each FC* layer contains a sequence of Fully-Connected layers, the number of which and the dimensions of which are stored in the CNN library 178 and loaded into the CNN 176 based on the current scenario.

The outputs of the respective FC* layers are then feed into respective Class Ranking blocks, 438 for LTE symbols, 440 for spectrum traces or 3D histograms, or 442 for complex I and Q samples. The Class Ranking blocks each identify several likely emitters or other problem sources, along with confidence metrics.

The outputs of the Class Ranking blocks 438, 440, and 442 are combined in the Decision Logic block 444, which combines the likely emitter estimates and confidence metrics, along with weighting factors supplied from the CNN Library 178 to arrive at a final set of likely emitter estimates along with confidence metrics. These are then sent to the Analytic Computer Unit 30 for storage in the Event System (q.v.) database and therefore archiving in memories 122, 124, 126, or 130; display to the user on Display 36; and report generation to the Equipment Monitoring System 38.

With this circuitry, the RANALYZER™ system 22 is able to perform processing on both wide and narrow spans (in time and/or frequency), with both fine and coarse resolutions (also in time and/or frequency).

While one dimensional (1-D, i.e. pure time domain or pure frequency domain) data, across a narrow span, with coarse resolution, can feasibly be processed in real time by software on a general-purpose processor, this will rarely be adequate to classify sources of interference not readily classifiable using conventional algorithms.

Moving to 2-D (joint time-frequency) data, wide spans (e.g. an entire LTE frame) and/or fine resolutions (e.g. the LTE subcarrier width of 15 kHz, or less) requires hardware acceleration, for which the RANALYZER™ system 22 uses the Digital Signal Processor 24.

It should be noted that CNNs are structured in "layers" of arbitrary dimensionality. The greatest processing load is presented by the convolutional ("CONV") sub-layers and the fully connected ("FC") sub-layers. The CONV layer processing occurs nearer the CNN inputs and is well structured, thus naturally amenable to implementation in the Digital Signal Processor 24 that provide those inputs. The nonlinear activation ("ReLU") and down-sampling (or pooling, "POOL") layers are much simpler in comparison, and are also included in the Digital Signal Processor 24 to allow easy interconnection with the FC* layers 436.

By selecting CONV filter kernel widths and so-called strides based on the LTE frame structure (e.g. frequency kernel width of 12 LTE subcarriers, and stride of half the filter width for 50% filter overlap), the CONV, ReLU and POOL layers are all easily included in the Digital Signal Processor 24.

The data reduction thus achieved reduces the size of the FC layers required, enabling them to be implemented either in the Digital Signal Processor 28, or in the Analytic Computer Unit 30. FIG. 14 shows these in the CNN block 176, however moving these to the Analytic Computer Unit 30 does not affect the overall scope of the present invention. TheClass Ranking blocks 438, 440, and 442, as well as the Decision Logic block 444 also may easily be implemented in the Analytic Computer Unit 30, again with no impact on the overall scope of the present invention.

Due to the large number of emitter types, a library 178 of neural network connections and other parameters is used for different scenarios. This reduces the required complexity of the CNN, as there may be hundreds of different emitter types, and a simple pre-classification, such as based on the frequency band of the RE can easily reduce the number of possible emitters that could be causing the interference, thus greatly simplifying the CNN needed for each scenario.

The data from the unknown signal is fed to the neural network 176, along with a selected entry from the library of neural network 178 connections to use, based on the current scenario. The CNN then indicates the best estimate of what type of emitter is causing the problem, from the ones that it has been trained on for that scenario. The CNN also provides a confidence metric for the most likely emitter, as well as other possible emitter types with sufficiently large confidence.

The library 178 is created outside the RANALYZER™ system 22 by applying the captured complex I and Q samples to a neural network circuit 176 that is set to learn that signal type. The more complex I and Q samples from similar types of rogue transmitters that are available, the better this neural network circuit 176 will be at recognizing that signal type. Since various RANALYZER™ system 22 installations are connected via a Private Internet Protocol Network 34, they can potentially monitor hundreds of thousands of receivers, a large set of captured I/Q samples is available for this learning function. This learning processes then updates the library 178 in the various RANALYZER™ system 22 units.

It should be noted that the system 22 provides data to the CNN in a variety of forms, including complex I and Q samples, complex outputs of an FFT performed on those samples, the log of the magnitude of the FFT outputs, cepstrums (the inverse FFT of the log of the FFT of the complex I and Q samples), and complex LTE symbols. The Digital Signal Process 24 has sufficient capability for creating all of these data forms.

One of the data forms the system 22 provides to the CNN is a 3D histogram of the spectrum traces. Real-time spectrum analyzer displays show a color-coded spectrum display, based on a histogram of the number of observances at each power level across the frequency range. This form of spectrum analysis which is performed by the system 22 enables users to see lower-power signals in the presence of bursty, higher-power signals. This form of analysis is ideal for detecting interference in the presence of LTE UE traffic because LTE UE traffic occurs in bursts of energy (relative to human perception). Such analysis is performed by the system 22 of the present invention. See the sub-section on Percentile Traces in Signal Displays section for more details about this.

Real-time spectrum analyzers color-code the vertical power histograms for human perception. The system 22 of the present invention uses the histogram data directly, by feeding this information into a pattern-matching neural network 176. Again, the neural-network circuit 176 is trained based on previously captured 3D histogram data, from known interference types stored in memories 124, 128, 126 or 130. In any case, the library 178 of neural-network circuits 176 is made available to all RANALYZER™ systems 22 connected in a network and exchanging information and data, so that an interference type can be recognized anywhere in that network.

W) Event System-Keeping Track of when Important Things Happen

The RANALYZER™ system 22 does not just show the spectrum and identify signals—it also keeps track of when various things happen (called Events), and stores these in a database. This database is distributed among the local system 22 on disk 124 and other RANALYZER™ systems 22 on disks 126, as well as central storage 130. A wide variety of information is stored, and a facility is provided to filter and sort the data to find what's helpful for any condition. A wide variety of events are detected by the system 22, including:

1. Identification of where the data came from, including the LTE cellIdentity, LTE PCI, and physical address of the RE.
2. The date & time the data was acquired.
3. What other data was acquired at exactly the same date and time. This is used for emitter location.
4. I/Q samples, from both the uplink and downlink directions. These are often the same I/Q samples used to make the spectrum and other data below, so further analysis can be done to find additional detail.
5. Spectrum data, derived from the uplink I/Q samples. This may be the full spectrum, part of the spectrum, spectrum with UE traffic removed, or spectrums from individual UEs.
6. PIM Identification, as described elsewhere herein.
7. Interference Identification, as described elsewhere herein.
8. RTWP data, as described elsewhere herein.
9. Diversity Imbalance; which is when the ΔRTWP is greater than a set threshold.
10. False alarm diagnoses, as described elsewhere herein.
11. ADC overload. The Analog-to-Digital Converter (ADC) in the base station receiver works over a wide range of signal levels. However, in some extreme conditions, such as the entrance to a stadium when potentially thousands of people are using their cell phones 4 at once, the total input signal power may exceed the design maximum for that ADC. In this case, the instantaneous signal level is no longer known, and the amplitudes of the I and Q signals are distorted.

This has two effects—it both makes the spectrum somewhat meaningless at that point in time, but it also is useful to indicate that the overall signal level is much higher than expected.

While most ADCs provide a direct indication of this overload, this is not carried by the CPRI interface. As such, it is necessary to estimate when this has happened by examining the I and Q signals, as well as the spectrum computed from them. When the power of the combined I and Q signal ($I^2+Q^2$) is at or very near the maximum possible value, this is a strong clue. If, in addition, the spectrum computed from the I and Q signals is much wider than normal, this is an even stronger indication. Such steps are performed by the system 22 of the present invention.

12. Spectrum Limits exceeded. Similar to a Spectrum Analyzer, the user of the system 22 can set up a Limit Line for the spectrum on the display 36—a set of amplitude points versus frequency. If the computed spectrum is higher than any of these points, that information is stored in the Event System database.
13. Trouble reports from the mobile telephone network 2, including excessive RSSI and Diversity Imbalance, as described elsewhere herein as Alarms and Indicators.
14. Excess NACK/ACK ratio for of uplink transmissions, as described elsewhere herein.

In addition to simply detecting these events, further processing performed by the system 22 of the present invention can greatly increase the usefulness of the information. Useful processing performed by the system 22 includes:

1. How long the event happens. For example, the spectrum may exceed a limit line for ten (10) seconds.
2. How many times similar events have happened. For example, the spectrum may exceed a limit line for at least one second 100 times in the last 24 hours, with the longest time being ten (10) seconds.
3. Confidence factor in the diagnosis of the event based on screening criteria and correlation of observances to the natural laws of physics.
4. Automatically storing in the database, the spectrum when the event happens, as well as the spectrum shortly before and after the event. This allows further examination of the spectrum during the event, which can provide insight into the problem.
5. Automatically storing the I/Q data in the database, to allow more detailed examination of the signal during an event, as mentioned above.
6. When the system 22 is storing traces and I/Q data related to an event, there is some complexity about where the data is stored, especially as one wants to see the spectrum or otherwise examine the signal before the event is detected. As such, it is important to recognize where these data need to be stored:
   a. High-speed RAM 114, 116 and 118 in the RANALYZER™ system 22 can be used to temporarily store traces and I/Q data while events are being detected. Large amounts of this RAM, especially 118, allow recording the traces and I/Q data for many seconds before and after the event.

b. A small but fast Solid-State Drive (SSD) 122 is used in the system 22 to quickly archive traces and I/Q data, freeing up the high-speed RAM 118 to record additional events.

c. A large hard drive 122 forming part of the system 22 can then be used to archive events, as the SSD memory 122 fills up.

d. The system 22 has a network connection 34, which also provides the capability to use large external disks 126, 130 for further archiving capability.

X) Report Generation

While simply identifying problems is very useful, for an organization to effectively deal with, and ultimately fix, those problems, some kind of report needs to be created. To speed this process, the RANALYZER™ system has several mechanisms for automatically creating reports and useful parts of reports:

1. The most common part of a report is simply a picture of the measurement screens, which may be printed by a printer 37 or displayed on a display 36.

2. When events are dynamic, seeing how the spectrum varies with time is helpful. As such, the RANALYZER™ system 22 has various tools for defining the start and end times for when a video should be made, as well as one-button method for creating the video, which may be displayed on the display 36, or exported in a standard format such as MP4 for use on various computers. The system tools for define the start and end times include:

a. Clicking on the RTWP vs. time graph.
   b. Going to the beginning or end of an event.
   c. Going to the next or previous events in time.
   d. Going to the next or previous spectrum (or sets of spectrums) in time.

3. A standardized report, printed or displayed, that includes the type of event, how long it occurred, information about how often it is occurring, and a screenshot. This may be all that is required for submitting a report to start further action in the organization.

Y) Multi-user Capability

The RANALYZER™ system 22 also allows multiple people to do these functions—observing both live and stored spectrums, spectrograms, and RTWP versus time and difference in RTWP versus time graphs. Other data recorded in the Events System database at the same time can also be observed, as well as recreating spectrums from stored I/Q data for additional analysis. This is because a C-RAN location may have hundreds of base station connections at one place, and multiple problems may be occurring at the same time.

The system 22 may also being doing an automatic diagnosis at the same time a user is looking at the spectrum (e.g.) from different REs. In this case, the automatic operation of the system can be considered a "user", even though no human is involved, since the automatic operation also consumes system resources such as connections to REs.

Z) Distance to PIM

It is helpful to have an estimated location for the junction causing the observed PIM, as this aids finding it and fixing it. There is a well-known method for distance-to-PIM (DTP), which can also be applied in the case where there are REC-to-RE connections. However, this method has a significant limitation in this environment, in that there is very little bandwidth available—leading to insufficient resolution for the position estimate.

1. Super-resolution Distance-to-PIM

A problem with distance-to-PIM (DTP) measurements using the RE-to-REC connection using the conventional method is that with the typical RF bandwidth available in remote radio heads, e.g. 10 or 20 MHz, the distance resolution available is very limited. A simple estimate of this resolution is 1/RF bandwidth, or 50 to 100 feet for 20 MHz or 10 MHz bandwidths, respectively. Somewhat better resolution may be available via interpolation or other means of extracting slightly better information from the same method, but to get to the desired resolution of one foot or less, something better is needed.

There are other methods which may be performed by the system 22 to estimate time delay that do not rely on bandwidth. For example, counting the periods of a well-known frequency can give a very precise measurement of time delay, while requiring essentially no bandwidth at all. A modern implementation of this measures the phase of I/Q vectors over time, leading to much better resolution than one period of the frequency being used.

To apply this method to a DTP measurement in an REC-to-RE environment requires several elements:

a. A multi-tone CW test signal. To generate PIM products requires at least two tones, and PIM testers to date all have used exactly two tones. For the present invention, three tones are optimally used by the system 22, as will become apparent shortly.

It should be noted that the use of such a test signal by the system 22 also causes the base station 12 to be out-of-service, so again this is best done during a maintenance window.

b. A way to measure the phase of the transmitted (downlink) and received (uplink) signals. This is easily performed by the system 22, as I/Q vectors contain this phase information. For example, the system 22 taking the arctangent of an I/Q vector for a CW signal provides the phase. This phase information can be used by the system 22 to find the precise distance to the PIM source, by translating the phase into time, and then applying the velocity-of-propagation for the medium being used.

c. However, there is another problem that needs to be solved. The transmission of I/Q vectors between the REC 18 and the RE 16 is at "baseband" frequencies. These are upconverted to the assigned RF frequency in the RE 16 for transmission, and downconverted in the RE 16 from the received signal over the air. This is done through one or more local oscillators in the RE 16. Unfortunately, the phase of the local oscillators in the RE 16 affects the phase of the transmitted and received signal.

The use of three test tones of the proper frequencies by the system 22 of the present invention allows two different PIM products to appear in the receive (uplink) frequency band; these are called in-band PIM products. This provides a way to eliminate the effect of the RE local oscillator phase on the DTP measurement. By the system 22 looking at the phase difference between the two in-band PIM products, the phase of the RE local oscillators is common, and therefore removed. The phase difference may be obtained by the system 22 in a variety of ways, including mixing them together or using a complex Fourier transform to extract the phase of each frequency independently.

This method performed by the system 22 allows the DTP resolution to be based not on the bandwidth, but on the ability to measure phase. This is limited by the signal-to-noise ratio of the received signals, which can be made large by using vary narrow bandwidth filters—the narrower the bandwidth, the lower the noise. The fundamental limitation of this technique then is how narrow a bandwidth can be used. This will be limited by how much time is available (e.g. the duration of a maintenance window), as well as the frequency variation (also known as phase noise) of the transmitted signals and the receiver's local oscillator.

AA) Interfering Emitter Location

There are three well-known methods of estimating the location of an emitter, mentioned elsewhere herein. These can be called angle-of-arrival, power-of-arrival, and time-difference-of-arrival. The system 22 of the present invention uses one or more of these techniques in combination to arrive at a position estimate.

These techniques each have significant limitations, including:
- A) Angle-of-arrival is imprecise, given the wide beamwidth of cellular antennas 10. These are typically 120°. While somewhat better angular resolution is possible than this, such as comparing the relative amplitude of antennas 10 pointed in different directions or pattern-matching received amplitudes to the antenna patterns, a precise angle is often not possible. Even without a precise angle, however, this method practiced by the system 22 can help refine a position estimate, in combination with other techniques.
- B) The multipath environment makes power-of-arrival problematic, as the power level can vary substantially over time, and be quite different than what would be expected from a free-space calculation.

Two refinements in the system 22 of the present invention that can help with power-of-arrival estimates are:
  - a. Averaging measured power over a short period of time. Multipath can make the received power vary quite quickly, and averaging performed by the system 22 can help remove this variation—as long as the emitter has not moved very far during the average. In the worst case, the emitter might be in a vehicle travelling around 100 feet per second, so averaging over a time much less than a second would sufficiently reduce the position variation due to movement.
  - b. Using multiple receive antennas 10. Multipath will be different to different receive antennas 10, so a well-known technique for radio reception which is used by the system 22 of the present invention is to use multiple receive antennas 10, along with various methods of combing the signal from each. This same technique can reduce the effects of multipath on emitter position estimates.
- C) The time-difference-of-arrival method performed by the RANALYZER™ system 22 is perhaps the most precise of the three position-estimate techniques in the REC-to-RE connection environment. However, it has a similar problem as DTP measurements-calibrating out the length of the fiber. Fortunately, many mobile network systems have this distance calibrated already, for use by the emergency call (e.g. "911" in the U.S.) system.

For systems that don't have these distances calibrated, the system 22 attempts to perform its own calibration. As mentioned in the section on distance-to-PIM measurements, this can be done by putting a high-PIM device at the antenna face, but this is quite inconvenient. The system 22 of the present invention uses any PIM source that is naturally present in the RF system (of sufficient amplitude) to estimate the length of the fiber. This is done by:
  - a. Using the known physical location of at least three different transmit and receive antennas 10. These antennas 10 may combine transmit and receive functions, or may be separate.
  - b. Having some measurable PIM source available. The location of the PIM source does not matter, but it has to be large enough to be seen by all receive antennas 10, and has to be dominant—sufficiently larger than other PIM sources (10 dB is currently deemed to be sufficient).

The PIM source may be common to all receive antennas 10, or may be separate. Separate sources may be optimal to obtaining a better signal-to-noise ratio at each receiver, but this is not strictly necessary.

It should be noted that, as in the DTP measurement, the Signal-to-Noise (SNR) ratio is important for making a good measurement, but by the system 22 using CW tones as a test signal, the SNR can be made large by using narrow receive bandwidth.
  - c. The test signal from each transmitter would be the three-tone signal for DTP measurements, but would generate PIM products at slightly different frequencies or times, to allow separating them. In the system 22 of the present invention, different times are used, so that the same frequencies can be used, ensuring that the channel conditions are the same for each measurement. It should be noted that variable multipath can change the channel conditions over time, but that averaging or simply looking for the shortest path delay can reduce this effect, as is performed by the system 22.
  - d. For the three-antenna case, we now have as many as six unknowns—the distances from the RANALYZER™ system 22 to the antennas 10, and the locations of up to three PIM sources. The system 22 also has up to nine measurements it can make for the three-antenna case, as well as the physical distances between antennas 10. Additionally, the measurements are sufficiently different to allow the use by the system 22 of algebra to solve for the locations of both the PIM sources as well as the distances to the antennas 10.

It should be noted that this may not be possible with just two antennas 10, as while there can be what appear to be sufficient measurements, they may not be different enough to allow calculating the solution.

BB) Details about MIMO Branch Comparator

As explained above, the RANALYZER™ system 22 uses the Digital Signal Processor 24 to digitally create signals that simulate internal and external PIM products. The system then compares these simulated signals to the received signals to determine with high confidence if the PIM is internal or external. The detailed steps to accomplish this are:

1. First, the system 22 determines what transmitted frequencies could combine to cause PIM in an uplink channel. Given that the frequencies and bandwidths for both transmission and reception are known, the system 22 calculates the frequencies bandwidths of intermodulation and harmonics of various intermodulation orders up to a predetermined limit, preferably $11^{th}$ order. These intermodulation products can come from any co-located transmitter, or combinations of different transmitters.

It should be noted that "intermodulation order" refers to combinations of integers used in the calculation. For example, the $5^{th}$ order products of two sinewaves at frequencies F1 and F2 happen at frequencies 3F1-2F2 and 3F2-2F1. The fact that the 3 and 2 from those formulas add up to 5 means that these are $5^{th}$ order intermodulation products.

It should also be noted that the modulation on different transmitters can be thought of as a plethora of frequencies across the modulation bandwidth. Thus, a single modulated carrier can intermodulated with itself. Also, the bandwidth of the intermodulation products of various orders is based on the modulation bandwidth of each contributing transmitted signal, as well as the intermodulation order.

2. Next, the system 22 creates a simulated PIM product for each combination of transmitted signals that it has determined above might be a cause of PIM products within the receive bandwidth of the problem uplink. There is very commonly only one combination of transmitted signals that can cause PIM, within a reasonable range of intermodulation orders, simplifying this process. Occasionally there is more than one combination that can cause PIM, but almost always they are of different orders. Since the amplitude of intermodulation products is a strong inverse function of order (i.e. higher order products are much lower in amplitude), only the lowest order products generally need to be considered. The details of creating these simulated PIM products are:

a. For the case where a single transmitted signal is intermodulated with itself, the sample rate of the I & Q samples is increased by interpolation to be sufficient to create products that are at the offset frequency between uplink and downlink. For example, with a 10 MHz LTE channel, the complex sample rate is 15.36 MHz, but an example offset between uplink and downlink LTE signals is 31 MHz. Because of the Nyquist criteria, a complex sample rate of 15.36 MHz cannot show frequency offsets greater than 15.36/2=7.68 MHz. So, the complex sample rate must be increased to at least 72 MHz. This value comes from the frequency offset, plus ½ of the bandwidth of the uplink signal, all times two. Interpolation by an integer factor is the simplest way to do this, and facilitates the later reduction in sample rate in a later step. So, the smallest integer greater than the minimum is chosen for this interpolation factor.

It should be noted that higher-order intermodulation products are generally much lower in amplitude than lower order products, and can almost always be ignored.

b. For the case where two transmitted signals are intermodulated with each other, the complex sample rate of each signal must be increased to be able to show the intermodulation products. This can be done similarly as for the single transmitted signal case above, but this processed can be simplified since the system 22 has calculated the intermodulation order that would cause a PIM signal in the problem uplink RF signal. So, instead of combining the transmitted signals at the relative frequencies used by the actual transmitters, they can be combined at a much smaller frequency offset—just large enough that the modulation from the signals doesn't overlap in frequency. The complex sample rate then must be increased only enough that the modulation order of interest is not aliased, per the Nyquist criteria. The signals are then offset by the frequency determined above—one moved down in frequency by half of that value, and the other moved up by the same amount. This frequency shift is done by multiplying the complex I and Q samples by a complex sine (or cosine) wave at the appropriate positive or negative frequency.

It should be noted that "negative frequency", while nonexistent in the real world, is a very reasonable concept in digital signal processing, by using complex numbers to represent sine and cosine waves.

c. Once the complex sample rate has been increased sufficiently, and if there are multiple transmitters from step b the signals are combined to create a new set of complex I and Q samples, the intermodulation products are created by simulating a mixing process. Ideal mixing can be done on digital samples by squaring the complex I & Q samples together, which is the same as multiplying the signal by itself. However, this would be too good-none of the needed higher-order intermodulation products would be generated. Thus, the mixing must use a better model of how PIM is created. This may be done either by multiplying the combined complex I and Q samples by a nonlinear (e.g. exponential) transfer function, but that process is complex. Instead, the Digital Signal Processor 24 multiplies the signal by itself n−1 times, where n is the needed modulation order.

d. The resulting distorted signal contains the needed PIM products, as well as many others. The complex I and Q samples that describe this signal are shifted in frequency, using the same process as mentioned in step b above, so that the frequency at the center of the needed intermodulation product (on the same sideband, upper or lower, as the actual PIM product would be) is at zero frequency. The resulting complex I and Q samples are then filtered to have the same bandwidth as the uplink signal received from the RE. This gives an emulated PIM product that describes well what actually would be received by an RE.

3. The same digital mixing process as described above is used for each MIMO antenna branch, as well as combinations of the MIMO branches. The resulting reference waveforms (not power spectrums), which are stored in memory 116 in the digital signal processor 24, are compared to the actual waveforms received.

4. If the received waveforms have a good match to the signals transmitted from just one MIMO branch (either from one or several transmitters), this is an indication of internal PIM with high confidence as shown in FIG. 15C, Box 2 (Step 158). Details about this comparison are listed below in the section on MIMO Branch Comparison Details about PIM Location.

This information is then stored in the Events System database (q.v.), and the system 22 proceeds as shown in FIG. 15C, Box 4 (Step 160), to schedule a distance to PIM measurement. Knowing where internal PIM is located is helpful to know what to fix.

5. If the match is high between the digital mixing products for the transmitters for each MIMO antenna branch and the receivers for each MIMO branch, and more importantly for the combination of MIMO branches, then the problem is diagnosed as external PIM with very high confidence, also as shown in FIG. 15C, Box 2 (Step 158). The fact that a match was found is stored in the Events System database (q.v.), and the system 22 again proceeds as shown in FIG. 15C, Box 4 (Step 160), to schedule a distance-to-PIM measurement during a maintenance window. See the section Automatic Tests during the Maintenance Window herein for more details on this topic. Knowing how far external PIM is from the RE 16 is helpful to locate the source of that PIM, and correct it.
6. If, however, the match is high for individual branches, but low for the combination of branches, this is diagnosed as multiple internal PIM, and the specific branches (if more than 2) are identified. The system 22 then proceeds as above in step 5, identify which branch has the PIM problem. Note that information from the Equipment Monitoring System 38 is used to identify the physical MIMO branch, as the system 22 only knows which antenna container (A×C) has the internal PIM problem.
7. If, the match is only high for one branch, then this is diagnosed as internal PIM for that branch. The system 22 then proceeds as above in step 5, identify which branch has the PIM problem. Once again, information from the Equipment Monitoring System 38 is used to identify the physical MIMO branch.

It should be noted that this technique works best when there is no uplink traffic, which can be helped by making an OCNS test during a maintenance window. See the section on Automatic Tests during the Maintenance Window for more details about this. Another advantage of doing OCNS testing during a maintenance window is that the transmitters for each MIMO branch can be turned on independently, further improving the match, or lack of match to predicted behavior.

Several example PIM scenarios for two MIMO branches are listed below, and the comparison results for those scenarios are listed in Table 5. These examples are for cross-polarized antennas with 2 MIMO branches. Higher numbers of MIMO branches and spatially-separated antennas will have somewhat different results, not shown here.

Example PIM scenarios:
A) Internal PIM (iPIM) that only affects MIMO branch 1.
B) Internal PIM on both MIMO branch 1 and branch 2. Good isolation between branches (e.g. no reflector).
C) Internal PIM on MIMO branch 1, reflected to MIMO branch 2 via external reflector.
D) External PIM (ePIM) that is equal in both MIMO branches.
E) External PIM that is weak, and only seen in one branch 1.
F) External PIM reflected to both MIMO branch 1 and branch 2, seen much higher in branch 1 than branch 2, due to an external object that polarizes the PIM signal.

In Table 5:
The top row shows the scenario (A-F) from the above list.
The second row is an indication of how common this scenario occurs in the real world, based on the experience of the present authors.
The third row is a short description of the scenario, matching the longer descriptions given above.
The seven cells labelled "Comparisons" in the first column can be interpreted as follows. Each comparison (e.g. correlation) is between a predicted ("P") PIM waveform based on the process described above, and an observed ("O") waveform. The numbers after the letters P or O are the branches that are either predicted or observed. Thus, "Corr (P1, O1)" the match (in each scenario) between intermodulation products coming from the signals transmitted only through MIMO branch 1 then predicted with the process described above, and the observed in MIMO branch 1. "Corr (P(1+2), O2) indicates the match (again for each scenario) between intermodulation products from the signals transmitted through both MIMO branch 1 and MIMO branch 2 and again predicted with the process described above, and observed in MIMO branch 2

TABLE 5

Relative Comparisons for Example PIM Scenarios

| Scenarios | A | B | C | D | E | F |
|---|---|---|---|---|---|---|
| How common | 1 | 5 | 6 | 2 | 3 | 4 |
| Short description | iPIM on 1 | iPIM on both branches | iPIM on 1, external reflector | ePIM, equal on both | Weak ePIM, favors 1 | Polarized ePIM, favors 1 |
| Comparisons | | | | | | |
| Corr (P1, O1) | High | High | High | Medium | Medium | High |
| Corr (P2, O1) | Low | Low | Low | Medium | Low | Low |
| Corr (P(1 + 2), O1) | Low | Low | Low | High | Medium+ | Highest |
| Corr (P1, O2) | Low | Low | Medium | Medium | Low | Medium |
| Corr (P2, O2) | Low | High | Low | Medium | Low | Low |
| Corr (P(1 + 2), O2) | Low | Low | Low | High | Low | Almost Highest |
| Corr (O1, O2) | Low | Low | Low-Medium | High | Low | Medium |

CC) Using Vehicle-Mounted Receivers to Enhance Position Estimation

One of the limitations of using multiple REs 16 to estimate the position of a problem emitter (rogue transmitter, malfunctioning UE or unmanaged BDA) is that the signal level may be too low to detect from other REs 16 than the one with the problem. A way to overcome this is to dispatch a mobile receiver, such as vehicle, which can be manned or unmanned, and on the surface on in the air (see, for example, FIG. 15D, Box 4 [Step 190] or Box 12 [Step 188]). Preferably this vehicle is a drone, also known as an unmanned aerial vehicle. If equipped with hardware like the RANA-LYZER™ system 22 (preferably hardware like used in the Macro site context due to weight limits of drones), this can provide better signal strength than the non-problem REs 16 can—once the drone is close enough to the problem emitter. The system 22 does this in one or more of the following ways:

a. Preferably, for locating BDAs, the vehicle sends brief, high-power pulses in the uplink frequency range. The RANALYZER™ system 22 with the problem RE 16 then measures the time between the transmitted pulse when received at the RE 16, and any repetition of the pulse as made by the BDA. If the distance between the vehicle and BDA is too short, the received pulse from the BDA may start before the transmitted pulse is finished. In this case, the width of the pulse will appear longer at the RE 16, so the RANALYZER™ system 22 can compare the received pulse width to an expected pulse width stored in memories 118 and 124, as well as noting that the vehicle is close to the BDA. This provides a range of approximate locations for the BDA around the vehicle location, which is measured with a GPS or similar receiver and reported to the RANALYZER™ system 22. This is repeated at several drone locations, and the overlap in possible positions is determined by the system 22. This overlap provides a good estimate of the location of the BDA.

i. There are several techniques that the system 22 uses to enhance this capability, including
  1. During non-maintenance-window times, keeping the pulse width preferably brief enough that uplink traffic is not affected much, ideally less than what the LTE error correction system can compensate for, without requiring retransmissions.
  2. Transmission just barely into guard bands between channels. If the BDA has sufficient gain at these frequencies, the system 22 can still see a response, but the effects on the mobile network traffic will be minimal.
  3. If the BDA can't be seen during non-maintenance-window times, scheduling a test during a maintenance window via the Equipment Monitoring System 38. Since the test signal will not be affecting service nearly as much at these times, longer pulses can be used. These have higher energy, and with pulse-compression modulation (e.g. chirped frequency modulation, or phase modulation) like RADAR systems, can still give good distance resolution.

b. For any problem emitter, the system 22 records uplink I/Q samples into memories 118 and 122 for later analysis, triggered by a known time signal, such as a one pulse-per-second signal from a GPS receiver. The IEEE-1588 Precision Time Protocol is alternative to using a GPS receiver, but at the present time the performance of IEEE-1588 may be insufficient for this task.

It should be noted that while this method can work for BDAs, it is reliant on a UE transmitting a signal while the vehicle is in the area. While UEs often transmit brief messages, the BDA may have to be near a UE that is turned on, so if a transmitter is available, the previous technique used by the system 22 is advantageous for the BDA case. Details of this method performed by the system 22 are:
  i. Due to limited memory, the capture happens at specific times, either predetermined or signaled live from a RANALYZER™ system 22 to the vehicle.
  It should be noted that this RANALYZER™ system 22 may be either the RANALYZER™ system 22 connected to the problem RE 16, or any other one that has access to the data from it. Scheduling of the measurements can be also be done by either of these RANALYZER™ systems 22.
  ii. Meanwhile, the RANALYZER™ system 22 captures the uplink and downlink I/Q samples at the same time, again based on a known time signal such as from GPS or IEEE 1588 Precision Time Protocol.
  iii. Either while dispatched, or preferably when the vehicle returns to base, the I/Q samples are uploaded to a RANALYZER™ system 22. Again, this RANALYZER™ system 22 can be the unit connected to the problem RE 16, or a network-connected unit that has access to the data from it.
  iv. The I/Q samples from the RANALYZER™ system 22 and the drone are processed by the system 22 in the same way as for multiple-receiver analysis. In this case the drone is just another receiver, but one that can be positioned relatively close to the BDA.
  v. If the RANALYZER™ system 22 in the vehicle has sufficient processing power, it may record signals from the problem emitter at various locations, process and analyze them and automatically identify the location of the problem emitter. The required processing power is quite small for emitters that are continuously (or at least continually) on, or that are easily separable from other signals, such as a large CW signal that is on for significant times.
  However, for BDAs or problem UEs, the problem signal is difficult to separate from the normal uplink traffic. The digital signal processor circuitry 24 in the RANALYZER™ system 22 is sufficient to do this separation, so either a RANALYZER™ system 22 could be deployed in the vehicle, or I/Q samples can be captured in the vehicle and processed later in a separate RANALYZER™ system 22.
  vi. In order to have a signal to measure, the RANALYZER™ system 22 can request from the mobile network 2, via the Equipment Monitoring System 38, that the network 2 repeatedly commands the UE to make measurements of the transmission channel, and then transmit this measurement data. In LTE, UEs can measure various conditions and report this to the network 2. The RANALYZER™ system 22 exploits this function to provide a signal to measure, when looking for BDAs or distorted UEs.

c. The time for these measurements would commonly be scheduled during a maintenance window to cause minimal impact on the network 2. However, the problem UE and/or BDA must be operating at this point in time for this technique to be effective. By monitoring the problem RE 16 over at least one maintenance window before dispatching a vehicle, the system 22 can determine times when the problem is happening, allowing the RANALYZER™ system 22 to request an optimum time for the measurements.

The system 22 and method of the present invention, as well as a preferred form of the switching sub-assembly 26, will now be further described. In accordance with the present invention, a system 22 for automatically determining the cause of distortion or corruption of signals is connectable to a cellular communications network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. Preferably, the system 22 comprises: a switching sub-assembly 26, the switching sub-assembly 26 being operatively coupled to the uplink and downlink signal transmission media and providing as output signals therefrom the transport digital data signals of selected uplink and downlink signal transmission media, including the I and Q digital data signals, carried thereby; a digital signal processor 24, the digital signal processor 24 being responsive to the output signals of the switching sub-assembly 26 and extracting the I and Q digital data signals from the transport digital data signals carried by the selected uplink and downlink signal transmission media, the digital signal processor 24 processing the extracted I and Q digital data signals and generating therefrom signal spectrum data relating thereto; an analytic computer unit 30 operatively coupled to the digital signal processor 24, the analytic computer unit 30 receiving the signal spectrum data generated by the digital signal processor 24, the analytic computer unit 30 generating a control signal, the switching sub-assembly 26 being responsive to the control signal and providing as the output signals therefrom the transport digital data signals of selected uplink and downlink transmission media in response thereto, the analytic computer unit 30 analyzing the signal spectrum data, at least one of the digital signal processor 24 and the analytic computer unit 30 including: at least one comparator 508 and at least one memory 506 operatively coupled to the at least one comparator 508, the at least one memory 506 storing therein reference spectra of normal cellular communications signals having no distortion or corruption or abnormal cellular communications signals having known causes of signal distortion or corruption, the at least one comparator 508 comparing the signal spectrum data with the reference spectra stored in the at least one memory 506 to determine if the signal spectrum data has similar or dissimilar characteristics to the characteristics of the stored reference signal spectra, and generating a first signal corresponding to one or more possible causes of signal distortion or corruption relating thereto, the analytic computer unit 30 analyzing the possible cause first signal from the comparator and determining therefrom a probable cause of signal distortion or corruption, the analytic computer unit 30 generating a probable cause signal corresponding to the probable cause of signal distortion or corruption; and a display, the display being responsive to the probable cause output signal generated by the analytic computer unit 30 and displaying thereon the probable cause of signal distortion or corruption of the signal corresponding to the probable cause output signal generated by the analytic computer unit 30.

Preferably, the system 22 is connectable to a network wherein the uplink and downlink signal transmission media includes at least one of fiber optic transmission lines, coaxial cables and wireless, free space, transmission media or wherein the uplink and downlink signal transmission media are fiber optic signal transmission lines. In such a case, the transport digital data signals, including the I and Q digital data signals, are in optical format, and wherein the system 22 further comprises: an optical-to-electrical signal converter 28, the optical-to-electrical signal converter 28 being operatively coupled to the uplink and downlink fiber optic transmission lines and converting the optical transport digital data signals, including the I and Q digital data signals, in optical format, into corresponding electrical transport digital data signals, including electrical I and Q digital data signals respectively corresponding to the optical I and Q digital data signals, the optical-to-electrical signal converter 28 providing output signals corresponding thereto, the switching sub-assembly 26 being responsive to the output signals of the optical-to-electrical signal converter 28.

The system 22 may further comprise an optical-to-electrical signal converter 28, the optical-to-electrical signal converter 28 being responsive to the output signals of the switching sub-assembly 26 and converting the optical transport digital data signals, including the optical I and Q digital data signals, of the selected uplink and downlink fiber optic signal transmission lines into corresponding electrical transport digital data signals, including electrical I and Q digital data signals respectively corresponding to the optical I and Q digital data signals, the optical-to-electrical signal converter 28 providing output signals corresponding to the electrical transport digital data signals, the digital signal processor 24 being responsive to the output signals of the optical-to-electrical signal converter 28.

The cellular communications network may further include an equipment monitoring system 22 which generates alarm signals or indicator signals representing abnormal conditions relating to the radio equipment 16. In such a case, the at least one memory 506 stores therein as a look-up table a set of alarm data or indicator data corresponding to the alarm signals or indicator signals received from the network equipment monitoring system 22, and a list of possible causes of signal distortion or corruption associated with the alarm data or indicator data of the stored set of alarm data or indicator data, the at least one comparator 508 receiving the alarm or indicator signals from the network equipment monitoring system 22 and comparing the alarm or indicator signals with the set of alarm data or indicator data stored in the at least one memory 506, and generating a second signal corresponding to possible causes of signal distortion or corruption relating to a received alarm signal or indicator signal, the analytic computer unit 30 analyzing the second possible cause signal and the first possible cause signal from the comparator and determining therefrom a probable cause of signal distortion or corruption, the analytic computer unit 30 generating a probable cause signal corresponding to the probable cause of signal distortion or corruption.

The display is one of a liquid crystal display (LCD) and a light emitting diode (LED) display; and wherein the analytic computer unit 30 generates a spectral output signal of a frequency spectrum trace from the signal spectrum data, the display being responsive to the spectral output signal and displaying thereon the frequency spectrum trace.

The system 22 may further comprise a web server 32, the web server 32 being operatively coupled to the analytic computer unit 30 and being coupleable to an internet protocol network, the web server 32 providing the probable cause output signal to the internet protocol network when the web server 32 is coupled thereto.

The display may be remotely located from the analytic computer unit 30 and is operatively coupled to the web server 32 through the internet protocol network.

The analytic computer unit 30 may generate a spectral output signal of a frequency spectrum trace from the signal spectrum data, and the display may be responsive to the spectral output signal and displaying thereon the frequency spectrum trace; and wherein the web server 32 provides the spectral output signal to the internet protocol network when the web server 32 is coupled thereto.

The display may be remotely located from the analytic computer unit 30 and is operatively coupled to the web server 32 through the internet protocol network.

The at least one memory 506 preferably includes a high speed, solid state memory and a hard disk drive memory operatively coupled to the solid state memory, at least one of the solid state memory and the hard disk drive memory storing therein at least one of the extracted electrical I and Q digital data signals of the output signals of the digital signal processor 24 and the signal spectrum data generated by the digital signal processor 24.

The at least one memory 506 may include a non-transitory recording medium, wherein the non-transitory recording medium is one of a random access memory (RAM), a dynamic random access memory (DRAM) and a digital storage disk.

The digital signal processor 24 may include a high speed, static random access memory (SRAM), the SRAM storing therein at least one of the extracted electrical I and Q digital data signals and the signal spectrum data.

In one form of the invention, the display is responsive to the first possible cause signal generated by the at least one comparator 508 and displays in response thereto possible causes of signal distortion or corruption relating to a received alarm signal or indicator signal. The display may be responsive to the second possible cause signal generated by the at least one comparator 508 and displays in response thereto possible causes of signal distortion or corruption relating to the signal spectrum data.

In one form of the invention, the digital signal processor 24 extracts from the I and Q digital data signals at least one of Physical Cell Identity (PCI) codes and CellIdentity codes and generates at least one of a PCI code signal representative of the PCI codes and a CellIdentity code signal representative of the CellIdentity codes, at least one of the PCI code signal and the CellIdentity code signal being provided to the at least one comparator 508; wherein the at least one memory 506 has stored therein a list of at least one of PCI codes and CellIdentity codes, each stored PCI code and CellIdentity code corresponding to a particular radio equipment 16; wherein the at least one comparator 508 compares the at least one of the PCI code signal and the CellIdentity code signal received from the digital signal processor 24 with the list of the at least one of the PCI codes and the CellIdentity codes stored in the at least one memory 506 and provides an RE identification signal representative of the particular radio equipment 16; and wherein the analytic computer unit 30 is responsive to the RE identification signal from the at least one comparator 508 and generates the control signal provided to the switching sub-assembly 26 based at least partially thereon, the switching sub-assembly 26 being responsive to the control signal and providing as output signals therefrom the transport digital data signals, including I and Q digital data signals, of selected uplink and downlink transmission media.

In another form of the invention, the display is responsive to at least one of the first possible cause signal and the second possible cause signal and displays in response respectively thereto at least one of 1) possible causes of signal distortion or corruption relating to the received alarm signal or indicator signal, and 2) possible causes of signal distortion or corruption relating to the signal spectrum data. The possible causes of signal distortion or corruption relating to the received alarm signal or indicator signal having a first degree of probability of accuracy, and the possible causes of signal distortion or corruption relating to the signal spectrum data having a second degree of probability of accuracy, the second degree of probability of accuracy being greater than the first degree of probability of accuracy.

In one form of the system 22 of the present invention, the digital signal processor 24 extracts from the I and Q digital data signals ACK (Acknowledgement) codes and NACK (Not Acknowledgement) codes, and generates an ACK signal and NACK signal respectively representative of the ACK codes and NACK codes; wherein the analytic computer unit 30 further includes at least one counter, the at least one counter being responsive to the ACK signal and the NACK signal and effectively counting the number of times the ACK codes and the NACK codes appear in the I and Q digital data signal within a predetermined period of time and providing an ACK count signal and a NACK count signal in response thereto; and wherein the analytic computer unit 30 determines from the ACK count signal and the NACK count signal a ratio between the ACK codes and the NACK codes, and causes the at least one memory 506 to store therein the period of time when the ratio is greater than a predetermined threshold.

In another form of the invention, the digital signal processor 24 extracts from the I and Q digital data signals NACK (Not Acknowledgement) codes, and generates a NACK signal representative of the NACK codes; wherein the analytic computer unit 30 further includes at least one counter, the at least one counter being responsive to the NACK signal and effectively counting the number of times the NACK codes appear in the I and Q digital data signal within a predetermined period of time and providing a NACK count signal in response thereto; and wherein the analytic computer unit 30 determines from the NACK count signal whether the NACK codes appear in the I and Q digital data signal more than a predetermined number of times during the predetermined period of time.

In yet another form, the digital signal processor 24 extracts from the I and Q digital data signals PDCCH (Physical Downlink Control Channel) codes and generates a PDCCH code signal representative of the PDCCH codes, the PDCCH code signal being provided to the analytic computer unit 30; wherein the analytic computer unit 30 determines from the PDCCH code signal times or frequencies when or spectrally where no cellular communications signals are transmitted by cellular telephones communicating with at least one particular radio equipment 16 of the cellular communications network, and analyzes the signal spectrum data at said times or frequencies.

The analytic computer unit 30 may include a clock unit, the clock unit monitoring at least one of the time of the day, the week, the month and the year, the clock unit generating a clock signal in response thereto; wherein the at least one memory 506 has stored therein known predetermined times of the day, the week, the month or the year when cellular communications signals transmitted between the cellular communications network and cellular telephones communicating with the cellular communication network are less frequent than at other times of the day, the week, the month or the year; and wherein, in response to the clock signal, the analytic computer unit 30 analyzes the signal spectrum data of the I and Q digital data signals occurring at a known predetermined time of the day, the week, the month or the year when cellular telephone communications with the cellular communications network are less frequent.

Preferably, the analytic computer unit 30 analyzes the signal spectrum data and determines if communications signal noise, distortion or corruption is present in the signal spectrum data, the analytic computer unit 30 generating an event occurrence signal in response thereto; wherein the analytic computer unit 30 further includes an events counter, the events counter, in response to the event occurrence signal, counting the number of times similar types of signal noise, distortion or corruption are present in the signal spectrum data over a predetermined period of time, the events counter generating a similar events count signal in response thereto; and wherein the at least one memory 506 stores therein the similar events count signal.

The signal spectrum data has a slope associated therewith over a particular frequency range. The analytic computer unit 30 quantifies the slope of the signal spectrum data over the particular frequency range and provides therefrom a quantified slope signal; and the analytic computer unit 30 analyzes the quantified slope of the signal spectrum data from the quantified slope signal to determine at least partially therefrom the probable cause of signal distortion or corruption.

Preferably, at least one of the digital signal processor 24 and the analytic computer unit 30 determines from the signal spectrum data the power level of cellular communications signals.

In yet another form of the invention, the digital signal processor 24 extracts from the I and Q digital data signals PDCCH (Physical Downlink Control Channel) codes and determines therefrom the modulation format of cellular communications signals received by a radio equipment 16; wherein at least one of the digital signal processor 24 and the analytic computer unit 30 determines from the signal spectrum data the power level of the cellular communications signals; wherein the at least one memory 506 has stored therein known modulation formats and power levels associated with the known modulation formats which are expected to be received by the radio equipment 16; wherein the at least one comparator 508 compares the modulation format and the power level determined by the at least one of the analytic computer unit 30 and the digital signal processor 24 with the known modulation formats and associated power levels stored in the at least one memory 506 and generates a power level signal if the power level determined by the at least one of the digital signal processor 24 and the analytic computer unit 30 is different from the stored power level associated with a stored known modulation format that is the same as or similar to the modulation format of the signal spectrum data; and wherein the analytic computer unit 30, in response to the power level signal, determines at least partially therefrom the probable cause of signal distortion or corruption.

In yet another form, the analytic computer unit 30 further includes a pattern recognition neural network 500 and a database operatively coupled to the pattern recognition neural network 500, the database containing a library 514 of different interference scenarios which can cause signal distortion or corruption; wherein the neural network 500 analyzes at least the signal spectrum data and, based on the library 514 of different interference scenarios contained in the database, characterizes the interference scenario that may effect the signal spectrum data, the neural network 500 generating a pattern recognition signal in response thereto; and wherein the analytic computer unit 30, in response to the pattern recognition signal from the neural network 500, determines at least partially therefrom the probable cause of signal distortion or corruption.

The radio receiver controller of the cellular communications network may include an analog-to-digital converter 28 (ADC), wherein the total received signal power of the radio equipment 16 may exceed a maximum allowable signal power level of the ADC in the radio equipment 16, resulting in the I and Q signal components becoming distorted. The analytic computer unit 30 analyzes the signal spectrum data and determines therefrom the power level of the combined I and Q signal components ($I^2+Q^2$) and generates a combined power level signal representative thereof. The at least one memory 506 has stored therein a predetermined threshold power level. The at least one comparator 508, in response to the combined power level signal, compares the power level of the combined I and Q signal components with the stored predetermined threshold power level and provides an excessive power level signal in response thereto indicative of when the power level of the combined I and Q signal components exceeds the predetermined threshold power level. The analytic computer unit 30, in response to the excessive power level signal, determines at least partially therefrom that distortion of the I and Q signal components is probably caused by the maximum allowable signal power level of the ADC in the radio equipment 16 being exceeded.

In accordance with the present invention, a method for determining the cause of distortion or corruption of signals in a cellular communications network will now be described. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. The method comprises the steps of operatively coupling to the uplink and downlink signal transmission media, and providing the transport digital data signals of selected uplink and downlink signal transmission media, including the I and Q digital data signals, carried thereby; extracting the I and Q digital data signals from the transport digital data signals carried by the selected uplink and downlink signal transmission media; processing the extracted I and Q digital data signals, and generating therefrom signal spectrum data relating thereto; storing reference spectra of normal cellular communications signals having no distortion or corruption or abnormal cellular communications signals having known causes of signal distortion or corruption; comparing the signal spectrum data with the stored reference spectra to determine if the signal spectrum data has similar or dissimilar characteristics to the characteristics of the stored reference signal spectra, and generating a first signal corresponding to one or more possible causes of signal distortion or corruption relating thereto; analyzing the possible cause first signal and determining therefrom a probable cause of signal distortion or corruption, and generating a probable cause signal corresponding to the probable cause of signal distortion or corruption; and displaying, in response to the probable cause output signal, the probable cause of signal distortion or corruption.

The uplink and downlink signal transmission media may be fiber optic signal transmission lines, and the transport digital data signals, including the I and Q digital data signals, are in optical format. In such a case, the method further comprises the steps of: converting the optical transport digital data signals, including the I and Q digital data signals, in optical format, into corresponding electrical transport digital data signals, including electrical I and Q digital data signals respectively corresponding to the optical I and Q digital data signals, and providing output signals corresponding thereto. Alternatively, the method further comprises the steps of: converting the optical transport digital data signals, including the optical I and Q digital data signals, of the selected uplink and downlink fiber optic signal transmission lines into corresponding electrical transport digital data signals, including electrical I and Q digital data signals respectively corresponding to the optical I and Q digital data signals, and providing output signals corresponding to the electrical transport digital data signals.

The cellular communications network may further include an equipment monitoring system 22 which generates alarm signals or indicator signals representing abnormal conditions relating to the radio equipment 16. Then, the method further comprises the steps of: storing as a look-up table a set of alarm data or indicator data corresponding to the alarm signals or indicator signals received from the network equipment monitoring system 22, and a list of possible causes of signal distortion or corruption associated with the alarm data or indicator data of the stored set of alarm data or indicator data; receiving the alarm or indicator signals from the network equipment monitoring system 22; comparing the alarm or indicator signals with the stored set of alarm data or indicator data, and generating a second signal corresponding to possible causes of signal distortion or corruption relating to a received alarm signal or indicator signal; and analyzing the second possible cause signal and the first possible cause signal and determining therefrom a probable cause of signal distortion or corruption, and generating the probable cause signal corresponding to the probable cause of signal distortion or corruption. Also, the method may further comprise the steps of: generating a spectral output signal of a frequency spectrum trace from the signal spectrum data, and displaying on a display the frequency spectrum trace.

The method may include the step of: operatively coupling a web server 32 to an internet protocol network, and providing by the web server 32 the probable cause output signal to the internet protocol network. Also, the method may include operatively coupling to the web server 32 through the internet protocol network a remotely located display.

The method, in one form, may further comprise the steps of: generating a spectral output signal of a frequency spectrum trace from the signal spectrum data, and displaying on a display the frequency spectrum trace; and providing by the web server 32 the spectral output signal to the internet protocol network. Also, the method may include the step of: remotely locating the display from the web server 32, and operatively coupling the display to the web server 32 through the internet protocol network.

In accordance with one form, the method may further comprise the step of: storing on at least one of a high speed, solid state memory and a hard disk drive memory operatively coupled to the solid state memory at least one of the extracted I and Q digital data signals and the signal spectrum data. Furthermore, the method may include storing at least one of the extracted I and Q digital data signals and the signal spectrum data on a non-transitory recording medium, such as a random access memory (RAM), a dynamic random access memory (DRAM) and a digital storage disk. Additionally, the method may include storing the extracted I and Q digital data signals on a high speed, static random access memory (SRAM).

In accordance with the present invention, the method may comprise the steps of: extracting from the I and Q digital data signals at least one of Physical Cell Identity (PCI) codes and CellIdentity codes, and generating at least one of a PCI code signal representative of the PCI codes and a CellIdentity code signal representative of the CellIdentity codes; storing a list of at least one of PCI codes and CellIdentity codes, each stored PCI code and CellIdentity code corresponding to a particular radio equipment 16; comparing the at least one of the PCI code signal and the CellIdentity code signal with the stored list of the at least one of the PCI codes and the CellIdentity codes, and providing an RE identification signal representative of the particular radio equipment 16; and providing, in response to the RE identification signal, the transport digital data signals, including I and Q digital data signals, of selected uplink and downlink transmission media. Furthermore, the method may include displaying at least one of 1) possible causes of signal distortion or corruption relating to the received alarm signal or indicator signal, and 2) possible causes of signal distortion or corruption relating to the signal spectrum data. The possible causes of signal distortion or corruption relating to the received alarm signal or indicator signal have a first degree of probability of accuracy, and the possible causes of signal distortion or corruption relating to the signal spectrum data have a second degree of probability of accuracy, the second degree of probability of accuracy being greater than the first degree of probability of accuracy.

Additionally, a preferred form of the method comprises the steps of: extracting from the I and Q digital data signals ACK (Acknowledgement) codes and NACK (Not Acknowledgement) codes; effectively counting the number of times the ACK codes and the NACK codes appear in the I and Q digital data signal within a predetermined period of time, and providing an ACK count signal and a NACK count signal in response thereto; and determining from the ACK count signal and the NACK count signal a ratio between the ACK codes and the NACK codes, and storing the period of time when the ratio is greater than a predetermined threshold.

In another form, the method further comprises the steps of: extracting from the I and Q digital data signals NACK (Not Acknowledgement) codes; effectively counting the number of times the NACK codes appear in the I and Q digital data signal within a predetermined period of time, and providing a NACK count signal in response thereto; and determining from the NACK count signal whether the NACK codes appear in the I and Q digital data signal more than a predetermined number of times during the predetermined period of time.

In yet another form, the method further comprises the steps of: extracting from the I and Q digital data signals PDCCH (Physical Downlink Control CHannel) codes, and generating a PDCCH code signal representative of the PDCCH codes; and determining from the PDCCH code signal times or frequencies when or spectrally where no cellular communications signals are transmitted by cellular telephones communicating with the cellular communications network, and analyzing the signal spectrum data at said times or frequencies.

In still another form, the method further comprises the steps of: monitoring at least one of the time of the day, the week, the month and the year, and generating a clock signal in response thereto; storing known predetermined times of the day, the week, the month or the year when cellular communications signals transmitted between the cellular communications network and cellular telephones communicating with the cellular communication network are less frequent than at other times of the day, the week, the month or the year, and analyzing the signal spectrum data of I and Q digital data signals occurring at a known predetermined time of the day, the week, the month or the year when cellular telephone communications with the cellular communications network are less frequent.

The method may include the steps of: analyzing the signal spectrum data and determining if communications signal noise, distortion or corruption is present in the signal spectrum data, and generating an event occurrence signal in response thereto; counting, in response to the event occurrence signal, the number of times similar types of signal noise, distortion or corruption are present in the signal spectrum data over a predetermined period of time, and generating a similar events count signal in response thereto; and storing the similar events count signal.

The signal spectrum data has a slope associated therewith over a particular frequency range. Then, the method further comprises the steps of: quantifying the slope of the signal spectrum data over the particular frequency range, and providing therefrom a quantified slope signal; and analyzing the quantified slope of the signal spectrum data from the quantified slope signal, and determining at least partially therefrom the probable cause of signal distortion or corruption.

In yet another form, the method further comprises the steps of: analyzing the signal spectrum data and determining therefrom the power level of cellular communications signals.

The method of the present invention may include the steps of: extracting from the I and Q digital data signals PDCCH (Physical Downlink Control Channel) codes, and determining therefrom the modulation format of cellular communications signals received by a radio equipment 16; determining from the signal spectrum data the power level of the cellular communications signals; storing known modulation formats and power levels associated with the known modulation formats which are expected to be received by the radio equipment 16; comparing the determined modulation format and the power level with the stored known modulation formats and associated power levels, and generating a power level signal if the determined power level is different from the stored power level associated with a stored known modulation format that is the same as or similar to the modulation format of the signal spectrum data; and determining at least partially therefrom the probable cause of signal distortion or corruption.

Also, the method in one form includes the steps of: using a pattern recognition neural network 500 and a database operatively coupled to the pattern recognition neural network 500; storing in the database a library 514 of different types of known interference which can cause signal distortion or corruption; analyzing by the neural network 500 at least the signal spectrum data and, based on the library 514 of different types of known interference stored in the database, characterizing the type of interference that may effect the signal spectrum data, and generating by the neural network 500 a pattern recognition signal in response thereto; and determining at least partially from the pattern recognition signal the probable cause of signal distortion or corruption.

The radio receiver controller of the cellular communications network includes an analog-to-digital converter 28 (ADC), and wherein the total received signal power of the radio equipment 16 may exceed a maximum allowable signal power level of the ADC in the radio equipment 16, resulting in the I and Q signal components becoming distorted. To detect such distortion, the method preferably comprises the steps of: analyzing the signal spectrum data and determining therefrom the power level of the combined I and Q signal components ($I^2+Q^2$), and generating a combined power level signal representative thereof; storing a predetermined threshold power level; comparing, in response to the combined power level signal, the power level of the combined I and Q signal components with the stored predetermined threshold power level, and providing an excessive power level signal in response thereto indicative of when the power level of the combined I and Q signal components exceeds the predetermined threshold power level; and determining, in response to the excessive power level signal, at least partially therefrom that distortion of the I and Q signal components is probably caused by the maximum allowable signal power level of the ADC in the radio equipment 16 being exceeded.

In yet another form of the present invention, a method for determining the cause of distortion or corruption of signals is connected to a cellular communications network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. The cellular communications network further includes an equipment monitoring system 22 which generates alarm signals or indicator signals representing abnormal conditions relating to the radio equipment 16. The method comprises the steps of: receiving the alarm or indicator signals from the network equipment monitoring system 22; determining from the received alarm or indicator signal a particular radio equipment 16 to monitor, operatively coupling to selected uplink and downlink signal transmission media relating to the particular radio equipment 16, and providing the transport digital data signals of the selected uplink and downlink signal transmission media, including the I and Q digital data signals, carried thereby; extracting the I and Q digital data signals from the transport digital data signals carried by the selected uplink and downlink signal transmission media; processing the extracted I and Q digital data signals using a Fourier Transform algorithm, and generating therefrom signal spectrum data relating thereto; and analyzing the signal spectrum data to detect if a signal distortion event has occurred or whether the received alarm or indicator signal was a false alarm.

Preferably, the step of analyzing the signal spectrum data to detect if a signal distortion event has occurred includes the sub-step of: comparing the signal spectrum data with stored reference spectra of normal cellular communications signals having no distortion or corruption or abnormal cellular communications signals having known causes of signal distortion or corruption to determine if the signal spectrum data has similar or dissimilar characteristics to the characteristics of the stored reference signal spectra.

The method may further include the step of: when a signal distortion event has been detected, determining a time when the particular radio equipment 16 receives no or minimal communications signals from mobile cellular communications devices; and analyzing the extracted I and Q digital data signals or the signal spectrum data relating thereto of the transport digital data signals carried by the selected uplink and downlink signal transmission media and occurring at the determined time of no or minimal communications signals.

Also, the method may further comprise the step of: comparing the signal spectrum data which exhibits no or minimal communications signals relating to the extracted I and Q digital data signals occurring at the determined time with stored reference spectra of normal cellular communications signals having no distortion or corruption or abnormal cellular communications signals having known causes of signal distortion or corruption to determine if the signal spectrum data has similar or dissimilar characteristics to the characteristics of the stored reference signal spectra, and determining therefrom the probable cause of signal distortion.

Preferably, the step of determining the probable cause of signal distortion includes at least one of the sub-steps of: determining whether the probable cause of signal distortion is passive intermodulation distortion; determining whether the probable cause of signal distortion is an interfering signal; and determining that no signal is detected that would be the probable cause of signal distortion.

The step of determining whether the probable cause of signal distortion is passive intermodulation distortion may include the sub-steps of: calculating the slope of the signal spectrum data at a particular frequency, and providing therefrom a calculated slope signal; and determining whether the slope of the signal spectrum data from the calculated slope signal is different from a stored predetermined slope, and determining at least partially therefrom whether the probable cause of signal distortion is passive intermodulation distortion.

Furthermore, the step of determining whether the probable cause of signal distortion is passive intermodulation distortion may include the sub-steps of: comparing the signal spectrum data with a stored reference spectra of abnormal cellular communications signals having signal distortion or corruption known to be caused by passive intermodulation distortion to determine if the signal spectrum data has similar characteristics to characteristics of the stored reference signal spectra, and providing a spectrum comparison signal in response thereto; determining, in response to the spectrum comparison signal, at least partially therefrom whether the probable cause of signal distortion is passive intermodulation distortion.

The step of determining whether the probable cause of signal distortion is passive intermodulation distortion preferably includes the sub-step of: determining whether the probable cause of signal distortion is internal passive intermodulation distortion or external passive intermodulation distortion.

The step of determining whether the probable cause of signal distortion is internal passive intermodulation distortion or external passive intermodulation distortion may include the sub-steps of: operatively coupling to selected uplink and downlink signal transmission media relating to the particular radio equipment 16 and relating to at least one other radio equipment 16 located in proximity to the particular equipment, and providing the transport digital data signals of the selected uplink and downlink signal transmission media, including the I and Q digital data signals, carried thereby; extracting the I and Q digital data signals from the transport digital data signals carried by the selected uplink and downlink signal transmission media; processing the extracted I and Q digital data signals using a Fourier Transform algorithm, and generating therefrom signal spectrum data relating thereto; and analyzing at least one of the signal spectrum data and the extracted I and Q digital data signals to detect if a signal distortion event caused by passive intermodulation distortion has occurred in cellular communications signals for the particular radio equipment 16 and in cellular communications signals for the at least one other radio equipment 16, and determining therefrom whether the probable cause of signal distortion is internal passive intermodulation distortion or external passive intermodulation distortion.

In the network, a particular radio equipment 16 may include a first antenna and at least a second antenna. In such case, and in accordance with the method of the present invention, the step of determining whether the probable cause of signal distortion is internal passive intermodulation distortion or external passive intermodulation distortion includes the sub-steps of: operatively coupling to selected uplink and downlink signal transmission media relating to the first antenna and to the at least second antenna of the particular radio equipment 16, and providing the transport digital data signals of the selected uplink and downlink signal transmission media, including the I and Q digital data signals, relating to the first antenna and the at least second antenna, carried thereby; extracting the I and Q digital data signals from the transport digital data signals carried by the selected uplink and downlink signal transmission media; processing the extracted I and Q digital data signals using a Fourier Transform algorithm, and generating therefrom signal spectrum data relating thereto; and analyzing at least one of the signal spectrum data and the extracted I and Q digital data signals to detect if a signal distortion event caused by passive intermodulation distortion has occurred in cellular communications signals received or transmitted by the first antenna and in cellular communications signals received or transmitted by the at least second antenna, and determining therefrom whether the probable cause of signal distortion is internal passive intermodulation distortion or external passive intermodulation distortion.

In one form, the method further comprises the steps of: mixing the I and Q digital data signals of the downlink signal transmission medium for the first antenna with the same I and Q digital data signals of the downlink signal transmission medium for the first antenna and obtaining therefrom a first mixed product data signal; filtering the first mixed product data signal to thereby obtain a filtered first mixed product data signal residing substantially within a first frequency band of interest; mixing the I and Q digital data signals of the downlink signal transmission medium for the at least second antenna with the same I and Q digital data signals of the downlink signal transmission medium for the at least second antenna and obtaining therefrom a second mixed product data signal; filtering the second mixed product data signal to thereby obtain a filtered second mixed product data signal residing substantially within a second frequency band of interest; mixing the I and Q digital data signals of the downlink signal transmission medium for the first antenna combined with the I and Q digital data signals of the downlink signal transmission medium for the at least second antenna with the same combined I and Q digital data signals of the downlink signal transmission media for the first and the at least second antennas and obtaining therefrom a third mixed product data signal; filtering the third mixed product data signal to thereby obtain a filtered third mixed product data signal residing substantially within a third frequency band of interest; comparing at least one of the filtered first mixed product data signal, the filtered second mixed product data signal and the filtered third mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion. At least one of the first frequency band of interest, the second frequency band of interest and the third frequency band of interest is different from at least another of the at least one of the first frequency band of interest, the second frequency band of interest and the third frequency band of interest; or, at least one of the first frequency band of interest, the second frequency band of interest and the third frequency band of interest is substantially the same as at least another of the at least one of the first frequency band of interest, the second frequency band of interest and the third frequency band of interest.

Alternatively, the method further comprises the steps of: convolving the signal spectrum data of the downlink signal transmission medium for the first antenna with the same signal spectrum data of the downlink signal transmission medium for the first antenna and obtaining therefrom a first convolved product data signal; filtering the first convolved product data signal to thereby obtain a filtered first convolved product data signal residing substantially within a first frequency band of interest; convolving the signal spectrum data of the downlink signal transmission medium for the at least second antenna with the same signal spectrum data of the downlink signal transmission medium for the second antenna and obtaining therefrom a second convolved product data signal; filtering the second convolved product data signal to thereby obtain a filtered second convolved product data signal residing substantially within a second frequency band of interest; convolving the signal spectrum data of the downlink signal transmission medium for the first antenna combined with the signal spectrum data of the downlink signal transmission medium for the second antenna with the same combined signal spectrum data of the downlink signal transmission media for the first and second antennas and obtaining therefrom a third convolved product data signal; filtering the third convolved product data signal to thereby obtain a filtered third convolved product data signal residing substantially within a third frequency band of interest; comparing at least one of the filtered first convolved product data signal, the filtered second convolved product data signal and the filtered third convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion. Here, at least one of the first frequency band of interest, the second frequency band of interest and the third frequency band of interest is different from at least another of the at least one of the first frequency band of interest, the second frequency band of interest and the third frequency band of interest. Or, at least one of the first frequency band of interest, the second frequency band of interest and the third frequency band of interest is substantially the same as at least another of the at least one of the first frequency band of interest, the second frequency band of interest and the third frequency band of interest.

In yet another form, the method further comprises the steps of: mixing the I and Q digital data signals of the downlink signal transmission medium for the first antenna with the same I and Q digital data signals of the downlink signal transmission medium for the first antenna and obtaining therefrom a first antenna mixed product data signal; filtering the first antenna mixed product data signal to thereby obtain a filtered first antenna mixed product data signal residing substantially within a frequency band of interest; comparing the filtered first antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

Alternatively, the method further comprises the steps of: convolving the signal spectrum data of the downlink signal transmission medium for the first antenna with the same signal spectrum data of the downlink signal transmission medium for the first antenna and obtaining therefrom a first antenna convolved product data signal; filtering the first antenna convolved product data signal to thereby obtain a filtered first antenna convolved product data signal residing substantially within a frequency band of interest; comparing the filtered first antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

In yet another form, the method further comprises the steps of: mixing the I and Q digital data signals of the downlink signal transmission medium for the at least second antenna with the same I and Q digital data signals of the downlink signal transmission medium for the at least second antenna and obtaining therefrom a second antenna mixed product data signal; filtering the second antenna mixed product data signal to thereby obtain a filtered second antenna mixed product data signal residing substantially within a frequency band of interest; comparing the filtered second antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

Alternatively, the method includes the steps of: convolving the signal spectrum data of the downlink signal transmission medium for the at least second antenna with the same signal spectrum data of the downlink signal transmission medium for the at least second antenna and obtaining therefrom a second antenna convolved product data signal; filtering the second antenna convolved product data signal to thereby obtain a filtered second antenna convolved product data signal residing substantially within a frequency band of interest; comparing the filtered second antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

The method may include the steps of: mixing the I and Q digital data signals of the downlink signal transmission medium for the first antenna combined with the I and Q digital data signals of the downlink signal transmission medium for the at least second antenna with the same combined I and Q digital data signals of the downlink signal transmission media for the first and the at least second antennas and obtaining therefrom a mixed product data signal; filtering the mixed product data signal to thereby obtain a filtered mixed product data signal residing substantially within a frequency band of interest; comparing the filtered mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

Alternatively, the method may include the steps of: convolving the signal spectrum data of the downlink signal transmission medium for the first antenna combined with the signal spectrum data of the downlink signal transmission medium for the at least second antenna with the same combined signal spectrum data of the downlink signal transmission media for the first and the at least second antennas and obtaining therefrom a convolved product data signal; filtering the convolved product data signal to thereby obtain a filtered convolved product data signal residing substantially within a frequency band of interest; comparing the filtered convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

In yet another form, the method of the present invention may comprise the steps of: mixing the I and Q digital data signals of the downlink signal transmission medium for the first antenna with a first mixing signal and obtaining therefrom a first mixed product data signal; filtering the first mixed product data signal to thereby obtain a filtered first mixed product data signal residing substantially within a first frequency band of interest; mixing the I and Q digital data signals of the downlink signal transmission medium for the at least second antenna with a second mixing signal and obtaining therefrom a second mixed product data signal; filtering the second mixed product data signal to thereby obtain a filtered second mixed product data signal residing substantially within a second frequency band of interest; mixing the I and Q digital data signals of the downlink signal transmission medium for the first antenna combined with the I and Q digital data signals of the downlink signal transmission medium for the at least second antenna with a third mixing signal and obtaining therefrom a third mixed product data signal; filtering the third mixed product data signal to thereby obtain a filtered third mixed product data signal residing substantially within a third frequency band of interest; comparing at least one of the filtered first mixed product data signal, the filtered second mixed product data signal and the filtered third mixed product data signal with at least one of the I and Q digital data signals of the uplink signal transmission medium for the first antenna and the I and Q digital data signals of the uplink signal transmission medium for the second antenna, and providing therefrom at least one comparison signal; and analyzing the at least one comparison signal, and determining therefrom whether the probable cause of signal distortion is internal passive intermodulation distortion or external passive intermodulation distortion. At least one of the first frequency band of interest, the second frequency band of interest and the third frequency band of interest is different from at least another of the at least one of the first frequency band of interest, the second frequency band of interest and the third frequency band of interest. Or, at least one of the first frequency band of interest, the second frequency band of interest and the third frequency band of interest is substantially the same as at least another of the at least one of the first frequency band of interest, the second frequency band of interest and the third frequency band of interest. Also, at least one of the first mixing signal, the second mixing signal and the third mixing signal is different from at least another of the at least one of the first mixing signal, the second mixing signal and the third mixing signal, or at least one of the first mixing signal, the second mixing signal and the third mixing signal is substantially the same as at least another of the at least one of the first mixing signal, the second mixing signal and the third mixing signal.

In yet another form, the method further comprises the steps of: convolving the signal spectrum data of the downlink signal transmission medium for the first antenna with a first mixing signal and obtaining therefrom a first convolved product data signal; filtering the first convolved product data signal to thereby obtain a filtered first convolved product data signal residing substantially within a first frequency band of interest; convolving the signal spectrum data of the downlink signal transmission medium for the at least second antenna with a second mixing signal and obtaining therefrom a second convolved product data signal; filtering the second convolved product data signal to thereby obtain a filtered second convolved product data signal residing substantially within a second frequency band of interest; convolving the signal spectrum data of the downlink signal transmission medium for the first antenna combined with the signal spectrum data of the downlink signal transmission medium for the at least second antenna with a third mixing signal and obtaining therefrom a third convolved product data signal; filtering the third convolved product data signal to thereby obtain a filtered third convolved product data signal residing substantially within a third frequency band of interest; comparing at least one of the filtered first convolved product data signal, the filtered second convolved product data signal and the filtered third convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion. At least one of the first frequency band of interest, the second frequency band of interest and the third frequency band of interest is different from at least another of the at least one of the first frequency band of interest, the second frequency band of interest and the third frequency band of interest; or, at least one of the first frequency band of interest, the second frequency band of interest and the third frequency band of interest is substantially the same as at least another of the at least one of the first frequency band of interest, the second frequency band of interest and the third frequency band of interest. Furthermore, at least one of the first mixing signal, the second mixing signal and the third mixing signal is different from at least another of the at least one of the first mixing signal, the second mixing signal and the third mixing signal; or, at least one of the first mixing signal, the second mixing signal and the third mixing signal is substantially the same as at least another of the at least one of the first mixing signal, the second mixing signal and the third mixing signal.

In still another form of the present invention, the method further comprises the steps of: mixing the I and Q digital data signals of the downlink signal transmission medium for the first antenna with a mixing signal and obtaining therefrom a first antenna mixed product data signal; filtering the first antenna mixed product data signal to thereby obtain a filtered first antenna mixed product data signal residing substantially within a frequency band of interest; comparing the filtered first antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

Alternatively, the method includes the steps of: convolving the signal spectrum data of the downlink signal transmission medium for the first antenna with a mixing signal and obtaining therefrom a first antenna convolved product data signal; filtering the first antenna convolved product data signal to thereby obtain a filtered first antenna convolved product data signal residing substantially within a frequency band of interest; comparing the filtered first antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

In a further form of the present invention, the method further comprises the steps of: mixing the I and Q digital data signals of the downlink signal transmission medium for the at least second antenna with a mixing signal and obtaining therefrom a second antenna mixed product data signal; filtering the second antenna mixed product data signal to thereby obtain a filtered second antenna mixed product data signal residing substantially within a frequency band of interest; comparing the filtered second antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

Or, alternatively, the method may include the steps of: convolving the signal spectrum data of the downlink signal transmission medium for the at least second antenna with a mixing signal and obtaining therefrom a second antenna convolved product data signal; filtering the second antenna convolved product data signal to thereby obtain a filtered second antenna convolved product data signal residing substantially within a frequency band of interest; comparing the filtered second antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

In another form, the method further comprises the steps of: mixing the I and Q digital data signals of the downlink signal transmission medium for the first antenna combined with the I and Q digital data signals of the downlink signal transmission medium for the at least second antenna with a mixing signal and obtaining therefrom a mixed product data signal; filtering the mixed product data signal to thereby obtain a filtered mixed product data signal residing substantially within a frequency band of interest; comparing the filtered mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

Alternatively, the method comprises the steps of: convolving the signal spectrum data of the downlink signal transmission medium for the first antenna combined with the signal spectrum data of the downlink signal transmission medium for the at least second antenna with a mixing signal and obtaining therefrom a convolved product data signal; filtering the convolved product data signal to thereby obtain a filtered convolved product data signal residing substantially within a frequency band of interest; comparing the filtered convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

A method formed in accordance with the present invention for determining the cause of distortion or corruption of signals in a cellular communications network is connected to the network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. The method comprises the steps of: operatively coupling to the uplink and downlink signal transmission media, and providing the transport digital data signals of selected uplink and downlink signal transmission media, including the I and Q digital data signals, carried thereby; extracting the I and Q digital data signals from the transport digital data signals carried by the selected uplink and downlink signal transmission media; comparing the extracted I and Q digital data signals with stored reference I and Q digital data of normal cellular communications signals having no distortion or corruption or abnormal cellular communications signals having known causes of signal distortion or corruption to determine if the extracted I and Q digital data signals have similar or dissimilar characteristics to the characteristics of the stored reference I and Q digital data, and generating a first signal corresponding to one or more possible causes of signal distortion or corruption relating thereto; analyzing the possible cause first signal and determining therefrom a probable cause of signal distortion or corruption, and generating a probable cause signal corresponding to the probable cause of signal distortion or corruption; and displaying, in response to the probable cause output signal, the probable cause of signal distortion or corruption.

The stored reference I and Q digital data includes I and Q digital data of at least one of known interfering transmitted signals and unknown interfering transmitted signals. Preferably, the step of comparing the extracted I and Q digital data signals with stored reference I and Q digital data includes the sub-step of comparing the extracted I and Q digital data signals to the stored reference I and Q digital data of at least one of known interfering transmitted signals and unknown interfering transmitted signals.

When the extracted I and Q digital data signals are compared to the stored reference I and Q digital data and determined to be different from the stored reference I and Q digital data, the method includes the step of storing I and Q digital data representing the extracted I and Q digital data signals as the reference I and Q digital data.

Also, the method further comprises the steps of: further extracting from extracted I and Q digital data signals of the selected uplink and downlink signal transmission media cyclostationary metric data; and comparing the extracted cyclostationary metric data with stored reference cyclostationary metric data of I and Q digital data of at least one of known interfering transmitted signals and unknown interfering transmitted signals.

Alternatively, the method includes the steps of: further extracting from extracted I and Q digital data signals of the selected uplink and downlink signal transmission media symbol rate data; and comparing the extracted symbol rate data with stored reference symbol rate data of I and Q digital data of at least one of known interfering transmitted signals and unknown interfering transmitted signals.

In yet another form, the method further comprises the steps of: further extracting from extracted I and Q digital data signals of the selected uplink and downlink signal transmission media Distribution Function data; and comparing the extracted Distribution Function data with stored reference Distribution Function data of I and Q digital data of at least one of known interfering transmitted signals and unknown interfering transmitted signals.

Alternatively, or in addition to the above, the method further comprises the steps of: further extracting from extracted I and Q digital data signals of the selected uplink and downlink signal transmission media modulation format data; and comparing the extracted modulation format data with stored reference modulation format data of I and Q digital data of at least one of known interfering transmitted signals and unknown interfering transmitted signals.

In still another form, the method further comprises the steps of: determining from the extracted I and Q digital data signals of the selected uplink and downlink signal transmission media peak-to-average ratio data; and comparing the determined peak-to-average ratio data with stored reference peak-to-average ratio data of at least one of known interfering transmitted signals and unknown interfering transmitted signals.

The method of the present invention may further include the steps of: generating from the extracted I and Q digital data signals of the selected uplink and downlink signal transmission media a three dimensional histogram of communications signals on at least one of the downlink communications medium and the uplink communications medium; and displaying the generated three dimensional histogram.

Alternatively, the method further comprises the steps of: generating from the extracted I and Q digital data signals of the selected uplink and downlink signal transmission media histogram data of communications signals on at least one of the downlink communications medium and the uplink communications medium; and comparing the generated histogram data with stored reference histogram data of at least one of known interfering transmitted signals and unknown interfering transmitted signals.

In accordance with yet another form of the present invention, a method for determining the cause of distortion or corruption of signals in a cellular communications network is connected to the network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. The method comprises the steps of: operatively coupling to the uplink and downlink signal transmission media, and providing the transport digital data signals of the uplink and downlink signal transmission media of at least one selected radio equipment 16, including the I and Q digital data signals, carried thereby, extracting the I and Q digital data signals from the transport digital data signals carried by the selected uplink and downlink signal transmission media; analyzing the extracted I and Q digital data signals to determine, from the extracted I and Q digital data signals, of the at least one selected radio equipment 16 if cellular communications signals relating to the at least one selected radio equipment 16 exhibiting signal distortion or corruption, and generating a first identifying signal in response thereto; identifying, from the first identifying signal, at least one other radio equipment 16 situated in proximity to the at least one selected radio equipment 16; operatively coupling to the uplink and downlink signal transmission media, and providing the transport digital data signals of the uplink and downlink signal transmission media of the at least one other radio equipment 16, including the I and Q digital data signals, carried thereby; extracting the I and Q digital data signals from the transport digital data signals carried by the uplink and downlink signal transmission media of the at least one other radio equipment 16; and analyzing the extracted I and Q digital data signals of the at least one selected radio equipment 16 and the extracted I and Q digital data signals of the at one other radio equipment 16 to determine therefrom a possible location of an interfering source of signal distortion or corruption.

Also, the method may include dispatching at least one of an aerial vehicle 510 and a surface vehicle 512 to the possible location of the interfering source of signal distortion or corruption, the at least one of the aerial vehicle 510 and the surface vehicle 512 having signal receiving equipment to receive signals emitted by the interfering source of signal distortion or corruption.

In yet another form of the present invention, a system 22 for determining the cause of distortion or corruption of signals in a cellular communications network is connected to the network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals, the cellular communications network further including an equipment monitoring system 22 which generates alarm signals or indicator signals representing abnormal conditions relating to the radio equipment 16. The system 22 comprises: an analytic computer unit 30, the analytic computer unit 30 receiving the alarm or indicator signals from the network equipment monitoring system 22 and determining from the received alarm or indicator signal a particular radio equipment 16 to monitor, the analytic computer unit 30 providing a control signal in response thereto; a switching sub-assembly 26, the switching sub-assembly 26 being operatively coupled to selected uplink and downlink signal transmission media relating to the particular radio equipment 16, and, in response to the control signal of the analytic computer unit 30, providing as an output signal the transport digital data signals of the selected uplink and downlink signal transmission media, including the I and Q digital data signals, carried thereby; and a digital signal processor 24, the digital signal processor 24 being responsive to the output signal of the switching sub-assembly 26 and in response thereto extracts the I and Q digital data signals from the transport digital data signals carried by the selected uplink and downlink signal transmission media and processes the extracted I and Q digital data signals using a Fourier Transform algorithm, and generates therefrom signal spectrum data relating thereto; and wherein the analytic computer unit 30 analyzes the signal spectrum data to detect if a signal distortion event has occurred or whether the received alarm or indicator signal was a false alarm.

Preferably, at least one of the digital signal processor 24 and the analytic computer unit 30 includes: at least one comparator 508 and at least one memory 506 operatively coupled to the at least one comparator 508, the at least one memory 506 storing therein reference spectra of normal cellular communications signals having no distortion or corruption or abnormal cellular communications signals having known causes of signal distortion or corruption, the at least one comparator 508 comparing the signal spectrum data with stored reference spectra of normal cellular communications signals having no distortion or corruption or abnormal cellular communications signals having known causes of signal distortion or corruption to determine if the signal spectrum data has similar or dissimilar characteristics to the characteristics of the stored reference signal spectra.

When a signal distortion event has been detected, the analytic computer unit 30 determines a time when the particular radio equipment 16 receives no or minimal communications signals from mobile cellular communications devices, and analyzes the extracted I and Q digital data signals or the signal spectrum data relating thereto of the transport digital data signals carried by the selected uplink and downlink signal transmission media and occurring at the determined time of no or minimal communications signals.

Preferably, at least one of the digital signal processor 24 and the analytic computer unit 30 includes: at least one comparator 508 and at least one memory 506 operatively coupled to the at least one comparator 508, the at least one memory 506 storing therein reference spectra of normal cellular communications signals having no distortion or corruption or abnormal cellular communications signals having known causes of signal distortion or corruption. Also, the at least one comparator 508 compares the signal spectrum data which exhibits no or minimal communications signals relating to the extracted I and Q digital data signals occurring at the determined time with the reference spectra, stored in the at least one memory 506, of normal cellular communications signals having no distortion or corruption or abnormal cellular communications signals having known causes of signal distortion or corruption to determine if the signal spectrum data has similar or dissimilar characteristics to the characteristics of the stored reference signal spectra, the analytic computer unit 30 determining therefrom the probable cause of signal distortion.

The analytic computer unit 30, in determining the probable cause of signal distortion, determines at least one of 1) whether the probable cause of signal distortion is passive intermodulation distortion, 2) whether the probable cause of signal distortion is an interfering signal, and 3) that no signal is detected that would be the probable cause of signal distortion.

Alternatively, the analytic computer unit 30, in determining whether the probable cause of signal distortion is passive intermodulation distortion, calculates the slope of the signal spectrum data at a particular frequency, and provides therefrom a calculated slope signal, determines whether the slope of the signal spectrum data from the calculated slope signal is different from a stored predetermined slope, and determines at least partially therefrom whether the probable cause of signal distortion is passive intermodulation distortion.

Alternatively, in determining by the system 22 whether the probable cause of signal distortion is passive intermodulation distortion, the at least one comparator 508 compares the signal spectrum data with a reference spectra stored in the at least one memory 506 of abnormal cellular communications signals having signal distortion or corruption known to be caused by passive intermodulation distortion to determine if the signal spectrum data has similar characteristics to characteristics of the stored reference signal spectra, and provides a spectrum comparison signal in response thereto; and the analytic computer unit 30 determines, in response to the spectrum comparison signal, at least partially therefrom whether the probable cause of signal distortion is passive intermodulation distortion.

Furthermore, in determining whether the probable cause of signal distortion is passive intermodulation distortion, the analytic computer unit 30 determines whether the probable cause of signal distortion is internal passive intermodulation distortion or external passive intermodulation distortion. More specifically, in determining whether the probable cause of signal distortion is internal passive intermodulation distortion or external passive intermodulation distortion, the switching sub-assembly 26 operatively couples to selected uplink and downlink signal transmission media relating to the particular radio equipment 16 and relating to at least one other radio equipment 16 located in proximity to the particular equipment, and provides the transport digital data signals of the selected uplink and downlink signal transmission media, including the I and Q digital data signals, carried thereby to the digital signal processor 24; the digital signal processor 24 extracts the I and Q digital data signals from the transport digital data signals carried by the selected uplink and downlink signal transmission media; the digital signal processor 24 processes the extracted I and Q digital data signals using a Fourier Transform algorithm, and generates therefrom signal spectrum data relating thereto; and the analytic computer unit 30 analyzes at least one of the signal spectrum data and the extracted I and Q digital data signals to detect if a signal distortion event caused by passive intermodulation distortion has occurred in cellular communications signals for the particular radio equipment 16 and in cellular communications signals for the at least one other radio equipment 16, and determines therefrom whether the probable cause of signal distortion is internal passive intermodulation distortion or external passive intermodulation distortion.

In some cases, a particular radio equipment 16 includes a first antenna and at least a second antenna. In such cases, and in determining whether the probable cause of signal distortion is internal passive intermodulation distortion or external passive intermodulation distortion, the switching sub-assembly 26 operatively couples to selected uplink and downlink signal transmission media relating to the first antenna and to the at least second antenna of the particular radio equipment 16, and provides the transport digital data signals of the selected uplink and downlink signal transmission media, including the I and Q digital data signals, relating to the first antenna and the at least second antenna, carried thereby. The digital signal processor 24 extracts the I and Q digital data signals from the transport digital data signals carried by the selected uplink and downlink signal transmission media. The digital signal processor 24 processes the extracted I and Q digital data signals using a Fourier Transform algorithm, and generates therefrom signal spectrum data relating thereto. The analytic computer unit 30 analyzes at least one of the signal spectrum data and the extracted I and Q digital data signals to detect if a signal distortion event caused by passive intermodulation distortion has occurred in cellular communications signals received or transmitted by the first antenna and in cellular communications signals received or transmitted by the at least second antenna, and determines therefrom whether the probable cause of signal distortion is internal passive intermodulation distortion or external passive intermodulation distortion.

At least one of the digital signal processor 24 and the analytic computer unit 30 preferably includes at least one mixer 502 and at least one filter 503. The at least one mixer 502 mixes the I and Q digital data signals of the downlink signal transmission medium for the first antenna with the same I and Q digital data signals of the downlink signal transmission medium for the first antenna and obtains therefrom a first mixed product data signal. The at least one filter filters the first mixed product data signal to thereby obtain a filtered first mixed product data signal residing substantially within a first frequency band of interest. The at least one mixer 502 mixes the I and Q digital data signals of the downlink signal transmission medium for the at least second antenna with the same I and Q digital data signals of the downlink signal transmission medium for the at least second antenna and obtains therefrom a second mixed product data signal. The at least one filter filters the second mixed product data signal to thereby obtain a filtered second mixed product data signal residing substantially within a second frequency band of interest. The at least one mixer 502 mixes the I and Q digital data signals of the downlink signal transmission medium for the first antenna combined with the I and Q digital data signals of the downlink signal transmission medium for the at least second antenna with the same combined I and Q digital data signals of the downlink signal transmission media for the first and the at least second antennas and obtains therefrom a third mixed product data signal. The at least one filter filters the third mixed product data signal to thereby obtain a filtered third mixed product data signal residing substantially within a third frequency band of interest. The at least one comparator 508 compares at least one of the filtered first mixed product data signal, the filtered second mixed product data signal and the filtered third mixed product data signal with at least one of the I and Q digital data signals of the uplink signal transmission medium for the first antenna and the I and Q digital data signals of the uplink signal transmission medium for the second antenna, and provides therefrom at least one comparison signal. The analytic computer unit 30 analyzes the at least one comparison signal, and determines therefrom whether the probable cause of signal distortion is internal passive intermodulation distortion or external passive intermodulation distortion. At least one of the first frequency band of interest, the second frequency band of interest and the third frequency band of interest is different from at least another of the at least one of the first frequency band of interest, the second frequency band of interest and the third frequency band of interest. Or, at least one of the first frequency band of interest, the second frequency band of interest and the third frequency band of interest is substantially the same as at least another of the at least one of the first frequency band of interest, the second frequency band of interest and the third frequency band of interest.

Alternatively, at least one of the digital signal processor 24 and the analytic computer unit 30 includes at least one filter and at least one convolver 504, and wherein the at least one convolver 504 convolves the signal spectrum data of the downlink signal transmission medium for the first antenna with the same signal spectrum data of the downlink signal transmission medium for the first antenna and obtains therefrom a first convolved product data signal; wherein the at least one filter filters the first convolved product data signal to thereby obtain a filtered first convolved product data signal residing substantially within a first frequency band of interest; wherein the at least one convolver 504 convolves the signal spectrum data of the downlink signal transmission medium for the at least second antenna with the same signal spectrum data of the downlink signal transmission medium for the second antenna and obtains therefrom a second convolved product data signal; wherein the at least one filter filters the second convolved product data signal to thereby obtain a filtered second convolved product data signal residing substantially within a second frequency band of interest; wherein the at least one convolver 504 convolves the signal spectrum data of the downlink signal transmission medium for the first antenna combined with the signal spectrum data of the downlink signal transmission medium for the at least second antenna with the same combined signal spectrum data of the downlink signal transmission media for the first and the at least second antennas and obtains therefrom a third convolved product data signal; wherein the at least one filter filters the third convolved product data signal to thereby obtain a filtered third convolved product data signal residing substantially within a third frequency band of interest; wherein the at least one comparator 508 compares at least one of the filtered first convolved product data signal, the filtered second convolved product data signal and the filtered third convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion. In such a situation, at least one of the first frequency band of interest, the second frequency band of interest and the third frequency band of interest is different from at least another of the at least one of the first frequency band of interest, the second frequency band of interest and the third frequency band of interest. Or, at least one of the first frequency band of interest, the second frequency band of interest and the third frequency band of interest is substantially the same as at least another of the at least one of the first frequency band of interest, the second frequency band of interest and the third frequency band of interest.

In yet another form of the system 22 of the present invention, at least one of the digital signal processor 24 and the analytic computer unit 30 includes at least one mixer 502 and at least one filter, and wherein the at least one mixer 502 mixes the I and Q digital data signals of the downlink signal transmission medium for the first antenna with the same I and Q digital data signals of the downlink signal transmission medium for the first antenna and obtains therefrom a first antenna mixed product data signal; wherein the at least one filter filters the first antenna mixed product data signal to thereby obtain a filtered first antenna mixed product data signal residing substantially within a frequency band of interest; wherein the at least one comparator 508 compares the filtered first antenna mixed product data signal with at least one of the I and Q digital data signals of the uplink signal transmission medium for the first antenna and the I and Q digital data signals of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

In yet another form, at least one of the digital signal processor 24 and the analytic computer unit 30 includes at least one filter and at least one convolver 504, and wherein the at least one convolver 504 convolves the signal spectrum data of the downlink signal transmission medium for the first antenna with the same signal spectrum data of the downlink signal transmission medium for the first antenna and obtains therefrom a first antenna convolved product data signal; wherein the at least one filter filters the first antenna convolved product data signal to thereby obtain a filtered first antenna convolved product data signal residing substantially within a frequency band of interest; wherein the at least one comparator 508 compares the filtered first antenna convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

In still another form, at least one of the digital signal processor 24 and the analytic computer unit 30 includes at least one mixer 502 and at least one filter, and wherein the at least one mixer 502 mixes the I and Q digital data signals of the downlink signal transmission medium for the at least second antenna with the same I and Q digital data signals of the downlink signal transmission medium for the at least second antenna and obtains therefrom a second antenna mixed product data signal; wherein the at least one filter filters the second antenna mixed product data signal to thereby obtain a filtered second antenna mixed product data signal residing substantially within a frequency band of interest; wherein the at least one comparator 508 compares the filtered second antenna mixed product data signal with at least one of the I and Q digital data signals of the uplink signal transmission medium for the first antenna and the I and Q digital data signals of the uplink signal transmission medium for the second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

Alternatively, at least one of the digital signal processor 24 and the analytic computer unit 30 includes at least one filter and at least one convolver 504, and wherein the at least one convolver 504 convolves the signal spectrum data of the downlink signal transmission medium for the at least second antenna with the same signal spectrum data of the downlink signal transmission medium for the at least second antenna and obtains therefrom a second antenna convolved product data signal; wherein the at least one filter filters the second antenna convolved product data signal to thereby obtain a filtered second antenna convolved product data signal residing substantially within a frequency band of interest; wherein the at least one comparator 508 compares the filtered second antenna convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the correlation signal, and determines therefrom whether the probable cause of signal distortion is internal passive intermodulation distortion or external passive intermodulation distortion.

In another form of the present invention, at least one of the digital signal processor 24 and the analytic computer unit 30 includes at least one mixer 502 and at least one filter, and wherein the at least one mixer 502 mixes the I and Q digital data signals of the downlink signal transmission medium for the first antenna combined with the I and Q digital data signals of the downlink signal transmission medium for the at least second antenna with the same combined I and Q digital data signals of the downlink signal transmission media for the first and the at least second antennas and obtains therefrom a mixed product data signal; wherein the at least one filter filters the mixed product data signal to thereby obtain a filtered mixed product data signal residing substantially within a frequency band of interest; wherein the at least one comparator 508 compares the filtered mixed product data signal with at least one of the I and Q digital data signals of the uplink signal transmission medium for the first antenna and the I and Q digital data signals of the uplink signal transmission medium for the second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

Alternatively, at least one of the digital signal processor 24 and the analytic computer unit 30 includes at least one filter and at least one convolver 504, and wherein the at least one convolver 504 convolves the signal spectrum data of the downlink signal transmission medium for the first antenna combined with the signal spectrum data of the downlink signal transmission medium for the at least second antenna with the same combined signal spectrum data of the downlink signal transmission media for the first and the at least second antennas and obtains therefrom a convolved product data signal; wherein the at least one filter filters the convolved product data signal to thereby obtain a filtered convolved product data signal residing substantially within a frequency band of interest; wherein the at least one comparator 508 compares the filtered convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

In still another form, at least one of the digital signal processor 24 and the analytic computer unit 30 includes at least one mixer 502 and at least one filter, and wherein the at least one mixer 502 mixes the I and Q digital data signals of the downlink signal transmission medium for the first antenna with a first mixing signal and obtains therefrom a first mixed product data signal; wherein the at least one filter filters the first mixed product data signal to thereby obtain a filtered first mixed product data signal residing substantially within a first frequency band of interest; wherein the at least one mixer 502 mixes the I and Q digital data signals of the downlink signal transmission medium for the at least second antenna with at least a second mixing signal and obtains therefrom a second mixed product data signal; wherein the at least one filter filters the second mixed product data signal to thereby obtain a filtered second mixed product data signal residing substantially within a second frequency band of interest; wherein the at least one mixer 502 mixes the I and Q digital data signals of the downlink signal transmission medium for the first antenna combined with the I and Q digital data signals of the downlink signal transmission medium for the at least second antenna with a third mixing signal and obtains therefrom a third mixed product data signal; wherein the at least one filter filters the third mixed product data signal to thereby obtain a filtered third mixed product data signal residing substantially within a third frequency band of interest; wherein the at least one comparator 508 compares at least one of the filtered first mixed product data signal, the filtered second mixed product data signal and the filtered third mixed product data signal with at least one of the I and Q digital data signals of the uplink signal transmission medium for the first antenna and the I and Q digital data signals of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion. In such a situation, at least one of the first frequency band of interest, the second frequency band of interest and the third frequency band of interest is different from at least another of the at least one of the first frequency band of interest, the second frequency band of interest and the third frequency band of interest. Or, at least one of the first frequency band of interest, the second frequency band of interest and the third frequency band of interest is substantially the same as at least another of the at least one of the first frequency band of interest, the second frequency band of interest and the third frequency band of interest. Also, at least one of the first mixing signal, the at least second mixing signal and the third mixing signal is different from at least another of the at least one of the first mixing signal, the at least second predetermined mixing signal and the third predetermined mixing signal; or at least one of the first mixing signal, the at least second predetermined mixing signal and the third predetermined mixing signal is substantially the same as at least another of the at least one of the first mixing signal, the at least second predetermined mixing signal and the third predetermined mixing signal.

In an alternative form of the system 22, at least one of the digital signal processor 24 and the analytic computer unit 30 includes at least one filter and at least one convolver 504, and wherein the at least one convolver 504 convolves the signal spectrum data of the downlink signal transmission medium for the first antenna with a first mixing signal and obtains therefrom a first convolved product data signal; wherein the at least one filter filters the first convolved product data signal to thereby obtain a filtered first convolved product data signal residing substantially within a first frequency band of interest; wherein the at least one convolver 504 convolves the signal spectrum data of the downlink signal transmission medium for the at least second antenna with at least a second mixing signal and obtains therefrom a second convolved product data signal; wherein the at least one filter filters the second convolved product data signal to thereby obtain a filtered second convolved product data signal residing substantially within a second frequency band of interest; wherein the at least one convolver 504 convolves the signal spectrum data of the downlink signal transmission medium for the first antenna combined with the signal spectrum data of the downlink signal transmission medium for the at least second antenna with a third mixing signal and obtains therefrom a third convolved product data signal; wherein the at least one filter filters the third convolved product data signal to thereby obtain a filtered third convolved product data signal residing substantially within a third frequency band of interest; wherein the at least one comparator 508 compares at least one of the filtered first convolved product data signal, the filtered second convolved product data signal and the filtered third convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion. Again, in such a situation, at least one of the first frequency band of interest, the second frequency band of interest and the third frequency band of interest is different from at least another of the at least one of the first frequency band of interest, the second frequency band of interest and the third frequency band of interest. Or, at least one of the first frequency band of interest, the second frequency band of interest and the third frequency band of interest is substantially the same as at least another of the at least one of the first frequency band of interest, the second frequency band of interest and the third frequency band of interest. Also, at least one of the first mixing signal, the at least second mixing signal and the third mixing signal is different from at least another of the at least one of the first mixing signal, the at least second mixing signal and the third mixing signal; or at least one of the first mixing signal, the at least second mixing signal and the third mixing signal is substantially the same as at least another of the at least one of the first mixing signal, the at least second mixing signal and the third mixing signal.

In yet another form of the system 22, at least one of the digital signal processor 24 and the analytic computer unit 30 includes at least one mixer 502 and at least one filter, and wherein the at least one mixer 502 mixes the I and Q digital data signals of the downlink signal transmission medium for the first antenna with a predetermined mixing signal and obtaining therefrom a first antenna mixed product data signal; wherein the at least one filter filters the first antenna mixed product data signal to thereby obtain a filtered first antenna mixed product data signal residing substantially within a frequency band of interest; wherein the at least one comparator 508 compares the filtered first antenna mixed product data signal with at least one of the I and Q digital data signals of the uplink signal transmission medium for the first antenna and the I and Q digital data signals of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

Alternatively, at least one of the digital signal processor 24 and the analytic computer unit 30 includes at least one filter and at least one convolver 504, and wherein the at least one convolver 504 convolves the signal spectrum data of the downlink signal transmission medium for the first antenna with a mixing signal and obtains therefrom a first antenna convolved product data signal; wherein the at least one filter filters the first antenna convolved product data signal to thereby obtain a filtered first antenna convolved product data signal residing substantially within a frequency band of interest; wherein the at least one comparator 508 compares the filtered first antenna convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

In yet another form, at least one of the digital signal processor 24 and the analytic computer unit 30 includes at least one mixer 502 and at least one filter, and wherein the at least one mixer 502 mixes the I and Q digital data signals of the downlink signal transmission medium for the at least second antenna with a mixing signal and obtains therefrom a second antenna mixed product data signal; wherein the at least one filter filters the second antenna mixed product data signal to thereby obtain a filtered second antenna mixed product data signal residing substantially within a frequency band of interest; wherein the at least one comparator 508 compares the filtered second antenna mixed product data signal with at least one of the I and Q digital data signals of the uplink signal transmission medium for the first antenna and the I and Q digital data signals of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

Alternatively, at least one of the digital signal processor 24 and the analytic computer unit 30 includes at least one filter and at least one convolver 504, and wherein the at least one convolver 504 convolves the signal spectrum data of the downlink signal transmission medium for the at least second antenna with a mixing signal and obtains therefrom a second antenna convolved product data signal; wherein the at least one filter filters the second antenna convolved product data signal to thereby obtain a filtered second antenna convolved product data signal residing substantially within a frequency band of interest; wherein the at least one comparator 508 compares the filtered second antenna convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

In yet another form of the system 22 of the present invention, at least one of the digital signal processor 24 and the analytic computer unit 30 includes at least one mixer 502 and at least one filter, and wherein the at least one mixer 502 mixes the I and Q digital data signals of the downlink signal transmission medium for the first antenna combined with the I and Q digital data signals of the downlink signal transmission medium for the at least second antenna with a mixing signal and obtains therefrom a mixed product data signal; wherein the at least one filter filters the mixed product data signal to thereby obtain a filtered mixed product data signal residing substantially within a frequency band of interest; wherein the at least one comparator 508 compares the filtered mixed product data signal with at least one of the I and Q digital data signals of the uplink signal transmission medium for the first antenna and the I and Q digital data signals of the uplink signal transmission medium for the second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

Alternatively, at least one of the digital signal processor 24 and the analytic computer unit 30 includes at least one filter and at least one convolver 504, and wherein the at least one convolver 504 convolves the signal spectrum data of the downlink signal transmission medium for the first antenna combined with the signal spectrum data of the downlink signal transmission medium for the at least second antenna with a mixing signal and obtains therefrom a convolved product data signal; wherein the at least one filter filters the convolved product data signal to thereby obtain a filtered convolved product data signal residing substantially within a frequency band of interest; wherein the at least one comparator 508 compares the filtered convolved product data signal with at least one of the signal spectrum data of the uplink signal transmission medium for the first antenna and the signal spectrum data of the uplink signal transmission medium for the at least second antenna, and provides therefrom at least one comparison signal; and wherein the analytic computer unit 30 analyzes the at least one comparison signal, and determines therefrom whether the probable cause of signal distortion is internal passive intermodulation distortion or external passive intermodulation distortion.

In accordance with the present invention, in yet another form, a system 22 for determining the cause of distortion or corruption of signals in a cellular communications network is connected to the network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. The system 22 comprises: a switching sub-assembly 26, the switching sub-assembly 26 being operatively coupled to selected uplink and downlink signal transmission media relating to the particular radio equipment 16, and, in response to a control signal of the analytic computer unit 30, providing as an output signal the transport digital data signals of selected uplink and downlink signal transmission media, including the I and Q digital data signals, carried thereby; a digital signal processor 24, the digital signal processor 24 being responsive to the output signals of the switching sub-assembly 26 and extracting the I and Q digital data signals from the transport digital data signals carried by the selected uplink and downlink signal transmission media, the digital signal processor 24 providing extracted I and Q digital data signals relating thereto; an analytic computer unit 30 operatively coupled to the digital signal processor 24, the analytic computer unit 30 receiving the extracted I and Q digital data signals generated by the digital signal processor 24, the analytic computer unit 30 generating the control signal, the switching sub-assembly 26 being responsive to the control signal and providing as the output signals therefrom the transport digital data signals of the selected uplink and downlink transmission media in response thereto, the analytic computer unit 30 analyzing the extracted I and Q digital data signals, at least one of the digital signal processor 24 and the analytic computer unit 30 including: at least one comparator 508 and at least one memory 506 operatively coupled to the at least one comparator 508, the at least one memory 506 storing therein reference I and Q digital data of normal cellular communications signals having no distortion or corruption or abnormal cellular communications signals having known causes of signal distortion or corruption, the at least one comparator 508 comparing the extracted I and Q digital data signals with the stored reference I and Q digital data of normal cellular communications signals having no distortion or corruption or abnormal cellular communications signals having known causes of signal distortion or corruption to determine if the extracted I and Q digital data signals have similar or dissimilar characteristics to the characteristics of the stored reference I and Q digital data, and generating a first signal corresponding to one or more possible causes of signal distortion or corruption relating thereto, wherein the analytic computer unit 30 analyzes the possible cause first signal and determining therefrom a probable cause of signal distortion or corruption, and generating a probable cause signal corresponding to the probable cause of signal distortion or corruption; and a display, the display being responsive to the probable cause output signal generated by the analytic computer unit 30 and displaying thereon the probable cause of signal distortion or corruption of the signal corresponding to the probable cause output signal generated by the analytic computer unit 30.

The reference I and Q digital data stored in the at least one memory 506 includes I and Q digital data of at least one of known interfering transmitted signals and unknown interfering transmitted signals. The at least one comparator 508 compares the extracted I and Q digital data signals to the stored reference I and Q digital data of at least one of known interfering transmitted signals and unknown interfering transmitted signals.

When the extracted I and Q digital data signals are compared by the at least one comparator 508 to the stored reference I and Q digital data and determined by the at least one comparator 508 to be different from the stored reference I and Q digital data, the at least one memory 506 in response thereto stores I and Q digital data representing the extracted I and Q digital data signals as the reference I and Q digital data.

The digital signal processor 24 further extracts from the extracted I and Q digital data signals of the selected uplink and downlink signal transmission media cyclostationary metric data and provides extracted cyclostationary metric data. The at least one memory 506 has stored therein reference cyclostationary metric data of I and Q digital data of at least one of known interfering transmitted signals and unknown interfering transmitted signals. The at least one comparator 508 compares the extracted cyclostationary metric data with the stored reference cyclostationary metric data of I and Q digital data of at least one of known interfering transmitted signals and unknown interfering transmitted signals.

The digital signal processor 24 further extracts from the extracted I and Q digital data signals of the selected uplink and downlink signal transmission media symbol rate data and provides extracted symbol rate data. The at least one memory 506 has stored therein reference symbol rate data of I and Q digital data of at least one of known interfering transmitted signals and unknown interfering transmitted signals. The at least one comparator 508 compares the extracted symbol rate data with the stored reference symbol rate data of I and Q digital data of at least one of known interfering transmitted signals and unknown interfering transmitted signals.

The digital signal processor 24 further may extract from the extracted I and Q digital data signals of the selected uplink and downlink signal transmission media Distribution Function data and provides extracted Distribution Function data. The at least one memory 506 has stored therein reference Distribution Function data of I and Q digital data of at least one of known interfering transmitted signals and unknown interfering transmitted signals. The at least one comparator 508 compares the extracted Distribution Function data with the stored reference Distribution Function data of I and Q digital data of at least one of known interfering transmitted signals and unknown interfering transmitted signals.

The digital signal processor 24 further extracts from the extracted I and Q digital data signals of the selected uplink and downlink signal transmission media modulation format data and provides extracted modulation format data. The at least one memory 506 has stored therein reference modulation format data of I and Q digital data of at least one of known interfering transmitted signals and unknown interfering transmitted signals. The at least one comparator 508 compares the extracted modulation format data with the stored reference modulation format data of I and Q digital data of at least one of known interfering transmitted signals and unknown interfering transmitted signals.

The digital signal processor 24 preferably further extracts from the extracted I and Q digital data signals of the selected uplink and downlink signal transmission media peak-to-average ratio data and provides extracted peak-to-average ratio data. The at least one memory 506 has stored therein reference peak-to-average ratio data of I and Q digital data of at least one of known interfering transmitted signals and unknown interfering transmitted signals. The at least one comparator 508 compares the extracted peak-to-average ratio data with the stored reference peak-to-average ratio data of I and Q digital data of at least one of known interfering transmitted signals and unknown interfering transmitted signals.

At least one of the digital signal processor 24 and the analytic computer unit 30 preferably generates from the extracted I and Q digital data signals of the selected uplink and downlink signal transmission media a three dimensional histogram of communications signals on at least one of the downlink communications medium and the uplink communications medium. The display displays the generated three dimensional histogram.

At least one of the digital signal processor 24 and the analytic computer unit 30 generates histogram data of communications signals on at least one of the downlink communications medium and the uplink communications medium. The at least one memory 506 has stored therein reference histogram data of I and Q digital data of at least one of known interfering transmitted signals and unknown interfering transmitted signals. The at least one comparator 508 compares the generated histogram data with the stored reference histogram data of at least one of known interfering transmitted signals and unknown interfering transmitted signals.

In accordance with yet another form of the present invention, a system 22 for determining the cause of distortion or corruption of signals in a cellular communications network is connected to the network. The cellular communications network includes radio equipment 16 and at least one radio equipment controller 18, and an uplink signal transmission medium and a downlink signal transmission medium interconnecting the radio equipment 16 and the radio equipment controller 18, the uplink and downlink signal transmission media carrying transport digital data signals, including I (in phase) and Q (quadrature phase) digital data signals relating to cellular communications signals. The system 22 comprises: a switching sub-assembly 26, the switching sub-assembly 26 being operatively coupled to the uplink and downlink signal transmission media, and, in response to a control signal of an analytic computer unit 30, providing as an output signal the transport digital data signals of the uplink and downlink signal transmission media of at least one selected radio equipment 16, including the I and Q digital data signals, carried thereby; a digital signal processor 24, the digital signal processor 24 being operatively coupled to the switching sub-assembly 26 and extracting the I and Q digital data signals from the transport digital data signals carried by the uplink and downlink signal transmission media of the at least one selected radio equipment 16; and an analytic computer unit 30, the analytic computer unit 30 being operatively coupled to the digital signal processor 24 and the switching sub-assembly 26, the analytic computer unit 30 generating the control signal, the switching sub-assembly 26 being responsive to the control signal and providing as the output signal therefrom the transport digital data signals of the uplink and downlink signal transmission media of the at least one selected radio equipment 16 in response thereto, the analytic computer unit 30 analyzing the extracted I and Q digital data signals to determine, from the extracted I and Q digital data signals, of the at least one selected radio equipment 16 if cellular communications signals relating to the at least one selected radio equipment 16 exhibit signal distortion or corruption, and generating a first identifying signal in response thereto, the analytic computer unit 30 identifying, from the first identifying signal, at least one other radio equipment 16 situated in proximity to the at least one selected radio equipment 16, the switching sub-assembly 26 operatively coupling to and providing the transport digital data signals of the uplink and downlink signal transmission media of the at least one other radio equipment 16, including the I and Q digital data signals, carried thereby, the digital signal processor 24 extracting the I and Q digital data signals from the transport digital data signals carried by the uplink and downlink signal transmission media of the at least one other radio equipment 16; wherein the analytic computer unit 30 analyzes the extracted I and Q digital data signals of the at least one selected radio equipment 16 and the extracted I and Q digital data signals of the at one other radio equipment 16 to determine therefrom a possible location of an interfering source of signal distortion or corruption.

The system 22 may further comprise at least one of an aerial vehicle 510 and a surface vehicle 512, the at least one of the aerial vehicle 510 and the surface vehicle 512 having signal receiving equipment to receive signals emitted by the interfering source of signal distortion or corruption. The at least one of an aerial vehicle 510 and a surface vehicle 512 is dispatched to the possible location of the interfering source of signal distortion or corruption to receive signals emitted by the interfering source of signal distortion or corruption. Alternatively, the system 22 dispatches at least one of an aerial vehicle 510 and a surface vehicle 512 not forming part of the system 22 to the possible location of the interfering source of signal distortion or corruption, the at least one of the aerial vehicle 510 and the surface vehicle 512 having signal receiving equipment to receive signals emitted by the interfering source of signal distortion or corruption.

The method may further comprise the step of selecting at least one histogram percentile for display. Or, the method may comprise the steps of: generating a spectral output signal of a frequency spectrum trace from the histogram data; displaying on a display the at least one histogram percentile trace; and providing by the web server 32 the spectral output signal to the internet protocol network.

The method may further comprise the step of adjusting the display update rate of the at least one histogram percentile trace.

The method may further include the steps of operatively coupling a web server 32 to an internet protocol network, and providing by the web server 32 the at least one histogram percentile trace.

The method may further include the steps of remotely locating the display from the web server 32, and operatively coupling the display to the web server 32 through the internet protocol network.

In the system 22 of the present invention, there is preferably also a separate transmitter with associated antenna that can transmit test signals.

In a preferred form of the system 22 of the present invention, the test signals consist of a pulsed signal.

In a preferred form of the system 22 of the present invention, the test signal consists of a pulsed signal that is modulated.

In a preferred form of the system 22 of the present invention, the modulation is a chirp (a frequency sweep in either or both directions, of arbitrary shape).

In a preferred form of the system 22 of the present invention, the modulation is phase modulation.

In a preferred form of the system 22 of the present invention, the test signal is phase modulated.

In a preferred form of the system 22 of the present invention, the frequency of transmission is within the reception bandwidth of the radio equipment 16.

In a preferred form of the system 22 of the present invention, the frequency is within the reception bandwidth of the radio equipment 16.

In a preferred form of the system 22 of the present invention, the frequency is within the reception bandwidth of the radio equipment 16.

In a preferred form of the system 22 of the present invention, the frequency is within the reception bandwidth of the radio equipment 16.

In a preferred form of the system 22 of the present invention, the frequency is within the reception bandwidth of the radio equipment 16.

In a preferred form of the system 22 of the present invention, the transmitter is located nearby the radio equipment 16.

In a preferred form of the system 22 of the present invention, the transmitter is located in a vehicle. The vehicle may be unmanned, including an unmanned aerial vehicle 510 (a drone).

In a preferred form of the system 22 of the present invention, the test signal is received by the radio equipment 16; and wherein the test signal that has been received and re-transmitted by a bi-directional amplifier is also received.

In a preferred form of the system 22 of the present invention, the received signal is used to determine a set of probable positions for the bi-directional amplifier, relative to the vehicle location.

In a preferred form of the system 22 of the present invention, the vehicle moves to multiple locations, and the set of probable positions for the bi-directional amplifier is reduced to a smaller set of probable locations, based on the intersections of the probable position determined for each vehicle position. The vehicle reports its position to the analytic computer unit 30 via a cellular network connection.

In a preferred form of the system 22 of the present invention, the frequency of operation is outside the frequencies used for communication.

In a preferred form of the system 22 of the present invention, the time of day that the transmitter is operating is controlled.

In a preferred form of the system 22 of the present invention, the time of day that the transmitter is operating is controlled by the analytic computer unit 30.

In a preferred form of the system 22 of the present invention, the time of day that the transmitter is operating is when the communications traffic transmitted or received by the radio equipment 16 is low.

Furthermore, in accordance with one form of the method of the present invention, there is also a separate transmitter with associated antenna that can transmit test signals.

In a preferred form of the method, the test signals consist of a pulsed signal.

In a preferred form of the method, the test signal consists of a pulsed signal that is modulated.

In a preferred form of the method, the modulation is a chirp (a frequency sweep in either or both directions, of arbitrary shape).

In a preferred form of the method, the modulation is phase modulation.

In a preferred form of the method, the test signal is phase modulated.

In a preferred form of the method, the frequency of transmission is within the reception bandwidth of the radio equipment 16.

In a preferred form of the method, the frequency is within the reception bandwidth of the radio equipment 16.

In a preferred form of the method, the frequency is within the reception bandwidth of the radio equipment 16.

In a preferred form of the method, the frequency is within the reception bandwidth of the radio equipment 16.

In a preferred form of the method, the frequency is within the reception bandwidth of the radio equipment 16.

In a preferred form of the method, the received signal from the radio equipment 16 is used to determine a set of probable positions for the bi-directional amplifier, relative to the transmitter location.

In a preferred form, the method is used to determine the set of probable positions for the bi-directional amplifier relative to the transmitter location is the relative timing of the signals received from each.

In a preferred form, the system 22 connects to at least one additional radio equipment 16.

In a preferred form of the method, the set of probable positions for the bi-directional amplifier is made smaller by the intersection of the sets of probable locations determined with the first radio equipment 16 and the at least second radio equipment 16. Also, the radio equipment 16 can be commanded to generate test signals in the downlink; and the test signals consist of at least three discrete tones.

In a preferred form of the system 22, the equipment monitoring system 22 can be requested to command the radio equipment controller 18 to generate test signals in the downlink; and wherein the test signals consist of at least three discrete tones.

In a preferred form of the system 22, the extracted I and Q digital data signals from the uplink are used to determine the relative phase of the at least three test tones.

In a preferred form of the system 22, the extracted I and Q digital data signals from the uplink are used to determine the relative phase of the at least three test tones.

In a preferred form of the system 22, the phase of the three test tones is determined by means of a complex Fourier transform.

In a preferred form of the method, the phase of the three test tones is determined by means of a complex Fourier transform.

In a preferred form of the system 22, the phase of the three test tones is used to determine the distance from the radio equipment 16 to an object causing intermodulation distortion.

In a preferred form of the system 22, the phase of the three test tones is used to determine the distance from the radio equipment 16 to an object causing intermodulation distortion.

A system 22 formed in accordance with another form of the present invention is connected to the cable assembly that is connected to an antenna, wherein the system 22 generates at least three discrete test tones. The system 22 has a filter to eliminate the reception of the at least three test tones. The system 22 has a receiver. The receiver is used to determine the relative phase of the three test tones.

The frequencies of the at least three test tones is preferably set so that intermodulation products of the at least three test tones produce at least two discrete tones within the bandwidth of the filter.

The relative phase of the two test tones is used to determine the distance to an object causing intermodulation distortion.

The method used to determine the of signal distortion or corruption is based on a convolutional neural network 500 implemented partially or wholly in the digital signal processor 24. Preferably, the convolutional neural network 500 operates on inputs from the extracted I and Q digital data signals. The convolutional neural network 500 preferably operates on inputs from Fourier transforms of the extracted I and Q digital data signals. The convolutional neural network 500 further preferably operates on inputs that are time-aligned with LTE symbols that are received by the radio equipment 16. Also, the convolutional neural network 500 may operate on inputs that are a combination of extracted I and Q digital data signals and Fourier transforms of the I and Q digital data signals.

The convolutional neural network 500 may operate on inputs that are a combination of extracted I and Q digital data signals and Fourier transforms of the I and Q digital data signals that is time-aligned with LTE symbols that are received by the radio equipment 16. Alternatively, the convolutional neural network 500 may operate on inputs that are a combination of Fourier transforms of the extracted I and Q digital data signals and Fourier transforms of the I and Q digital data signals that is time-aligned with LTE symbols that are received by the radio equipment 16.

Furthermore, the convolutional neural network 500 may operate on inputs that are a combination of the I and Q digital data signals, Fourier transforms of the extracted I and Q digital data signals, and Fourier transforms of the I and Q digital data signals that is time-aligned with LTE symbols that are received by the radio equipment 16. In addition, the convolutional neural network 500 may operate on inputs that are three-dimensional histograms derived from Fourier transforms of the extracted I and Q digital data signals.

The convolutional neural network 500 may operate on a combination of inputs that are the I and Q digital data signals, and three-dimensional histograms derived from Fourier transforms of the extracted I and Q digital data signals. The convolutional neural network 500 may operate on a combination of inputs that are the I and Q digital data signals, and three-dimensional histograms derived from Fourier transforms of the extracted I and Q digital data signals that are time-aligned with LTE symbols received by the radio equipment 16.

The convolutional neural network 500 may operate on a combination of inputs that are the I and Q digital data signals, and three-dimensional histograms derived from Fourier transforms of the extracted I and Q digital data signals, and Fourier transforms that are time-aligned with LTE symbols received by the radio equipment 16. The convolutional neural network 500 may operate on inputs that are the magnitude data derived from Fourier transforms of the extracted I and Q digital data signals.

The convolutional neural network 500 may operate on inputs that are the logarithm of the magnitude data derived from Fourier transforms of the extracted I and Q digital data signals.

Preferably, the convolutional neural network 500 is flexible, and is configured from a library 514 of setup parameters for different scenarios. The output of the convolutional neural network 500 is a signal indicating the probable cause of signal distortion or corruption.

The final output of the convolutional neural network 500 is a signal based on a comparison of the outputs based on inputs from the I and Q digital data signals, and with outputs based on inputs from Fourier transforms of the I and Q digital data signals. The final output preferably includes signals for multiple likely causes of signal distortion and corruption, and also preferably includes a confidence-level signal for each likely cause of signal distortion and corruption.

Preferably, the final output of the convolutional neural network 500 is a signal based on a comparison of the outputs based on inputs from the I and Q digital data signals, and with outputs based on inputs from Fourier transforms of the I and Q digital data signals that are time-aligned with LTE symbols received by the radio equipment 16. The final output preferably includes signals for multiple likely causes of signal distortion and corruption, and also preferably includes a confidence-level signal for each likely cause of signal distortion and corruption.

In yet another form, the final output of the convolutional neural network 500 is a signal based on a comparison of the outputs based on inputs from the I and Q digital data signals, outputs based on inputs from Fourier transforms of the I and Q digital data signals, and outputs based on inputs from Fourier transforms of the I and Q digital data signals that are time-aligned with LTE symbols received by the radio equipment 16. The final output preferably includes signals for multiple likely causes of signal distortion and corruption, and also includes a confidence-level signal for each likely cause of signal distortion and corruption.

In still another form, the final output of the convolutional neural network 500 is a signal based on a comparison of the outputs based on inputs from the I and Q digital data signals, and with outputs based on inputs from Fourier transforms of the I and Q digital data signals, and outputs based on inputs from Fourier transforms of the I and Q digital data signals that are time-aligned with LTE symbols received by the radio equipment 16. The final output preferably includes signals for multiple likely causes of signal distortion and corruption, and also includes a confidence-level signal for each likely cause of signal distortion and corruption.

In still another form of the present invention, the final output of the convolutional neural network 500 is a signal based on a comparison of the outputs based on inputs from the I and Q digital data signals, and with outputs based on three-dimensional histograms based on Fourier transforms of the I and Q digital data signals. The final output preferably includes signals for multiple likely causes of signal distortion and corruption, and also includes a confidence-level signal for each likely cause of signal distortion and corruption.

The switching sub-assembly 26 of the system 22 of the present invention, in one form is a robotic operated, mechanical-optical assembly. The switching sub-assembly 26 preferably includes: a support panel; a plurality of optical fiber input connectors mounted on the support panel, at least some of the optical fiber connectors of the plurality of optical fiber connectors having an exterior monitor jack and an interior monitor jack optically coupled to the exterior monitor jack, the exterior monitor jacks of at least some of the optical fiber connectors being optically coupled to respective uplink and downlink fiber optic signal transmission lines, each of the interior monitor jacks of the optical fiber connectors defining a port for at least partially receiving and optically coupling to an optical test connection plug; at least a pair of test connection plugs, each test connection plug of the pair of test connection plugs being receivable by and optically coupleable to a respective interior monitor jack; at least a pair of fiber optic test connection cables, each test connection cable of the pair of test connection cables being optically coupled to a respective test connection plug of the pair of test connection plugs; at least a pair of optical fiber output connectors, each test connection cable being optically coupled to a respective output connector of the pair of output connectors; an arm and gripper mechanism 74, the arm and gripper mechanism 74 being moveable and coupleable to at least one test connection plug of the pair of test connection plugs; and a transport mechanism, the arm and gripper mechanism 74 being operatively coupled to the transport mechanism, the transport mechanism effecting movement of the arm and gripper mechanism 74 to position the arm and gripper mechanism 74 in alignment with at least one of a respective test connection plug and a first respective interior monitor jack and so that the arm and gripper mechanism 74 is engageable with the respective test connection plug; wherein, the arm and gripper mechanism 74, when aligned with the respective test connection plug caused by the transport mechanism, may engage and remove the respective test connection plug from being optically coupled with the first respective interior monitor jack; and wherein, the arm and gripper mechanism 74, when aligned with the first respective interior monitor jack caused by the transport mechanism, may insert the respective test connection plug into a second respective interior monitor jack such that the respective test connection plug is optically coupled to the second respective interior monitor jack.

Preferably, the switching sub-assembly 26 has many input connectors and more than one output connector, but fewer output connectors than input connectors.

Furthermore, in a preferred form, the robotic operated, fiber-mechanical switching assembly 26 includes a slidable member, and a first pulley mounted on the slidable member, the at least one test connection cable being routed at least partially around the first pulley, the slidable member being biased so as to exert a known and substantially constant level of tension on the at least one test connection cable.

Preferably, each interior monitor jack has a chamfered lead-in area to provide an acceptable tolerance for insertion of the at least one test connection plug into a respective interior monitor jack by the arm and gripper mechanism 74.

The transport mechanism preferably effects movement of the arm and gripper mechanism 74 in the X-axis, the Y-axis and the Z-axis. The transport mechanism preferably includes a first stepper motor and belt drive system 22 operatively coupled to the first stepper motor to effect movement of the arm and gripper mechanism 74 in the X-axis. The transport mechanism further preferably includes a second stepper motor and a first lead screw operatively coupled to the second stepper motor to effect movement of the arm and gripper mechanism 74 in the Y-axis. The transport mechanism also preferably includes a third stepper motor and a second lead screw operatively coupled to the third stepper motor to effect movement of the arm and gripper mechanism 74 in the Z-axis.

In one form of the switching assembly 26, the arm and gripper mechanism 74 includes a cable guide generally in the form of a rounded wedge, the cable guide engaging the at least one test connection cable to aid in X-axis movement of the at least one test connection cable.

The robotic operated, fiber-mechanical switching assembly 26 also includes a housing. The housing defines an interior cavity, at least the transport mechanism and the arm and gripper mechanism 74 being situated within the interior cavity. There is also electronic circuitry situated within the internal cavity of the housing. The electronic circuitry generates control signals provided to the transport mechanism and the arm and gripper mechanism 74 to respectively control movement of the arm and gripper mechanism 74 caused by the transport mechanism and the engagement and disengagement by the arm and gripper mechanism 74 of the at least one test connection plug.

Preferably, the arm and gripper mechanism 74 of the robotic operated, fiber-mechanical switching assembly 26 includes a cradle dimensioned to hold a portion of the at least one test connection plug therein. The arm and gripper mechanism 74 further preferably includes a resilient clip, the resilient clip selectively exerting pressure on a test connection plug situated in the cradle to hold the plug therein. The resilient clip further selectively exerts pressure on a test connection plug situated in a respective interior monitor jack to allow removal of the plug from the jack.

In a preferred form, the arm and gripper mechanism 74 further includes a rotatable cam, and a motor, the cam being operatively coupled to and driven by the motor to rotate, the cam engaging the resilient clip and causing the clip to move between an open position and a closed position, and to engage the test connection plug to hold the plug in the cradle and to disconnect and remove the plug from a respective interior monitor jack.

The robotic operated, fiber-mechanical switching assembly 26 further comprises a spring, the spring being coupled to the slidable member to bias the member in a direction that causes the slidable member to exert the tension on the at least one connection cable.

Also, in a preferred form, the robotic operated, fiber-mechanical switching assembly 26 includes a multi-roller output assembly, the multi-roller output assembly having at least one pair of adjacent rotatable rollers, the at least one test connection cable passing between the pair of adjacent rotatable rollers, the rollers engaging the test connection cable to help guide the test connection cable in a desired direction.

The rotatable cam is operatively coupled to and driven by the motor to rotate. The cam engages the resilient clip and causes the clip to move between an open position and a closed position, and to engage the test connection plug to hold the plug in the cradle and to disconnect and remove the plug from a respective interior monitor jack. A respective control signal generated the electronic circuitry is provided to the motor of the arm and gripper assembly to cause the cam to rotate in a first direction and in a second direction which is opposite the first direction. The rotatable cam engages the resilient clip to cause the clip to 1) exert a force on the at least one test connection plug to disconnect the plug from a respective interior monitor jack, 2) exert a force on the at least one test connect plug to secure the plug to the arm and gripper mechanism 74, and 3) release the plug from the arm and gripper mechanism 74 in order to allow the plug to remain inserted in a respective interior monitor jack.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A method for determining the cause of distortion or corruption of signals in a cellular communications network, the cellular communications network including radio equipment and at least one radio equipment controller, and an uplink signal transmission medium and a downlink signal transmission medium interconnecting the radio equipment and the radio equipment controller, the uplink and downlink signal transmission media carrying transport digital data signals, including I (in phase) and Q (quadrature phase) digital data signals relating to cellular communications signals, the cellular communications network further including an equipment monitoring system which generates alarm signals or indicator signals representing abnormal conditions relating to the radio equipment, the method comprising the steps of:
   receiving one of the alarm or indicator signals from the network equipment monitoring system;
   determining from the received one of the alarm or indicator signals a particular radio equipment to monitor;
   operatively coupling to selected uplink and downlink signal transmission media relating to the particular radio equipment, and providing the transport digital data signals of the selected uplink and downlink signal transmission media, including the I and Q digital data signals, carried thereby;
   extracting the I and Q digital data signals from the transport digital data signals carried by the selected uplink and downlink signal transmission media;
   processing the extracted I and Q digital data signals using a Fourier Transform algorithm, and generating therefrom signal spectrum data relating thereto; and
   analyzing the signal spectrum data to detect if a signal distortion event has occurred or whether the received one of the alarm or indicator signals was a false alarm.

2. The method as defined by claim 1, wherein the step of analyzing the signal spectrum data to detect if a signal distortion event has occurred includes the sub-step of:
   comparing the signal spectrum data with stored reference spectra of normal cellular communications signals having no distortion or corruption or abnormal cellular communications signals having known causes of signal distortion or corruption to determine if the signal spectrum data has similar or dissimilar characteristics to the characteristics of the stored reference signal spectra.

3. The method as defined by claim 1, which further comprises the step of:
   when a signal distortion event has been detected, determining a time when the particular radio equipment receives no or minimal communications signals from mobile cellular communications devices; and
   analyzing the extracted I and Q digital data signals or the signal spectrum data relating thereto of the transport digital data signals carried by the selected uplink and downlink signal transmission media and occurring at the determined time of no or minimal communications signals.

4. The method as defined by claim 3, which further comprises the step of:
   comparing the signal spectrum data which exhibits no or minimal communications signals relating to the extracted I and Q digital data signals occurring at the determined time with stored reference spectra of normal cellular communications signals having no distortion or corruption or abnormal cellular communications signals having known causes of signal distortion or corruption to determine if the signal spectrum data has similar or dissimilar characteristics to the characteristics of the stored reference signal spectra, and determining therefrom the probable cause of signal distortion.

5. The method as defined by claim 4, wherein the step of determining the probable cause of signal distortion includes at least one of the sub-steps of:
   determining whether the probable cause of signal distortion is passive intermodulation distortion;
   determining whether the probable cause of signal distortion is an interfering signal; and
   determining that no signal is detected that would be the probable cause of signal distortion.

6. The method as defined by claim 5, wherein the step of determining whether the probable cause of signal distortion is passive intermodulation distortion includes the sub-steps of:
   calculating the slope of the signal spectrum data at a particular frequency, and providing therefrom a calculated slope signal; and
   determining whether the slope of the signal spectrum data from the calculated slope signal is different from a stored predetermined slope, and determining at least partially therefrom whether the probable cause of signal distortion is passive intermodulation distortion.

7. The method as defined by claim 5, wherein the step of determining whether the probable cause of signal distortion is passive intermodulation distortion includes the sub-steps of:
   comparing the signal spectrum data with a stored reference spectra of abnormal cellular communications signals having signal distortion or corruption known to be caused by passive intermodulation distortion to determine if the signal spectrum data has similar characteristics to characteristics of the stored reference signal spectra, and providing a spectrum comparison signal in response thereto;
   determining, in response to the spectrum comparison signal, at least partially therefrom whether the probable cause of signal distortion is passive intermodulation distortion.

8. The method as defined by claim 5, wherein the step of determining whether the probable cause of signal distortion is passive intermodulation distortion includes the sub-step of:
   determining whether the probable cause of signal distortion is internal passive intermodulation distortion or external passive intermodulation distortion.

9. The method as defined by claim 8, wherein the step of determining whether the probable cause of signal distortion is internal passive intermodulation distortion or external passive intermodulation distortion includes the sub-steps of:
   operatively coupling to selected uplink and downlink signal transmission media relating to the particular radio equipment and relating to at least one other radio equipment located in proximity to the particular equipment, and providing the transport digital data signals of the selected uplink and downlink signal transmission media, including the I and Q digital data signals, carried thereby;

extracting the I and Q digital data signals from the transport digital data signals carried by the selected uplink and downlink signal transmission media;

processing the extracted I and Q digital data signals using a Fourier Transform algorithm, and generating therefrom signal spectrum data relating thereto; and analyzing at least one of the signal spectrum data and the extracted I and Q digital data signals to detect if a signal distortion event caused by passive intermodulation distortion has occurred in cellular communications signals for the particular radio equipment and in cellular communications signals for the at least one other radio equipment, and determining therefrom whether the probable cause of signal distortion is internal passive intermodulation distortion or external passive intermodulation distortion.

10. The method as defined by claim 8, wherein a particular radio equipment includes a first antenna and at least a second antenna; and wherein the step of determining whether the probable cause of signal distortion is internal passive intermodulation distortion or external passive intermodulation distortion includes the sub-steps of:

operatively coupling to selected uplink and downlink signal transmission media relating to the first antenna and to the at least second antenna of the particular radio equipment, and providing the transport digital data signals of the selected uplink and downlink signal transmission media, including the I and Q digital data signals, relating to the first antenna and the at least second antenna, carried thereby;

extracting the I and Q digital data signals from the transport digital data signals carried by the selected uplink and downlink signal transmission media;

processing the extracted I and Q digital data signals using a Fourier Transform algorithm, and generating therefrom signal spectrum data relating thereto; and analyzing at least one of the signal spectrum data and the extracted I and Q digital data signals to detect if a signal distortion event caused by passive intermodulation distortion has occurred in cellular communications signals received or transmitted by the first antenna and in cellular communications signals received or transmitted by the at least second antenna, and determining therefrom whether the probable cause of signal distortion is internal passive intermodulation distortion or external passive intermodulation distortion.

11. The method as defined by claim 10, which further comprises the steps of:

mixing the I and Q digital data signals of the downlink signal transmission medium for the first antenna with the same I and Q digital data signals of the downlink signal transmission medium for the first antenna and obtaining therefrom a first mixed product data signal;

filtering the first mixed product data signal to thereby obtain a filtered first mixed product data signal residing substantially within a first frequency band of interest;

mixing the I and Q digital data signals of the downlink signal transmission medium for the at least second antenna with the same I and Q digital data signals of the downlink signal transmission medium for the at least second antenna and obtaining therefrom a second mixed product data signal;

filtering the second mixed product data signal to thereby obtain a filtered second mixed product data signal residing substantially within a second frequency band of interest;

mixing the I and Q digital data signals of the downlink signal transmission medium for the first antenna combined with the I and Q digital data signals of the downlink signal transmission medium for the at least second antenna with the same combined I and Q digital data signals of the downlink signal transmission media for the first and the at least second antennas and obtaining therefrom a third mixed product data signal;

filtering the third mixed product data signal to thereby obtain a filtered third mixed product data signal residing substantially within a third frequency band of interest;

comparing at least one of the filtered first mixed product data signal, the filtered second mixed product data signal and the filtered third mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

12. The method as defined by claim 11, wherein at least one of the first frequency band of interest, the second frequency band of interest and the third frequency band of interest is different from at least another of the at least one of the first frequency band of interest, the second frequency band of interest and the third frequency band of interest.

13. The method as defined by claim 11, wherein at least one of the first frequency band of interest, the second frequency band of interest and the third frequency band of interest is substantially the same as at least another of the at least one of the first frequency band of interest, the second frequency band of interest and the third frequency band of interest.

14. The method as defined by claim 10, which further comprises the steps of:

convolving the signal spectrum data of the downlink signal transmission medium for the first antenna with the same signal spectrum data of the downlink signal transmission medium for the first antenna and obtaining therefrom a first convolved product data signal;

filtering the first convolved product data signal to thereby obtain a filtered first convolved product data signal residing substantially within a first frequency band of interest;

convolving the signal spectrum data of the downlink signal transmission medium for the at least second antenna with the same signal spectrum data of the downlink signal transmission medium for the second antenna and obtaining therefrom a second convolved product data signal;

filtering the second convolved product data signal to thereby obtain a filtered second convolved product data signal residing substantially within a second frequency band of interest;

convolving the signal spectrum data of the downlink signal transmission medium for the first antenna combined with the signal spectrum data of the downlink signal transmission medium for the second antenna with the same combined signal spectrum data of the downlink signal transmission media for the first and second antennas and obtaining therefrom a third convolved product data signal;

filtering the third convolved product data signal to thereby obtain a filtered third convolved product data signal residing substantially within a third frequency band of interest;

comparing at least one of the filtered first convolved product data signal, the filtered second convolved product data signal and the filtered third convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

15. The method as defined by claim 14, wherein at least one of the first frequency band of interest, the second frequency band of interest and the third frequency band of interest is different from at least another of the at least one of the first frequency band of interest, the second frequency band of interest and the third frequency band of interest.

16. The method as defined by claim 14, wherein at least one of the first frequency band of interest, the second frequency band of interest and the third frequency band of interest is substantially the same as at least another of the at least one of the first frequency band of interest, the second frequency band of interest and the third frequency band of interest.

17. The method as defined by claim 10, which further comprises the steps of:

mixing the I and Q digital data signals of the downlink signal transmission medium for the first antenna with the same I and Q digital data signals of the downlink signal transmission medium for the first antenna and obtaining therefrom a first antenna mixed product data signal;

filtering the first antenna mixed product data signal to thereby obtain a filtered first antenna mixed product data signal residing substantially within a frequency band of interest;

comparing the filtered first antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

18. The method as defined by claim 10, which further comprises the steps of: convolving the signal spectrum data of the downlink signal transmission medium for the first antenna with the same signal spectrum data of the downlink signal transmission medium for the first antenna and obtaining therefrom a first antenna convolved product data signal;

filtering the first antenna convolved product data signal to thereby obtain a filtered first antenna convolved product data signal residing substantially within a frequency band of interest;

comparing the filtered first antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

19. The method as defined by claim 10, which further comprises the steps of: mixing the I and Q digital data signals of the downlink signal transmission medium for the at least second antenna with the same I and Q digital data signals of the downlink signal transmission medium for the at least second antenna and obtaining therefrom a second antenna mixed product data signal;

filtering the second antenna mixed product data signal to thereby obtain a filtered second antenna mixed product data signal residing substantially within a frequency band of interest;

comparing the filtered second antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

20. The method as defined by claim 10, which further comprises the steps of:

convolving the signal spectrum data of the downlink signal transmission medium for the at least second antenna with the same signal spectrum data of the downlink signal transmission medium for the at least second antenna and obtaining therefrom a second antenna convolved product data signal;

filtering the second antenna convolved product data signal to thereby obtain a filtered second antenna convolved product data signal residing substantially within a frequency band of interest;

comparing the filtered second antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

21. The method as defined by claim 10, which further comprises the steps of:

mixing the I and Q digital data signals of the downlink signal transmission medium for the first antenna combined with the I and Q digital data signals of the downlink signal transmission medium for the at least second antenna with the same combined I and Q digital data signals of the downlink signal transmission media for the first and the at least second antennas and obtaining therefrom a mixed product data signal;

filtering the mixed product data signal to thereby obtain a filtered mixed product data signal residing substantially within a frequency band of interest;

comparing the filtered mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

22. The method as defined by claim 10, which further comprises the steps of:

convolving the signal spectrum data of the downlink signal transmission medium for the first antenna combined with the signal spectrum data of the downlink signal transmission medium for the at least second antenna with the same combined signal spectrum data of the downlink signal transmission media for the first and the at least second antennas and obtaining therefrom a convolved product data signal;

filtering the convolved product data signal to thereby obtain a filtered convolved product data signal residing substantially within a frequency band of interest;

comparing the filtered convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

23. The method as defined by claim 10, which further comprises the steps of:

mixing the I and Q digital data signals of the downlink signal transmission medium for the first antenna with a first mixing signal and obtaining therefrom a first mixed product data signal;

filtering the first mixed product data signal to thereby obtain a filtered first mixed product data signal residing substantially within a first frequency band of interest;

mixing the I and Q digital data signals of the downlink signal transmission medium for the at least second antenna with a second mixing signal and obtaining therefrom a second mixed product data signal;

filtering the second mixed product data signal to thereby obtain a filtered second mixed product data signal residing substantially within a second frequency band of interest;

mixing the I and Q digital data signals of the downlink signal transmission medium for the first antenna combined with the I and Q digital data signals of the downlink signal transmission medium for the at least second antenna with a third mixing signal and obtaining therefrom a third mixed product data signal;

filtering the third mixed product data signal to thereby obtain a filtered third mixed product data signal residing substantially within a third frequency band of interest;

comparing at least one of the filtered first mixed product data signal, the filtered second mixed product data signal and the filtered third mixed product data signal with at least one of the I and Q digital data signals of the uplink signal transmission medium for the first antenna and the I and Q digital data signals of the uplink signal transmission medium for the second antenna, and providing therefrom at least one comparison signal; and analyzing the at least one comparison signal, and determining therefrom whether the probable cause of signal distortion is internal passive intermodulation distortion or external passive intermodulation distortion.

24. The method as defined by claim 23, wherein at least one of the first frequency band of interest, the second frequency band of interest and the third frequency band of interest is different from at least another of the at least one of the first frequency band of interest, the second frequency band of interest and the third frequency band of interest.

25. The method as defined by claim 23, wherein at least one of the first frequency band of interest, the second frequency band of interest and the third frequency band of interest is substantially the same as at least another of the at least one of the first frequency band of interest, the second frequency band of interest and the third frequency band of interest.

26. The method as defined by claim 23, wherein at least one of the first mixing signal, the second mixing signal and the third mixing signal is different from at least another of the at least one of the first mixing signal, the second mixing signal and the third mixing signal.

27. The method as defined by claim 23, wherein at least one of the first mixing signal, the second mixing signal and the third mixing signal is substantially the same as at least another of the at least one of the first mixing signal, the second mixing signal and the third mixing signal.

28. The method as defined by claim 10, which further comprises the steps of:

convolving the signal spectrum data of the downlink signal transmission medium for the first antenna with a first mixing signal and obtaining therefrom a first convolved product data signal;

filtering the first convolved product data signal to thereby obtain a filtered first convolved product data signal residing substantially within a first frequency band of interest;

convolving the signal spectrum data of the downlink signal transmission medium for the at least second antenna with a second mixing signal and obtaining therefrom a second convolved product data signal;

filtering the second convolved product data signal to thereby obtain a filtered second convolved product data signal residing substantially within a second frequency band of interest;

convolving the signal spectrum data of the downlink signal transmission medium for the first antenna combined with the signal spectrum data of the downlink signal transmission medium for the at least second antenna with a third mixing signal and obtaining therefrom a third convolved product data signal;

filtering the third convolved product data signal to thereby obtain a filtered third convolved product data signal residing substantially within a third frequency band of interest;

comparing at least one of the filtered first convolved product data signal, the filtered second convolved product data signal and the filtered third convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

29. The method as defined by claim 28, wherein at least one of the first frequency band of interest, the second frequency band of interest and the third frequency band of interest is different from at least another of the at least one of the first frequency band of interest, the second frequency band of interest and the third frequency band of interest.

30. The method as defined by claim 28, wherein at least one of the first frequency band of interest, the second frequency band of interest and the third frequency band of interest is substantially the same as at least another of the at least one of the first frequency band of interest, the second frequency band of interest and the third frequency band of interest.

31. The method as defined by claim 28, wherein at least one of the first mixing signal, the second mixing signal and the third mixing signal is different from at least another of the at least one of the first mixing signal, the second mixing signal and the third mixing signal.

32. The method as defined by claim 28, wherein at least one of the first mixing signal, the second mixing signal and the third mixing signal is substantially the same as at least another of the at least one of the first mixing signal, the second mixing signal and the third mixing signal.

33. The method as defined by claim 10, which further comprises the steps of:
mixing the I and Q digital data signals of the downlink signal transmission medium for the first antenna with a mixing signal and obtaining therefrom a first antenna mixed product data signal;
filtering the first antenna mixed product data signal to thereby obtain a filtered first antenna mixed product data signal residing substantially within a frequency band of interest;
comparing the filtered first antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and
analyzing the at least one comparison signal, and determining therefrom whether the probable cause of signal distortion is internal passive intermodulation distortion or external passive intermodulation distortion.

34. The method as defined by claim 10, which further comprises the steps of:
convolving the signal spectrum data of the downlink signal transmission medium for the first antenna with a mixing signal and obtaining therefrom a first antenna convolved product data signal;
filtering the first antenna convolved product data signal to thereby obtain a filtered first antenna convolved product data signal residing substantially within a frequency band of interest;
comparing the filtered first antenna convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

35. The method as defined by claim 10, which further comprises the steps of:
mixing the I and Q digital data signals of the downlink signal transmission medium for the at least second antenna with a mixing signal and obtaining therefrom a second antenna mixed product data signal;
filtering the second antenna mixed product data signal to thereby obtain a filtered second antenna mixed product data signal residing substantially within a frequency band of interest;
comparing the filtered second antenna mixed product data signal with at least one of the I and Q digital data signals of the uplink signal transmission medium for the first antenna and the I and Q digital data signals of the uplink signal transmission medium for the at least second antenna, and providing therefrom at least one comparison signal; and
analyzing the at least one comparison signal, and determining therefrom whether the probable cause of signal distortion is internal passive intermodulation distortion or external passive intermodulation distortion.

36. The method as defined by claim 10, which further comprises the steps of:
convolving the signal spectrum data of the downlink signal transmission medium for the at least second antenna with a mixing signal and obtaining therefrom a second antenna convolved product data signal;
filtering the second antenna convolved product data signal to thereby obtain a filtered second antenna convolved product data signal residing substantially within a frequency band of interest;
comparing the filtered second antenna convolved product data signal with at least one of the signal spectrum data of the uplink signal transmission medium for the first antenna and the signal spectrum data of the uplink signal transmission medium for the at least second antenna, and providing therefrom at least one comparison signal; and
analyzing the at least one comparison signal, and determining therefrom whether the probable cause of signal distortion is internal passive intermodulation distortion or external passive intermodulation distortion.

37. The method as defined by claim 10, which further comprises the steps of:
mixing the I and Q digital data signals of the downlink signal transmission medium for the first antenna combined with the I and Q digital data signals of the downlink signal transmission medium for the at least second antenna with a mixing signal and obtaining therefrom a mixed product data signal;
filtering the mixed product data signal to thereby obtain a filtered mixed product data signal residing substantially within a frequency band of interest;
comparing the filtered mixed product data signal with at least one of the I and Q digital data signals of the uplink signal transmission medium for the first antenna and the I and Q digital data signals of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

38. The method as defined by claim 10, which further comprises the steps of:

convolving the signal spectrum data of the downlink signal transmission medium for the first antenna combined with the signal spectrum data of the downlink signal transmission medium for the at least second antenna with a mixing signal and obtaining therefrom a convolved product data signal;

filtering the convolved product data signal to thereby obtain a filtered convolved product data signal residing substantially within a frequency band of interest;

comparing the filtered convolved product data signal with at least one of the signal spectrum data of the uplink signal transmission medium for the first antenna and the signal spectrum data of the uplink signal transmission medium for the at least second antenna, and providing therefrom at least one comparison signal; and analyzing the at least one comparison signal, and determining therefrom whether the probable cause of signal distortion is internal passive intermodulation distortion or external passive intermodulation distortion.

* * * * *